United States Patent
Li et al.

(10) Patent No.: US 12,406,371 B2
(45) Date of Patent: Sep. 2, 2025

(54) SYSTEMS AND METHODS FOR IMAGE SEGMENTATION USING MULTIPLE STAIN INDICATORS

(71) Applicant: 10x Genomics, Inc., Pleasanton, CA (US)

(72) Inventors: Dongyao Li, Pleasanton, CA (US); Neil Ira Weisenfeld, Pleasanton, CA (US); Paul Ryvkin, San Francisco, CA (US); Xiaoyan Qian, Stockholm (SE); Preyas Shah, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 0 days.

(21) Appl. No.: 19/037,114

(22) Filed: Jan. 25, 2025

(65) Prior Publication Data
US 2025/0245832 A1    Jul. 31, 2025

Related U.S. Application Data

(60) Provisional application No. 63/570,399, filed on Mar. 27, 2024, provisional application No. 63/566,088, (Continued)

(51) Int. Cl.
*G06T 7/00* (2017.01)
*G06T 7/11* (2017.01)
(Continued)

(52) U.S. Cl.
CPC ............. *G06T 7/0014* (2013.01); *G06T 7/11* (2017.01); *G06T 7/136* (2017.01); *G06T 7/194* (2017.01);
(Continued)

(58) Field of Classification Search
CPC ........ G06T 7/0014; G06T 7/11; G06T 7/136; G06T 7/194; G06T 2207/20152; G06T 2207/20156; G06T 2207/30024
See application file for complete search history.

(56) References Cited

U.S. PATENT DOCUMENTS 7,460,709 B2    12/2008  Grady
2014/0294266 A1* 10/2014  Eichhorn ............... H04N 19/86
                                                    382/128
(Continued)

*Primary Examiner* — Mia M Thomas
(74) *Attorney, Agent, or Firm* — Erik A. Huestis; Stephen J. Kenny; Foley Hoag LLP

(57) ABSTRACT

In embodiments, a method includes reading a nuclear segmentation mask of an image including pixels arranged in two dimensions. The nuclear segmentation mask identifies cellular nuclei stained with a cellular nucleus stain. The method includes determining amplitudes for each pixel. Each amplitude corresponds to exactly one dimension of the two dimensions. The method includes constructing a graph having nodes and edges. Each node corresponds to a pixel. Nodes corresponding to neighboring pixels are connected by an edge. The method includes assigning a weight to each edge. Each edge's weight is based on amplitudes of pixels corresponding to nodes connected thereby. The method further includes, based on the graph, determining, for each cellular nuclei, a heat map corresponding to a predicted cell region associated with that cellular nucleus. The method further includes based on the heat maps of the cellular nuclei, determining a cellular segmentation mask comprising predicted cell regions.

23 Claims, 85 Drawing Sheets

Related U.S. Application Data filed on Mar. 15, 2024, provisional application No. 63/625,132, filed on Jan. 25, 2024.

(51) Int. Cl.
*G06T 7/136* (2017.01)
*G06T 7/194* (2017.01)

(52) U.S. Cl.
CPC ............. *G06T 2207/20152* (2013.01); *G06T 2207/20156* (2013.01); *G06T 2207/30024* (2013.01)

(56) References Cited

U.S. PATENT DOCUMENTS

| | | | | |
|---|---|---|---|---|
| 2015/0078640 | A1* | 3/2015 | Guo | G06T 7/12 |
| | | | | 382/131 |
| 2017/0309021 | A1* | 10/2017 | Barnes | G06T 7/0012 |
| 2019/0139221 | A1* | 5/2019 | Castro-Gonzalez | A61B 5/489 |
| 2021/0133981 | A1* | 5/2021 | Chen | G06T 7/11 |
| 2021/0225027 | A1* | 7/2021 | Wang | G06F 18/295 |
| 2021/0350176 | A1* | 11/2021 | Klaiman | G06F 18/214 |
| 2022/0076067 | A1* | 3/2022 | Marie-Nelly | G06N 3/045 |
| 2022/0175325 | A1* | 6/2022 | Fukushima | A61B 5/4872 |
| 2022/0237788 | A1* | 7/2022 | Shaul | G16H 50/70 |
| 2022/0390735 | A1* | 12/2022 | Amthor | G06T 7/11 |
| 2023/0082710 | A1* | 3/2023 | Fuchs | G06V 10/98 |
| | | | | 382/128 |
| 2024/0054639 | A1* | 2/2024 | Nadeem | G06T 7/174 |
| 2024/0281988 | A1* | 8/2024 | Abbott | G01S 17/89 |
| 2025/0061732 | A1* | 2/2025 | Li | G06T 7/194 |

* cited by examiner

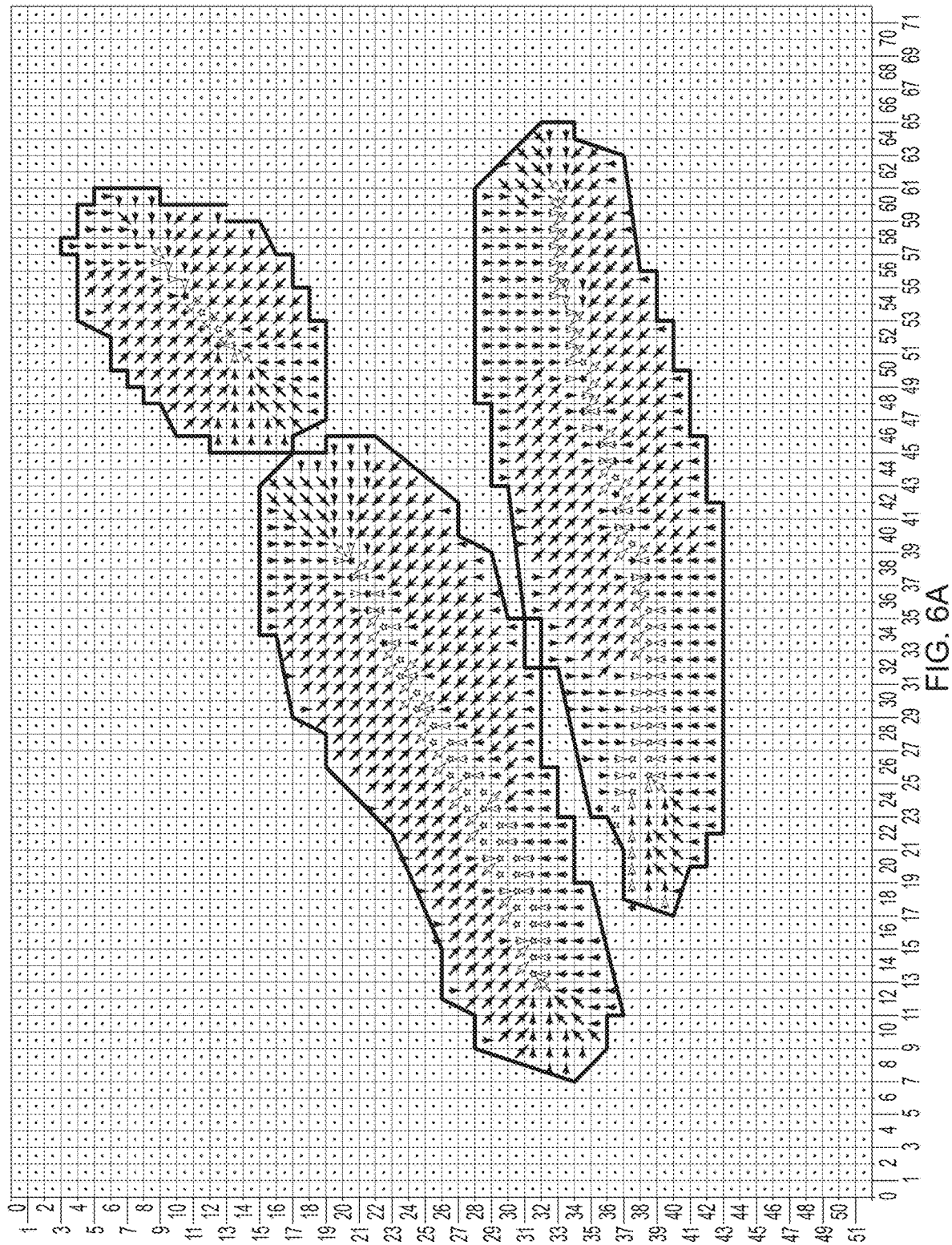

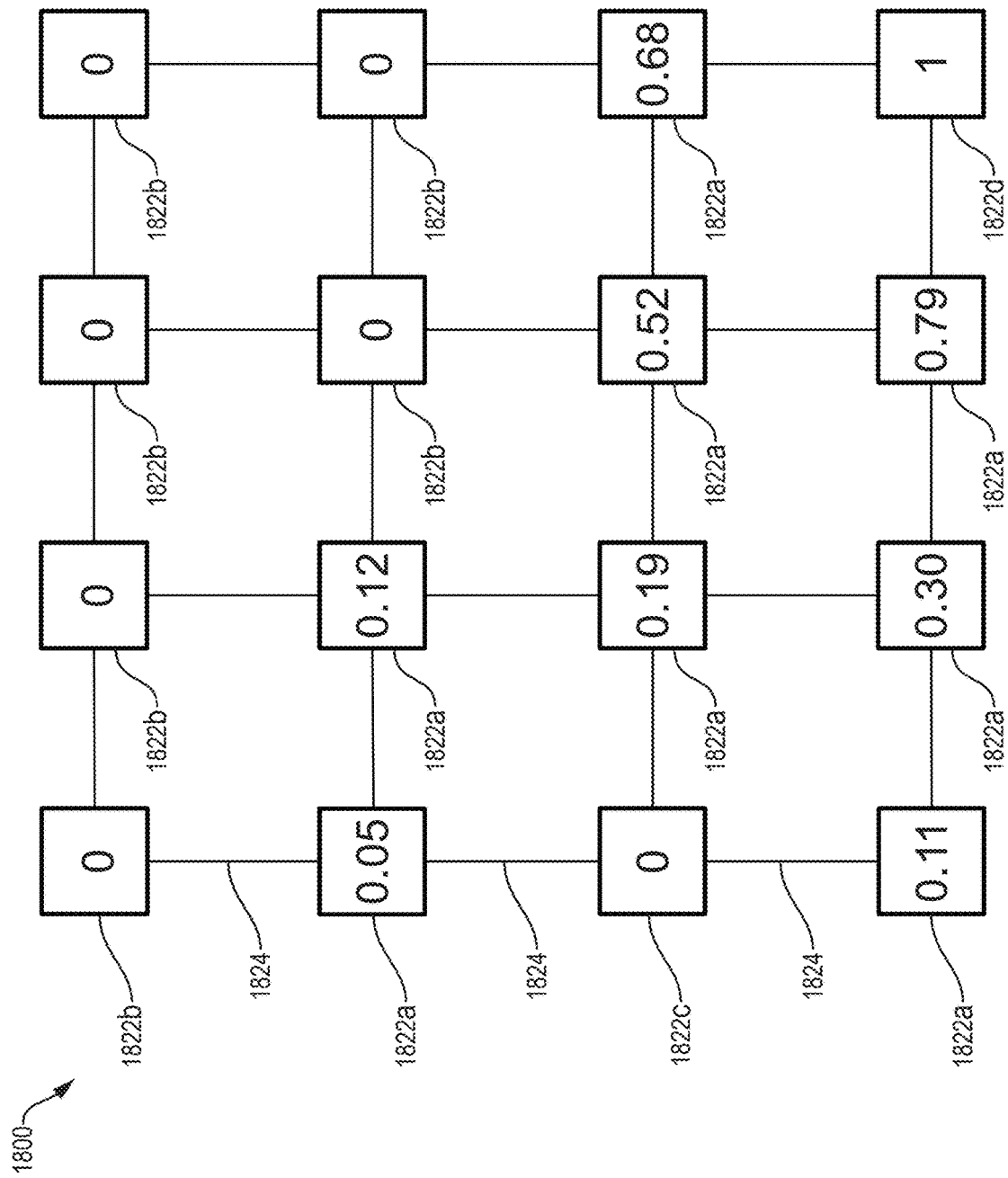

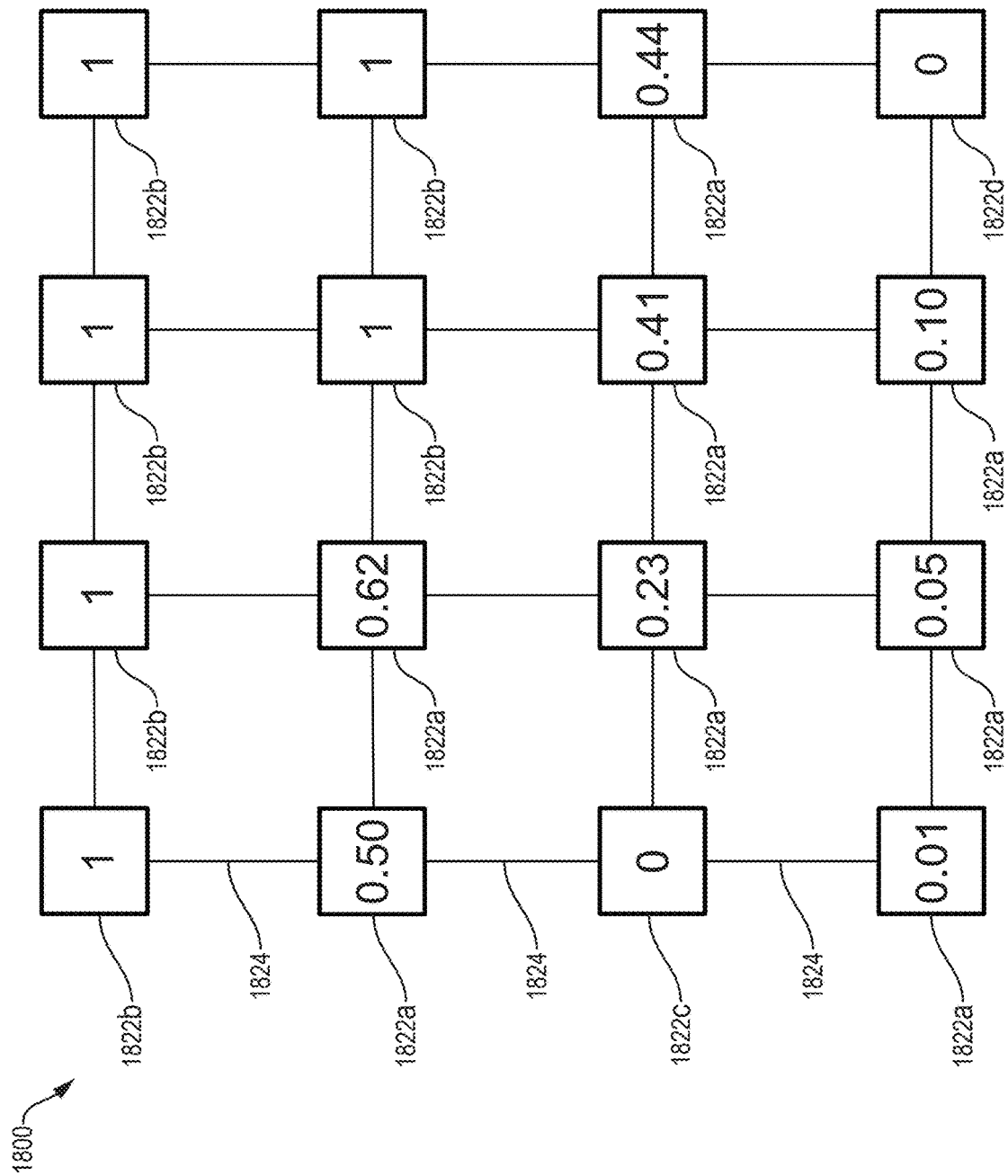

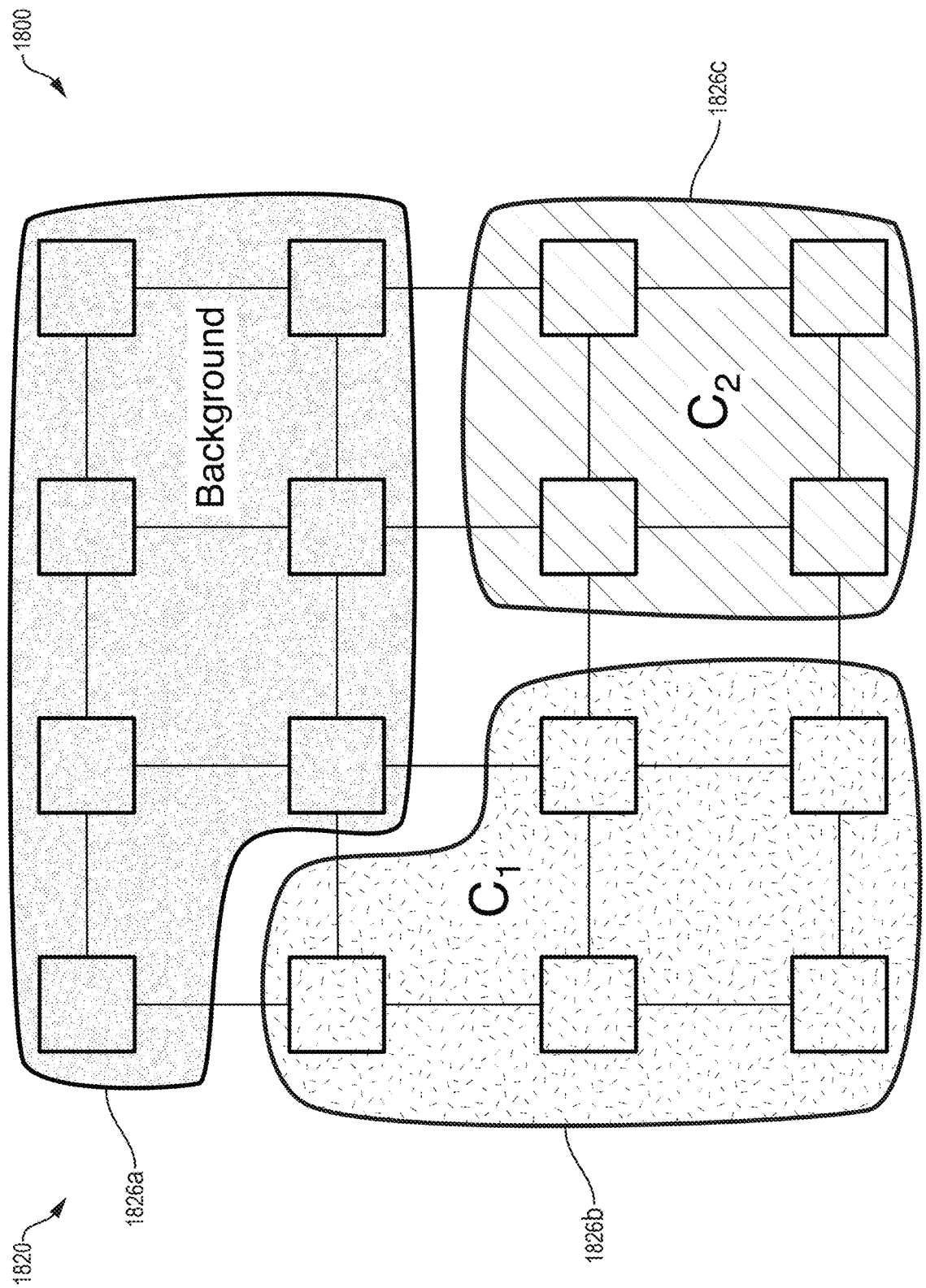

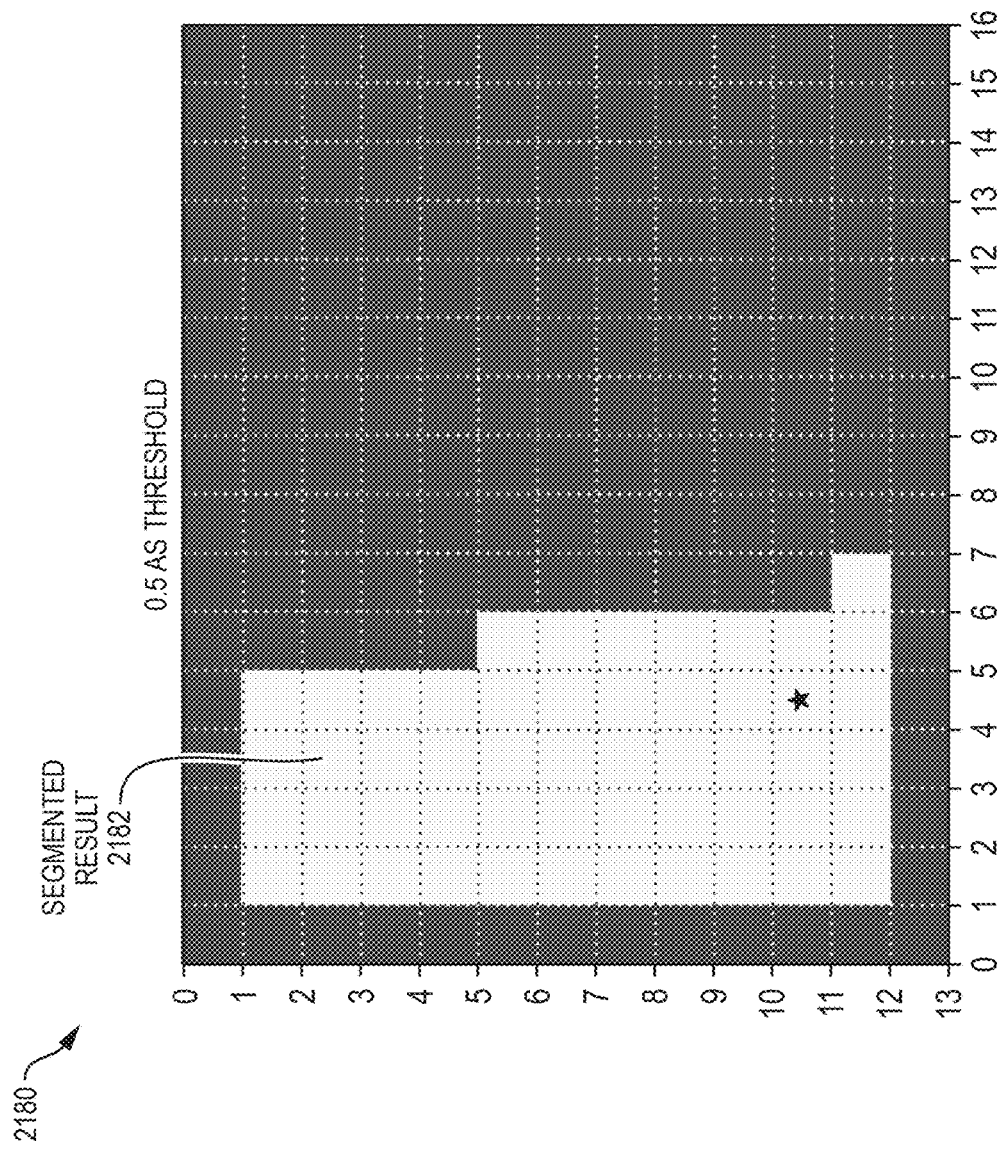

SYSTEMS AND METHODS FOR IMAGE SEGMENTATION USING MULTIPLE STAIN INDICATORS

CROSS-REFERENCE TO RELATED APPLICATIONS

This application claims the benefit of U.S. Provisional Application Nos. 63/570,399, filed Mar. 27, 2024; 63/566,088, filed Mar. 15, 2024; and 63/625,132, filed Jan. 25, 2024, each of which is hereby incorporated by reference in its entirety.

FIELD OF THE INVENTION

The present disclosure is directed to image analysis techniques for samples, e.g., biological samples. More specifically, the present disclosure describes methods for performing segmentation of cells and cellular components such as nuclei.

BACKGROUND

In situ detection and analysis methods are emerging from the rapidly developing field of spatial biology (e.g., spatial transcriptomics, spatial proteomics, etc.). The key objectives in spatial transcriptomics are to detect, quantify, and map gene activity to specific regions in a tissue sample at cellular or sub-cellular resolution. These techniques allow one to study the subcellular distribution of gene activity (as evidenced, e.g., by expressed gene transcripts), and have the potential to provide crucial insights in the fields of developmental biology, oncology, immunology, histology, etc.

However, there are challenges in the downstream analysis of data extracted from the aforementioned in situ detection. Such challenges include accurate identification of cell boundaries and/or cell enumeration, otherwise known in the art as cell segmentation. Typically, in biological samples, such as tissue sections, (1) cells are densely packed within the space of the tissue, making it difficult to distinguish individual cells from each other; (2) the tissue can be heterogeneous with respect to cell size and shape, (3) tissue-sample processing (e.g., fixing, sectioning, mounting) introduces further heterogeneity and potential complications, and (4) there is a lack of compatible, reliable, and clear membrane-staining reagents and techniques.

Accordingly, there exists a need for fast and accurate cell segmentation methods for use in automated and high-throughput imaging systems.

SUMMARY

In some embodiments, a computer-implemented method of cell segmentation includes reading a nuclear segmentation mask of a first image. The first image includes a plurality of pixels arranged in at least two dimensions. The nuclear segmentation mask identifies a plurality of cellular nuclei stained with a cellular nucleus stain in the first image. The computer-implemented method further includes reading an interior segmentation mask of a second image. The interior segmentation mask identifies portions of the second image stained with at least one cellular interior stain. The computer-implemented method further includes, for each of the plurality of pixels in the second image, determining a plurality of amplitudes for each of the plurality of pixels. Each amplitude of the plurality of amplitudes for each of the plurality of pixels corresponds to exactly one dimension of the at least two dimensions. The computer-implemented method includes determining an expansion cost for each pixel of the second image based on at least the plurality of amplitudes. The computer-implemented method further includes, for each of the plurality of cellular nuclei, generating a predicted cell region based on the interior segmentation mask. Generating the predicted cell region comprises expanding from each cellular nucleus to a subset of the plurality of pixels according to the expansion costs of those pixels. The computer-implemented method further includes providing a cellular segmentation mask including the predicted cell regions.

In some embodiments, determining the plurality of amplitudes includes providing the second image to a pretrained machine learning model.

In some embodiments, determining the expansion cost for each pixel includes computing a divergence value based on the plurality of amplitudes.

In some embodiments, determining the expansion cost for each pixel includes applying a first cost function to each divergence value. In some embodiments, the cost function is monotonically increasing. In some embodiments, the expansion cost for each pixel is additionally based on its distance to one of the plurality of nuclei. In some embodiments, determining the expansion cost for each pixel also includes applying a first cost function to each divergence value to obtain a first cost, applying a second cost function to the distance of each pixel to obtain a second cost, and combining the first and second costs.

In some embodiments, the computer-implemented method includes expanding from each selected cellular nucleus to the subset of the plurality of pixels comprises geodesic expansion according to the expansion costs of those pixels.

In some embodiments, the cellular nucleus stain comprises a DAPI stain.

In some embodiments, the at least one cellular interior stain can include a 18S ribosomal RNA stain, a polyadenylated mRNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

In some embodiments, a computer-implemented method of cell segmentation includes reading a nuclear segmentation mask of a first image. The nuclear segmentation mask identifies a plurality of cellular nuclei in the first image. The computer-implemented method further includes reading a cellular segmentation mask of a second image. The cellular segmentation mask identifies a plurality of cells in the second image. The computer-implemented method further includes reading an interior segmentation mask of the second image. The interior segmentation mask identifies portions of the second image stained with a cellular interior stain. The computer-implemented method includes selecting from the nuclear segmentation mask those of the plurality of cellular nuclei that do not correspond to any of the plurality of cells identified by the cellular segmentation mask. The computer-implemented method further includes for each of the selected cellular nuclei, generating a predicted cell region based on the interior segmentation mask. The computer-implemented method further includes providing a composite cellular segmentation mask comprising the cellular segmentation mask and the predicted cell regions.

In some embodiments, the computer-implemented method includes generating the nuclear segmentation mask from portions of the first image stained by the cellular nucleus stain.

In some embodiments, wherein generating the nuclear segmentation mask comprises providing the first image to a trained machine learning model. In some embodiments, the computer-implemented method further includes generating the cellular segmentation mask from portions of the second image stained by the at least one cellular boundary stain. In some embodiments, generating the cellular segmentation mask comprises providing the image to a trained machine learning model.

In some embodiments, the nuclear stain comprises DAPI.

In some embodiments, the at least one cellular boundary stain comprises: an antibody stain for ATP1A1, an antibody stain for ATP2B1, an antibody stain for pan-cytokeratin (pan-CK), an antibody stain for pan-cadherin (pan-CDH), an antibody stain for beta 2 microglobulin (B2M), an antibody stain for FXYD3, an antibody stain for gamma-catenin, an antibody stain for S100A14, an antibody stain for beta-catenin, an antibody stain for annexin A2, an antibody stain for GLUT2, an antibody stain for E-cadherin, an antibody stain for p120 catenin, an antibody stain for cadherin-17, an antibody stain for CD44, an antibody stain for CD45, a WGA lectin stain, a Con-A lectin stain, a SNA lectin stain, or a combination thereof.

In some embodiments, the at least one cellular interior stain comprises a 18S ribosomal RNA stain, a polyadenylated mRNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

In some embodiments, generating the predicted cell regions includes performing one or more of the above methods of cell segmentation described herein.

In some embodiments, a computer-implemented method of cell segmentation includes reading a nuclear segmentation mask of a first image. The nuclear segmentation mask identifies a plurality of cellular nuclei stained with a cellular nucleus stain in the first image. The computer-implemented method includes reading a plurality of interior segmentation masks. Each of the plurality of interior segmentation masks identify portions of the second image stained with an associated cellular interior stain. The computer-implemented method further includes selecting a first interior segmentation mask from the plurality of interior segmentation masks. The computer-implemented method further includes selecting a first subset of the plurality of cellular nuclei. The first subset consisting of those nuclei associated with the portions of the second image identified by the first interior segmentation mask. The computer-implemented method further includes, for each of the first subset of cellular nuclei, generating a predicted cell region based on the first interior segmentation mask. The computer-implemented method further includes incrementally selecting one or more additional subset of the plurality of cellular nuclei based on one of the plurality of interior segmentation masks. Each of the one or more additional subset includes those of the plurality of cellular nuclei associated with its one of the plurality of interior segmentation masks but not contained in any prior subset. The computer-implemented method further includes, for each of the one or more subset, generating additional predicted cell regions based on the interior segmentation mask of that subset. The computer-implemented method further includes providing a composite cellular segmentation mask comprising the predicted cell regions and the additional predicted cell regions.

In some embodiments, selecting the first subset comprises selecting those of the plurality of nuclei overlapping the first interior segmentation mask by at least a first threshold.

In some embodiments, the associated cellular interior stains comprise a 18S ribosomal RNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

In some embodiments, generating the predicted cell region comprises performing the method of any of the methods of cell segmentation described herein.

In some embodiments, a computer program product for cell segmentation includes a computer readable storage medium having program instructions embodied therewith. The program instructions are executable by a processor to cause the processor to perform any of the above methods.

In some embodiments, a system includes a processor and a memory with program instructions executable by the processor stored thereon, such that upon being executed by the processor, the instructions perform a method according to any one of the above methods.

In some embodiments, a method includes receiving a first image comprising a nuclear stain. The method further includes determining a nuclear mask based on the first image, the nuclear mask representing a plurality of nuclei. The method further includes receiving a second image comprising a cell boundary stain. The method further includes determining a cell boundary mask from the second image. The method further includes receiving a third image comprising a first interior cell stain. The method further includes determining a first cell interior mask from the third image. The method further includes determining a first cell boundary based on the cell boundary mask. The method further includes determining a second cell boundary by expanding at least one nucleus of the plurality of nuclei based on the first cell interior mask.

In an embodiment, a first interior cell stain can include one or more antibody stains that all are measured in the same color channel. For example, the stain can have the same or similar fluorophore that emits light upon excitation with a specific spectrum of light.

In some embodiments, the method can also include receiving a fourth image comprising a second interior cell stain. The method can also include determining a second cell interior mask from the fourth image. The method can also include determining a third cell boundary by expanding at least one additional nucleus of the plurality of nuclei based on the second cell interior mask.

In some embodiments, the method can further include determining a remaining cell boundary by expanding at least one remaining nucleus of the plurality of nuclei using a predetermined expansion model.

In some embodiments, the predetermined expansion model comprises an isometric expansion model.

In some embodiments, the isometric expansion model stops expansion upon reaching a predetermined maximum expansion.

In some embodiments, the predetermined maximum expansion is about 5 µm to about 30 µm.

In some embodiments, the predetermined maximum expansion is about 15 µm.

In some embodiments, the isometric expansion model stops expansion upon encountering another cell boundary.

In some embodiments, the at least one remaining nucleus is not expanded based on any cell interior mask or any cell boundary mask.

In some embodiments, a computer program product for cell segmentation includes a computer readable storage medium having program instructions embodied therewith. The program instructions are executable by a processor to cause the processor to perform a method according to any one of the above methods.

In some embodiments, a method includes determining a nuclear mask from a first image comprising a cellular nucleus stain, wherein the nuclear mask comprises a plurality of nuclear boundaries. The method further includes determining a cell boundary mask from a second image comprising at least one cellular boundary stain. The cell boundary mask includes a plurality of cell boundaries. The method further includes determining a first plurality of segmented cells based on the plurality of cell boundaries in the cell boundary mask. The method further includes determining a first cell interior mask from a third image comprising at least one cellular interior stain. The method further includes determining a second plurality of segmented cells by comparing the plurality of nuclear boundaries or a subset thereof with the first cell interior mask. Each segmented cell of the second plurality of segmented cells is segmented using a first predetermined nuclear expansion model based on overlap with the first cell interior mask.

In some embodiments, the method can also include determining a second cell interior mask from a fourth image comprising at least one cellular interior stain. The method can also include determining a third plurality of segmented cells by comparing the plurality of nuclear boundaries or a subset thereof with the second cell interior mask, wherein each segmented cell of the third plurality of segmented cells is segmented using the first predetermined nuclear expansion model based on overlap with the second cell interior mask.

In some embodiments, the method includes determining a final plurality of segmented cells by expanding at least one nuclear boundary of the plurality of nuclear boundaries using a second predetermined nuclear expansion model.

In some embodiments, at least one nuclear boundary of the plurality of nuclear boundaries does not have an associated segmented cell from the first plurality of segmented cells or the plurality of segmented cells.

In some embodiments, the second predetermined expansion model comprises an isometric expansion of the at least one nuclear boundary.

In some embodiments, the isometric expansion model stops expansion upon reaching a predetermined maximum expansion.

In some embodiments, the predetermined maximum expansion is about 5 µm to about 30 µm.

In some embodiments, the predetermined maximum expansion is about 15 µm.

In some embodiments, the isometric expansion model stops expansion upon encountering another cell boundary.

In some embodiments, method further includes, after the first plurality of segmented cells are segmented, removing nuclei corresponding to the first plurality of segmented cells from the plurality of nuclear boundaries.

In some embodiments, the cellular nucleus stain comprises DAPI.

In some embodiments, the at least one cellular boundary stain comprises: an antibody stain for ATP1A1, an antibody stain for ATP2B1, an antibody stain for pan-cytokeratin (pan-CK), an antibody stain for pan-cadherin (pan-CDH), an antibody stain for beta 2 microglobulin (B2M), an antibody stain for FXYD3, an antibody stain for gamma-catenin, an antibody stain for S100A14, an antibody stain for beta-catenin, an antibody stain for annexin A2, an antibody stain for GLUT2, an antibody stain for E-cadherin, an antibody stain for p120 catenin, an antibody stain for cadherin-17, an antibody stain for CD44, an antibody stain for CD45, a WGA lectin stain, a Con-A lectin stain, a SNA lectin stain, or a combination thereof.

In some embodiments, the at least one cellular interior stain comprises: a 18S ribosomal RNA stain, a polyadenylated mRNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

In some embodiments, computer program product for cell segmentation includes a computer readable storage medium having program instructions embodied therewith. The program instructions executable by a processor to cause the processor to perform a method according to any of the above methods.

In some embodiments, a system for cell segmentation includes a processor and a memory. The memory is configured to store program instructions embodied therewith. The program instructions are executable by the processor to cause the processor to perform any of the above methods.

In some embodiments, a computer-implemented method of cell segmentation includes reading a nuclear segmentation mask of an image. The image includes a plurality of pixels arranged in at least two dimensions. The nuclear segmentation mask identifies a plurality of cellular nuclei stained with a cellular nucleus stain in the image. The method includes, for each of the plurality of pixels in the image, determining a plurality of amplitudes for each of the plurality of pixels. Each amplitude of the plurality of amplitudes for each of the plurality of pixels corresponds to exactly one dimension of the at least two dimensions. The method further includes constructing a graph having a plurality of nodes and a plurality of edges. Each of the plurality of nodes corresponds to one of the plurality of pixels. Nodes corresponding to neighboring pixels are connected by one of the plurality of edges. The method further includes assigning a weight to each of the plurality of edges. The weight of each respective edge is based on the amplitudes of the pixels corresponding to the nodes connected thereby. The method further includes, based on the graph, determining, for each of the plurality of cellular nuclei, a heat map corresponding to a predicted cell region associated with that cellular nucleus. The method further includes based on the heat maps of the plurality of cellular nuclei, determining a cellular segmentation mask comprising the predicted cell regions.

In some embodiments, only those nodes of the plurality of nodes corresponding to adjacent pixels are connected by one of the plurality of edges.

In some embodiments, the method includes reading an interior segmentation mask and/or a background mask of the image. Constructing the graph is based on the interior segmentation mask and/or the background mask.

In some embodiments, the method includes, based on the heat maps of the plurality of cellular nuclei, assigning each of the plurality of pixels to one of the plurality of cellular nuclei or to a background region.

In some embodiments, said assigning further includes selecting, for at least a portion of the plurality of pixels, a cellular nucleus of the plurality of cellular nuclei having an associated heat map with a highest value for that pixel.

In some embodiments, determining the heat maps comprises minimizes a Dirichlet energy for the graph.

In some embodiments, determining the heat maps comprises representing the graph as a Laplacian matrix.

In some embodiments, determining the plurality of amplitudes comprises providing the image to a pretrained machine learning model.

In some embodiments, the method further includes computing a divergence value for each pixel based on its plurality of amplitudes.

In some embodiments, the weight of each edge is further based on the divergence values of the pixels corresponding to the nodes connected thereby.

In some embodiments, the cellular nucleus stain comprises a DAPI stain.

In some embodiments, the method further includes determining a cellular boundary mask from the image. The cellular boundary mask identifies a plurality of cellular boundaries stained with a cellular boundary stain in the image. The method further includes determining a first plurality of segmented cells based on the plurality of cellular boundaries in the cellular boundary mask.

In some embodiments, the method further includes determining a cellular interior mask from the image. The cellular interior mask identifies portions of the image stained with a cellular interior stain. The method further includes determining a selected cellular nuclei mask, the selected cellular nuclei mask identifying a plurality of selected cellular nuclei of the plurality of cellular nuclei being within the portion of the image identified by the cellular interior mask. Determining the heat map is performed for of the plurality of selected cellular nuclei. In some embodiments, the cellular nucleus stain comprises DAPI.

In some embodiments, the at least one cellular boundary stain comprises: an antibody stain for ATP1A1, an antibody stain for ATP2B1, an antibody stain for pan-cytokeratin (pan-CK), an antibody stain for pan-cadherin (pan-CDH), an antibody stain for beta 2 microglobulin (B2M), an antibody stain for FXYD3, an antibody stain for gamma-catenin, an antibody stain for S100A14, an antibody stain for beta-catenin, an antibody stain for annexin A2, an antibody stain for GLUT2, an antibody stain for E-cadherin, an antibody stain for p120 catenin, an antibody stain for cadherin-17, an antibody stain for CD44, an antibody stain for CD45, a WGA lectin stain, a Con-A lectin stain, a SNA lectin stain, or a combination thereof.

In some embodiments, the at least one cellular interior stain comprises: a 18S ribosomal RNA stain, a polyadenylated mRNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

In some embodiments, a computer program product for cell segmentation includes a computer readable storage medium having program instructions embodied therewith, the program instructions executable by a processor to cause the processor to perform a method according to any of the above methods.

BRIEF DESCRIPTION OF THE DRAWINGS

FIGS. 6A-6B depict an exemplary two-dimensional pixel field and illustrates the classification of pixels. FIG. 6B is a closeup of a region of FIG. 6A.

FIGS. 23A-23G are diagrams of exemplary graphs illustrating a segmentation method that employs a heat diffusion model to segment features (e.g., cell boundaries) in images.

FIGS. 26A-26E are diagrams illustrating embodiments of a method of a heat map based method that improves on alternative cell segmentation methods.

In the figures, elements and steps having the same or similar reference numeral have the same or similar attributes or description, unless explicitly stated otherwise.

DETAILED DESCRIPTION

Figure 1:
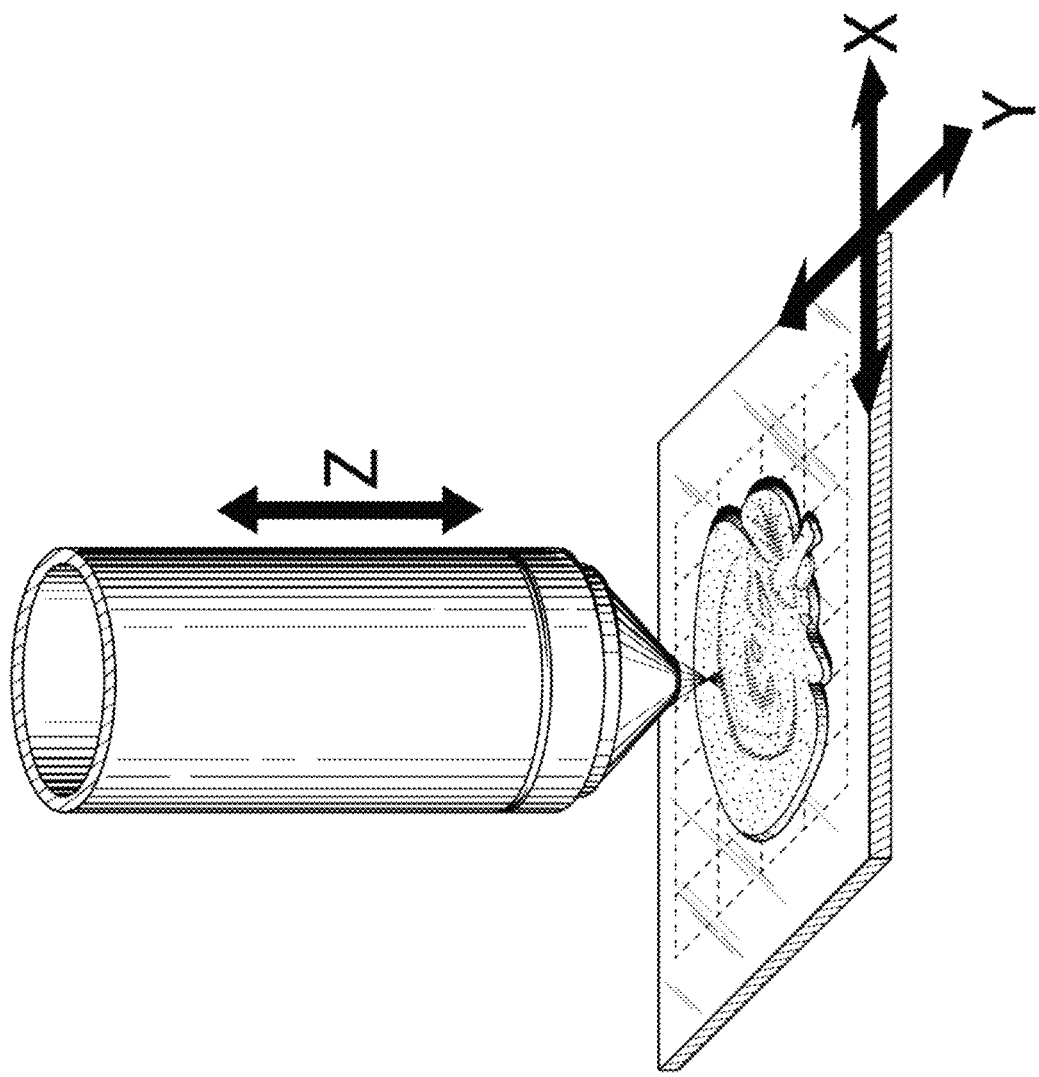
FIG. 1 depicts an overview of a volumetric sample imaging system and illustrates a Field of View (FOV) grid bounding the sample (e.g., hydrogel, tissue section, one or more cells, etc.) as projected onto the surface of a solid substrate supporting the sample.
Figure 2:
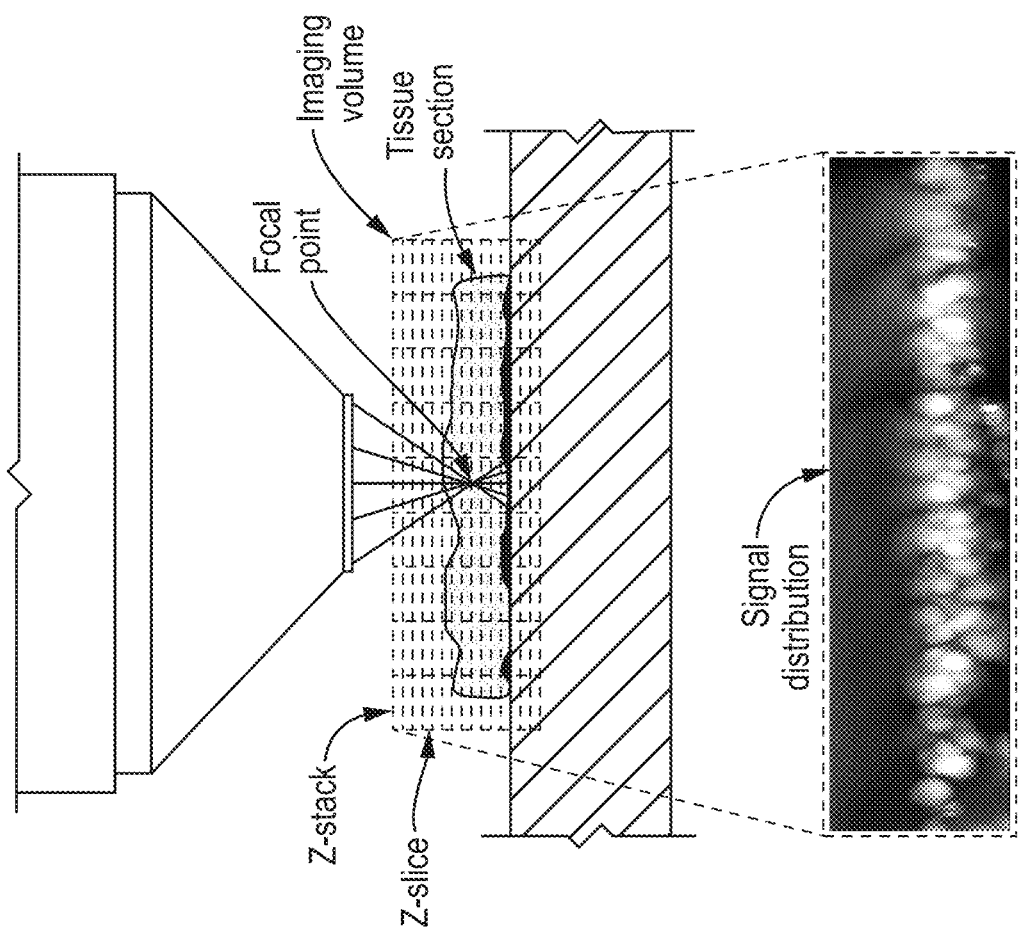
FIG. 2 depicts the XZ cross-sectional view and illustrates tissue non-uniformity in the Z dimension, where the full (non-reduced) imaging volume is oversampled in the Z dimension. The objective lens focal point is positioned to acquire an image at every Z-slice in a Z-stack. An XZ image of signal distribution (bottom) demonstrates a non-uniform distribution of detected signal within the imaging volume.

In volumetric sample imaging systems (e.g., an optofluidic instrument), a z-stack of images is obtained for each Field of View (FOV) of the objective (FIG. 1). For such automated, high-throughput tissue imaging applications, automatically identifying relevant regions—those regions that contain target molecules such as nucleic acids or proteins—can be challenging as distribution of tissue is non-uniform in many biological samples (FIG. 2). The data extracted from the detection and analysis methods disclosed herein (e.g., in situ detection and analysis of target analytes, such as SBS, SBL, SBH; and in situ hybridization techniques, such as smFISH and MERFISH) include the relative coordinates within a field of view (FOV) and provides intricate information regarding tissue organization, yet the data is still obfuscated by the difficulty of telling individual cells apart. This further hampers downstream analyses such as tissue architecture, cell interactions, context-dependent expression states, and spatial relationships between cell types. The effective spatial resolution of cells is therefore dependent on the presence of discriminating features for effective analysis. Thus, to achieve cellular resolution, accurate and efficient cell segmentation is necessary. However, cell segmentation remains a challenge and bottleneck in image cytometry and high-throughput analysis.

In general, the systems and methods described herein use any suitable method to generate contrast of a sample against a background (e.g., illumination of a sample via bright field imaging, illumination of a sample via fluorescent imaging, inducing autofluorescence within the sample, adding contrast to the sample with one or more stains, etc.)

General Terminology

Specific terminology is used throughout this disclosure to explain various aspects of the methods, systems, and compositions that are described. Unless otherwise defined, all of the technical terms used herein have the same meaning as commonly understood by one of ordinary skill in the art in the field to which this disclosure belongs.

As used herein, the term "amplitude" refers to a signed value (e.g., +1, −1, +0.1, −0.1, +0.01, −0.01, etc.) representing direction of movement of a pixel in an image. In a first example, the amplitude indicates a direction of movement (e.g., towards an attraction basin) using single, discrete values for a positive direction, a negative direction, and no movement along a given dimension (e.g., x-dimension, y-dimension, and/or z-dimension). In some embodiments, the amplitude is a whole integer selected from a set of {−1, 0, +1} that indicates a direction of motion. In this case, a positive 1 indicates motion in a first direction (e.g., up/+y) along the given dimension (e.g., the vertical dimension/y). A negative value of the amplitude indicates motion in a second, opposite, direction (e.g., down/−y) along the given dimension (e.g., the vertical dimension/y). A zero value indicates no motion in the given dimension. In other embodiments, the amplitude is a signed probability value. In particular, an amplitude on the interval [−1,1] is provided corresponding to a given dimension (e.g., x-dimension, y-dimension, or z-dimension) of an image. In this case, a positive value of the amplitude indicates the probability of movement in a first direction (e.g., up/+y) along the given dimension (e.g., the vertical dimension/y). A negative value of the amplitude indicates the probability of movement in a second, opposite, direction (e.g., down/−y) along the given dimension (e.g., the vertical dimension/y). A zero value indicates no motion in the given dimension. The magnitude of an amplitude refers to the absolute value of the amplitude, that is the magnitude is without direction. For ease of reference, a pixel having a zero amplitude or an amplitude of low magnitude (i.e., below a given threshold) is referred to as stationary. A pixel having magnitude exceeding that threshold are referred to as moving.

As used herein, the term "flow" as applied to pixels refers to the piecewise path from a pixel through zero or more intermediate pixels to a basin conforming to the amplitudes of those pixels. For example, a pixel that is adjacent to a basin pixel and has an amplitude indicating movement towards the basin pixel has length one flow to the basin. A piecewise path may be constructed from pixel to pixel according to the movement indicated by each pixel's amplitude until arrival at a basin.

With reference to pixels of an image, adjacent pixels are those that share an edge or a corner.

As used in this specification and the appended claims, the singular forms "a", "an", and "the" include plural references unless the context clearly dictates otherwise. For example, "a" or "an" means "at least one" or "one or more". Any reference to "or" herein is intended to encompass "and/or" unless otherwise stated.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, un-recited additives, components, integers, elements or method steps.

As used herein, the term "about" a number refers to that number plus or minus 10% of that number. The term 'about' when used in the context of a range refers to that range minus 10% of its lowest value and plus 10% of its greatest value.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

The term "platform" (or "system") may refer to an ensemble of: (i) instruments (e.g., imaging instruments, fluid controllers, temperature controllers, motion controllers and translation stages, etc.), (ii) devices (e.g., specimen slides, substrates, flow cells, microfluidic devices, etc., which may comprise fixed and/or removable or disposable components of the platform), (iii) reagents and/or reagent kits, and (iv) software, or any combination thereof, which allows a user to perform one or more bioassay methods (e.g., analyte detection, in situ detection or sequencing, and/or nucleic acid detection or sequencing) depending on the particular combination of instruments, devices, reagents, reagent kits, and/or software utilized.

The section headings used herein are for organizational purposes only and are not to be construed as limiting the subject matter described.

Barcoding and Decoding Terminology

A "barcode" is a label, or identifier, that conveys or is capable of conveying information (e.g., information about an analyte in a sample, a cell, a bead, a location, a sample, and/or a capture probe). The term "barcode" may refer either to a physical barcode molecule (e.g., a nucleic acid barcode molecule) or to its representation in a computer-readable, digital format (e.g., as a string of characters representing the sequence of bases in a nucleic acid barcode molecule).

The phrase "barcode diversity" refers to the total number of unique barcode sequences that may be represented by a given set of barcodes.

A physical barcode molecule (e.g., a nucleic acid barcode molecule) that forms a label or identifier as described above. In some instances, a barcode can be part of an analyte, can be independent of an analyte, can be attached to an analyte, or can be attached to or part of a probe that targets the analyte. In some instances, a particular barcode can be unique relative to other barcodes.

Physical barcodes can have a variety of different formats. For example, barcodes can include polynucleotide barcodes, random nucleic acid and/or amino acid sequences, and synthetic nucleic acid and/or amino acid sequences. A physical barcode can be attached to an analyte, or to another moiety or structure, in a reversible or irreversible manner. A physical barcode can be added to, for example, a fragment of a deoxyribonucleic acid (DNA) or ribonucleic acid (RNA) sample before or during sequencing of the sample. In some instances, barcodes can allow for identification and/or quantification of individual sequencing-reads in sequencing-based methods (e.g., a barcode can be or can include a unique molecular identifier or "UMI"). Barcodes can be used to detect and spatially-resolve molecular components found in biological samples, for example, at single-cell resolution (e.g., a barcode can be, or can include, a molecular barcode, a spatial barcode, a unique molecular identifier (UMI), etc.).

In some instances, barcodes may comprise a series of two or more segments or sub-barcodes (e.g., corresponding to "letters" or "code words" in a decoded barcode), each of which may comprise one or more of the subunits or building blocks used to synthesize the physical (e.g., nucleic acid) barcode molecules. For example, a nucleic acid barcode molecule may comprise two or more barcode segments, each of which comprises one or more nucleotides. In some instances, a barcode may comprise at least 1, 2, 3, 4, 5, 6, 7, 8, 9, 10, or more than 10 segments. In some instances, each segment of a barcode molecule may comprise at least 1, 2, 3, 4, 5, 6, 7, 8, 9, 10, 12, 14, 16, 18, 20, or more than 20 subunits or building blocks. For example, each segment of a nucleic acid barcode molecule may comprise at least 1, 2, 3, 4, 5, 6, 7, 8, 9, 10, 12, 14, 16, 18, 20, or more than 20 nucleotides. In some instances, two or more of the segments of a barcode may be separated by non-barcode segments, i.e., the segments of a barcode molecule need not be contiguous.

A "digital barcode" (or "digital barcode sequence") is a representation of a corresponding physical barcode (or target analyte sequence) in a computer-readable, digital format as described above. A digital barcode may comprise one or more "letters" (e.g., 1, 2, 3, 4, 5, 6, 7, 8, 9, 10, 12, 14, 16, 18, 20, or more than 20 letters) or one or more "code words" (e.g., 1, 2, 3, 4, 5, 6, 7, 8, 9, 10, or more than 10 code words), where a "code word" comprises, e.g., 1, 2, 3, 4, 5, 6, 7, 8, 9, 10, 12, 14, 16, 18, 20, or more than 20 letters. In some instances, the sequence of letters or code words in a digital barcode sequence may correspond directly with the sequence of building blocks (e.g., nucleotides) in a physical barcode. In some instances, the sequence of letters or code words in a digital barcode sequence may not correspond directly with the sequence of building blocks in a physical barcode, but rather may comprise, e.g., arbitrary code words that each correspond to a segment of a physical barcode. For example, in some instances, the disclosed methods for decoding and error correction may be applied directly to detecting target analyte sequences (e.g., mRNA sequences) as opposed to detecting target barcodes, and the barcode probes used to detect the target analyte sequences may correspond to letters or code words that have been assigned to specific target analyte sequences but that do not directly correspond to the target analyte sequences.

A "designed barcode" (or "designed barcode sequence") is a barcode (or its digital equivalent; in some instances a designed barcode may comprise a series of code words that can be assigned to gene transcripts and subsequently decoded into a decoded barcode) that meets a specified set of design criteria as required for a specific application. In some instances, a set of designed barcodes may comprise at least 2, at least 5, at least 10, at least 20, at least 40, at least 60, at least 80, at least 100, at least 200, at least 400, at least 600, at least 800, at least 1,000, at least 2,000, at least 4,000, at least 6,000, at least 8,000, at least 10,000, at least 20,000, at least 40,000, at least 60,000, at least 80,000, at least 100,000, at least 200,000, at least 400,000, at least 600,000, at least 800,000, at least 1,000,000, at least $2 \times 10^6$, at least $3 \times 10^6$, at least $4 \times 10^6$, at least $5 \times 10^6$, at least $6 \times 10^6$, at least $7 \times 10^6$, at least $8 \times 10^6$, at least $9 \times 10^6$, at least 107, at least 108, at least 109, or more than 109 unique barcodes. In some instances, a set of designed barcodes may comprise any number of designed barcodes within the range of values in this paragraph, e.g., 1,225 unique barcodes or $2.38 \times 10^6$ unique barcodes. As noted above for barcodes in general, in some instances designed barcodes may comprise two or more segments (corresponding to two or more code words in a decode barcode). In those cases, the specified set of design criteria may be applied to the designed barcodes as a whole, or to one or more segments (or positions) within the designed barcodes.

A "decoded barcode" (or "decoded barcode sequence") is a digital barcode sequence generated via a decoding process that ideally matches a designed barcode sequence, but that may include errors arising from noise in the synthesis process used to create barcodes and/or noise in the decoding process itself. As noted above, in some instances, the disclosed methods for decoding and error correction may be applied directly to detecting target analytes (e.g., mRNA sequences) as opposed to detecting target barcodes, and the barcode probes used to detect the target analytes may correspond to letters or code words that have been assigned to specific target analytes but that do not directly correspond to the target analytes. In these instances, a decoded barcode (i.e., a series of letters or code words) may serve as a proxy for the target analyte.

A "corrected barcode" (or "corrected barcode sequence") is a digital barcode sequence derived from a decoded barcode sequence by applying one or more error correction methods.

Probe Terminology

The term "probe" may refer either to a physical probe molecule (e.g., a nucleic acid probe molecule) or to its representation in a computer-readable, digital format (e.g., as a string of characters representing the sequence of bases in a nucleic acid probe molecule). A "probe" may be, for example, a molecule designed to recognize (and bind or hybridize to) another molecule, e.g., a target analyte, another probe molecule, etc.

In some instances, a physical probe molecule may comprise one or more of the following: (i) a target recognition element (e.g., an antibody capable of recognizing and binding to a target peptide, protein, or small molecule; an oligonucleotide sequence that is complementary to a target gene sequence or gene transcript; or a poly-T oligonucleotide sequence that is complementary to the poly-A tails on messenger RNA molecules), (ii) a barcode element (e.g., a molecular barcode, a cell barcode, a spatial barcode, and/or a unique molecular identifier (UMI)), (iii) an amplification and/or sequencing primer binding site, (iv) one or more linker regions, (v) one or more detectable tags (e.g., fluorophores), or any combination thereof. In some instances, each component of a probe molecule may comprise at least 1, 2, 3, 4, 5, 6, 7, 8, 9, 10, 12, 14, 16, 18, 20, or more than 20 subunits or building blocks. For example, in some instances, each component of a nucleic acid probe molecule may comprise at least 1, 2, 3, 4, 5, 6, 7, 8, 9, 10, 12, 14, 16, 18, 20, or more than 20 nucleotides.

In some instances, physical probes may bind or hybridize directly to their target. In some instances, physical probes may bind or hybridize indirectly to their target. For example, in some instances, a secondary probe may bind or hybridize to a primary probe, where the primary probe binds or hybridizes directly to the target analyte. In some instances, a tertiary probe may bind or hybridize to a secondary probe, where the secondary probe binds or hybridizes to a primary probe, and where the primary probe binds or hybridizes directly to the target analyte.

Examples of "probes" and their applications include, but are not limited to, primary probes (e.g., molecules designed to recognize and bind or hybridize to target analyte), intermediate probes (e.g., molecules designed to recognize and bind or hybridize to another molecule and provide a hybridization or binding site for another probe (e.g., a detection probe), detection probes (e.g., molecules designed to recognize and bind or hybridize to another molecule, detection probes may be labeled with a fluorophore or other detectable tag). In some instances, a probe may be designed to recognize and bind (or hybridize) to a physical barcode sequence (or segments thereof). In some instances, a probe may be used to detect and decode a barcode, e.g., a nucleic acid barcode. In some instances, a probe may bind or hybridize directly to a target barcode. In some instances, a probe may bind or hybridize indirectly to a target barcode (e.g., by binding or hybridizing to other probe molecules which itself is bound or hybridized to the target barcode).

Nucleic Acid Molecule and Nucleotide Terminology

The terms "nucleic acid" (or "nucleic acid molecule") and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage including any of a variety of those known in the art. Naturally-occurring nucleic acids generally have a deoxyribose sugar (e.g., found in deoxyribonucleic acid (DNA)) or a ribose sugar (e.g. found in ribonucleic acid (RNA)).

A nucleic acid can contain nucleotides having any of a variety of analogs of these sugar moieties that are known in the art. A nucleic acid can include natural or non-natural nucleotides. In this regard, a naturally-occurring deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G). Useful non-natural bases that can be included in a nucleic acid or nucleotide are known in the art. See, for example, Appella (2009), "Non-Natural Nucleic Acids for Synthetic Biology", *Curr Opin Chem Biol.* 13 (5-6): 687-696; and Duffy, et al. (2020), "Modified Nucleic Acids: Replication, Evolution, and Next-Generation Therapeutics", BMC Biology 18:112.

Samples:

A sample disclosed herein can be or derived from any biological sample. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. In addition to the subjects described above, a biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some instances, the biological sample may comprise cells which are deposited on a surface.

Cell-free biological samples can include extracellular macromolecules, e.g., polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

In some instances, a substrate herein can be any support that is insoluble in aqueous liquid and which allows for positioning of biological samples, analytes, features, and/or reagents (e.g., probes) on the support. In some instances, a biological sample can be attached to a substrate. Attachment of the biological sample can be irreversible or reversible, depending upon the nature of the sample and subsequent steps in the analytical method. In certain instances, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. In some instances, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

Endogenous Analytes:

In some instances, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some instances, the analyte is inside a cell or on a cell surface, such as a transmembrane analyte or one that is attached to the cell membrane. In some instances, the analyte can be an organelle (e.g., nuclei or mitochondria). In some instances, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some instances described herein, an analyte may be a denatured nucleic acid, wherein the resulting denatured nucleic acid is single-stranded. The nucleic acid may be denatured, for example, optionally using formamide, heat, or both formamide and heat. In some instances, the nucleic acid is not denatured for use in a method disclosed herein.

In certain instances, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any implementation described herein, the analyte comprises a target sequence. In some instances, the target sequence may be endogenous to the sample, generated in the sample, added to the sample, or associated with an analyte in the sample. In some instances, the target sequence is a single-stranded target sequence (e.g., a sequence in a rolling circle amplification product). In some instances, the analytes comprise one or more single-stranded target sequences. In one aspect, a first single-stranded target sequence is not identical to a second single-stranded target sequence. In another aspect, a first single-stranded target sequence is identical to one or more second single-stranded target sequence. In some instances, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

Labelling Agents:

In some instances, provided herein are methods and compositions for analyzing endogenous analytes (e.g., RNA, ssDNA, and cell surface or intracellular proteins and/or metabolites) in a sample using one or more labelling agents. In some instances, an analyte labelling agent may include an agent that interacts with an analyte (e.g., an endogenous analyte in a sample). In some instances, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some instances, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some instances, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some instances, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some instances, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto.

Accordingly, terms such as "stain", "staining", "labeling", and the like, may be used interchangeably to refer to elements, complexes, and macromolecules that allow a substance, structure, organelle, and/or component in a sample to be more easily detected than if said substance, structure, organelle, and/or component had not been stained or stained. For example, a tissue sample treated with a DNA dye such as DAPI (4',6-diamidino-2-phenylindole) makes the nucleus of a cell more visible and makes detection or quantification of such cells easier than if they were not stained. Without being bound by theory or methodology, the labeling described herein may be used to mark a cell, structure, particle, or other target, and may be useful in discovering, determining expression, localization, confirmation, quantification, or measuring properties within a sample. Without limitation, labeling agents disclosed herein include stains, dyes, ligands, antibodies, particles, and other substances that may bind to or be localized at certain specific objects or locations. "Labels" or "labeling agents" may also refer to compounds or compositions which are conjugated or fused directly or indirectly to a reagent such as an oligonucleotide as disclosed herein or an antibody, and facilitates detection of the reagent to which it is conjugated or fused. The label may itself be detectable (e.g., radioisotope labels or fluorescent labels) or may catalyze chemical alteration of a substrate compound or composition which is detectable, e.g., an enzymatic label.

As provided by the invention disclosed herein, one or more features are derived by detecting nuclei, cell membrane, and/or cytoplasm of cells within the input image and/or by extracting features from the detected nuclei, cell membrane, and/or cytoplasm (depending upon the labeling agent(s) utilized within the input image). In some embodiments, features are derived by analyzing cell membrane staining, cell cytoplasm staining, and/or cell nucleus staining. Without being bound by theory or methodology "cytoplasmic staining" may describe a group of pixels arranged in a pattern bearing the morphological characteristics of a cytoplasmic region of a cell. Similarly "membrane staining" may refer to a group of pixels arranged in a pattern bearing the morphological characteristics of a cell membrane, preferably the plasma membrane separating the intracellular environment from the extracellular space; and "nucleus staining" may refer to a group of pixels with strong localized intensity in a pattern bearing the morphological characteristics of a nucleus of the cell. Those of skill in the art will appreciate that the nucleus, cytoplasm, and membrane of a cell have different characteristics and that differently stained tissue samples may reveal different biological features. For example, those of skill would understand that certain cell surface elements and receptors can have staining patterns localized to the membrane or localized to the cytoplasm. Thus, a "membrane" staining pattern may be analytically distinct from a "cytoplasmic" staining pattern. Likewise, a "cytoplasmic" staining pattern and a "nuclear" staining pattern may be analytically distinct.

In some such embodiments, labels or labelling comprises tissue and/or cell surface staining. Surface stains may include general lipid stains, fluorescent lipid analogues, sugar-binding lectins, label-conjugated protein-specific antibodies, and plasma membrane-specific dyes, stains, and label-conjugated antibodies. Those of skill in the art will appreciate and understand that a biological sample may be stained for different types of and/or cell membrane structures/components. Stains and dyes that label cell nuclei may include hematoxylin dyes, cyanine dyes, Draq dyes, and DAPI stain. Stains and dyes that label the cytoplasm of cells may include eosin dyes, fluorescein dyes, and the like. Alternatively, binding moieties (e.g., ligands, antibodies, and or peptides) directed/localizing to a cell membrane (e.g., the plasma membrane), the cytoplasm, the nucleus, or other structure/organelle of the cell may be conjugated to a labeling moiety described herein, thereby providing a detectable signal that identifies said membrane, cytoplasm, and/or nucleus. Such labeling can be used individually or in combination to aid in visualization, identification, and quantification of cells.

In some embodiments of the invention, the labelling described herein may be cell specific (e.g., cell-type specific), thus providing the detection of different cell types within a sample. In some embodiments, the invention disclosed herein, or elements thereof, incorporate identification of cell polarity and/or morphology. Cell polarity may refer to an asymmetry in molecular composition or structure between two sides, thus defining a polarity axis along which cellular processes will be differentially regulated. In some such embodiments, the invention incorporates identifying cellular symmetry, including the distribution of structures and/or organelles within the cells. For example and without limitation, the radial symmetry of labeled structures or organelles relative to other stains, e.g., plasma membrane, cytoplasmic and/or nuclear labels, such as the radial staining pattern of cytoskeletal structures or mitochondria relative to nuclear, cytoplasmic, and/or plasma membrane stains/labels in fibroblastic cell types. Similarly, the polarization of structures or organelles relative to other stains, e.g., plasma membrane, cytoplasmic and/or nuclear stains/labels, such as those polarized structures observed in the axonal projections of neuronal cells or the apical/basal polarity of epithelial cells.

Exemplary methods for staining tissue structures and guidance in the choice of stains appropriate for various purposes are known in the art and are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)," the disclosures of which are incorporated herein by reference. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some instances, an analyte binding moiety includes one or more antibodies or antigen binding fragments thereof. The antibodies or antigen binding fragments including the analyte binding moiety can specifically bind to a target analyte. In some instances, the analyte is a protein (e.g., a protein on a surface of the biological sample (e.g., a cell) or an intracellular protein). In some instances, a plurality of analyte labelling agents comprising a plurality of analyte binding moieties bind a plurality of analytes present in a biological sample. In some instances, the plurality of analytes includes a single species of analyte (e.g., a single species of polypeptide). In some instances in which the plurality of analytes includes a single species of analyte, the analyte binding moieties of the plurality of analyte labelling agents are the same. In some instances in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some instances, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some instances, the reporter oligonucleotides are releasable from the labelling agent, such as upon application of a stimulus. For example, the reporter oligonucleotide may be attached to the labelling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing, such as an adapter sequence, a unique molecular identifier (UMI) sequence, a sequencer specific flow cell attachment sequence (such as an P5, P7, or partial P5 or P7 sequence), a primer or primer binding sequence, a sequencing primer or primer binding sequence (such as an R1, R2, or partial R1 or R2 sequence).

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some instances, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

Assays for In Situ Detection and Analysis:

Objectives for in situ detection and analysis methods include detecting, quantifying, and/or mapping analytes (e.g., gene activity) to specific regions in a biological sample (e.g., a tissue sample or cells deposited on a surface) at cellular or sub-cellular resolution. Methods for performing in situ studies include a variety of techniques, e.g., in situ hybridization and in situ sequencing techniques. These techniques allow one to study the subcellular distribution of target analytes (e.g., gene activity as evidenced, e.g., by expressed gene transcripts), and have the potential to provide crucial insights in the fields of developmental biology, oncology, immunology, histology, etc.

Various methods can be used for in situ detection and analysis of target analytes, e.g., sequencing by synthesis (SBS), sequencing by ligation (SBL), sequencing by hybridization (SBH). Non-limiting examples of in situ hybridization techniques include single molecule fluorescence in situ hybridization (smFISH) and multiplexed error-robust fluorescence in situ hybridization (MERFISH). smFISH enables in situ detection and quantification of gene transcripts in tissue samples at the locations where they reside by making use of libraries of multiple short oligonucleotide probes (e.g., approximately 20 base pairs (bp) in length), each labeled with a fluorophore. The probes are sequentially hybridized to gene sequences (e.g., DNA) or gene transcript sequences (e.g., mRNA) sequences, and visualized as diffraction-limited spots by fluorescence microscopy (Levsky, et al. (2003) "Fluorescence In situ Hybridization: Past, Present and Future", Journal of Cell Science 116 (14): 2833-2838; Raj, et al. (2008) "Imaging Individual mRNA Molecules Using Multiple Singly Labeled Probes", Nat Methods 5 (10): 877-879; Moor, et al. (2016), ibid.). Variations on the smFISH method include, for example, the use of combinatorial labelling schemes to improve multiplexing capability (Levsky, et al. (2003), ibid.), the use of smFISH in combination with super-resolution microscopy (Lubeck, et al. (2014) "Single-Cell In situ RNA Profiling by Sequential Hybridization", Nature Methods 11 (4): 360-361).

MERFISH addresses two of the limitations of earlier in situ hybridization approaches, namely the limited number of target sequences that could be simultaneously identified and the robustness of the approach to readout errors caused by the stochastic nature of the hybridization process (Moor, et al. (2016), ibid.). MERFISH utilizes a binary barcoding scheme in which the probed target mRNA sequences are either fluorescence positive or fluorescence negative for any given imaging cycle (Ke, et al. (2016), ibid.; Moffitt, et al. (2016) "RNA Imaging with Multiplexed Error Robust Fluorescence In situ Hybridization", *Methods Enzymol.* 572:1-49). The encoding probes that contain a combination of target-specific hybridization sequence regions and barcoded readout sequence regions are first hybridized to the target mRNA sequences. In each imaging cycle, a subset of fluorophore-conjugated readout probes is hybridized to a subset of encoding probes. Target mRNA sequences that fluoresce in a given cycle are assigned a value of "1" and the remaining target mRNA sequences are assigned a value of "0". Between imaging cycles, the fluorescent probes from the previous cycle are photobleached. After, e.g., 14 or 16 rounds of readout probe hybridization and imaging, unique combinations of the detected fluorescence signals generate a 14-bit or 16-bit code that identifies the different gene transcripts. To address the increased error rate for correctly calling the readout codes increases as the number of hybridization and imaging cycles increases, the method may also entail the use of Hamming distances for barcode design and correction of decoding errors (see, e.g., Buschmann, et al. (2013) "Levenshtein Error-Correcting Barcodes for Multiplexed DNA Sequencing", Bioinformatics 14:272), thereby resulting in an error-robust barcoding scheme.

Some in situ sequencing techniques generally comprise both in situ target capture (e.g., of mRNA sequences) and in situ sequencing. Non-limiting examples of in situ sequencing techniques include in situ sequencing with padlock probes (ISS-PLP), fluorescent in situ sequencing (FISSEQ), barcode in situ targeted sequencing (Barista-Seq), and spatially-resolved transcript amplicon readout mapping (STARmap) (see, e.g., Ke, et al. (2016), ibid., Asp, et al. (2020), ibid.).

Some methods for in situ detection and analysis of analytes utilize a probe (e.g., padlock or circular probe) that detects specific target analytes. The in situ sequencing using padlock probes (ISS-PLP) method, for example, combines padlock probing to target specific gene transcripts, rolling-circle amplification (RCA), and sequencing by ligation (SBL) chemistry. Within intact tissue sections, reverse transcription primers are hybridized to target sequence (e.g., mRNA sequences) and reverse transcription is performed to create cDNA to which a padlock probe (a single-stranded DNA molecule comprising regions that are complementary to the target cDNA) can bind (see, e.g., Asp, et al. (2020), ibid.). In one variation of the method, the padlock probe binds to the cDNA target with a gap remaining between the ends which is then filled in using a DNA polymerization reaction. In another variation of the method, the ends of the bound padlock probe are adjacent to each other. The ends are then ligated to create a circular DNA molecule. Target amplification using rolling-circle amplification (RCA) results in micrometer-sized RCA products (RCPs), containing a plurality of concatenated repeats of the probe sequence. In some examples, RCPs are then subjected to, e.g., sequencing-by-ligation (SBL) or sequencing-by-hybridization (SBH). In some cases, the method allows for a barcode located within the probe to be decoded.

Products of Endogenous Analytes and/or Labelling Agents:

In some instances, provided herein are methods and compositions for analyzing one or more products of an endogenous analyte and/or a labelling agent in a biological sample. In some instances, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product such as a rolling circle amplification (RCA) product) thereof is analyzed. In some instances, a labelling agent that directly or indirectly binds to an analyte in the biological sample is analyzed. In some instances, a product (e.g., a hybridization product, a ligation product, an extension product (e.g., by a DNA or RNA polymerase), a replication product, a transcription/reverse transcription product, and/or an amplification product such as a rolling circle amplification (RCA) product) of a labelling agent that directly or indirectly binds to an analyte in the biological sample is analyzed.

In some instances, the analyzing comprises using primary probes which comprise a target binding region (e.g., a region that binds to a target such as RNA transcripts) and the primary probes may contain one or more barcodes (e.g., primary barcode). In some instances, the barcodes are bound by detection primary probes, which do not need to be fluorescent, but that include a target-binding portion (e.g., for hybridizing to one or more primary probes) and one or more barcodes (e.g., secondary barcodes). In some instances, the detection primary probe comprises an overhang that does not hybridize to the target nucleic acid but hybridizes to another probe. In some examples, the overhang comprises the barcode(s). In some instances, the barcodes of the detection primary probes are targeted by detectably labeled detection oligonucleotides, such as fluorescently labeled oligos. In some instances, one or more decoding schemes are used to decode the signals, such as fluorescence, for sequence determination. Various probes and probe sets can be used to hybridize to and detect an endogenous analyte and/or a sequence associated with a labelling agent. In some instances, these assays may enable multiplexed detection, signal amplification, combinatorial decoding, and error correction schemes. Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set. The specific probe or probe set design can vary.

Hybridization and Ligation:

Various probes and probe sets can be hybridized to an endogenous analyte and/or a labelling agent and each probe may comprise one or more barcode sequences. The specific probe or probe set design can vary. In some instances, the hybridization of a primary probe or probe set (e.g., a circularizable probe or probe set) to a target nucleic acid analyte and may lead to the generation of a rolling circle amplification (RCA) template. In some instances, the assay uses or generates a circular nucleic acid molecule which can be the RCA template.

In some instances, a product of an endogenous analyte and/or a labelling agent is a ligation product. In some instances, the ligation product is formed from circularization of a circularizable probe or probe set upon hybridization to a target sequence. In some instances, the ligation product is formed between two or more endogenous analytes. In some instances, the ligation product is formed between an endogenous analyte and a labelling agent. In some instances, the ligation product is formed between two or more labelling agent. In some instances, the ligation product is an intramolecular ligation of an endogenous analyte. In some instances, the ligation product is an intramolecular ligation of a labelling agent, for example, the circularization of a circularizable probe or probe set upon hybridization to a target sequence. The target sequence can be comprised in an endogenous analyte (e.g., nucleic acid such as a genomic DNA or mRNA) or a product thereof (e.g., cDNA from a cellular mRNA transcript), or in a labelling agent (e.g., the reporter oligonucleotide) or a product thereof.

In some instances, provided herein is a probe or probe set capable of DNA-templated ligation, such as from a cDNA molecule. See, e.g., U.S. Pat. No. 8,551,710, which is hereby incorporated by reference in its entirety. In some instances, provided herein is a probe or probe set capable of RNA-templated ligation. See, e.g., U.S. Pat. Pub. 2020/0224244 which is hereby incorporated by reference in its entirety. In some instances, the probe set is a SNAIL probe set. See, e.g., U.S. Pat. Pub. 20190055594, which is hereby incorporated by reference in its entirety. In some instances, provided herein is a multiplexed proximity ligation assay. See, e.g., U.S. Pat. Pub. 20140194311 which is hereby incorporated by reference in its entirety. In some instances, provided herein is a probe or probe set capable of proximity ligation, for instance a proximity ligation assay for RNA (e.g., PLAYR) probe set. See, e.g., U.S. Pat. Pub. 20160108458, which is hereby incorporated by reference in its entirety. In some instances, a circular probe can be indirectly hybridized to the target nucleic acid. In some instances, the circular construct is formed from a probe set capable of proximity ligation, for instance a proximity ligation in situ hybridization (PLISH) probe set. See, e.g., U.S. Pat. Pub. 2020/0224243 which is hereby incorporated by reference in its entirety.

In some instances, the ligation involves chemical ligation. In some instances, the ligation involves template dependent ligation. In some instances, the ligation involves template independent ligation. In some instances, the ligation involves enzymatic ligation.

In some instances, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as *E. coli* DNA ligase, Tth DNA ligase, *Thermococcus* sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some instances, the ligase is a T4 RNA ligase. In some instances, the ligase is a splintR ligase. In some instances, the ligase is a single stranded DNA ligase. In some instances, the ligase is a T4 DNA ligase. In some instances, the ligase is a ligase that has an DNA-splinted DNA ligase activity. In some instances, the ligase is a ligase that has an RNA-splinted DNA ligase activity.

In some instances, the ligation herein is a direct ligation. In some instances, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, i.e., separated by one or more intervening nucleotides or "gaps". In some instances, said ends are not ligated directly to each other, but instead occurs either via the intermediacy of one or more intervening (so-called "gap" or "gap-filling" (oligo) nucleotides) or by the extension of 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo) nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific implementations, the gap may be a gap of about 1, 2, 3, 4, 5, 6, 7, 8, 9 or 10 or more nucleotides, of any integer (or range of integers) of nucleotides in between the indicated values. In some instances, the gap between said terminal regions may be filled by a gap oligonucleotide or by extending 3' end of a polynucleotide. In some cases, ligation involves ligating the ends of the probe to at least one gap (oligo) nucleotide, such that the gap (oligo) nucleotide becomes incorporated into the resulting polynucleotide. In some instances, the ligation herein is preceded by gap filling. In other implementations, the ligation herein does not require gap filling.

In some instances, ligation of the polynucleotides produces polynucleotides with melting temperature higher than that of un-ligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature (Tm) of the DNA strands. This selectively reduces the concentration of annealed mismatched substrates (expected to have a slightly lower Tm around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some instances, the ligation herein is a proximity ligation of ligating two (or more) nucleic acid sequences that are in proximity with each other, e.g., through enzymatic means (e.g., a ligase). In some instances, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

Primer Extension and Amplification:

In some instances, the hybridization of a primary probe or probe set (e.g. a circularizable probe or probe set) to a target analyte and may lead to the generation of an extension or amplification product. In some instances, a product is a primer extension product of an analyte, a labelling agent, a probe or probe set bound to the analyte (e.g., a circularizable probe bound to genomic DNA, mRNA, or cDNA), or a probe or probe set bound to the labelling agent (e.g., a circularizable probe bound to one or more reporter oligonucleotides from the same or different labelling agents.

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence. A primer extension reaction generally refers to any method where two nucleic acid sequences become linked (e.g., hybridized) by an overlap of their respective terminal complementary nucleic acid sequences (i.e., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some instances, a product of an endogenous analyte and/or a labelling agent is an amplification product of one or more polynucleotides, for instance, a circular probe or circularizable probe or probe set. In some instances, the disclosed methods may comprise the use of a rolling circle amplification (RCA) technique to amplify signal. Rolling circle amplification is an isothermal, DNA polymerase-mediated process in which long single-stranded DNA molecules are synthesized on a short circular single-stranded DNA template using a single DNA primer (Zhao, et al. (2008), "Rolling Circle Amplification: Applications in Nanotechnology and Biodetection with Functional Nucleic Acids", *Angew Chem Int Ed Engl.* 47 (34): 6330-6337; Ali, et al. (2014), "Rolling Circle Amplification: A Versatile Tool for Chemical Biology, Materials Science and Medicine", *Chem Soc Rev.* 43 (10): 3324-3341). The RCA product is a concatemer containing tens to hundreds of tandem repeats that are complementary to the circular template, and may be used to develop sensitive techniques for the detection of a variety of targets, including nucleic acids (DNA, RNA), small molecules, proteins, and cells (Ali, et al. (2014), ibid.). In some implementations, a primer that hybridizes to the circular probe or circularized probe is added and used as such for amplification. In some instances, the RCA comprises a linear RCA, a branched RCA, a dendritic RCA, or any combination thereof.

In some instances, the amplification is performed at a temperature between or between about 20° C. and about 60° C. In some instances, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some instances, upon addition of a DNA polymerase in the presence of appropriate dNTP precursors and other cofactors, a primer is elongated to produce multiple copies of the circular template. This amplification step can utilize isothermal amplification or non-isothermal amplification. In some instances, after the formation of the hybridization complex and association of the amplification probe, the hybridization complex is rolling-circle amplified to generate a cDNA nanoball (i.e., amplicon) containing multiple copies of the cDNA. Techniques for rolling circle amplification (RCA) are known in the art such as linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49 (11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29: el 18, 2001; Dean et al. Genome Res. 1 1:1095-1099, 2001; Schweitzer et al, Nature Biotech. 20:359-365, 2002; U.S. Pat. Nos. 6,054,274, 6,291,187, 6,323,009, 6,344,329 and 6,368,801). Exemplary polymerases for use in RCA comprise DNA polymerase such phi29 (§ 29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some instances, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some instances, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some instances, the RCA template may comprise the target analyte, or a part thereof, where the target analyte is a nucleic acid, or it may be provided or generated as a proxy, or a marker, for the analyte. In some instances, the RCA template may comprise a sequence of the probes and probe sets hybridized to an endogenous analyte and/or a labelling agent. In some instances, the amplification product can be generated as a proxy, or a marker, for the analyte. As noted above, many assays are known for the detection of numerous different analytes, which use a RCA-based detection system, e.g., where the signal is provided by generating a RCP from a circular RCA template which is provided or generated in the assay, and the RCP is detected to detect the analyte. The RCP may thus be regarded as a reporter which is detected to detect the target analyte. However, the RCA template may also be regarded as a reporter for the target analyte; the RCP is generated based on the RCA template, and comprises complementary copies of the RCA template. The RCA template determines the signal which is detected, and is thus indicative of the target analyte. As will be described in more detail below, the RCA template may be a probe, or a part or component of a probe, or may be generated from a probe, or it may be a component of a detection assay (i.e. a reagent in a detection assay), which is used as a reporter for the assay, or a part of a reporter, or signal-generation system. The RCA template used to generate the RCP may thus be a circular (e.g. circularized) reporter nucleic acid molecule, namely from any RCA-based detection assay which uses or generates a circular nucleic acid molecule as a reporter for the assay. Since the RCA template generates the RCP reporter, it may be viewed as part of the reporter system for the assay.

In some instances, an assay may detect a product herein that includes a molecule or a complex generated in a series of reactions, e.g., hybridization, ligation, extension, replication, transcription/reverse transcription, and/or amplification (e.g., rolling circle amplification), in any suitable combination. For example, a product comprising a target sequence for a probe disclosed herein (e.g., a bridge probe or L-probe) may be a hybridization complex formed of a cellular nucleic acid in a sample and an exogenously added nucleic acid probe. The exogenously added nucleic acid probe may comprise an overhang that does not hybridize to the cellular nucleic acid but hybridizes to another probe (e.g., a detection probe). The exogenously added nucleic acid probe may be optionally ligated to a cellular nucleic acid molecule or another exogenous nucleic acid molecule. In other examples, a product comprising a target sequence for a probe disclosed herein (e.g., an anchor probe) may be an RCP of a circularizable probe or probe set which hybridizes to a cellular nucleic acid molecule (e.g., genomic DNA or mRNA) or product thereof (e.g., a transcript such as cDNA, a DNA-templated ligation product of two probes, or an RNA-templated ligation product of two probes). In other examples, a product comprising a target sequence for a probe disclosed herein (e.g., a bridge probe or L-probe) may be a probe hybridizing to an RCP. The probe may comprise an overhang that does not hybridize to the RCP but hybridizes to another probe (e.g., a detection probe).

Signal Amplification Methods:

In some instances, a method disclosed herein may also comprise one or more signal amplification components and detecting such signals. In some instances, the present disclosure relates to the detection of nucleic acid sequences in situ using probe hybridization and generation of amplified signals associated with the probes. In some instances, the target nucleic acid of a nucleic acid probe comprises multiple target sequences for nucleic acid probe hybridization, such that the signal corresponding to a barcode sequence of the nucleic acid probe is amplified by the presence of multiple nucleic acid probes hybridized to the target nucleic acid. For example, multiple sequences can be selected from a target nucleic acid such as an mRNA, such that a group of nucleic acid probes (e.g., 20-50 nucleic acid probes) hybridize to the mRNA in a tiled fashion. In another example, the target nucleic acid can be an amplification product (e.g., an RCA product) comprising multiple copies of a target sequence (e.g., a barcode sequence of the RCA product).

Alternatively or additionally, amplification of a signal associated with a barcode sequence of a nucleic acid probe can be amplified using one or more signal amplification strategies off of an oligonucleotide probe that hybridizes to the barcode sequence. In some aspects, amplification of the signal associated with the oligonucleotide probe can reduce the number of nucleic acid probes needed to hybridize to the target nucleic acid to obtain a sufficient signal-to-noise ratio. For example, the number of nucleic acid probes to tile a target nucleic acid such as an mRNA can be reduced. In some aspects, reducing the number of nucleic acid probes tiling a target nucleic acid enables detection of shorter target nucleic acids, such as shorter mRNAs. In some instances, no more than one, two, three, 4, 5, 6, 7, 8, 9, 10, 11, 12, 13, 14, 15, 16, 17, 18, 19, or 20 nucleic acid probes may be hybridized to the target nucleic acid. In instances wherein the target nucleic acid is an amplification product, signal amplification off of the oligonucleotide probes may reduce the number of target sequences required for detection (e.g., the length of the RCA product can be reduced).

Exemplary signal amplification methods include targeted deposition of detectable reactive molecules around the site of probe hybridization, targeted assembly of branched structures (e.g., bDNA or branched assay using locked nucleic acid (LNA)), programmed in situ growth of concatemers by enzymatic rolling circle amplification (RCA) (e.g., as described in US 2019/0055594 incorporated herein by reference), hybridization chain reaction, assembly of topologically catenated DNA structures using serial rounds of chemical ligation (clampFISH), signal amplification via hairpin-mediated concatemerization (e.g., as described in US 2020/0362398 incorporated herein by reference), e.g., primer exchange reactions such as signal amplification by exchange reaction (SABER) or SABER with DNA-Exchange (Exchange-SABER). In some instances, a non-enzymatic signal amplification method may be used.

The detectable reactive molecules may comprise tyramide, such as used in tyramide signal amplification (TSA) or multiplexed catalyzed reporter deposition (CARD)-FISH. In some instances, the detectable reactive molecule may be releasable and/or cleavable from a detectable label such as a fluorophore. In some instances, a method disclosed herein comprises multiplexed analysis of a biological sample comprising consecutive cycles of probe hybridization, fluorescence imaging, and signal removal, where the signal removal comprises removing the fluorophore from a fluorophore-labeled reactive molecule (e.g., tyramide). Exemplary detectable reactive reagents and methods are described in U.S. Pat. No. 6,828,109, US 2019/0376956, WO 2019/236841, WO 2020/102094, WO 2020/163397, and WO 2021/067475, all of which are incorporated herein by reference in their entireties.

In some instances, hybridization chain reaction (HCR) can be used for signal amplification. HCR is an enzyme-free nucleic acid amplification based on a triggered chain of hybridization of nucleic acid molecules starting from HCR monomers, which hybridize to one another to form a nicked nucleic acid polymer. This polymer is the product of the HCR reaction which is ultimately detected in order to indicate the presence of the target analyte. HCR is described in detail in Dirks and Pierce, 2004, PNAS, 101(43), 15275-15278 and in U.S. Pat. Nos. 7,632,641 and 7,721,721 (see also US 2006/00234261; Chemeris et al, 2008 Doklady Biochemistry and Biophysics, 419, 53-55; Niu et al, 2010, 46, 3089-3091; Choi et al, 2010, Nat. Biotechnol. 28(11), 1208-1212; and Song et al, 2012, Analyst, 137, 1396-1401). HCR monomers typically comprise a hairpin, or other metastable nucleic acid structure. In the simplest form of HCR, two different types of stable hairpin monomer, referred to here as first and second HCR monomers, undergo a chain reaction of hybridization events to form a long nicked double-stranded DNA molecule when an "initiator" nucleic acid molecule is introduced. The HCR monomers have a hairpin structure comprising a double stranded stem region, a loop region connecting the two strands of the stem region, and a single stranded region at one end of the double stranded stem region. The single stranded region which is exposed (and which is thus available for hybridization to another molecule, e.g. initiator or other HCR monomer) when the monomers are in the hairpin structure may be known as the "toehold region" (or "input domain"). The first HCR monomers each further comprise a sequence which is complementary to a sequence in the exposed toehold region of the second HCR monomers. This sequence of complementarity in the first HCR monomers may be known as the "interacting region" (or "output domain"). Similarly, the second HCR monomers each comprise an interacting region (output domain), e.g. a sequence which is complementary to the exposed toehold region (input domain) of the first HCR monomers. In the absence of the HCR initiator, these interacting regions are protected by the secondary structure (e.g. they are not exposed), and thus the hairpin monomers are stable or kinetically trapped (also referred to as "metastable"), and remain as monomers (e.g. preventing the system from rapidly equilibrating), because the first and second sets of HCR monomers cannot hybridize to each other. However, once the initiator is introduced, it is able to hybridize to the exposed toehold region of a first HCR monomer, and invade it, causing it to open up. This exposes the interacting region of the first HCR monomer (e.g. the sequence of complementarity to the toehold region of the second HCR monomers), allowing it to hybridize to and invade a second HCR monomer at the toehold region. This hybridization and invasion in turn opens up the second HCR monomer, exposing its interacting region (which is complementary to the toehold region of the first HCR monomers), and allowing it to hybridize to and invade another first HCR monomer. The reaction continues in this manner until all of the HCR monomers are exhausted (e.g. all of the HCR monomers are incorporated into a polymeric chain). Ultimately, this chain reaction leads to the formation of a nicked chain of alternating units of the first and second monomer species. The presence of the HCR initiator is thus required in order to trigger the HCR reaction by hybridization to and invasion of a first HCR monomer. The first and second HCR monomers are designed to hybridize to one another are thus may be defined as cognate to one another. They are also cognate to a given HCR initiator sequence. HCR monomers which interact with one another (hybridize) may be described as a set of HCR monomers or an HCR monomer, or hairpin, system.

An HCR reaction could be carried out with more than two species or types of HCR monomers. For example, a system involving three HCR monomers could be used. In such a system, each first HCR monomer may comprise an interacting region which binds to the toehold region of a second HCR monomer; each second HCR may comprise an interacting region which binds to the toehold region of a third HCR monomer; and each third HCR monomer may comprise an interacting region which binds to the toehold region of a first HCR monomer. The HCR polymerization reaction would then proceed as described above, except that the resulting product would be a polymer having a repeating unit of first, second and third monomers consecutively. Corresponding systems with larger numbers of sets of HCR monomers could readily be conceived. Branching HCR systems have also been devised and described (see, e.g., WO 2020/123742 incorporated herein by reference), and may be used in the methods herein.

In some instances, similar to HCR reactions that use hairpin monomers, linear oligo hybridization chain reaction (LO-HCR) can also be used for signal amplification. In some instances, provided herein is a method of detecting an analyte in a sample comprising: (i) performing a linear oligo hybridization chain reaction (LO-HCR), wherein an initiator is contacted with a plurality of LO-HCR monomers of at least a first and a second species to generate a polymeric LO-HCR product hybridized to a target nucleic acid molecule, wherein the first species comprises a first hybridization region complementary to the initiator and a second hybridization region complementary to the second species, wherein the first species and the second species are linear, single-stranded nucleic acid molecules; wherein the initiator is provided in one or more parts, and hybridizes directly or indirectly to or is comprised in the target nucleic acid molecule; and (ii) detecting the polymeric product, thereby detecting the analyte. In some instances, the first species and/or the second species may not comprise a hairpin structure. In some instances, the plurality of LO-HCR monomers may not comprise a metastable secondary structure. In some instances, the LO-HCR polymer may not comprise a branched structure. In some instances, performing the linear oligo hybridization chain reaction comprises contacting the target nucleic acid molecule with the initiator to provide the initiator hybridized to the target nucleic acid molecule. In any of the instances herein, the target nucleic acid molecule and/or the analyte can be an RCA product.

In some instances, detection of nucleic acids sequences in situ includes combination of the sequential decoding methods described herein with an assembly for branched signal amplification. In some instances, the assembly complex comprises an amplifier hybridized directly or indirectly (via one or more oligonucleotides) to a sequence of an oligonucleotide probe described herein. In some instances, the assembly includes one or more amplifiers each including an amplifier repeating sequence. In some aspects, the one or more amplifiers is labeled. Described herein is a method of using the aforementioned assembly, including for example, using the assembly in multiplexed error-robust fluorescent in situ hybridization (MERFISH) applications, with branched DNA amplification for signal readout. In some instances, the amplifier repeating sequence is about 5-30 nucleotides, and is repeated N times in the amplifier. In some instances, the amplifier repeating sequence is about 20 nucleotides, and is repeated at least two times in the amplifier. In some aspects, the one or more amplifier repeating sequence is labeled. For exemplary branched signal amplification, see e.g., U.S. Pat. Pub. No. US20200399689A1 and Xia et al., Multiplexed Detection of RNA using MERFISH and branched DNA amplification. Scientific Reports (2019), each of which is fully incorporated by reference herein.

In some instances, an oligonucleotide probe described herein can be associated with an amplified signal by a method that comprises signal amplification by performing a primer exchange reaction (PER). In various instances, a primer with domain on its 3' end binds to a catalytic hairpin, and is extended with a new domain by a strand displacing polymerase. For example, a primer with domain 1 on its 3' ends binds to a catalytic hairpin, and is extended with a new domain 1 by a strand displacing polymerase, with repeated cycles generating a concatemer of repeated domain 1 sequences. In various instances, the strand displacing polymerase is Bst. In various instances, the catalytic hairpin includes a stopper which releases the strand displacing polymerase. In various instances, branch migration displaces the extended primer, which can then dissociate. In various instances, the primer undergoes repeated cycles to form a concatemer primer (see e.g., U.S. Pat. Pub. No. US20190106733, which is incorporated herein by reference, for exemplary molecules and PER reaction components).

Barcoded Analytes and Detection:

A target sequence for a probe disclosed herein may be comprised in any analyte disclose herein, including an endogenous analyte (e.g., a viral or cellular nucleic acid), a labelling agent, or a product generated in the biological sample using an endogenous analyte and/or a labelling agent.

In some aspects, one or more of the target sequences includes or is associated with one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI"). In some aspects, a barcode comprises about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some instances, a barcode includes two or more sub-barcodes that together function as a single barcode. For example, a polynucleotide barcode can include two or more polynucleotide sequences (e.g., sub-barcodes) that are separated by one or more non-barcode sequences. In some instances, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In any of the preceding implementations, barcodes (e.g., primary and/or secondary barcode sequences) can be analyzed (e.g., detected or sequenced) using any suitable method or technique, including those described herein, such as sequencing by synthesis (SBS), sequencing by ligation (SBL), or sequencing by hybridization (SBH). In some instances, barcoding schemes and/or barcode detection schemes as described in RNA sequential probing of targets (RNA SPOTs), single-molecule fluorescent in situ hybridization (smFISH), multiplexed error-robust fluorescence in situ hybridization (MERFISH) or sequential fluorescence in situ hybridization (seqFISH+) can be used. In any of the preceding implementations, the methods provided herein can include analyzing the barcodes by sequential hybridization and detection with a plurality of labelled probes (e.g., detection probes (e.g., detection oligos) or barcode probes). In some instances, the barcode detection steps can be performed as described in hybridization-based in situ sequencing (HybISS). In some instances, probes can be detected and analyzed (e.g., detected or sequenced) as performed in fluorescent in situ sequencing (FISSEQ), or as performed in the detection steps of the spatially-resolved transcript amplicon readout mapping (STARmap) method. In some instances, signals associated with an analyte can be detected as performed in sequential fluorescent in situ hybridization (seqFISH).

In some instances, in a barcode-based detection method, barcode sequences are detected for identification of other molecules including nucleic acid molecules (DNA or RNA) longer than the barcode sequences themselves, as opposed to direct sequencing of the longer nucleic acid molecules. In some instances, a N-mer barcode sequence comprises 4N complexity given a sequencing read of N bases, and a much shorter sequencing read may be required for molecular identification compared to non-barcode sequencing methods such as direct sequencing. For example, 1024 molecular species may be identified using a 5-nucleotide barcode sequence ($4^5$=1024), whereas 8 nucleotide barcodes can be used to identify up to 65,536 molecular species, a number greater than the total number of distinct genes in the human genome. In some instances, the barcode sequences contained in the probes or RCPs are detected, rather than endogenous sequences, which can be an efficient read-out in terms of information per cycle of sequencing. Because the barcode sequences are pre-determined, they can also be designed to feature error detection and correction mechanisms, see, e.g., U.S. Pat. Pub. 20190055594 and WO2019199579A1, which are hereby incorporated by reference in their entirety.

Sequential Hybridization:

In some instances, the present disclosure relates to methods and compositions for encoding and detecting analytes in a temporally sequential manner for in situ analysis of an analyte in a biological sample, e.g., a target nucleic acid in a cell in an intact tissue. In some aspects, provided herein is a method for detecting the detectably-labeled probes, thereby generating a signal signature. In some instances, the signal signature corresponds to an analyte of the plurality of analytes. In some instances, the methods described herein are based, in part, on the development of a multiplexed biological assay and readout, in which a sample is first contacted with a plurality of nucleic acid probes comprising one or more probe types (e.g., labelling agent, circularizable probe, circular probe, etc.), allowing the probes to directly or indirectly bind target analytes, which may then be optically detected (e.g., by detectably-labeled probes) in a temporally-sequential manner. In some instances, the probes or probe sets comprising various probe types may be applied to a sample simultaneously. In some instances, the probes or probe sets comprising various probe types may be applied to a sample sequentially. In some aspects, the method comprises sequential hybridization of labelled probes to create a spatiotemporal signal signature or code that identifies the analyte.

In some aspects, provided herein is a method involving a multiplexed biological assay and readout, in which a sample is first contacted with a plurality of nucleic acid probes, allowing the probes to directly or indirectly bind target analytes, which may then be optically detected (e.g., by detectably-labeled probes) in a temporally sequential manner. The plurality of nucleic acid probes themselves may be detectably-labeled and detected; in other words, the nucleic acid probes themselves serve as the detection probes. In other implementations, a nucleic acid probe itself is not directly detectably-labeled (e.g., the probe itself is not conjugated to a detectable label); rather, in addition to a target binding sequence (e.g., a sequence binding to a barcode sequence in an RCA product), the nucleic acid probe further comprises a sequence for detection which can be recognized by one or more detectably-labeled detection probes. In some instances, the probes or probe sets comprising various probe types may be applied to a sample simultaneously. In some instances, the probes or probe sets comprising various probe types may be applied to a sample sequentially. In some instances, the method comprises detecting a plurality of analytes in a sample.

In some instances, the method presented herein comprises contacting the sample with a plurality of probes comprising one or more probes having distinct labels and detecting signals from the plurality of probes in a temporally sequential manner, wherein said detection generates signal signatures each comprising a temporal order of signal or absence thereof, and the signal signatures correspond to said plurality of probes that identify the corresponding analytes. In some instances, the temporal order of the signals or absence thereof corresponding to the analytes can be unique for each different analyte of interest in the sample. In some instances, the plurality of probes hybridize to an endogenous molecule in the sample, such as a cellular nucleic acid molecule, e.g., genomic DNA, RNA (e.g., mRNA), or cDNA. In some instances, the plurality of probes hybridize to a product of an endogenous molecule in the sample (e.g., directly or indirectly via an intermediate probe). In some instances, the plurality of probes hybridize to labelling agent that binds directly or indirectly to an endogenous molecule in the sample or a product thereof. In some instances, the plurality of probes hybridize to a product (e.g., an RCA product) of a labelling agent that binds directly or indirectly to an endogenous molecule in the sample or a product thereof.

In any of the implementations disclosed herein, the detection of signals can be performed sequentially in cycles, one for each distinct label. In any of the implementations disclosed herein, signals or absence thereof from detectably-labeled probes targeting an analyte in a particular location in the sample can be recorded in a first cycle for detecting a first label, and signals or absence thereof from detectably-labeled probes targeting the analyte in the particular location can be recorded in a second cycle for detecting a second label distinct from the first label. In any of the implementations disclosed herein, a unique signal signature can be generated for each analyte of the plurality of analytes. In any of the implementations disclosed herein, one or more molecules comprising the same analyte or a portion thereof can be associated with the same signal signature.

In some instances, the in situ assays employ strategies for optically encoding the spatial location of target analytes (e.g., mRNAs) in a sample using sequential rounds of fluorescent hybridization. Microcopy may be used to analyze 4 or 5 fluorescent colors indicative of the spatial localization of a target, followed by various rounds of hybridization and stripping, in order to generate a large set of unique optical signal signatures assigned to different analytes. These methods often require a large number of hybridization rounds, and a large number of microscope lasers (e.g., detection channels) to detect a large number of fluorophores, resulting in a one to one mapping of the lasers to the fluorophores. Specifically, each detectably-labeled probe comprises one detectable moiety, e.g., a fluorophore.

In some aspects, provided herein is a method for analyzing a sample using a detectably-labeled set of probes. In some instances, the method comprises contacting the sample with a first plurality of detectably-labeled probes for targeting a plurality of analytes; performing a first detection round comprising detecting signals from the first plurality of detectably-labeled probes; contacting the sample with a second plurality of detectably-labeled probes for targeting the plurality of analytes; performing a second detection round of detecting signals from the second plurality of detectably-labeled probes, thereby generating a signal signature comprising a plurality of signals detected from the first detection round and second detection round, wherein the signal signature corresponds to an analyte of the plurality of analytes.

In some instances, detection of an optical signal signature comprises several rounds of detectably-labeled probe hybridization (e.g., contacting a sample with detectably-labeled probes), detectably-labeled probe detection, and detectably-labeled probe removal. In some instances, a sample is contacted with plurality first detectably-labeled probes, and said probes are hybridized to a plurality of nucleic acid analytes within the sample in decoding hybridization round 1. In some instances, a first detection round is performed following detectably-labeled probe hybridization. After hybridization and detection of a first plurality of detectably-labeled probes, probes are removed, and a sample may be contacted with a second plurality round of detectably-labeled probes targeting the analytes targeted in decoding hybridization round 1. The second plurality of detectably-labeled probes may hybridize to the same nucleic acid(s) as the first plurality of detectably-labeled probes (e.g., hybridize to an identical or hybridize to new nucleic acid sequence within the same nucleic acid), or the second plurality of detectably-labeled probes may hybridize to different nucleic acid(s) compared to the first plurality of detectably-labeled probes. Following m rounds of contacting a sample with a plurality of detectably-labeled probes, probe detection, and probe removal, ultimately a unique signal signature to each nucleic acid is produced that may be used to identify and quantify said nucleic acids and the corresponding analytes (e.g., if the nucleic acids themselves are not the analytes of interest and each is used as part of a labelling agent for one or more other analytes such as protein analytes and/or other nucleic acid analytes).

In some instances, after hybridization of a detectably-labeled probes (e.g., fluorescently labeled oligonucleotide) that detects a sequence (e.g., barcode sequence on a secondary probe or a primary probe), and optionally washing away the unbound molecules of the detectably-labeled probe, the sample is imaged and the detection oligonucleotide or detectable label is inactivated and/or removed. In some instances, removal of the signal associated with the hybridization between rounds can be performed by washing, heating, stripping, enzymatic digestion, photo-bleaching, displacement (e.g., displacement of detectably-labeled probes with another reagent or nucleic acid sequence), cleavage, quenching, chemical degradation, bleaching, oxidation, or any combinations thereof.

In some examples, removal of a probe (e.g., un-hybridizing the entire probe), signal modifications (e.g., quenching, masking, photo-bleaching, signal enhancement (e.g., via FRET), signal amplification, etc.), signal removal (e.g., cleaving off or permanently inactivating a detectable label) can be performed. Inactivation may be caused by removal of the detectable label (e.g., from the sample, or from the probe, etc.), and/or by chemically altering the detectable label in some fashion, e.g., by photobleaching the detectable label, bleaching or chemically altering the structure of the detectable label, e.g., by reduction, etc.). In some instances, the fluorescently labeled oligonucleotide and/or the intermediate probe hybridized to the fluorescently labeled oligonucleotide (e.g., bridge probe or L-probe) can be removed. In some instances, a fluorescent detectable label may be inactivated by chemical or optical techniques such as oxidation, photobleaching, chemically bleaching, stringent washing or enzymatic digestion or reaction by exposure to an enzyme, dissociating the detectable label from other components (e.g., a probe), chemical reaction of the detectable label (e.g., to a reactant able to alter the structure of the detectable label) or the like. For instance, bleaching may occur by exposure to oxygen, reducing agents, or the detectable label could be chemically cleaved from the nucleic acid probe and washed away via fluid flow.

In some instances, removal of a signal comprises displacement of probes with another reagent (e.g., probe) or nucleic acid sequence. For example, a given probe (e.g., detectably-labeled probes and/or the intermediate probe hybridized to the fluorescently labeled oligonucleotide (e.g., bridge probe or L-probe)) may be displaced by a subsequent probe that hybridizes to an overlapping region shared between the binding sites of the probes. In some cases, a displacement reaction can be very efficient, and thus allows for probes to be switched quickly between cycles, without the need for chemical stripping (or any of the damage to the sample that is associated therewith). In some instances, a sequence for hybridizing the subsequent or displacer probe (i.e. a toehold sequence) may be common across a plurality of probes capable of hybridizing to a given binding site. In some aspects, a single displacement probe can be used to simultaneously displace detection probes bound to an equivalent barcode position from all of the RCPs within a given sample simultaneously (with the displacement mediated by the subsequent detection probes). This may further increase efficiency and reduce the cost of the method, as fewer different probes are required.

After a signal is inactivated and/or removed, then the sample is re-hybridized in a subsequent round with a subsequent fluorescently labeled oligonucleotide, and the oligonucleotide can be labeled with the same color or a different color as the fluorescently labeled oligonucleotide of the previous cycle. In some instances, as the positions of the analytes, probes, and/or products thereof can be fixed (e.g., via fixing and/or crosslinking) in a sample, the fluorescent spot corresponding to an analyte, probe, or product thereof remains in place during multiple rounds of hybridization and can be aligned to read out a string of signals associated with each target analyte.

Decoding:

A "decoding process" is a process comprising a plurality of decoding cycles in which different sets of barcode probes are contacted with target analytes (e.g., mRNA sequences) or target barcodes (e.g., barcodes associated with target analytes) present in a sample, and used to detect the target sequences or associated target barcodes, or segments thereof. In some instances, the decoding process comprises acquiring one or more images (e.g., fluorescence images) for each decoding cycle. Decoded barcode sequences are then inferred based on a set of physical signals (e.g., fluorescence signals) detected in each decoding cycle of a decoding process. In some instances, the set of physical signals (e.g., fluorescence signals) detected in a series of decoding cycles for a given target barcode (or target analyte sequence) may be considered a "signal signature" for the target barcode (or target analyte sequence). In some instances, a decoding process may comprise, e.g., 1, 2, 3, 4, 5, 6, 7, 8, 9, 10, or more than 10 decoding cycles. In some instances, each decoding cycle may comprise contacting a plurality of target sequences or target barcodes with 1, 2, 3, 4, 5, 6, 7, 8, 9, 10, or more than 10 barcode probes (e.g., fluorescently-labeled barcode probes) that are configured to hybridize or bind to specific target sequences or target barcodes, or segments thereof. In some instances, a decoding process may comprise performing a series of in situ barcode probe hybridization steps and acquiring images (e.g., fluorescence images) at each step. Systems and methods for performing multiplexed fluorescence in situ hybridization and imaging are described in, for example, WO 2021/127019 A1; U.S. Pat. No. 11,021,737; and PCT/EP2020/065090 (WO2020240025A1), each of which is incorporated herein by reference in its entirety.

Anchor Probes:

In some instances, the present methods may further involve contacting the target analyte, e.g., a nucleic acid molecule, or proxy thereof with an anchor probe. In some instances, the anchor probe comprises a sequence complementary to an anchor probe binding region, which is present in all target nucleic acid molecules (e.g., in primary or secondary probes), and a detectable label. The detection of the anchor probe via the detectable label confirms the presence of the target nucleic acid molecule. The target nucleic acid molecule may be contacted with the anchor probe prior to, concurrently with, or after being contacted with the first set of detection probes. In some instances, the target nucleic acid molecule may be contacted with the anchor probe during multiple decoding cycles. In some instances, multiple different anchor probes comprising different sequences and/or different reporters may be used to confirm the presence of multiple different target nucleic acid molecules. The use of multiple anchor probes is particularly useful when detection of a large number of target nucleic acid molecules is required, as it allows for optical crowding to be reduced and thus for detected target nucleic acid molecules to be more clearly resolved.

Cell Segmentation:

Cell segmentation strategies try to localize target object boundaries (e.g., a cell or a structure thereof, such as the nucleus) within an image, and to distinguish these from background. Cell/nucleus segmentation belongs to instance segmentation, which requires unique representation to use together with deep learning approaches. Instance segmentation is a unique form of image segmentation that deals with detecting and delineating each distinct instance of an object appearing in an image. Instance segmentation detects all instances of a class with the extra functionality of demarcating separate instances of any segment class. Instance segmentation includes the task of splitting an image into individual instances of an object, such as individual cells or nuclei. Various labeling, painting, staining, tagging methodologies, and the like, are used to discern specific features for the purposes of cell segmentation. Without being bound by theory or methodology, these include nuclei, cytoplasmic, and/or membrane markers, e.g., DAPI (4'6-diamidino-2-phenulindole), a highly fluorescent stain which binds to adenine-thymine-rich regions in nuclear DNA and fluoresces, fluorescently-labeled histones, and/or poly (A) staining. However, such techniques may not be amenable to densely packed tissues, which may benefit from membrane staining, such as by immunofluorescence (IF) or fluorescent small molecules and dyes.

Typical cell segmentation methods and software tools employ existing image processing algorithms formulated decades ago, such as SMASH, ImageJ, Cellsegm and CellProfiler. These algorithms are insufficient for more challenging and extensive cell segmentation analysis. Conceptually, such algorithms are based on the Watershed algorithm where objects in an image are converted to a topological map, where bright spots are considered "high" and dark spots "low", resulting in a "basin" surrounded by watershed lines. The basin represents a segmented region of interest. Thus, the algorithm can form a clear, single basin when the object to be segmented has a smooth intensity decay from its center and when cells are sufficiently separated as in in vitro cultures, but not in inhomogeneous and/or densely cell-packed tissues. In addition, available thresholding algorithms for discriminating regions of interest (ROIs) are based on a predetermined value or range of values for pixel intensity. Pixels relative to the threshold are classified as foreground (i.e., a part of the cell) or background. For exemplary purposes, in classical thresholding algorithms, the threshold is found between two-pixel classes with a rather large intensity interval. This is insufficient, particularly when the intensity interval between background and darker cells is smaller than the one between darker and brighter cells; the image histogram is not properly equalized; or there exists a high degree of overlapping between different pixel classes in the histogram distribution. Due to the high level of noise and variation in intensities between and within cells, the thresholding algorithm must be more robust and flexible.

To apply classical cell segmentation algorithms to more complex cell images, deep neural networks (DNN) or "Deep Learning" have been employed, utilizing parameters estimated from large training datasets. Some Deep Learning-based instance segmentation in computer vision is based on Mask-regions with convolutional neural networks (RCNN) or YOLO (You Only Look Once), which relies on a rectangle bounding box to represent individual instances. Other segmentation methods include known algorithms, such as Stardist, Cellpose, Omnipose, and HoVer-Net, among others, used for nucleus and/or cell segmentation. Semantic segmentation representation can be repurposed to instance segmentation for nucleus segmentation, the most popular algorithms being U-Net2 (unet with 2 classes) and U-Net3 (unet with 3 classes). Although these automated methods are capable of both reducing human effort, increasing reproducibility, and allowing for improved scalability to larger datasets, they remain insufficient. As the acquired image becomes more diverse and complex, fully automated algorithms cannot be customized and the models perform poorly when applied to images markedly different from their training set.

TABLE 1 comparison of the most popular instance segmentation models

| | Representation | Limitation |
|---|---|---|
| U-Net2 | foreground/background pixel two class classification | Low expressiveness. Performance is consistently shown lower than other methods. |
| U-Net3 | foreground/background/boundary 3 class classification | Boundary classification not reliable |
| Mask-RCNN/YOLO | Bounding box + semantic segmentation of each pixel | Prone to merging-error for closely packed nuclei, when bounding boxes of neighbor nuclei have large overlaps and merged by non-maximum suppression. Not good enough for biological images. The bound-box does not accommodate densley packed tissue cells. |
| Stardist | Distance to 32 boundary points equally distributed in polar angles | Fundamentally cannot represent non-starconvex shape. Instead of bounding box (4 points) uses radially arrayed 32-points to bound/carveout the instance. Can only represent starconvex shape. |
| Cellpose | Normalized flow direction vector of each pixel to the "center" of the nucleus. | For certain shapes, the "center" of the object is not well defined. This leads to poor performance for elongated shapes, for instance. |
| | Assigns an artificial flow to each pixel, and calculates a flow vector such that a group of pixels flowing to a center identifies the instance/object. | Over-expressiveness: regression training task for each pixel, which is hard to train and in inference cannot assess the confidence. |
| | Doesn't work well for thin/elongated shapes, and thus flow to the skeleton of the shape. | Post-processing takes very long time (iterative flow process + clustering) |
| Omnipose | Normalized flow direction vector of each pixel to the "skeleton" of the nucleus | (similar limitations to Cellpose) Over-expressiveness: regression training task for each pixel, which is hard to train and in inference cannot assess the confidence Post-processing takes very long time (iterative flow process + clustering) |

Figure 12:
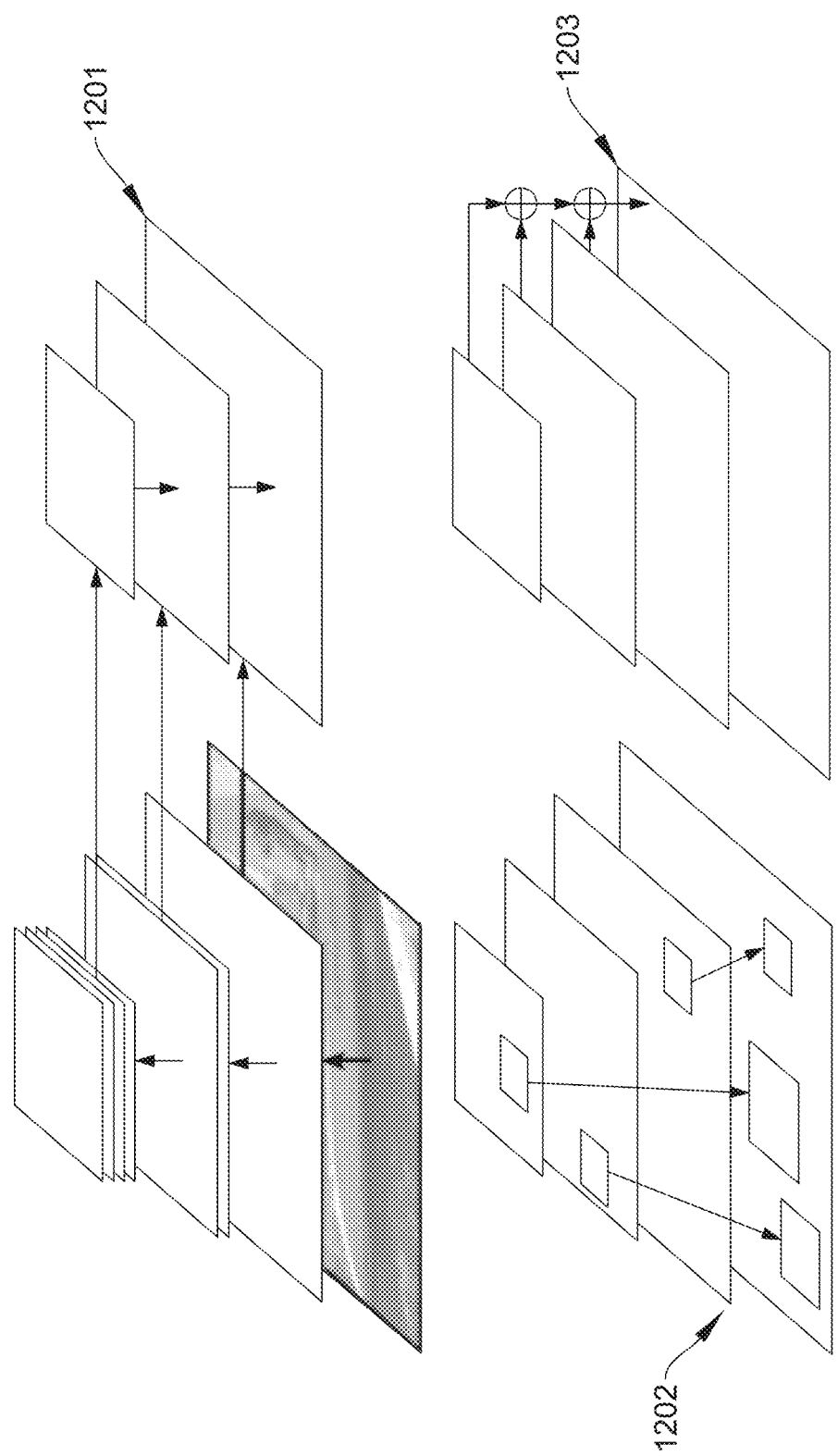
FIG. 12 shows an exemplary feature pyramid network according to embodiments of the present disclosure.

Exemplary FPN Implementation:

An exemplary implementation begins with the Feature Pyramid Network (FPN) backbone 1201 used for instance-level recognition and adds a branch for performing semantic segmentation 1202 in parallel with a region-based branch for instance segmentation 1203, see FIG. 12. Additional information on an exemplary FPN is available in Kirillov, et al., Panoptic Feature Pyramid Networks (accessible online at arxiv.org/abs/1901.02446). In some embodiments, a panoptic FPN is employed for its ability to generate both instance and semantic segmentations via FPN, and may be implemented given the Mask R-CNN framework. Additional information on the Mask R-CNN framework is available in He, et al., Mask R-CNN (accessible online at arxiv.org/abs/1703.06870).

Semantic segmentation: Fully Convolutional Networks (FCNs) serve as the foundation of modern semantic segmentation methods. To increase feature resolution, which is necessary for generating high quality results, recent top methods rely heavily on the use of dilated convolution (also known as atrous convolution). While effective, such an approach can substantially increase compute and memory, limiting the type of backbone network that can be used. As an alternative to dilation, an encoder-decoder or 'U-Net' architecture can be used to increase feature resolution. Encoder-decoders progressively upsample and combine high-level features from a feedforward network with features from lower-levels, ultimately generating semantically meaningful, high-resolution features. In contrast to 'symmetric' decoders, FPN uses a lightweight decoder. FPN is suitable for instance segmentation, and it can serve as a backbone for Mask R-CNN.

Panoptic Feature Pyramid Network: Panoptic FPN represents a single-network baseline that can achieve top performance on both instance and semantic segmentation, and their joint task: panoptic segmentation. The design principle is to start from Mask R-CNN with FPN, a strong instance segmentation baseline, and make minimal changes to also generate a semantic segmentation dense-pixel output (see FIG. 12).

Figure 13:
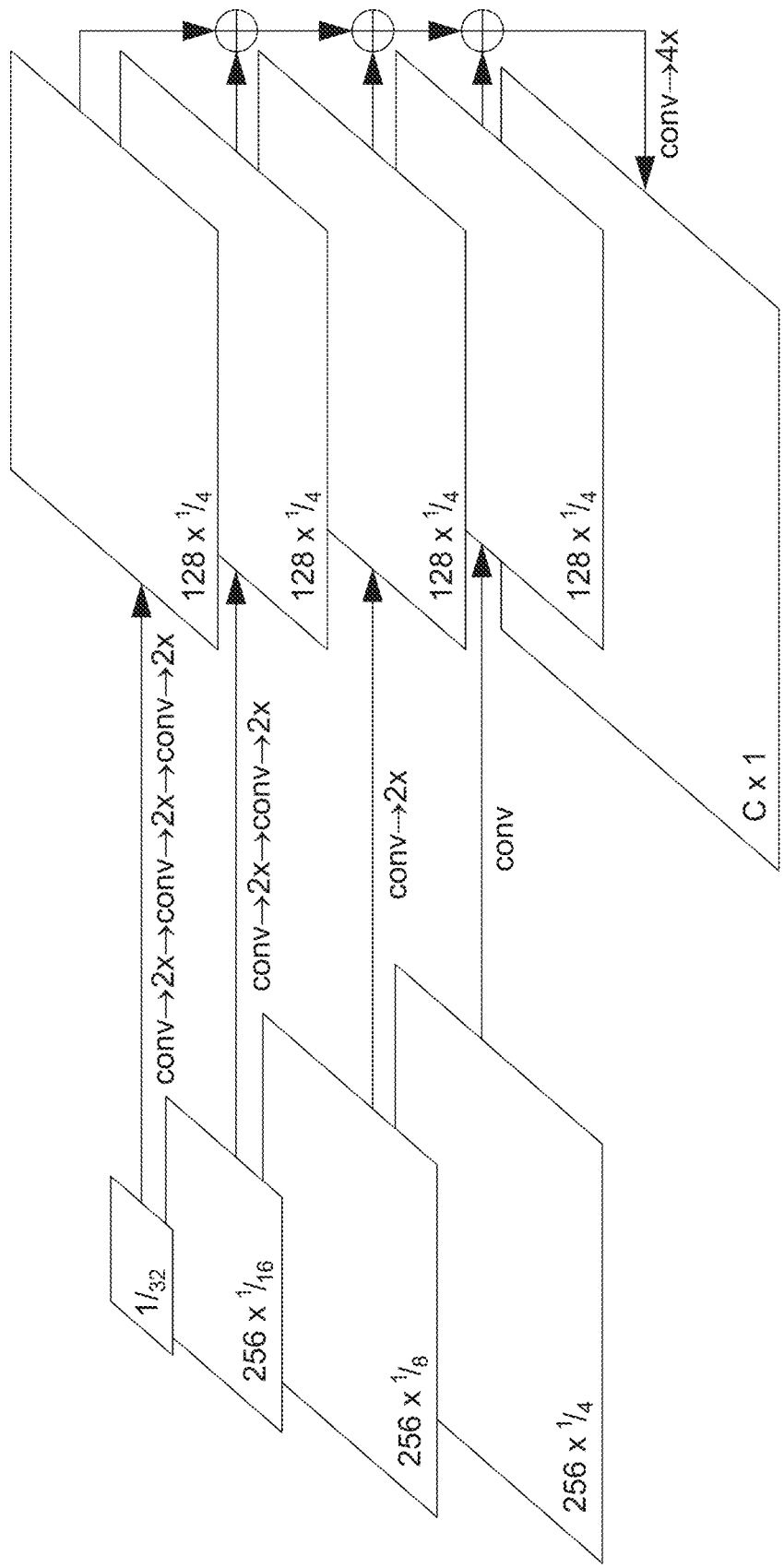
FIG. 13 shows an exemplary semantic segmentation network according to embodiments of the present disclosure.

Model Architecture:

Feature Pyramid Network (FPN): An FPN takes a standard network with features at multiple spatial resolutions (e.g., ResNet), and adds a light top-down pathway with lateral connections for extracting rich multi-scale features. The top-down pathway starts from the deepest layer of the network and progressively upsamples it while adding in transformed versions of higher-resolution features from the bottom-up pathway. As shown in FIG. 13, a FPN generates a pyramid, typically with scales from $\frac{1}{32}$ to $\frac{1}{4}$ resolution, where each pyramid level has the same channel dimension (256 by default).

Instance segmentation branch: The design of a FPN, and in particular the use of the same channel dimension for all pyramid levels, makes it easy to attach a region-based object detector like Faster R-CNN. Faster R-CNN performs region of interest (RoI) pooling on different pyramid levels and applies a shared network branch to predict a refined box and class label for each region. To output instance segmentations, Mask R-CNN was used, which extends Faster R-CNN by adding an FCN branch to predict a binary segmentation mask for each candidate region.

Panoptic FPN: As discussed, the approach is to modify Mask R-CNN with FPN to enable pixel-wise semantic segmentation prediction. However, to achieve accurate predictions, the features used for this task should:

(1) be of suitably high resolution to capture fine structures,
(2) encode sufficiently rich semantics to accurately predict class labels, and
(3) capture multi-scale information to predict stuff regions at multiple resolutions. Although FPN was designed for object detection, these requirements—high-resolution, rich, multi-scale features—identify exactly the characteristics of FPN. It is, thus, contemplated herein to attach to FPN a simple and fast semantic segmentation branch.

Exemplary Semantic Segmentation Branch:

In various embodiments, to generate the semantic segmentation output from the FPN features, information from all levels of the FPN pyramid is merged into a single output, as illustrated in instance segmentation 1203. An exemplary FPN is illustrated in detail in FIG. 13. Briefly, each FPN level is upsampled by convolutions and bilinear upsampling until it reaches ¼ scale, these outputs are then summed and finally transformed into a pixel-wise output.

Starting from the deepest FPN level (at 1/32 scale), three upsampling stages were performed to yield a feature map at ¼ scale, where each upsampling stage consists of 3×3 convolution, group norm, ReLU, and 2× bilinear upsampling. This strategy is repeated for FPN scales 1/16, 1/8, and ¼ (with progressively fewer upsampling stages). The result is a set of feature maps at the same ¼ scale, which are then element-wise summed. A final 1×1 convolution, 4× bilinear upsampling, and softmax are used to generate the per-pixel class labels at the original image resolution. In addition to stuff classes, this branch also outputs a special 'other' class for all pixels belonging to objects (to avoid predicting stuff classes for such pixels).

Implementation details: A standard FPN configuration was used with 256 output channels per scale, and the semantic segmentation branch reduces this to 128 channels. For the (pre-FPN) backbone, ResNet/ResNeXt models pre-trained on ImageNet were employed using batch norm (BN). When used in fine-tuning, BN was replaced with a fixed channel-wise affine transformation, as is typical.

Post-Processing Example:

Panoptic inference: The panoptic output format requires each output pixel to be assigned a single class label (or void) and instance id (the instance id is ignored for stuff classes). As the instance and semantic segmentation outputs from Panoptic FPN may overlap; simple postprocessing proposed in the art may be used to resolve all overlaps. This post-processing is similar in spirit to non-maximum suppression and operates by:

(1) resolving overlaps between different instances based on their confidence scores,
(2) resolving overlaps between instance and semantic segmentation outputs in favor of instances, and
(3) removing any stuff regions labeled 'other' or under a given area threshold.

Training (Loss Function) Example:

Joint training: During training the instance segmentation branch has three losses: Lc (classification loss), Lb (bounding-box loss), and Lm (mask loss). The total instance segmentation loss is the sum of these losses, where Lc and Lb are normalized by the number of sampled RoIs and Lm is normalized by the number of foreground RoIs. The semantic segmentation loss, Ls, is computed as a per-pixel cross entropy loss between the predicted and the ground-truth labels, normalized by the number of labeled image pixels.

It was observed that the losses from these two branches have different scales and normalization policies. Simply adding them degrades the final performance for one of the tasks. This can be corrected by a simple loss re-weighting between the total instance segmentation loss and the semantic segmentation loss. The final loss is thus: $L=\lambda_i(L_c+L_b+L_m)+\lambda_s L_s$. By tuning $\lambda_i$ and $\lambda_s$ it is possible to train a single model that is comparable to two separate task-specific models, but at about half the compute.

It will be appreciated that the above architecture is meant to illustrate the use of a panoptic FPN without constraining the following discussion.

In various embodiments, cell segmentation approximates boundaries between cells so that decoded transcripts can be assigned to cells. Downstream, these results can be used to produce a cell-feature matrix, similar to those output by existing single cell and spatial technologies. The first step is to detect the locations of nuclei using, e.g., DAPI images and a custom neural network for nucleus segmentation. In various embodiments, the neural network is trained on thousands of manually labeled image patches covering multiple tissue types. Once the locations of nuclei in the sample have been identified by the model, a heuristic cell boundary expansion step is performed. In various embodiments, the nuclei boundaries are expanded by a predetermined distance (e.g., 15 µm) or until they encounter another cell boundary in X-Y. In various embodiments, if cell boundaries overlap during expansion, they are resolved using an algorithm that is conceptually similar to Voronoi tessellation.

In various embodiments, cell segmentation takes into account the 3D output from a DAPI image processing step for all Z-slices for better accuracy, but ultimately produces a flattened 2D segmentation mask. In various embodiments, the nuclear boundaries are consolidated to form non-overlapping 2D objects when projected in X-Y. Since the segmentation mask is 2D, in various embodiments, transcripts are assigned to the 2D instances based on their X and Y coordinates.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Target molecules (e.g., nucleic acids, proteins, antibodies, etc.) can be detected in biological samples (e.g., one or more cells or a tissue sample) using an instrument having integrated optics and fluidics modules (an "opto-fluidic instrument" or "opto-fluidic system"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in-situ analysis system used to analyze a biological sample and detect target molecules including but not limited to DNA, RNA, proteins, antibodies, and/or the like.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample from a mammal. A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids needed for establishing the experimental conditions required for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The in-situ analysis system may also include other ancillary modules configured to facilitate the operation of the opto-fluidic instrument, such as, but not limited to, cooling systems, motion calibration systems, etc.

Figure 3:
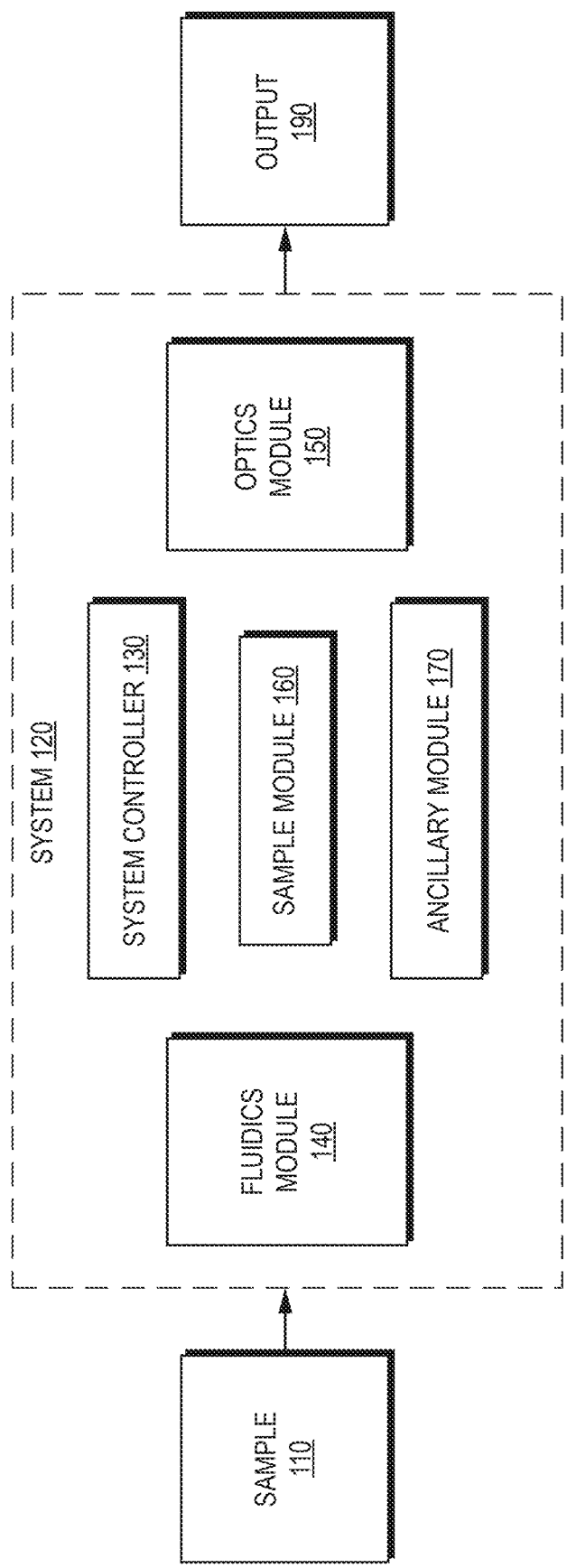
FIG. 3 is an example workflow of analysis of a biological sample (e.g., a cell or tissue sample) using an opto-fluidic instrument, according to various embodiments.

FIG. 3 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules such as DNA, RNA, proteins, antibodies, etc. For example, the sample 110 can be a sectioned tissue that is treated to access the RNA thereof for labeling with circularizable DNA probes. Ligation of the probes may generate a circular DNA probe which can be enzymatically amplified and bound with fluorescent oligonucleotides, which can create bright signal that is convenient to image and has a high signal-to-noise ratio.

In various embodiments, the sample 110 may be placed in the opto-fluidic instrument 120 for analysis and detection of the molecules in the sample 110. In various embodiments, the opto-fluidic instrument 120 can be a system configured to facilitate the experimental conditions conducive for the detection of the target molecules. For example, the opto-fluidic instrument 120 can include a fluidics module 140, an optics module 150, a sample module 160, and an ancillary module 170, and these modules may be operated by a system controller 130 to create the experimental conditions for the probing of the molecules in the sample 110 by selected probes (e.g., circularizable DNA probes), as well as to facilitate the imaging of the probed sample (e.g., by an imaging system of the optics module 150). In various embodiments, the various modules of the opto-fluidic instrument 120 may be separate components in communication with each other, or at least some of them may be integrated together.

In various embodiments, the sample module 160 may be configured to receive the sample 110 into the opto-fluidic instrument 120. For instance, the sample module 160 may include a sample interface module (SIM) that is configured to receive a sample device (e.g., cassette) onto which the sample 110 can be deposited. That is, the sample 110 may be placed in the opto-fluidic instrument 120 by depositing the sample 110 (e.g., the sectioned tissue) on a sample device that is then inserted into the SIM of the sample module 160. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along the two-dimensional (2D) plane of the opto-fluidic instrument 120.

The experimental conditions that are conducive for the detection of the molecules in the sample 110 may depend on the target molecule detection technique that is employed by the opto-fluidic instrument 120. For example, in various embodiments, the opto-fluidic instrument 120 can be a system that is configured to detect molecules in the sample 110 via hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, hybridizing reagents, etc., and such reagents may be provided by the fluidics module 140.

In various embodiments, the fluidics module 140 may include one or more components that may be used for storing the reagents, as well as for transporting said reagents to and from the sample device containing the sample 110. For example, the fluidics module 140 may include reservoirs configured to store the reagents, as well as a waste container configured for collecting the reagents (e.g., and other waste) after use by the opto-fluidic instrument 120 to analyze and detect the molecules of the sample 110. Further, the fluidics module 140 may also include pumps, tubes, pipettes, etc., that are configured to facilitate the transport of the reagent to the sample device (e.g., and as such the sample 110). For instance, the fluidics module 140 may include pumps ("reagent pumps") that are configured to pump washing/stripping reagents to the sample device for use in washing/stripping the sample 110 (e.g., as well as other washing functions such as washing an objective lens of the imaging system of the optics module 150).

In various embodiments, the ancillary module 170 can be a cooling system of the opto-fluidic instrument 120, and the cooling system may include a network of coolant-carrying tubes that are configured to transport coolants to various modules of the opto-fluidic instrument 120 for regulating the temperatures thereof. In such cases, the fluidics module 140 may include coolant reservoirs for storing the coolants and pumps (e.g., "coolant pumps") for generating a pressure differential, thereby forcing the coolants to flow from the reservoirs to the various modules of the opto-fluidic instrument 120 via the coolant-carrying tubes. In some instances, the fluidics module 140 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the fluidics module 140 may also include cooling fans that are configured to force air (e.g., cool and/or ambient air) into the returning coolant reservoirs to cool the heated coolants stored therein. In some instances, the fluidics module 140 may also include cooling fans that are configured to force air directly into a component of the opto-fluidic instrument 120 so as to cool said component. For example, the fluidics module 140 may include cooling fans that are configured to direct cool or ambient air into the system controller 130 to cool the same.

As discussed above, the opto-fluidic instrument 120 may include an optics module 150 which include the various optical components of the opto-fluidic instrument 120, such as but not limited to a camera, an illumination module (e.g., light source such as LEDs), an objective lens, and/or the like. The optics module 150 may include a fluorescence imaging system that is configured to image the fluorescence emitted by the probes (e.g., oligonucleotides) in the sample 110 after the probes are excited by light from the illumination module of the optics module 150.

In some instances, the optics module 150 may also include an optical frame onto which the camera, the illumination module, and/or the X-Y stage of the sample module 160 may be mounted.

In various embodiments, the system controller 130 may be configured to control the operations of the opto-fluidic instrument 120 (e.g., and the operations of one or more modules thereof). In some instances, the system controller 130 may take various forms, including a processor, a single computer (or computer system), or multiple computers in communication with each other. In various embodiments, the system controller 130 may be communicatively coupled with data storage, set of input devices, display system, or a combination thereof. In some cases, some or all of these components may be considered to be part of or otherwise integrated with the system controller 130, may be separate components in communication with each other, or may be integrated together. In other examples, the system controller 130 can be, or may be in communication with, a cloud computing platform.

In various embodiments, the opto-fluidic instrument 120 may analyze the sample 110 and may generate the output 190 that includes indications of the presence of the target molecules in the sample 110. For instance, with respect to the example embodiment discussed above where the opto-fluidic instrument 120 employs a hybridization technique for detecting molecules, the opto-fluidic instrument 120 may cause the sample 110 to undergo successive rounds of fluorescent probe hybridization (using two or more sets of fluorescent probes, where each set of fluorescent probes is excited by a different color channel) and be imaged to detect target molecules in the probed sample 110. In such cases, the output 190 may include optical signatures (e.g., a codeword) specific to each gene, which allow the identification of the target molecules.

In some instances, an assembly for transilluminating a substrate can include a sample carrier device (e.g., a microfluidic chip or glass slide), a thermal control module configured to control the temperature of the sample carrier device (e.g., a thermoelectric module), and a light source configured to illuminate the sample carrier device. In some instances, the assembly includes a heat exchanger (e.g., a fluid block having a cooling fluid flowing therethrough). In some instances, an assembly for transilluminating can include sample carrier device (e.g., a sample substrate), an optically transparent substrate, a light source configured to illuminate the optically transparent substrate, a light scattering layer configured to scatter light from the light source, and/or a thermal control module configured to control the temperature of the sample carrier device and/or optically transparent substrate.

In some embodiments, the sample carrier device (e.g., a cassette) can be configured to receive a sample. In some embodiments, the sample carrier device can include one or more microfluidic channels, e.g., sample chambers or microfluidic channels etched into a planar substrate or chambers within a flow cell or microfluidic device.

A sample carrier device for the systems disclosed herein can include, but is not limited to, a substrate configured to receive a sample, a microscope slide and/or an adapter configured to mount microscope slides (with or without coverslips) on a microscope stage or automated stage (e.g., an automated translation or rotational stage), a substrate, and/or an adapter configured to mount slides on a microscope stage or automated stage, a substrate comprising etched sample containment chambers (e.g., chambers open to the environment) and/or an adapter configured to mount such substrates on a microscope stage or automated stage, a flow cell and/or an adapter configured to mount flow cells on a microscope stage or automated stage, or a microfluidic device and/or an adapter configured to mount microfluidic devices on a microscope stage or automated stage. In some embodiments, the sample carrier device further includes a cassette configured to secure a substrate (e.g., a glass slide). In some embodiments, the cassette includes two or more components (e.g., a top half and a bottom half) into which the substrate is secured.

In some instances, the one or more sample carrier devices can be designed for performing a variety of chemical analysis, biochemical analysis, nucleic acid analysis, cell analysis, or tissue analysis applications. In some instances, for example, the sample carrier device (e.g., flow cells and microfluidic devices) may comprise a sample, e.g., a tissue sample. In some instances, the sample carrier device (e.g., flow cells and microfluidic devices) may comprise a sample, e.g., a tissue sample, placed in contact with, e.g., a substrate (e.g., a surface of the flow cell or microfluidic device).

The sample carrier devices for the disclosed systems (e.g., microscope slides, substrates comprising one or more etched microfluidic channel, flow cells or microfluidic devices comprising one or more microfluidic channels, etc.) can be fabricated from any of a variety of materials known to those of skill in the art including, but not limited to, glass (e.g., borosilicate glass, soda lime glass, etc.), fused silica (quartz), silicon, polymer (e.g., polystyrene (PS), macroporous polystyrene (MPPS), polymethylmethacrylate (PMMA), polycarbonate (PC), polypropylene (PP), polyethylene (PE), high density polyethylene (HDPE), cyclic olefin polymers (COP), cyclic olefin copolymers (COC), polyethylene terephthalate (PET), polydimethylsiloxane (PDMS), etc.), polyetherimide (PEI) and perfluoroelastomer (FFKM) as more chemically inert alternatives, or any combination thereof. FFKM is also known as Kalrez.

The one or more materials used to fabricate sample carrier devices for the disclosed systems (e.g., substrates configured to receive a sample, microscope slides, substrates comprising one or more etched microfluidic channels, flow cells or microfluidic devices comprising one or more microfluidic channels or sample chambers, etc.) can be optically transparent to facilitate use with spectroscopic or imaging-based detection techniques. In some instances, the entire sample carrier device can be optically transparent. Alternatively, in some instances, only a portion of the sample carrier device (e.g., an optically transparent "window") can be optically transparent.

The sample carrier devices for the disclosed systems (e.g., substrates configured to receive a sample, microscope slides, substrates comprising one or more etched microfluidic channels, flow cells or microfluidic devices comprising one or more microfluidic channels or sample chambers, etc.) can be fabricated using any of a variety of techniques known to those of skill in the art, where the choice of fabrication technique is often dependent on the choice of material used, and vice versa. Examples of suitable sample carrier device fabrication techniques include, but are not limited to, extrusion, drawing, precision computer numerical control (CNC) machining and boring, laser photoablation, photolithography in combination with wet chemical etching, deep reactive ion etching (DRIE), micro-molding, embossing, 3D-printing, thermal bonding, adhesive bonding, anodic bonding, and the like (see, e.g., Gale, et al. (2018), "A Review of Current Methods in Microfluidic Device Fabrication and Future Commercialization Prospects", Inventions 3, 60, 1-25, which is hereby incorporated by reference in its entirety).

Figure 4A:
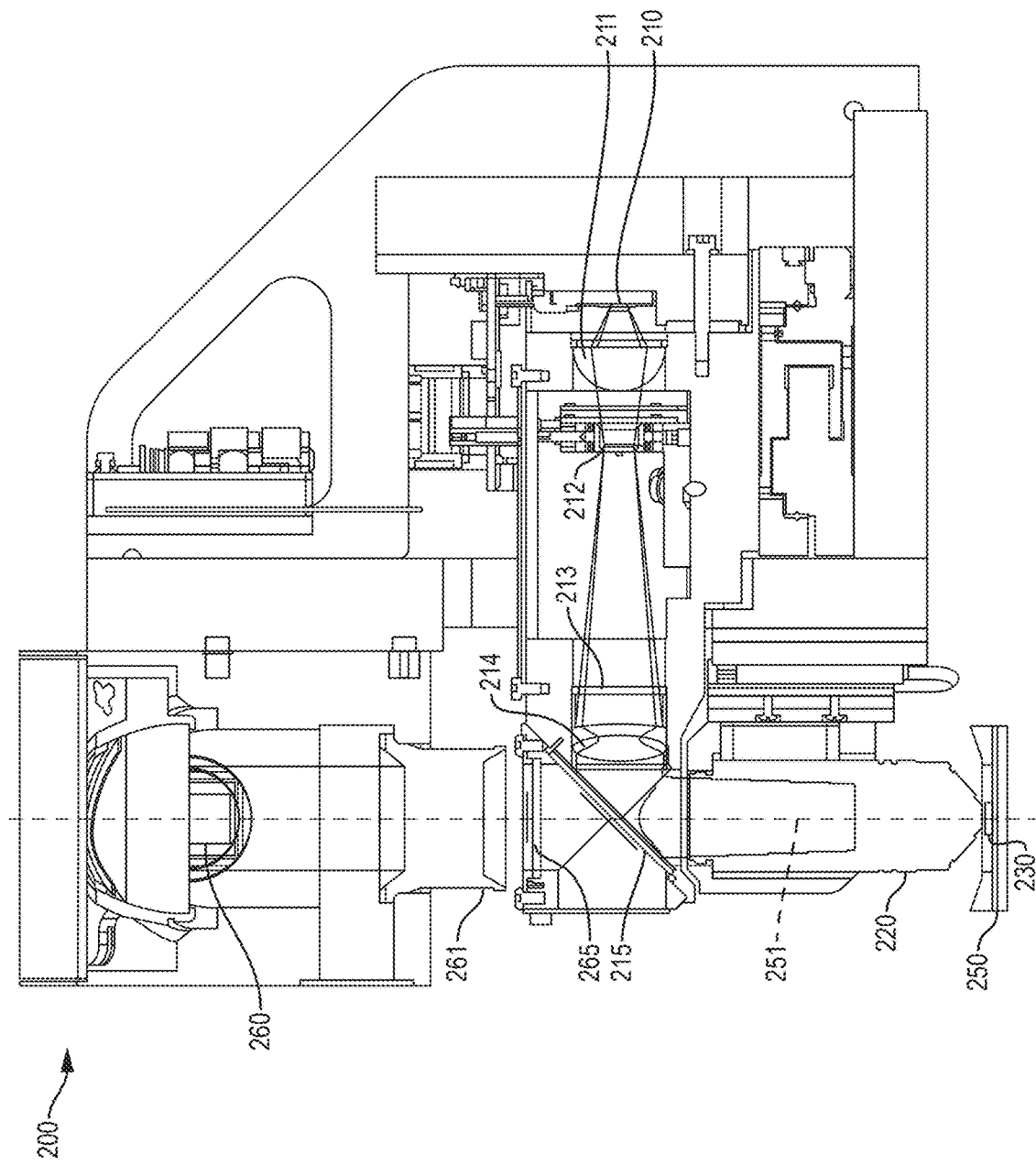
FIGS. 4A-4B illustrate cross-sectional views of an optics module in an imaging system, according to some embodiments.
Figure 4B:
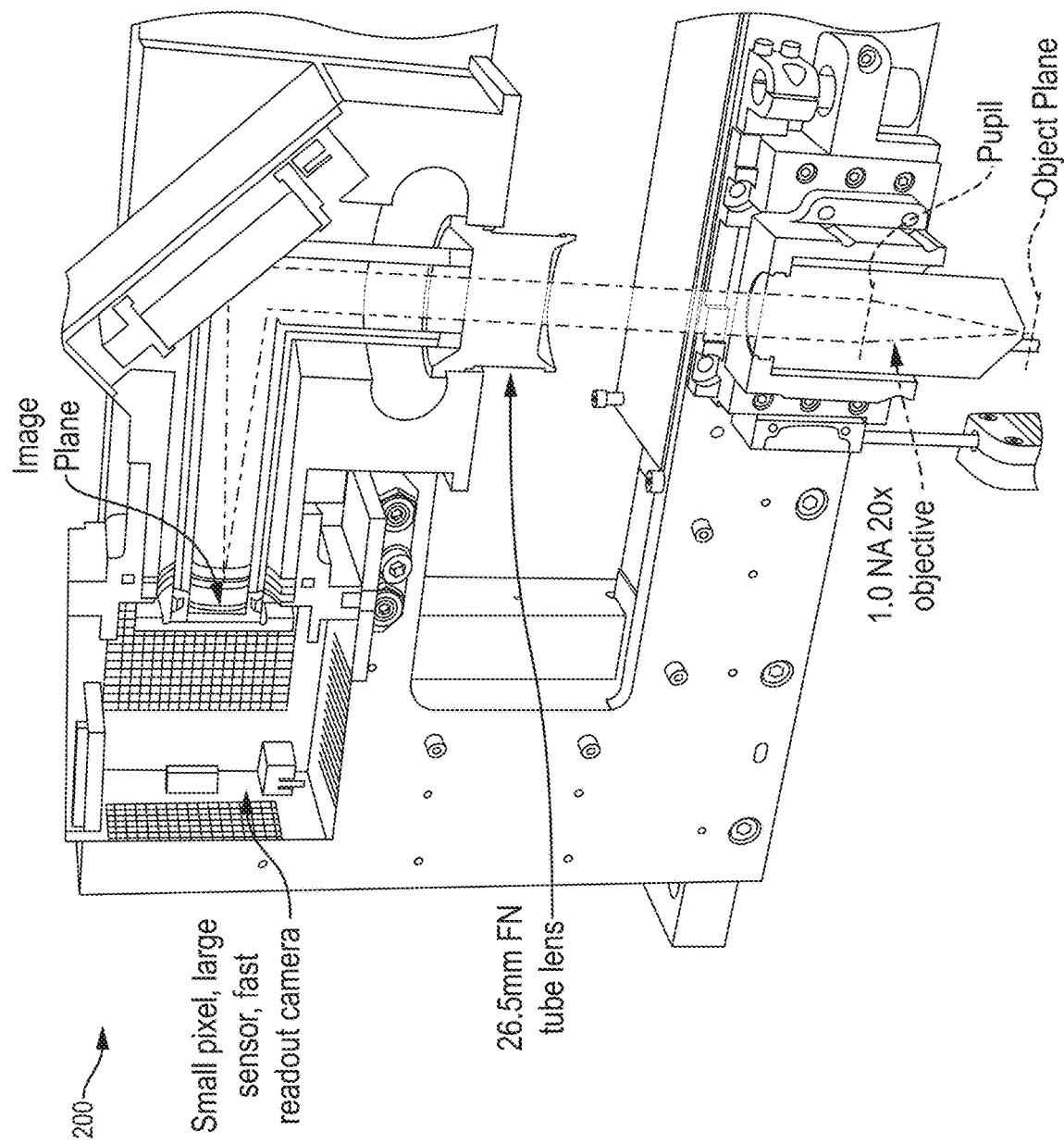

FIG. 4A illustrates a cross-sectional view of an optics module 200 in an imaging system. One or more illumination sources 210, e.g., one or more light emitting diodes (LEDs), provides light through one or more optical components and an objective lens 220 to thereby illuminate a sample 250. In various embodiments, the optical components include a collimator 211. In various embodiments, the optical components include a field stop 212. In various embodiments, the optical components include one or more excitation filters 213. In various embodiments, the one or more excitation filters 213 are configured to filter light from the illumination source(s) 210 for a predetermined range of wavelengths (e.g., each filter has one or more blocking band(s) and/or transmission band(s) that may be different or may overlap at least in part) and each excitation filter 213 is aligned with appropriate illumination sources (e.g., blue LEDs, green LEDs, yellow LEDs, red LEDs, ultraviolet LEDs, etc.). In various embodiments, the optical components include a condenser 214. In various embodiments, the optical components include a beam splitter 215. An optical axis 251 is illustrated extending through the center of the optical surfaces in the objective lens 220 and its path includes an image plane, a focal plane, and input/output pupils (illustrated in FIG. 4B).

A sensor array 260 (e.g., CMOS sensor) receives light signals from the sample 250. In various embodiments, the optical components include one or more emission filters 265. In various embodiments, the one or more emission filters 265 are configured to filter light from the sample (e.g., emitted from one or more fluorophores, autofluorescence, etc.) for a predetermined range of wavelengths (e.g., each filter has one or more blocking band(s) and/or transmission band(s) that may be different or may overlap at least in part). In various embodiments, the emission filters 265 align (e.g., via motorized translation) with optics and/or the sensor array. In various embodiments, the sample 250 is probed with fluorescent probes configured to bind to a target (e.g., DNA or RNA) that, when illuminated with a particular wavelength (or range of wavelengths) of light, emit light signals that can be detected by the sensor array 260. In various embodiments, the sample 250 is repeatedly probed with two or more (e.g., two, three, four, five, six, etc.) different sets of probes. In various embodiments, each set of probes corresponds to a specific color (e.g., blue, green, yellow, or red) such that, when illuminated by that color, probes bound to a target emit light signals. In some embodiments, the sensor array 260 is aligned with the optical axis 251 of the objective lens 220 (i.e., the optical axis of the camera is coincident with and parallel to the optical axis of the objective lens 220). In various embodiments, the sensor array 260 is positioned perpendicularly to the objective lens 220 (i.e., the optical axis of the camera is perpendicular to and intersects the optical axis of the objective lens 220). In various embodiments, a tube lens 261 is mounted in the optical path to focus light on the sensor array 260 thereby allowing for image formation with infinity-corrected objectives. Descriptions of optical modules and illumination assemblies for use in opto-fluidic instruments can be found in U.S. provisional patent application No. 63/427,282, filed on Nov. 22, 2022, titled "Systems and Methods for Illuminating a Sample" and U.S. provisional patent application No. 63/427,360, file on Nov. 22, 2022, titled "Systems and Methods for Imaging Samples," each of which is incorporated by reference in its entirety.

In various embodiments, the sample is illuminated with one or more wavelengths configured to induce fluorescence in the sample. In various embodiments, the sample is probed during one or more probing cycles with one or more fluorescent probes configured to bind to one or more target analytes. In various embodiments, the one or more wavelengths are selected to induce fluorescence in a subset of the one or more fluorescent probes. In various embodiments, each probing cycle includes illumination with two or more (e.g., four) colors of light. In various embodiments, the sample is treated with a fluorescent stain configured to illuminate one or more structures within the sample. In various embodiments, the sample is contacted with a nuclear stain. In various embodiments, the sample is contacted with 4', 6-diamidino-2-phenylindole ("DAPI") configured to bind to adenine-thymine-rich regions in DNA. In various embodiments, illumination of the sample causes autofluorescence of the sample. In various embodiments, autofluorescence is the natural emission of light by biological structures when they have absorbed light, and may be used to distinguish the light originating from artificially added fluorescent markers. In various embodiments, fluorescence of the sample through fluorescent probes, autofluorescence, and/or a fluorescent stain can be used with the methods described herein to determine one or more focus metrics of a tissue sample.

In various embodiments, the sample is illuminated via edge lighting or transillumination along one or more edges of the sample and/or sample substrate. In various embodiments, the edge lighting provides dark-field illumination of the sample. In various embodiments, edge lighting is provided by one or more light sources positioned to provide light substantially perpendicular to a normal of the substrate surface on which the sample is disposed. In various embodiments, the substrate is a glass slide. In various embodiments, the substrate is configured as a wave guide to thereby guide light emitted from the edge lighting towards the sample. In various embodiments, illumination of the sample via edge lighting can be used with the methods described herein to determine one or more focus metrics of a tissue sample.

Figure 5:
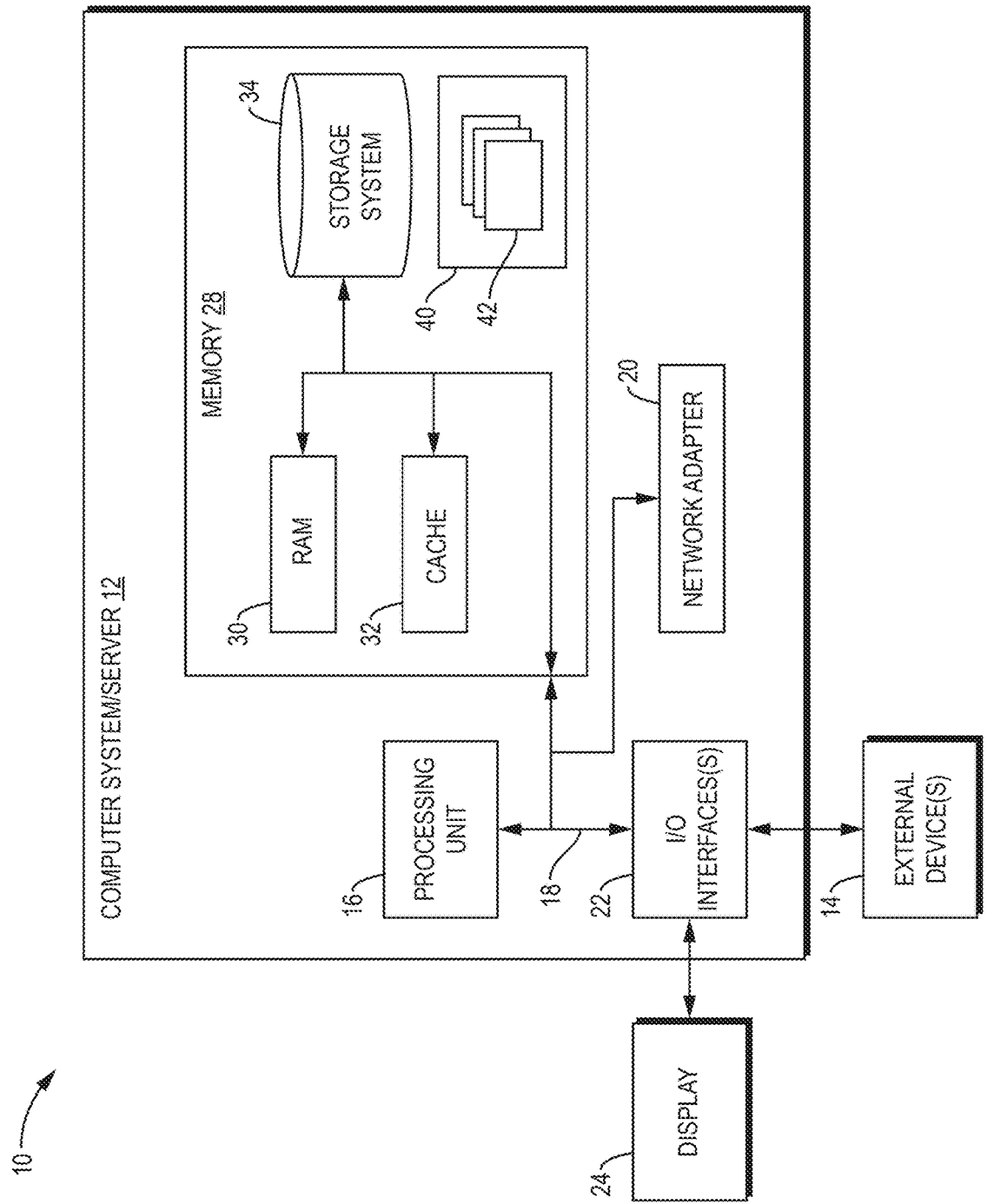
FIG. 5 depicts a computing node according to some embodiments disclosed herein.

Referring now to FIG. 5, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure includes systems, methods, and/or computer program products. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
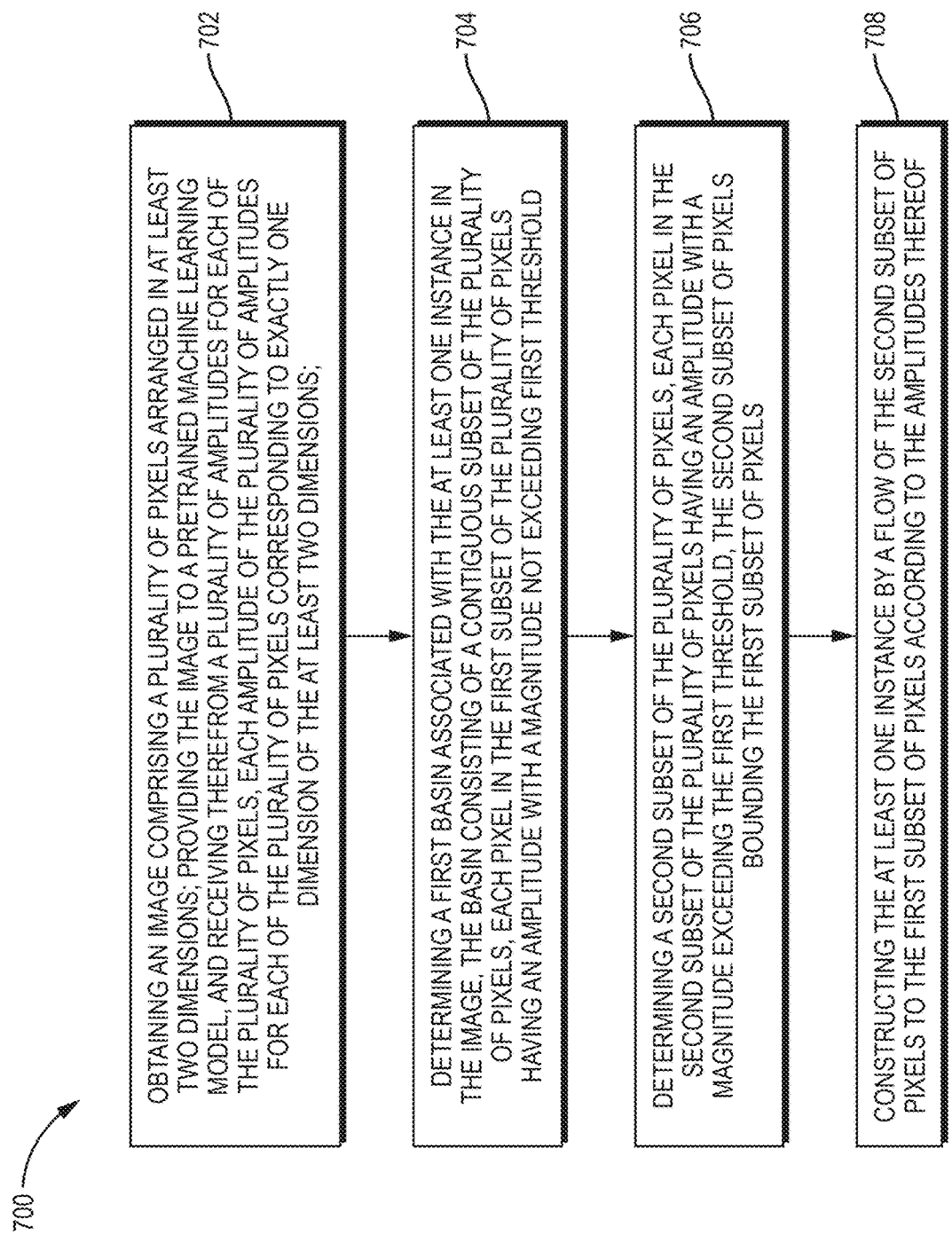
FIG. 7 is a flowchart illustrating a method of image segmentation.

Referring to FIG. 7, an exemplary method 700 of image segmentation is illustrated. In some aspects, provided herein are computer-implemented methods of image segmentation comprising: 702, obtaining an image comprising a plurality of pixels arranged in at least two dimensions; providing the image to a pretrained machine learning model, and receiving therefrom a plurality of amplitudes for each of the plurality of pixels, each amplitude of the plurality of amplitudes for each of the plurality of pixels corresponding to exactly one dimension of the of the at least two dimensions; identifying at least one instance in the image by: 704 determining a first basin associated with the at least one instance in the image, the basin consisting of a contiguous subset of the plurality of pixels, each pixel in the first subset of the plurality of pixels having an amplitude with a magnitude not exceeding first threshold; 706 determining a second subset of the plurality of pixels, each pixel in the second subset of the plurality of pixels having an amplitude with a magnitude exceeding the first threshold, the second subset of pixels bounding the first subset of pixels; and 708 constructing the at least one instance by a flow of the second subset of pixels to the first subset of pixels according to the amplitudes thereof.

In some embodiments, said method further comprises receiving from the pretrained machine learning model a classification of each pixel of the image as background or foreground, wherein the first and second subsets are selected from the foreground pixels. In some such embodiments, the method further comprises determining a third subset of the plurality of pixels, each pixel in the subset of the plurality of pixels having an amplitude with a magnitude exceeding the first threshold but not exceeding a second threshold; for each of the third subset of the plurality of pixels, correcting its amplitude or classifying it as a background pixel. Said correcting of amplitudes may be based on direction consistency of neighboring pixels and a level of divergence therefrom. In some embodiments, at least some of the pixels of the third subset are grouped with at least some of the pixels of the second subset based on proximity.

In some preferred embodiments, the machine learning model comprises a feature pyramid network (FPN). Said FPN may comprise a semantic segmentation branch configured to perform the classification as background or foreground and an instance segmentation branch configured to determine the plurality of amplitudes.

Embodiments of the disclosure further comprise discretizing each of the amplitudes of the second subset into a directional value selected from: stationary and directions corresponding to adjacent neighboring pixels.

In some embodiments, each of the plurality of amplitudes is independently selected from the group consisting of −1, 0, and +1.

Figure 8:
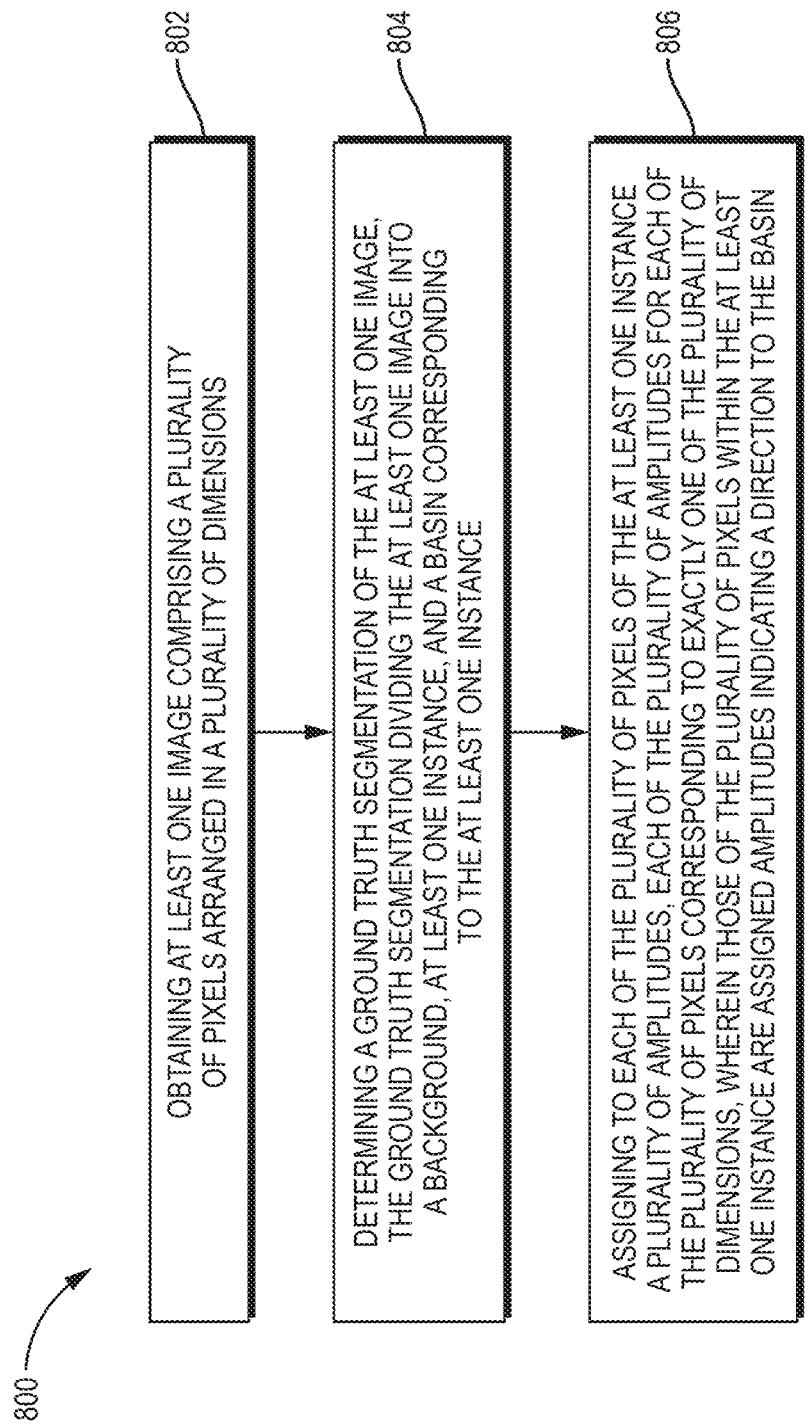
FIG. 8 is a flowchart illustrating a method of training a machine learning model for performing image segmentation.

Referring to FIG. 8, an exemplary method 800 of training a machine learning model for image segmentation is illustrated. In some aspects of the disclosure, provided herein are methods of training a machine learning model for performing image segmentation comprising: 802 obtaining at least one image comprising a plurality of pixels arranged in a plurality of dimensions; 804 determining a ground truth segmentation of the at least one image, the ground truth segmentation dividing the at least one image into a background, at least one instance, and a basin corresponding to the at least one instance; 806 assigning to each of the plurality of pixels of the at least one instance a plurality of amplitudes, each of the plurality of amplitudes for each of the plurality of pixels corresponding to exactly one of the plurality of dimensions, wherein those of the plurality of pixels within the at least one instance are assigned amplitudes indicating a direction to the basin.

In some embodiments, determining the ground truth representation comprises: receiving a boundary of the at least one instance; defining the basin of the at least one instance as all pixels within the at least one instance exceeding a predetermined distance its boundary. In some such embodiments, the predetermined distance is less than or equal to ten pixels. The direction to the basin may be determined by a neighboring pixel with a maximum distance away from the boundary.

In some embodiments, the pretrained machine learning model is pretrained according to any one of the methods disclosed herein.

In preferred embodiments, the image comprises a plurality of fields of view (FOVs) of a biological sample. In further preferred embodiments, the at least one instance is a cellular nucleus.

Further aspects of the disclosure include computer program products comprising a computer readable storage medium having program instructions embodied therewith, the program instructions executable by a processor to cause the processor to perform a method disclosed herein.

In certain aspects of the disclosure, provided herein are image processing systems for analysis of biological samples, comprising: a datastore having stored therein a digital image of a biological sample; and a processor configured to retrieve the digital image from the datastore and to perform thereon a method disclosed herein.

Aspects of the disclosure, as provided herein, also include imaging devices for analysis of biological samples, comprising: a camera configured to capture a digital image of a biological sample; and a processor configured to receive the digital image from the camera and perform thereon methods disclosed herein.

Full Cell Segmentation Using Multiple Stain Indicators

In various embodiments, cellular segmentation (e.g., cell membrane segmentation) is inferred based on an initial nuclear segmentation (e.g., a nuclear segmentation mask) that is expanded using one of a plurality of different expansion methods that will be discussed in more detail below. In such embodiments, a nuclear stain image is obtained, for example a DAPI stained image, by imaging a plurality of focal planes in one field of view (i.e., a z-stack) for a plurality of fields of view. In various embodiments, a z-stack of images is obtained in ZCYX imaging order (a z-stack is imaged for each color channel, then the sample is moved in X and/or Y). In various embodiments, a z-stack of images is obtained in ZYXC imaging order (a z-stack is imaged for a single color channel for each FOV before switching color channels). In various embodiments, the nuclear stain image is segmented in multiple planes across each z-stack. Nuclear boundaries determined from the segmented nuclear stain image are consolidated to form non-overlapping 2D objects when projected in XY in order to produce 2D masks.

In various embodiments, as one example of a cell segmentation model using isometric expansion, nuclear boundaries are expanded by a predetermined margin, e.g., 15 µm, 10 µm, 5 µm or until it encounters another cell boundary in XY to provide approximate cell segmentation. In various embodiments, the predetermined expansion is about 5 µm to about 30 µm. In various embodiments, the predetermined expansion is about 10 µm to about 20 µm. In various embodiments, the predetermined expansion is about 15 µm, about 14 µm, about 13 µm, about 12 µm, about 11 µm, about 10 µm, about 9 µm, about 8 µm, about 7 µm, about 6 µm, about 5 µm. If a decoded analyte (e.g., one or more RNA transcript) falls inside this boundary, the decoded analyte is assigned to a cell (e.g., arbitrarily or based on one or more rules). Finally, simplified polygons are made for ease of use in visualization.

In additional embodiments, cell segmentation is obtained using multiple layers of stained images as set out below.

In some embodiments, cell segmentation is improved by providing inputs to a cell segmentation pipeline that include images of one or more different stains (e.g., cell membrane stains, nuclear stains, cytoplasmic stains, etc.). In some embodiments, the inputs include images of a cellular nuclei stain, a cellular boundary stain, and one or more internal cell stain.

Figure 17:
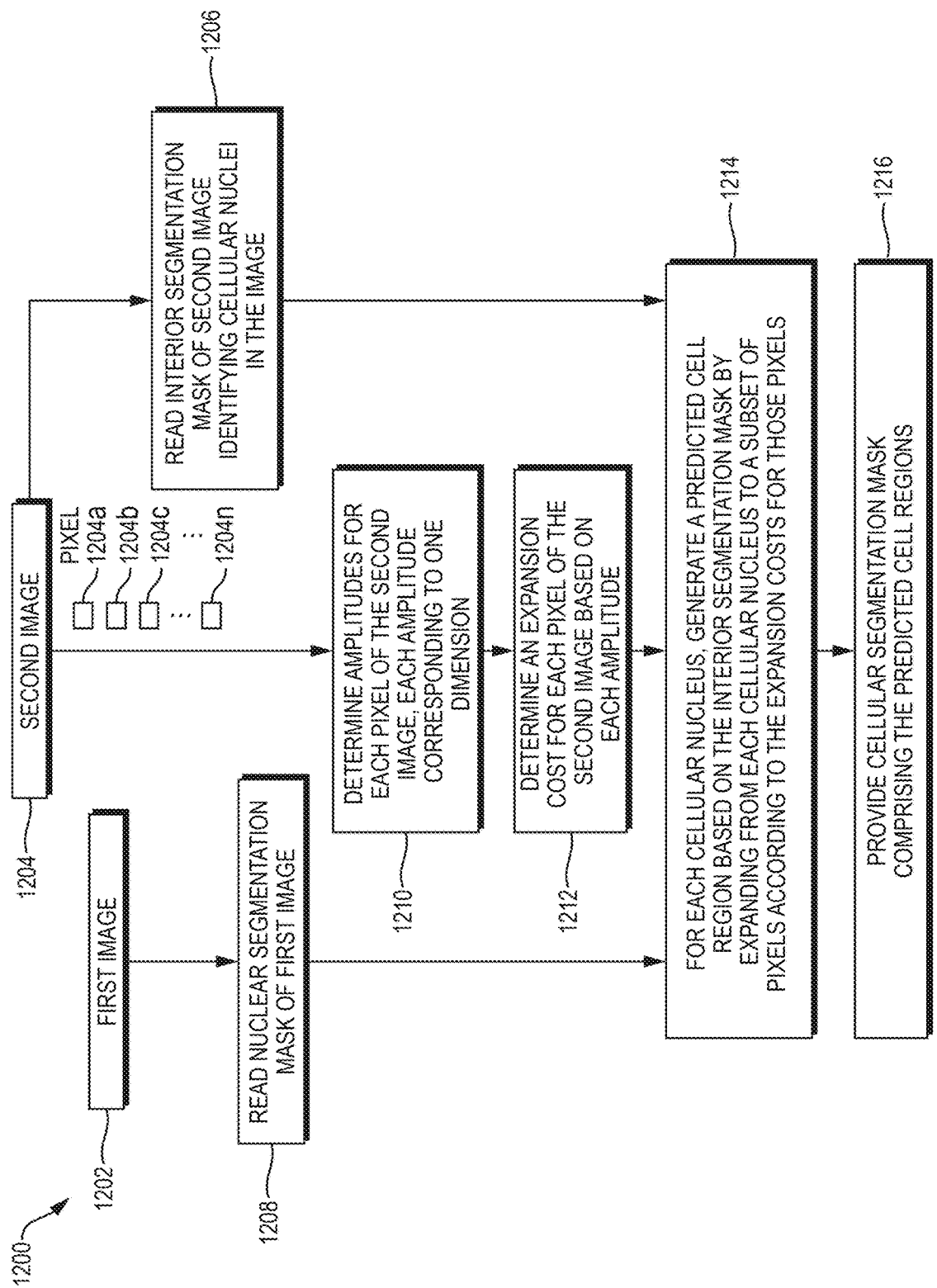
FIG. 17 is a flow diagram illustrating a method of cell segmentation, according to embodiments of the present disclosure.

FIG. 17 is a flow diagram 1700 illustrating a method of cell segmentation. At 1708, a nuclear segmentation mask of a first image 1702 is read. The nuclear segmentation mask identifies cellular nuclei in the first image 1702. At 1706, an interior segmentation mask of a second image 1704 is read. The interior segmentation mask is determined from the second image 1704 and identifies portions of the second image 1704 stained with a cellular interior stain. In some embodiments, the interior segmentation mask is determined using a geodesic expansion (e.g., a pixel-based method using a distance function and/or a cost function to expand the cellular interior around a segmented nucleus). Alternatively, in some embodiments, the interior segmentation mask is determined using interior expansion by heat diffusion (e.g., a pixel-based method where a heat diffusion model expands the cellular interior by minimizing a Dirichlet energy on a discrete grid). The second image 1704 includes pixels 1704a-1704n in two or more dimensions. At 1710, for each pixel 1704a-1704n of the second image 1704, amplitudes are determined for each pixel 1704a-1704n, where each amplitude corresponds to one dimension of the two or more dimensions. At 1712, an expansion cost is determined for each pixel of the second image 1704 based on each amplitude. In various embodiments, the expansion cost for each pixel is determined from a distance function and a divergence function, each of which are described below in further detail. A person of ordinary skill in the art can recognize that the first image and second image can be of the same spatial area (i.e., the same FOV).

At 1714, for each cellular nucleus of the cellular nuclei identified by the nuclear segmentation mask (read in step 1708), a predicted cell region is generated based on the interior segmentation mask by expanding from each cellular nucleus to a subset of pixels according to the expansion cost for these pixels. In various embodiments, expansion based on an interior segmentation mask is performed on a subset of cellular nuclei identified in the nuclear segmentation mask. At 1716, a cellular segmentation mask is provided having the predicted cellular regions.

In some embodiments, the amplitudes can be calculated, predicted, or generated by providing the image to a pretrained machine learning model. In some embodiments, the pretrained machine learning model is pretrained according to any one of the methods disclosed herein. In some embodiments, determining the expansion cost for each pixel includes computing a divergence value based on the amplitudes. In some embodiments, determining the expansion cost for each pixel includes applying a first cost function to each divergence value. In some embodiments, the cost function is monotonically increasing. In some embodiments, the expansion cost for each pixel is additionally based on its distance to one of the plurality of nuclei. In some embodiments, determining the expansion cost for each pixel further includes applying a first cost function to each divergence value to obtain a first cost, applying a second cost function to the distance of each pixel to obtain a second cost, and combining the first and second costs.

In some embodiments, expanding from each selected cellular nucleus to the subset of the pixels comprises geodesic expansion according to the expansion costs of those pixels.

In various embodiments, the cellular interior stain includes at least one cellular interior stain (e.g., a plurality of cellular interior stains). In various embodiments, the at least one cellular interior stain comprises: a 18S ribosomal RNA stain, a polyadenylated mRNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

In various embodiments, the cellular boundary stain includes at least one cellular boundary stain (e.g., a plurality of cellular boundary stains). In various embodiments, the at least one cellular boundary stain comprises: an antibody stain for ATP1A1, an antibody stain for ATP2B1, an antibody stain for pan-cytokeratin (pan-CK), an antibody stain for pan-cadherin (pan-CDH), an antibody stain for beta 2 microglobulin (B2M), an antibody stain for FXYD3, an antibody stain for gamma-catenin, an antibody stain for S100A14, an antibody stain for beta-catenin, an antibody stain for annexin A2, an antibody stain for GLUT2, an antibody stain for E-cadherin, an antibody stain for p120 catenin, an antibody stain for cadherin-17, an antibody stain for CD44, an antibody stain for CD45, a WGA lectin stain, a Con-A lectin stain, a SNA lectin stain, or a combination thereof.

In various embodiments, the cellular interior stain and/or the cellular boundary stain includes one or more stains (e.g., antibody stains) for at least one of the following markers: Human CD298, B2M, Hs PanCK, CD45, Mouse neuro rRNA, Mm neuro histone, Mm GFAP, Human CD68, Human cytokeratin 8/18, Human CD3, Human CD8, or a combination thereof.

Figure 18:
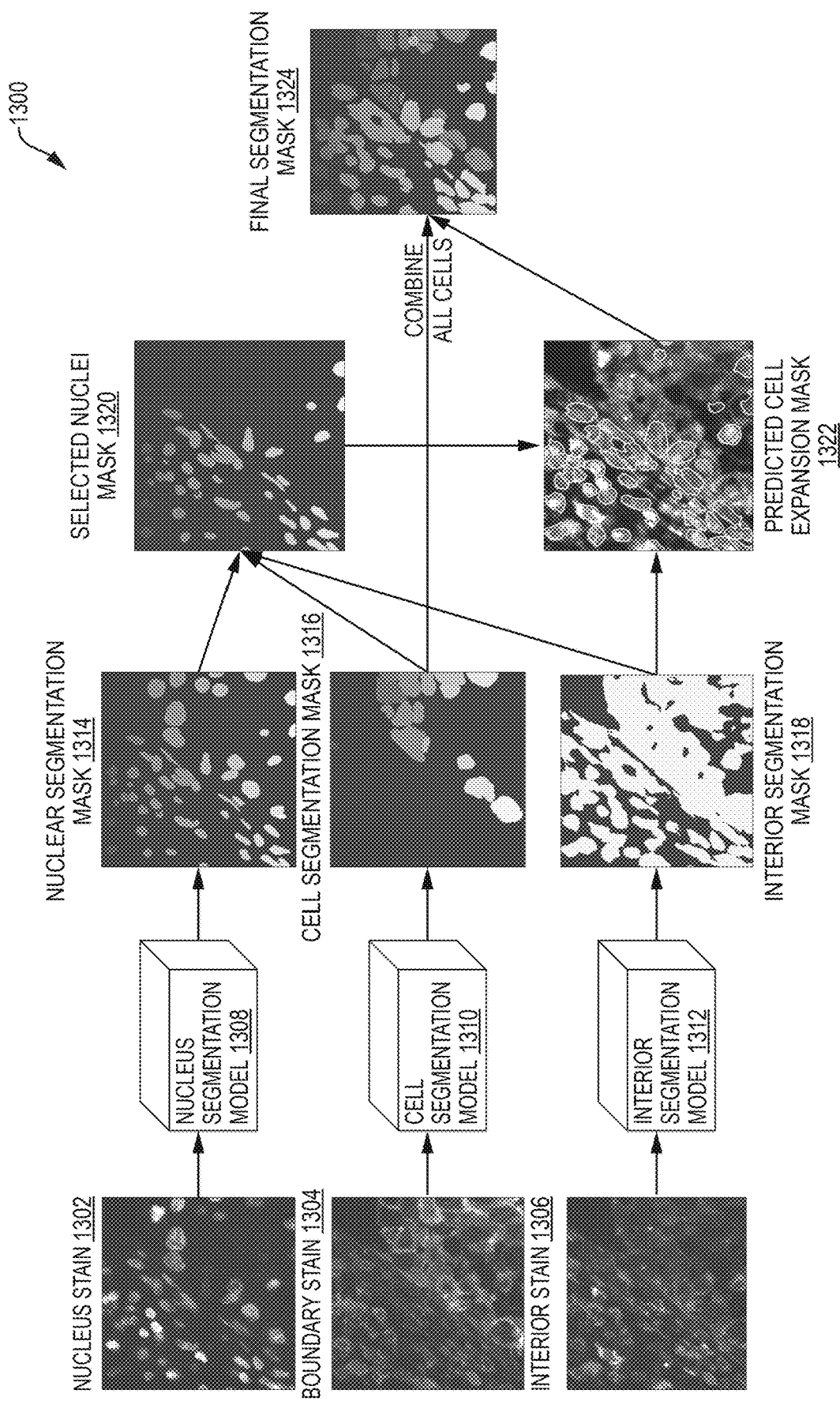
FIG. 18 is a diagram illustrating a method of cell segmentation using multiple stain indicators, according to embodiments of the present disclosure.

FIG. 18 is a diagram 1800 illustrating a method of cell segmentation using multiple stain indicators. A nucleus stain image 1802 (e.g., a stained with DAPI (4'6-diamidino-2-phenulindole) or other nucleus identifying stain), at least one boundary stain image 1804 and at least one interior stain image 1806 are obtained by imaging a sample contacted with multiple stains (e.g., nuclear stain, cell boundary stain, interior protein stain, cytoplasmic RNA stain). In various embodiments, a composite image is obtained and is filtered for the respective stain. In various embodiments, each stain includes a different color fluorophore and is imaged separately in its respective color channel. For example, the cellular boundary stain may have a green fluorophore and thus would be imaged in the green color channel of the optofluidic instrument, the cellular interior stain may have a red fluorophore and thus would be imaged in the red color channel of the optofluidic instrument, and the cytoplasmic RNA stain may have a yellow fluorophore and thus would be imaged in the yellow color channel. In various embodiments, the sample being imaged has been treated with a nuclear stain (e.g., DAPI), at least one boundary stain (e.g., CD45, E-cad, ATP1A1), at least one interior protein stain (e.g., alpha SMA, VIM), and at least one cytoplasmic RNA stain (e.g., 18s). In various embodiments, the at least one boundary stain, the at least one cellular interior stain, and the cytoplasmic RNA stain are mixed in a cocktail that is provided as a staining kit. In various embodiments, the images 1802, 1804, and 1806 are obtained through a single imaging cycle where the emissions of each of the one or more stains are imaged in the color channel that excites the respective fluorophores. For example, the DAPI image may be obtained in a first color channel (e.g., using a near ultraviolet illumination channel), the boundary stain image may be obtained in a second color channel, the one or more interior stain images may be obtained using a third (or more) color channel, and the cytoplasmic RNA stain images may be obtained using a fourth color channel. In various embodiments, the nuclear segmentation mask 1814, cell segmentation mask 1816, and interior segmentation mask 1818 as separate images are combined into a single composite image. In various embodiments, the images 1802, 1804, and 1806 are separated or multiplexed from an original, combined image to isolate the effects (e.g., contrast, intensity, etc.) of the emissions from each respective stain.

In various embodiments, a nucleus segmentation model 1808 receives the nucleus stain image 1802 as input and outputs a cellular nuclear segmentation mask 1814. The cellular nuclear segmentation mask 1814 represents or identifies the cellular nuclei in the image as provided by the nucleus stain (e.g., DAPI).

In various embodiments, a cell segmentation model 1810 receives the boundary stain image 1804 as input. In various embodiments, the cell segmentation model 1810 receives the cellular nucleus stain image 1802 as input. The cell segmentation model identifies cells in the image based on the boundary stain image 1804 and, optionally, the cellular nucleus stain image 1802. In various embodiments, the cell segmentation model 1810 outputs a cell segmentation mask 1816 that represents cells in the image as identified by the model. It will be appreciated that, in other embodiments, the cell segmentation model 1810 is configured to generate the cell segmentation mask 1816 based on a boundary stained image, an unstained image, or any combination of stained images. It will also be appreciated that any given instance of the cell segmentation model 1810 may not detect every cell in an image (e.g., due to the stain not staining every cell membrane which would cause the membrane not to fluoresce in the image and also not be segmented by the model), accordingly, aligning the nuclear segmentation mask 1814 and the cell segmentation mask 1816 may reveal a plurality of nuclei without identified cells. In various embodiments, the cell segmentation mask 1816 has at least some identified cells that correspond to one or more nuclei (e.g., a set of corresponding nuclei) in the nuclear segmentation mask. In various embodiments, each identified cell in the cell segmentation mask does not need an associated nucleus from the nuclear segmentation mask, as the boundary stain effectively identifies cells (and cell boundaries) with high accuracy. In various embodiments, because this set of corresponding nuclei are associated with an identified cell, the corresponding nuclei can be ignored or removed from the nuclear segmentation mask for future operations, such as interior stain-bounded expansion or isometric expansion. In various embodiments, nuclei identified in the nuclear segmentation mask 1814 that overlap the cell segmentation mask 1816 by a predetermined threshold are ignored or removed from the nuclear segmentation mask (see selected nuclei mask 1820 described below).

In various embodiments, the predetermined threshold is about 25%. In various embodiments, the predetermined threshold is about 30%. In various embodiments, the predetermined threshold is about 35%. In various embodiments, the predetermined threshold is about 40%. In various embodiments, the predetermined threshold is about 45%. In various embodiments, the predetermined threshold is about 50%. In various embodiments, the predetermined threshold is about 55%. In various embodiments, the predetermined threshold is about 60%. In various embodiments, the predetermined threshold is about 65%. In various embodiments, the predetermined threshold is about 70%. In various embodiments, the predetermined threshold is about 75%. In various embodiments, the predetermined threshold is about 80%. In various embodiments, the predetermined threshold is about 85%. In various embodiments, the predetermined threshold is about 90%. In various embodiments, the predetermined threshold is about 95%. In various embodiments, the predetermined threshold is about 25% to about 100%. In various embodiments, the predetermined threshold is about 30% to about 100%. In various embodiments, the predetermined threshold is about 35% to about 100%. In various embodiments, the predetermined threshold is about 40% to about 100%. In various embodiments, the predetermined threshold is about 45% to about 100%. In various embodiments, the predetermined threshold is about 50% to about 100%. In various embodiments, the predetermined threshold is about 55% to about 100%. In various embodiments, the predetermined threshold is about 60% to about 100%. In various embodiments, the predetermined threshold is about 65% to about 100%. In various embodiments, the predetermined threshold is about 70% to about 100%. In various embodiments, the predetermined threshold is about 75% to about 100%. In various embodiments, the predetermined threshold is about 80% to about 100%. In various embodiments, the predetermined threshold is about 85% to about 100%. In various embodiments, the predetermined threshold is about 90% to about 100%. In various embodiments, the predetermined threshold is about 95% to about 100%.

In various embodiments, an interior segmentation model 1812 receives the interior stain image 1806 as input. In various embodiments, the interior segmentation model 1812 receives the nucleus stain image 1802 as input. The interior segmentation model 1812 identifies portions of the image stained with a cellular interior stain. The interior segmentation model 1812 outputs an interior segmentation mask 1818 that represents or identifies portions of the image stained with the cellular interior stain. In various embodiments, any suitable number of interior stain images (e.g., two, three, four, five, six, seven, eight, nine, ten, etc.) can be segmented individually by the interior segmentation model 1812 to thereby generate an interior segmentation mask for each interior stain image. It will be appreciated that in other embodiments, interior segmentation model 1812 is configured to generate interior segmentation mask 1818 based on an interior stained image, an unstained image, or any combination of stained images. In various embodiments, the nucleus segmentation model 1808, the cell segmentation model 1810, and the interior segmentation model 1812 are the same type of model. In various embodiments, the nucleus segmentation model 1808, the cell segmentation model 1810, and the interior segmentation model 1812 are trained on the same training data set.

In some embodiments, a selected nuclei mask 1820 is generated from one or more of the nuclear segmentation mask 1814, cell segmentation mask 1816, and interior segmentation mask 1818. For example, the selected nuclei mask 1820 represents nuclei identified in the nuclear segmentation mask 1814 that do not overlap with called cells in the cell segmentation mask 1816. In various embodiments, the nuclei that overlap with called cells in the cell segmentation mask 1816 by at least a predetermined threshold can be ignored or removed from the nuclear segmentation mask 1814 for future operations, such as interior stain-bounded expansion or isometric expansion.

In various embodiments, the nuclear segmentation mask 1814, the cell segmentation mask 1816, and the interior segmentation mask 1818 are used to select nuclei of the nuclear segmentation mask 1814 that are within the regions identified by the interior segmentation mask 1818 but are not in the cell segmentation mask 1816. This operation can be represented as:

$$S=(N-C)\cap I$$

where S is the selected nuclei mask 1820, N is the nuclear segmentation mask 1814, C is the cell segmentation mask 1816, and/is the interior segmentation mask 1818. The selected nuclei mask 1820 thus identifies nuclei that appear in regions identified by the interior stain but are not already associated with an identified cell.

In some embodiments, a predicted cell expansion mask 1822 (e.g., interior cell stain expansion) is generated for each nucleus identified in the selected nuclei mask 1820. Each predicted cell region is generated based on the interior segmentation mask 1818. In embodiments, the predicted cell region is generated by expanding from each of the identified cellular nuclei to a subset of pixels according to the expansion costs for those pixels. In various embodiments, the predicted cell expansion mask is determined based on the selected nuclei mask 1820 (the remaining nuclei after nuclei associated with called cells from the cell boundary mask have been removed from the nuclear segmentation mask 1814 or ignored) and the interior segmentation mask 1818. In various embodiments, nuclei in the selected nuclei mask 1820 are expanded using an interior-bounded nuclear expansion model (e.g., expansion is bounded by the interior stain segmentation and has a cost function associated with expansion) when the nuclei overlaps with at least a portion of the interior segmentation mask 1818 by a predetermined threshold.

In various embodiments, the predetermined threshold is about 25%. In various embodiments, the predetermined threshold is about 30%. In various embodiments, the predetermined threshold is about 35%. In various embodiments, the predetermined threshold is about 40%. In various embodiments, the predetermined threshold is about 45%. In various embodiments, the predetermined threshold is about 50%. In various embodiments, the predetermined threshold is about 55%. In various embodiments, the predetermined threshold is about 60%. In various embodiments, the predetermined threshold is about 65%. In various embodiments, the predetermined threshold is about 70%. In various embodiments, the predetermined threshold is about 75%. In various embodiments, the predetermined threshold is about 80%. In various embodiments, the predetermined threshold is about 85%. In various embodiments, the predetermined threshold is about 90%. In various embodiments, the predetermined threshold is about 95%. In various embodiments, the predetermined threshold is about 25% to about 100%. In various embodiments, the predetermined threshold is about 30% to about 100%. In various embodiments, the predetermined threshold is about 35% to about 100%. In various embodiments, the predetermined threshold is about 40% to about 100%. In various embodiments, the predetermined threshold is about 45% to about 100%. In various embodiments, the predetermined threshold is about 50% to about 100%. In various embodiments, the predetermined threshold is about 55% to about 100%. In various embodiments, the predetermined threshold is about 60% to about 100%. In various embodiments, the predetermined threshold is about 65% to about 100%. In various embodiments, the predetermined threshold is about 70% to about 100%. In various embodiments, the predetermined threshold is about 75% to about 100%. In various embodiments, the predetermined threshold is about 80% to about 100%. In various embodiments, the predetermined threshold is about 85% to about 100%. In various embodiments, the predetermined threshold is about 90% to about 100%. In various embodiments, the predetermined threshold is about 95% to about 100%.

In some embodiments, remaining nuclei that are not within any region of the interior segmentation mask 1818 are expanded to identify cells using a predetermined expansion model. In some embodiments, the predetermined expansion model is an isometric expansion model applied to these remaining, unexpanded nuclei. In some embodiments, the isometric expansion model expands each nucleus by a predetermined distance. In various embodiments, the predetermined distance is about 5 µm to about 30 µm. In various embodiments, the predetermined distance is about 10 µm to about 20 µm. In various embodiments, the predetermined distance is about 15 µm. In various embodiments, the isometric expansion model expands each remaining nucleus simultaneously. In various embodiments, the isometric expansion model expands each nucleus until either the predetermined distance (e.g., 15 µm) or until the expanded cell boundary resulting from expanding the nucleus encounters an expanded cell boundary representing another cell.

In some embodiments, the predicted cell expansion mask 1822 is combined with the cell segmentation mask 1816 (e.g., the union of the predicted cell expansion mask and cell segmentation mask) to produce a final segmentation mask 1824 of all cells identified (e.g., called) by the cell segmentation process 1800. In various embodiments, the predicted cell expansion mask 1822 is combined with additional predicted cell expansion masks (e.g., from other interior segmentation masks generated by additional interior stain images) to produce a final segmentation mask 1824 of all cells identified by the cell segmentation process as shown in diagram 1800.

In some embodiments, the method includes generating the nuclear segmentation mask from portions of the image stained by a cellular nucleus stain (e.g., DAPI). In some embodiments, generating the nuclear segmentation mask comprises providing the image to a trained machine learning model and receiving therefrom a label for each pixel of the image as nucleus or non-nucleus. In some embodiments, generating the nuclear segmentation mask comprises applying a stain intensity threshold to determine a label for each pixel of the image as nucleus or non-nucleus. In some embodiments, the cellular nucleus stain comprises DAPI.

In some embodiments, the method includes generating the cellular segmentation mask from portions of the image stained by a cellular boundary stain. In some embodiments, generating the cellular segmentation mask comprises providing the image to a trained machine learning model. In some embodiments, generating the cellular segmentation mask comprises identifying one or more closed polygons formed by the stained regions.

In some embodiments, the method includes generating the interior segmentation mask from portions of the image stained by a cellular nuclear stain. In some embodiments, generating the interior segmentation mask comprises providing the image to a trained machine learning model and receiving therefrom a label for each pixel of the image as cellular or non-cellular. In some embodiments, generating the interior segmentation mask comprises applying a stain intensity threshold to determine a label for each pixel of the image as cellular or non-cellular. In some embodiments, the cellular nuclear stain comprises DAPI.

In some embodiments, generating the predicted cell regions comprises performing a method according to the methods of FIG. 17.

In various embodiments, the resulting segmentation masks (e.g., nuclear segmentation mask, cell segmentation mask, interior segmentation mask) are instance masks, meaning they contain integers where each non-zero integer represents an instance of the object. In various embodiments, a post-processing algorithm constructs each instance of cells/nuclei from the output of the model.

Figure 19A:
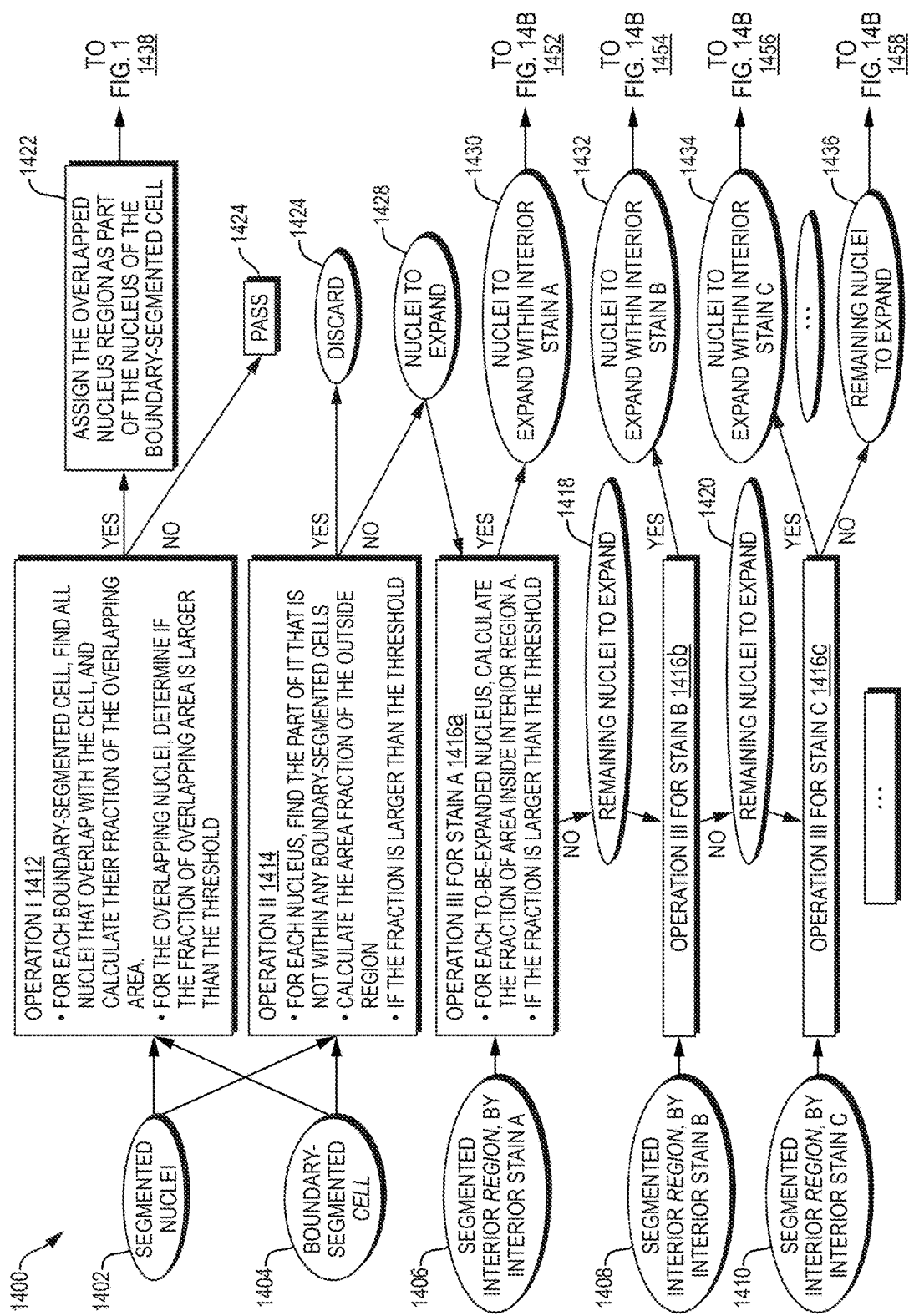
FIGS. 19A-19B are block diagrams illustrating methods of cell segmentation, according to embodiments of the present disclosure.
Figure 19B:
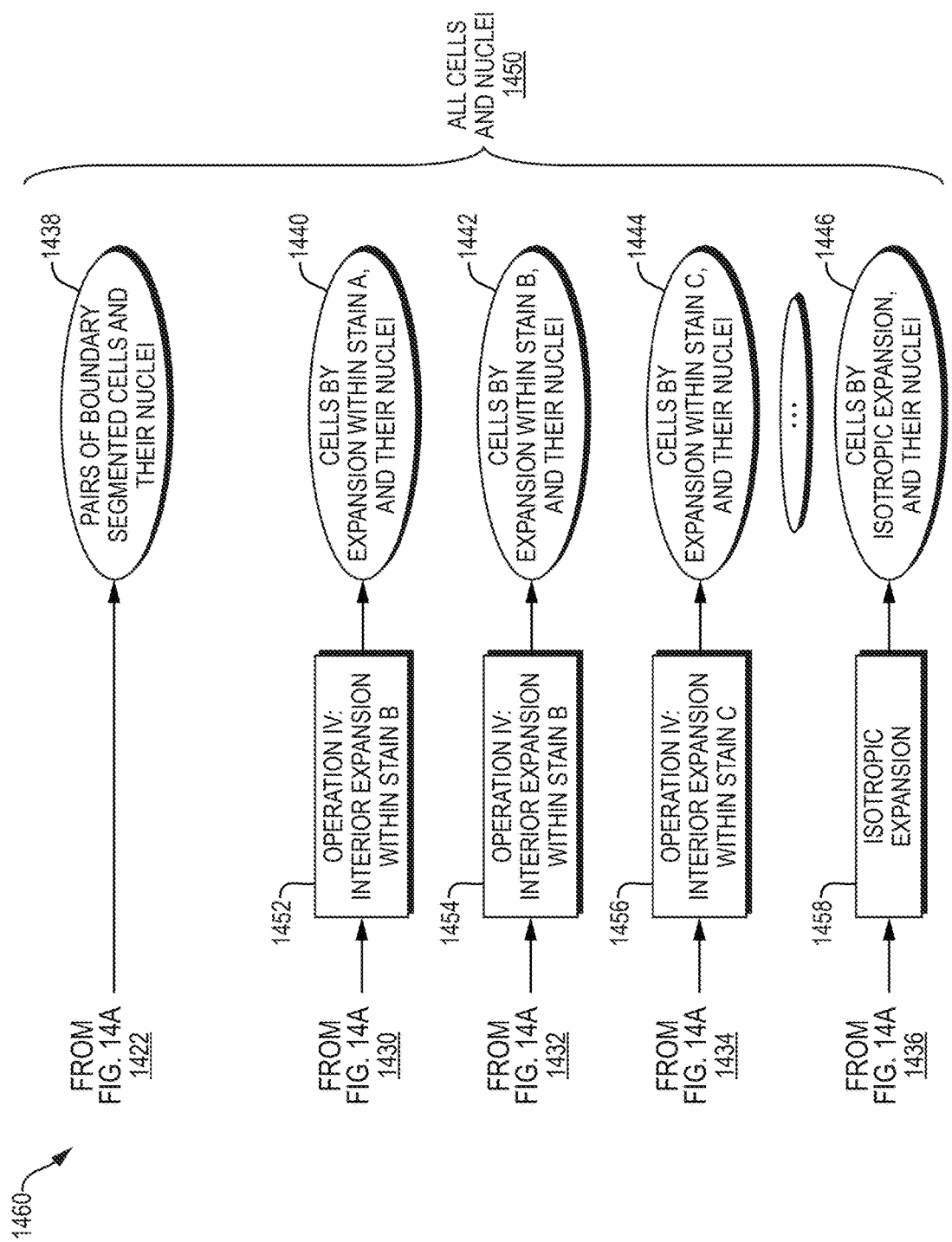

FIGS. 19A-19B are block diagrams 1900 and 1960 illustrating methods of cell segmentation. In some embodiments, the system reads or receives a nuclear segmentation mask 1902, a boundary segmented cell mask 1904, and one or more segmented interior region mask 1906, 1908, 1910. The nuclear segmentation mask 1902 identifies cellular nuclei in the image. The boundary segmented cell mask (e.g., cellular segmentation mask) identifies a plurality of cells in the image. The segmented interior region mask (e.g., an interior segmentation mask) each identify portions of the image identified by a cellular interior stain, such as interior stain A for segmented interior region mask 1906, interior stain B for segmented interior region mask 1908, and interior stain C for segmented interior region mask 1910. It will be appreciated that the system and method can employ one or more segmented interior region masks, and the three illustrated in FIGS. 19A-19B are exemplary. In some embodiments, each respective interior stain is for detecting a different cell type. In a non-limiting example, interior stain A is used for detecting cell type A, interior stain B is used for detecting cell type B, and interior stain C is used for detecting cell type C.

In some embodiments, a first operation 1912 is performed on the segmented nuclei mask 1902 and boundary segmented cell mask 1904. The first operation 1912, for each boundary-segmented cell, finds all nuclei that overlap with the cell, and calculates their fraction of the overlapping area. In other words, selected from the nuclear segmentation mask are those nuclei of the plurality of cellular nuclei that do not correspond to any of the plurality of cells identified by the cellular segmentation mask. For the overlapping nuclei, the first operation 1912 determines if the fraction of the overlapping area is larger than a threshold. If the overlapping area is larger than the threshold, the first operation 1912 assigns the overlapped nucleus region as part of the nucleus of the boundary-segmented cell. The assigned nucleus region as part of the nucleus of the boundary-segmented cell is added to a set of pairs of boundary segmented cells and their nuclei 1938. If the fraction of overlapping area is not larger than the threshold, the first operation 1912 passes on assigning the nuclei to a boundary-segmented cell.

In some embodiments, a second operation 1914 is performed also on the segmented nuclei mask 1902 and boundary segmented cell mask 1904. For each nucleus, the second operation 1914 finds the part of the respective nucleus that is not within any boundary-segmented cells. The second operation 1914 calculates the ratio of the area of the nucleus outside of the boundary-segmented cell to the total area of the nucleus. If the ratio is not larger than a threshold, the nucleus is discarded from expansion consideration 1924. If the ratio is larger than the threshold, the nuclei is expanded or added to a list of nuclei to expand 1928.

In some embodiments, a third operation for stain A 1916a calculates, for each to-be-expanded nucleus, the ratio of the area of the nucleus inside interior region A. Interior region A is represented by segmented interior region mask A 1906. Segmented interior region mask 1906 highlights areas of the sample highlighted by interior stain A 1906. If the ratio is larger than a threshold, the nuclei is selected to be expanded 1930 within the area highlighted by interior stain A. A fourth operation 1952 performs interior expansion within stain A and outputs a set of cells by expansion within stain A, and their nuclei 1940. In other words, for each of the selected cellular nuclei, the operation generates a predicted cell region based on the interior segmentation mask. If the ratio of a nuclei is not larger than the threshold, the nuclei is added to a remaining nuclei to expand list 1918.

In some embodiments, a third operation for stain B 1916b calculates, for each to-be-expanded nucleus from the remaining list 1918, the ratio of the area of the nucleus inside interior region B. Interior region B is represented by segmented interior region mask B 1908. Segmented interior region mask B 1908 highlights areas of the sample highlighted by interior stain B 1908. If the ratio is larger than a threshold, the nuclei is selected to be expanded 1932 within the area highlighted by interior stain B. A fourth operation 1954 performs interior expansion within stain B and outputs a set of cells by expansion within stain B, and their nuclei 1942. If the ratio of a nuclei is not larger than the threshold, the nuclei is added to a remaining nuclei to expand list 1920.

In some embodiments, a third operation for stain C 1916c calculates, for each to-be-expanded nucleus from the remaining list 1920, the ratio of the area of the nucleus inside interior region C. Interior region C is represented by segmented interior region mask B 1908. Segmented interior region mask C 1910 highlights areas of the sample highlighted by interior stain C 1910. If the ratio is larger than a threshold, the nuclei is selected to be expanded 1934 within the area highlighted by interior stain C. A fourth operation 1956 performs interior expansion within stain C and outputs a set of cells by expansion within stain C, and their nuclei 1944. If the ratio of a nuclei is not larger than the threshold, the nuclei is added to a remaining nuclei to expand list 1936.

In some embodiments, the threshold is 5%. In some embodiments, the threshold is 10%. In some embodiments, the threshold is 15%. In some embodiments, the threshold is 20%. In some embodiments, the threshold is 25%. In some embodiments, the threshold is 30%. In some embodiments, the threshold is 35%. In some embodiments, the threshold is 40%. In some embodiments, the threshold is 45%. In some embodiments, the threshold is 50%. In some embodiments, the threshold is 55%. In some embodiments, the threshold is 60%. In some embodiments, the threshold is 65%. In some embodiments, the threshold is 70%. In some embodiments, the threshold is 75%. In some embodiments, the threshold is 80%. In some embodiments, the threshold is 85%. In some embodiments, the threshold is 90%.

In some embodiments, third operation and fourth operation can iterate for additional segmented interior region masks by additional stains (e.g., interior stain D, interior stain E, . . . , interior stain N) that, for example, identify additional cell types like cell type D, cell type E, . . . cell type N. FIGS. 19A-19B are diagrams illustrating embodiments with segmented interior region shown by three stains (stain A, stain B, stain C), but additional or fewer stains can be employed.

In some embodiments, once the third and fourth operations have completed for each of their respective segmented interior region, the method processes a remaining nuclei to expand list 1936. The method performs isotropic expansion 1958 on each nuclei in the list 1936, thereby generating cells by isotropic expansion and their nuclei. The groups of cells and their nuclei 1938, 1940, 1942, 1944, and 1946 are joined to then represent all cells and nuclei 1950. In other words, the method provides a composite cellular segmentation mask comprising the cellular segmentation mask and the predicted cell regions.

In some embodiments, the priority of the stains (e.g., boundary stains and interior stains) are determined by accuracy of inferring cell boundaries using them, and therefore the more accurate stains are used first (and have higher priority). The boundary stains have the highest priority and are processed first in the first operation 1912 and/or second operation 1914 to determine boundary-segmented cells. The nuclei remaining are nuclei that are not in boundary segmented cells, which are to be expanded within interior stains. In practice, boundary stains are prioritized because the provide a cell boundary with higher confidence from boundary stain than interior stain.

In some embodiments, the third operation 1916a-1916c can be applied to a list of interior stains sequentially. The order of the list of interior stain represents their priorities. In practice, the interior stain with higher specificity, or easier to segment, has higher priority.

In some embodiments, isotropic nucleus expansion is less accurate than using boundary stains, boundary-segmented cells, and interior stains, so it is used when there are nuclei that are not inside of any stains (e.g., when those stains are exhausted).

In some embodiments, the integration method and design advantageously allows for maximum input flexibility because (1) it can process any number of boundary stains and interior stains, (2) the user can easily prioritize the stains that are more effective to the specific tissue and remove the stains that are not effective, (3) each of the final segmented cell can be clearly marked by the boundary or interior stain used to segment this cell, and (4) each stain can be processed as a separate layer, allowing each stain to be processed separately and avoiding data loss that occurs when merging layers into fewer channels.

In some embodiments, a person of ordinary skill in the art can appreciate that multiple channels of a same spatial area can be represented in an image. In some embodiments, a person of ordinary skill in the art can further appreciate that the multiple channels of the same spatial area can be stored in separate image files or within the same image file, or a combination of the same.

In some embodiments, semantic segmentation (e.g., segmentation into a foreground layer and a background layer) of interior stain can be used for interior expansion only if all visible boundaries can be clearly segmented as background. However, this is not the case because an interior stain is usually diffusive and does not have well defined edges. As such, the visible boundaries, in practice, cannot be clearly segmented as background. If the edges are not well defined and one pixel is misclassified as foreground, the model can make a mistake with that pixel and the faulty expansion resulting from the mistake can "leak" to other areas of the image. Therefore, an improved method is needed so interior expansion can stop at more natural boundary when it can be seen.

In some embodiments, nucleus expansion within the interior stain uses geodesic expansion. Geodesic expansion is an expansion where each pixel has a corresponding cost when expanding through the pixel. In some embodiments, the cost function is designed to optimize the nuclear expansion process.

In some embodiments, the interior stain segmentation model, similar to the path segmentation model used in nucleus and cell segmentation because both of these models infer the direction of each pixel. The direction of each pixel is used to create the following two intermediate results: (1) divergence of each pixel, calculated using two N×N kernels (e.g., N=5) and (2) distance to the boundary of the interior region. The divergence and distance can be considered heuristics or heuristic functions. The divergence and distance are both converted to a cost function. The cost function is designed such that when divergence is larger and the distance to boundary is smaller, the cost is higher. The total expansion cost is the sum of two divergence and distance costs.

In some embodiments, selecting the first subset comprises selecting those of the plurality of nuclei overlapping the first interior segmentation mask by at least a first threshold. In some embodiments, generating the predicted cell region comprises performing the method descried in relation to FIG. 17.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXAMPLES

Example 1: RidgePath Representation of Cell and Nucleus Segmentation

Discretized pixel direction: In alternative deep learning-based instance segmentation (e.g., Cellpose and Omnipose) the direction of each pixel is a normalized vector. An intermediate representation of the cells is constructed that forms just a single, smooth, topological basin. Topological maps are generated from a method called simulated diffusion, extracted from ground-truth masks (e.g., drawn by a human annotator). The Deep Learning model (e.g., DNN) is trained to predict three outputs: horizontal and vertical gradients of the topological maps to form vector fields, and a binary map to indicate if a given pixel is inside a ROI or not. The fields are used for gradient tracking, wherein each pixel is assigned a direction and pixels belonging to a specific object (e.g., cell and/or nucleus) is assigned a direction to its center. Gradient flow tracking comprises generating a diffused gradient flow vector field to smooth out noise in the gradient vector field; performing a gradient flow tracking procedure of the field to bring together points flowing to the same basin of attraction (i.e., the center of a specific object); and dividing the FOV into smaller regions, each consisting of one object (cell and/or nucleus) and its adjacent background. Local, flexible, thresholding for each region to distinguish the cell/nucleus from its background is then carried out.

The model is trained to predict the gradients from raw images, wherein the vector flow fields are generated from heat diffusion simulation, i.e., conceptually, a "heat source" is designated at the center pixel of the object, being the pixel at the median values of horizontal and vertical pixels within the cell. Iteratively, a pixel value of 1 is added to the heat source, and pixels within the object are assigned a mean value of its nearby surrounding pixels while all the pixels outside of the object are assigned a pixel value of 0 in each iteration. After N iterations (proportional to the vertical and horizontal pixel range within each cell), the heat distribution approaches equilibrium, and this final distribution generates an energy function that represents the two (horizontal and vertical) vector fields of the vector flow representation.

Thus, the direction of each pixel is represented as a normalized vector, meaning the x and y components are floating-point numbers. Inference of such results by the model is a calculation-intensive regression task.

Figure 6B:
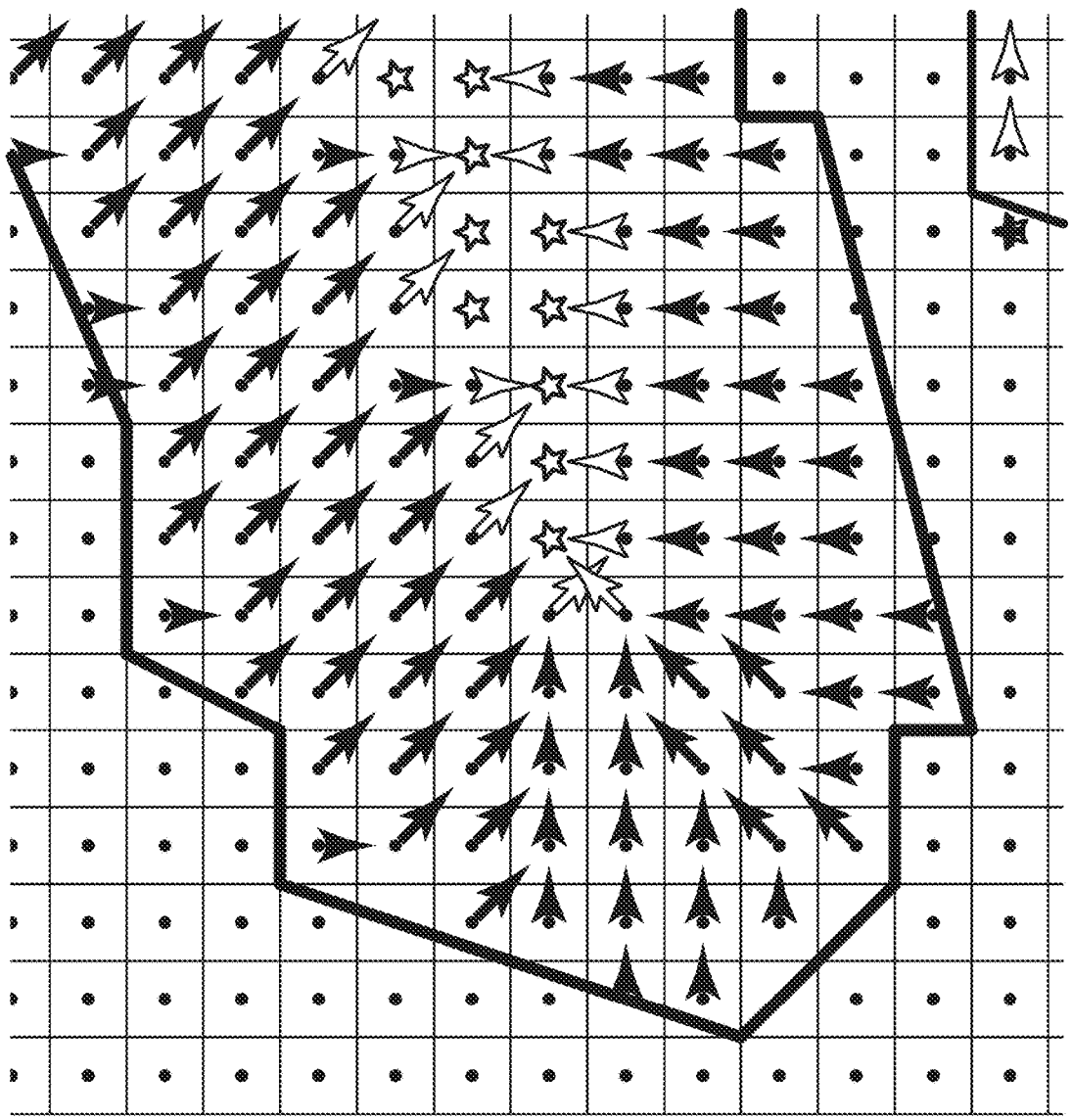

In various embodiments, as provided by the disclosure (e.g., Ridgepath), the direction of each pixel is classified as one of a plurality of values. In various embodiments, the plurality of values includes a plurality of directions. In various embodiments, the plurality of values includes no direction (i.e., stationary). In various embodiments, the plurality of values includes a classification of background. For example, each pixel in FIG. 6A is classified as one of 10 unique values: a direction to one of the 8 closest neighboring pixels no direction (stationary), or as a background pixel. However, one skilled in the art will recognize that any suitable number of directions can be used. In various embodiments, each pixel is classified as one of 6 unique values: up, down left, and right directions, no direction, and background. As shown in FIGS. 6A-6B, each pixel is classified as one of 8 directions (illustrated as an arrow pointing in the particular direction), no direction (illustrated as a star or a cross), or as a background pixel (illustrated as a dot). In particular, the 8 directions include up, down, left, right, diagonal up-left, diagonal up-right, diagonal down-left, and diagonal down-right. In various embodiments, the pixel classification result is not a vector and does not have any magnitude associated therewith. In various embodiments, stationary pixels (i.e., the pixels indicated with stars and crosses) are associated with an attraction basin to which pixels classified with a particular direction are traced back to during post-processing. In various embodiments, the classification of pixels includes a determination of confidence of the pixel classification. In various embodiments, the classified pixel includes metadata representing the level of confidence in the classification. In various embodiments, the level of confidence uses a value scale (e.g., low, medium, high), a quality scale (e.g., poor, acceptable, good, excellent), a numerical scale (a range from 0 to 100), or a color scale (e.g., red, yellow, green), etc. In various embodiments, as shown in FIG. 6A, the confidence of each pixel classification is illustrated in a particular color associated with the level of confidence. For example, a red arrow represents a high confidence classification while yellow arrows are inferred classifications from surrounding pixels (e.g., low confidence classifications). In various embodiments, the segmentation model described herein predicts how each pixel would "step" (e.g., −1, 0, or 1) closer to an attraction basin of the object horizontally and vertically. In various embodiments, pixels classified as the attraction basin stay stationary (step=0). In various embodiments, classifying pixels into one of a plurality of discrete directions reduces the unnecessary expressiveness inherent in alternative methods (e.g., Cellpose/Omnipose) that use vector-based representations. In various embodiments, an additional benefit of the segmentation model described herein is that it is easier to train since, for each pixel, the training is a classification problem instead of a regression problem. As such, the inference results have a statistical interpretation (e.g., a confidence can be assigned to a classification), and lead to more robust and flexible post processing.

Figure 9A:
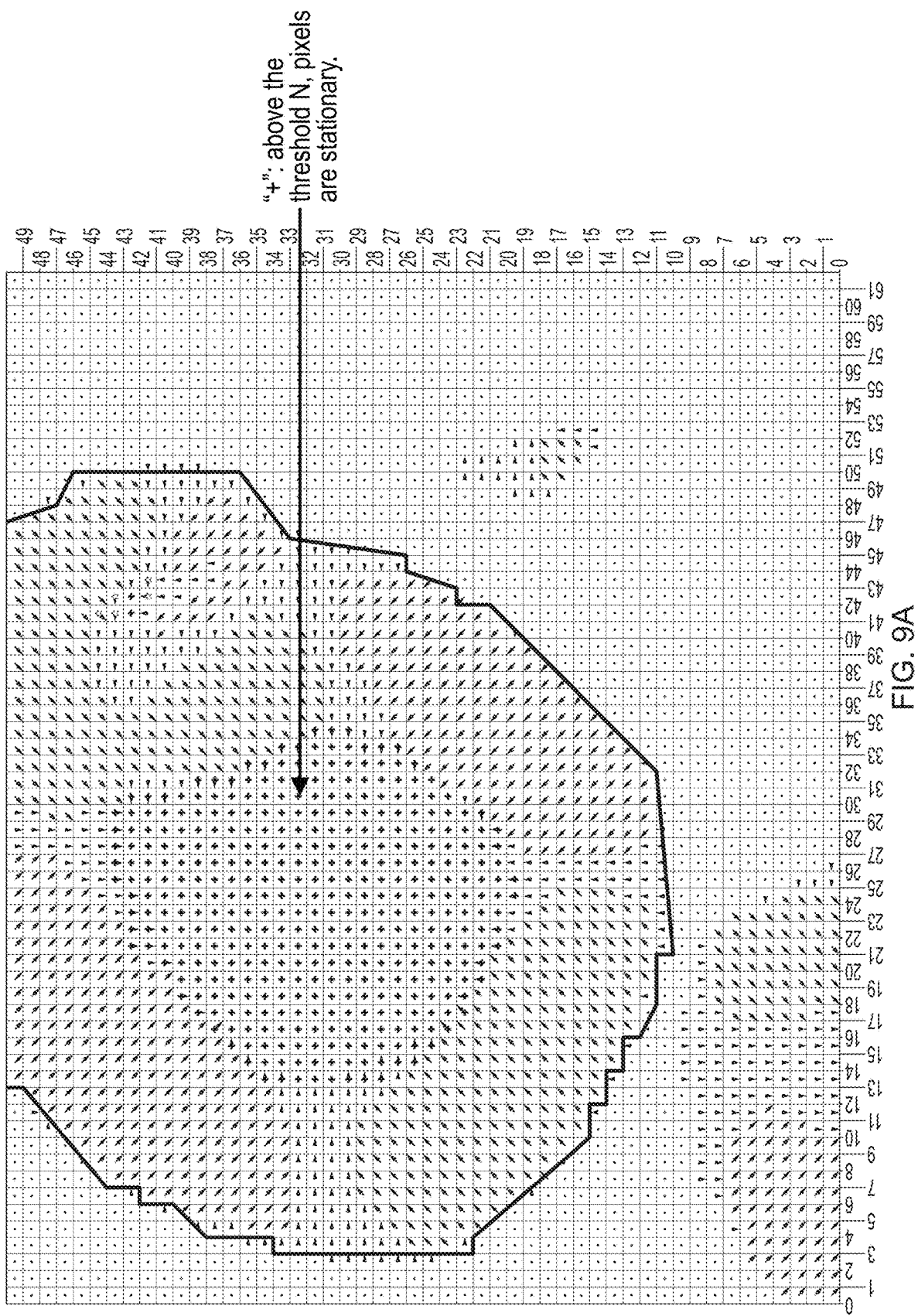
FIGS. 9A-9B depict an exemplary pixel classification map and illustrates an attraction basin in which the pixels are classified as stationary.
Figure 9B:
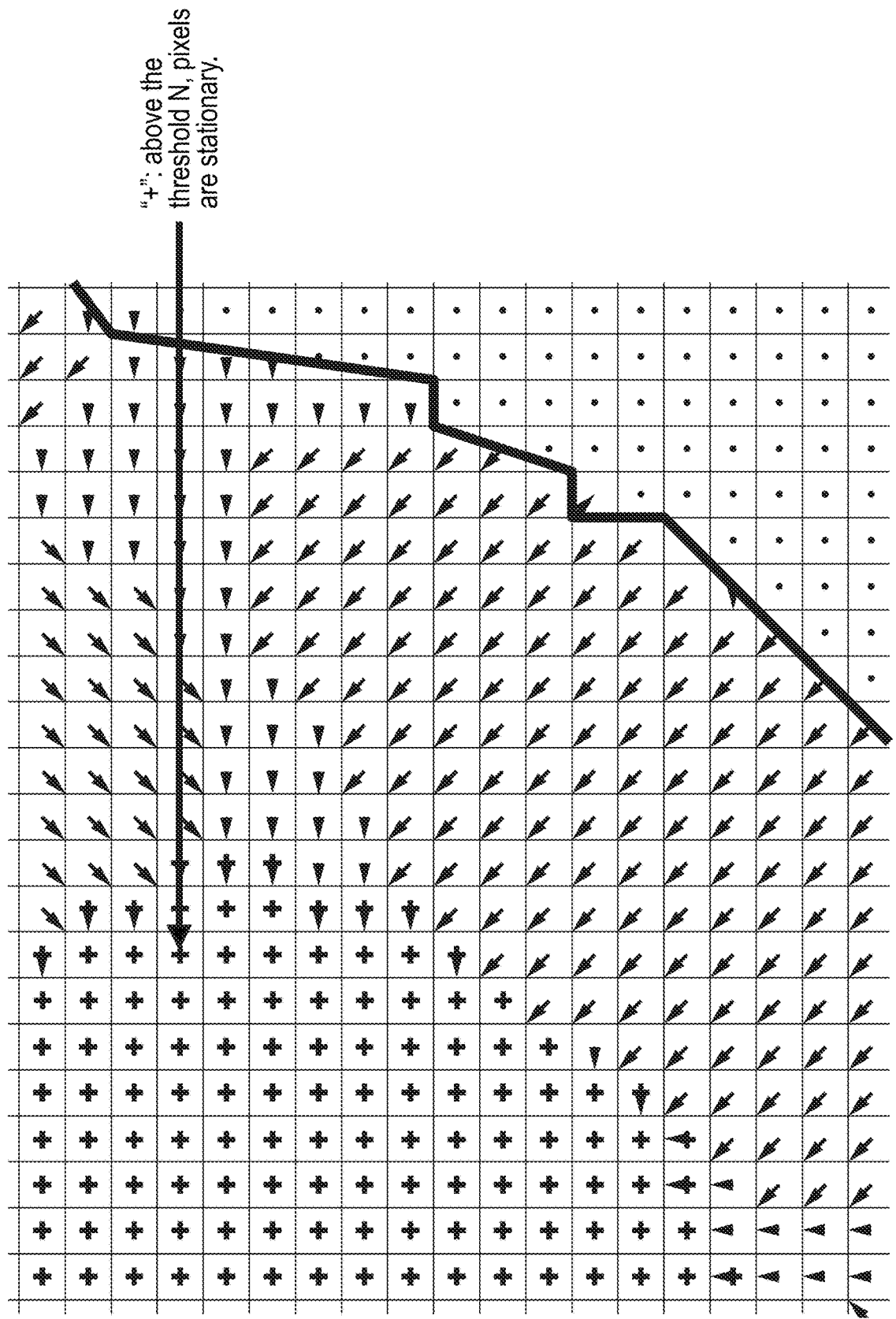

Large Inner Attraction Basin: For segmentation methodologies where the direction of each pixel is non-trivial, each and every pixel in an image may be assigned a direction. However, this unnecessarily adds to the difficulty of model training because the exact direction of inner pixels is not necessary to construct the instance. Additionally, the direction of inner pixels can be difficult to predict, potentially leading to biases within the model when every pixel must be assigned a direction. In various embodiments, an attraction basin 902 is defined as the inner region of the object that is a predetermined number of pixels away from the boundary, e.g., ten pixels. In various embodiments, the predetermined number of pixels is 1 pixel, 2 pixels, 3 pixels, 4 pixels, 5 pixels, 6 pixels, 7 pixels, 8 pixels, 9, pixels, 10, pixels, 11 pixels, 12 pixels, 13 pixels, 14 pixels, 15 pixels, 16 pixels, 17 pixels, 18 pixels, 19 pixels, 20 pixels, 25 pixels, 30 pixels, 35 pixels, 40 pixels, 45 pixels, 50 pixels, 75 pixels, 100 pixels, etc. In various embodiments, the number of pixels depends on the resolution of the images (e.g., a high resolution imaging sensor may use a larger number of pixels as the predetermined number of pixels) and the size of the object being segmented (e.g., larger objects may use a larger number of pixels as the predetermined number of pixels). In various embodiments, training data for the nuclear segmentation model includes images of nuclei where pixels that are greater than a predetermined number of pixels away from the nuclear boundary are labelled as having no direction (i.e., stationary). As shown in FIGS. 9A-9B, after pixels are classified by the model, the attraction basin is every pixel that is greater than a predetermined number of pixels (e.g., greater than 10 pixels) from the boundary. In various embodiments, if such a region does not exist, e.g., when the object is too small/thin, a skeleton of the object is assigned as the attraction basin for training purposes and the model learns to identify this skeleton in smaller/thinner nuclei. In various embodiments, because only pixels within N pixels away from the boundary have non-trivial direction, model learning challenges are reduced, making the segmentation model easier to train and more robust.

Determination of Direction: Some deep learning-based segmentation algorithms (e.g., Cellpose and Omnipose) determine the direction of each pixel based on how it can flow back to the center or the skeleton, i.e., the model needs to know exactly where the center of the object is located. However, this is unnecessary for instance segmentation and, in some cases, the center (or skeleton) of the object is hard to define.

In various embodiments, in the segmentation models described herein, as long as the pixels step inward towards an attraction basin, an instance can be constructed. In various embodiments, a pixel steps to the neighboring pixels (i.e., is assigned a classification of a direction) until the maximum distance away from the boundary is reached (at which point the pixels are classified as being stationary). In various embodiments, when there is a tie, the pixel has equal probability of stepping to each one of them. I various embodiments, the segmentation model described herein is more sensitive to boundaries of the objects to be segmented, makes it easier to separate closely packed objects, and allows for easier ground truth generation.

In various embodiments, to construct a final instance segmentation, some deep learning-based segmentation algorithms (e.g., Cellpose and Omnipose) use an iterative flow processing and clustering, which are resource intensive and complicated.

In various embodiments, the segmentation models described herein solve a classification problem with the inference of discrete pixel steps, and the output of the model can be interpreted as a probability. In various embodiments, the model outputs a probability for each value (e.g., unique directions, no direction, and/or background). In various embodiments, for each pixel, the value with the highest probability is selected as the classification for that pixel. This allows greater flexibility and robustness in post processing. In various embodiments, one or more thresholds are used to categorize pixels as:

High confidence stationary pixels,
High confidence moving pixels,
High confidence background pixels,
Uncertain/Low confidence pixels.

In various embodiments, the high confidence pixels are grouped together with fast and straightforward algorithms by following the inferred discrete direction described above. In various embodiments, low confidence pixels are corrected based on a divergence metric. In various embodiments, low confidence pixels are corrected based on a neighborhood direction consistency. In various embodiments, low confidence pixels are grouped together with high confidence pixels based on their proximity. For example, low confidence pixels that are next to one or more high confidence pixels (or within a predetermined number of pixels away from one or more high confidence pixels) can be assigned a same direction as the high confidence pixel(s). In various embodiments, any remaining low confidence pixels are classified as background. In various embodiments, these thresholds provide flexibility in controlling whether a model should favor merging errors over splitting errors, or vice versa. Thus, the tailored post-processing algorithm to reconstruct instances provides a much faster runtime and built-in logics and steps to reduce merging error and over-segmentation.

Figure 10:
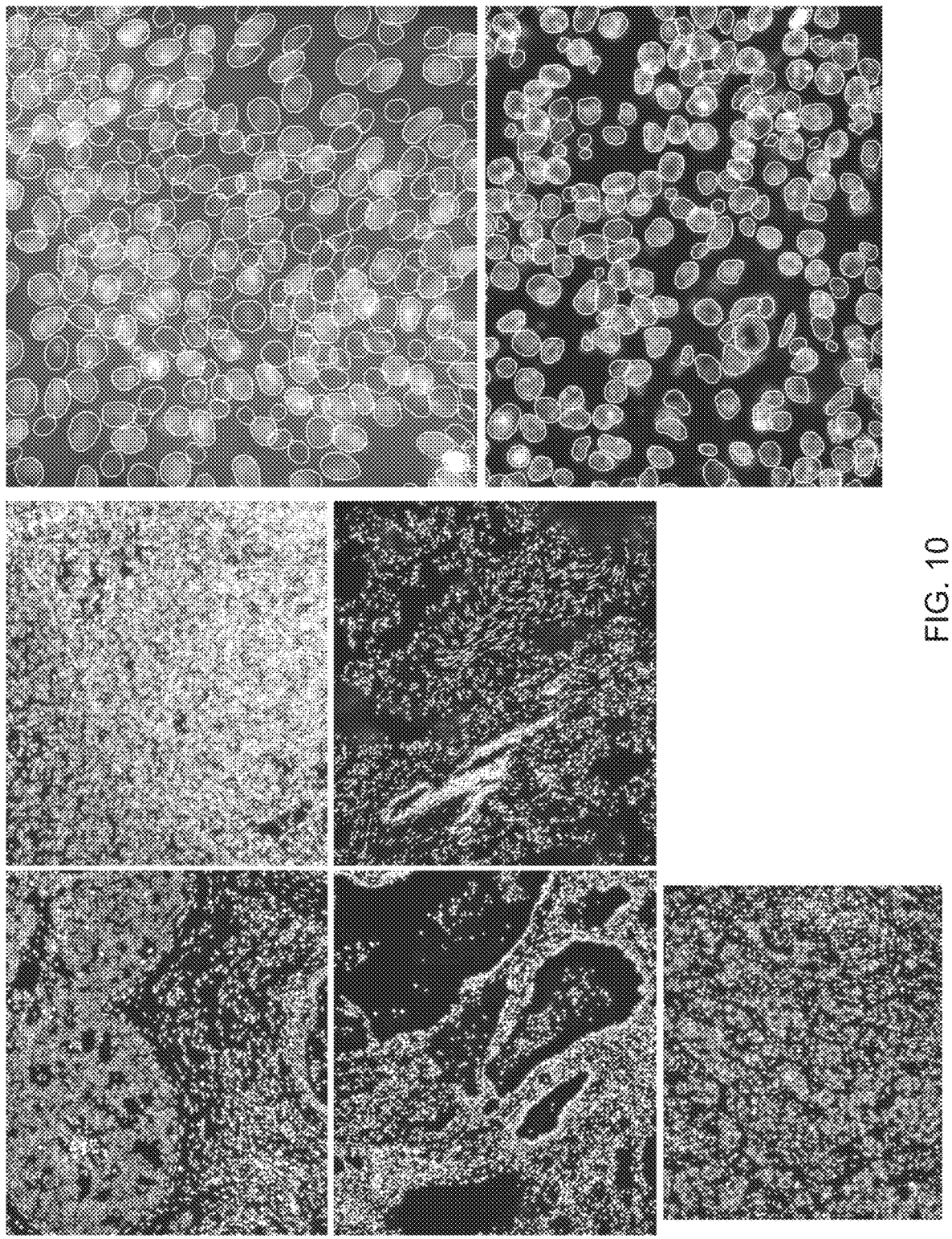
FIG. 10 depicts exemplary cell segmentation of nuclei on images from tissue sections.
Figure 11:
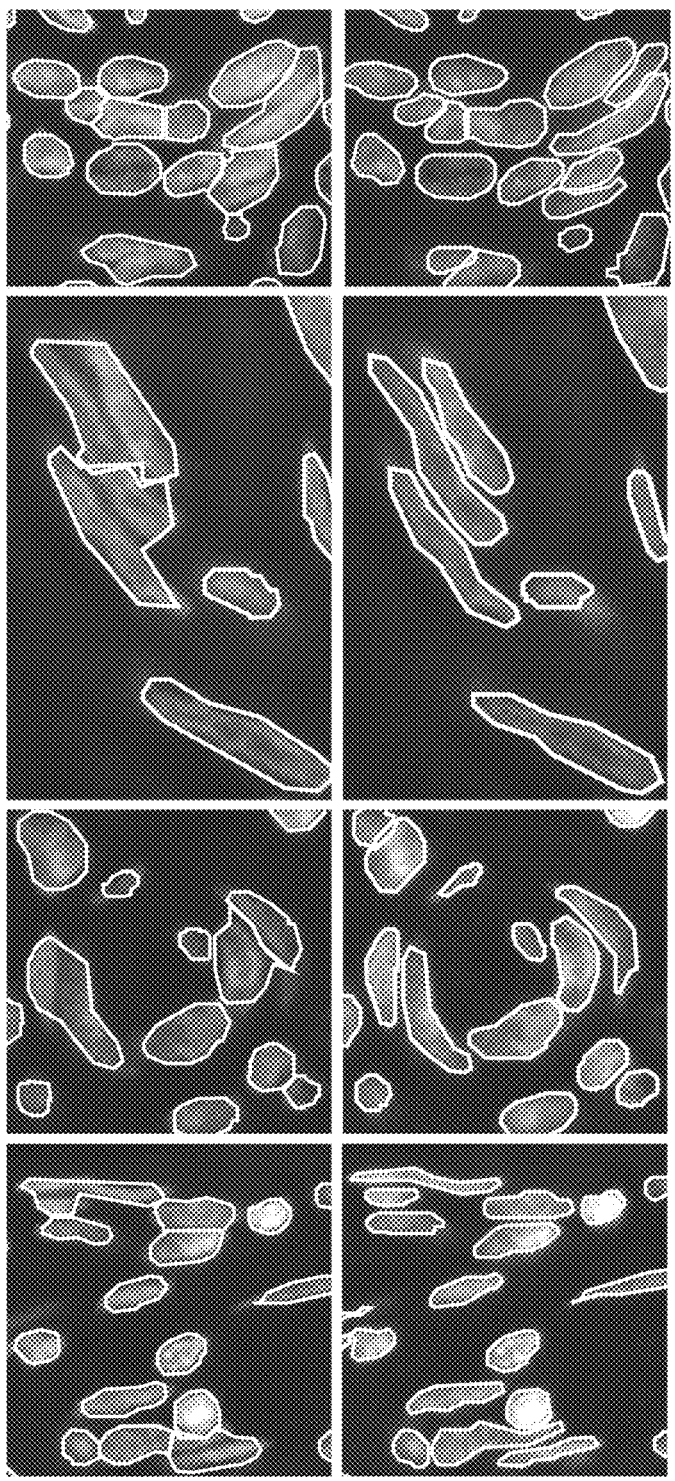
FIG. 11 shows improved segmentation of elongated and curved nuclei, the improved capture of the outline of the nucleus, and separation of densely packed nuclei using a Ridgepath model (bottom row) relative to a centerpath segmentation model (top row).

When historical image data was used to train a Ridgepath segmentation model as described herein, dense nuclei with various different morphology and shapes were successfully segmented, as shown in FIG. 10. FIG. 11 illustrates two different segmentation models (top showing a centerpath segmentation model and bottom showing a Ridgepath segmentation model) trained on the same dataset, but with the Ridgepath model outperforming the centerpath model in generating more natural (and more accurate) cellular boundary shapes. Notably, as shown in FIG. 11, the Ridgepath segmentation model was capable of segmenting elongated and curved nuclei, and capture the outline of nuclei, separating closely packed nuclei, relative to a centerpath model that was trained on the same dataset.

Example 2: General Overview of Segmentation

In various embodiments, steps for nuclear segmentation include:

1. Staining. DAPI nuclear stain infers cell boundaries.
2. Training data. Curated sets of data are used to train the deep learning algorithms (e.g., a convolutional neural network) to ensure high quality for one or more supported tissue types.
3. Algorithms. A core set of algorithms operate on top of staining. Specifically, the reference morphology image is segmented in multiple planes across the z-stack of images. The nuclear boundaries are consolidated to form non-overlapping 2D objects when projected in XY in order to produce 2D masks. In some embodiments, masks are expanded by a predetermined distance (e.g., 5 µm, 6 µm, 7 µm, 8 µm, 9 µm, 10 µm, 11 µm, 12 µm, 13 µm, 14 µm, 15 µm, etc.) or until it encounters another cell boundary in XY to provide approximate cell segmentation. If a transcript falls inside this boundary it is assigned to a cell (e.g., arbitrarily or based on one or more rules). Finally, simplified polygons are made for ease of use in visualization. In various embodiments, the one or more rules include distance-based rules, probability that a cell includes the particular transcript to be assigned (e.g., given other transcripts inside the cell), random assignment, etc.

Figure 14:
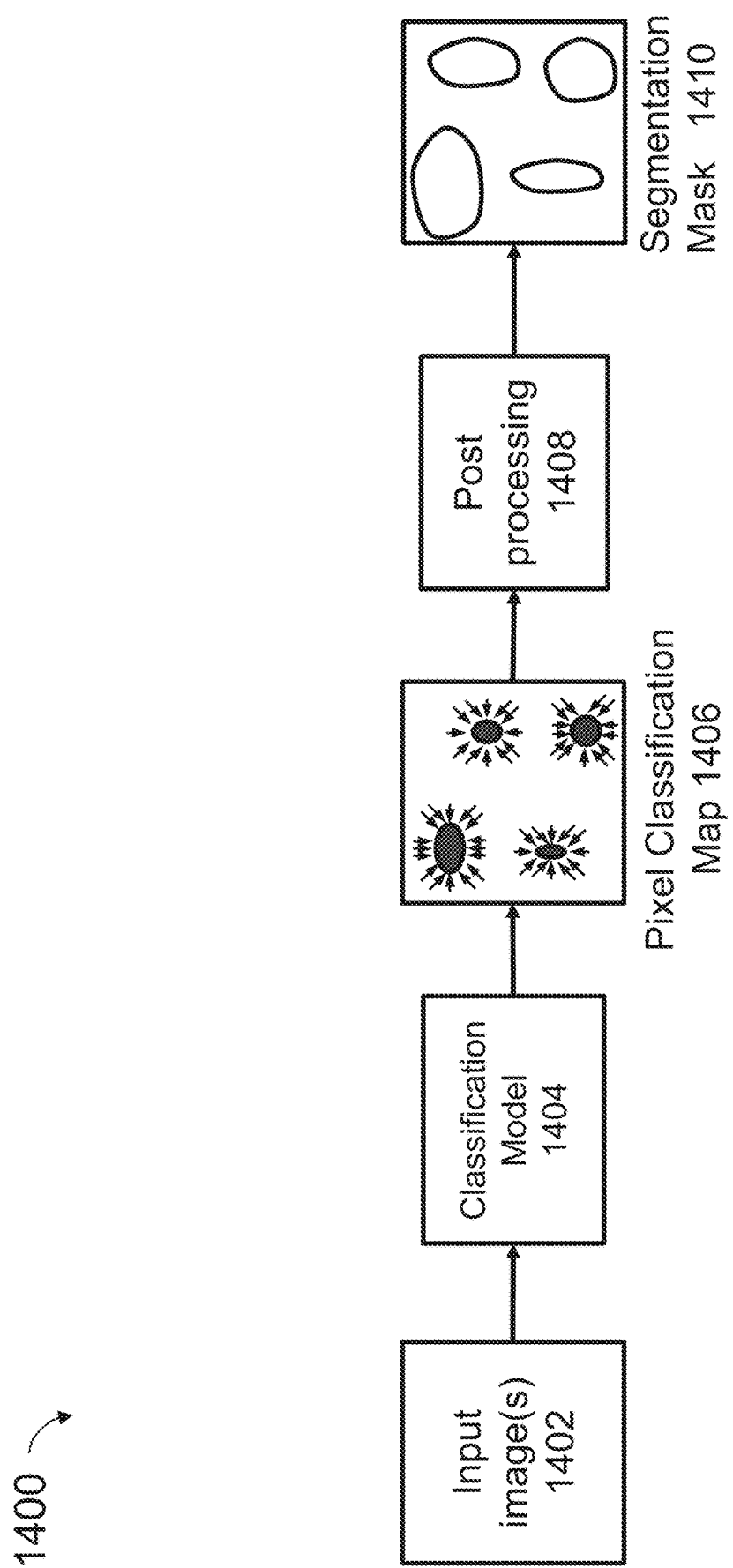
FIG. 14 shows an exemplary workflow for segmentation of nuclei according to embodiments of the present disclosure.

FIG. 14 shows an exemplary workflow 1400 for segmentation of nuclei (e.g., generating a segmentation mask indicating nuclear boundaries). As shown in FIG. 14, the workflow 1400 includes providing an input image 1402 to a pretrained model 1404. In various embodiments, the input image 1402 includes at least one image of a sample stained to cause fluorescence of the nuclei when illuminated with a specific wavelength of light. For example, a sample may be stained with DAPI (a fluorescent stain that binds strongly to adenine-thymine-rich regions in DNA) that causes fluorescence when illuminated with near ultraviolet light. In particular, when bound to double-stranded DNA, DAPI has an absorption maximum at a wavelength of 358 nm and its emission maximum is at 461 nm (blue). In various embodiments, the input image 1402 includes at least one z-stack of images. For example, a plurality of z-stacks of images may be provided to the pretrained model 1404, where each z-stack is obtained from a different field of view (FOV) of the sample. In various embodiments, the input image 1402 is a single overview image of a FOV. For example, a single slice of a z-stack may be selected having a highest focus score (e.g., Tenengrad, Vollath's F4). In another example, the single image may be a maximum intensity projection of a z-stack.

In various embodiments, the pretrained classification model 1404 is a convolutional neural network (CNN). For example, as described above, the pretrained classification model 1404 may include a feature pyramid network. In various embodiments, when training an untrained classification model 1404 for pixel classification in a nuclei segmentation workflow, a training data set is provided to the untrained classification model 1404 where the training data includes a plurality of training images. In various embodiments, the plurality of training images is labelled with a plurality of labels. For example, an attraction basin may be labelled as stationary pixels, pixels that are within the nuclear boundary (but not a part of the attraction basin) may be labelled with a direction (e.g., one of the 8 directions to a neighboring pixel) that is flowing towards the attraction basin, and/or background pixels (e.g., pixels not within the stained nucleus) may be labelled as background. In various embodiments, the plurality of training images is provided to the untrained classification model 1404 to thereby train the model to classify pixels of an image with one of the plurality of values. In various embodiments, the plurality of training images includes images of nuclei from a plurality of different cell types (with stained nuclei). For example, the plurality of different cell types may include heart cells, liver cells, intestinal cells, brain cells (neurons), skin cells, bone cells, immune cells (e.g., B cells, T cells, macrophages), pancreatic cells, testicular cells, ovarian cells, and/or stomach cells, or any other suitable cell type. In various embodiments, the plurality of training images includes images of cells (and stained nuclei) from a plurality of sources. For example, the plurality of sources may include mouse, rat, dog, cat, horse, monkey, and/or human, or any other suitable source.

In various embodiments, the workflow 1400 includes receiving, from the pretrained classification model 1404, a pixel classification map 1406. Exemplary pixel classification maps are shown in FIGS. 6A, 6B, 9A and 9B. In various embodiments, the pixel classification map includes, for each pixel, a classification of that pixel to one of a plurality of values. In various embodiments, the plurality of values includes no direction (stationary) representing an attraction basin, a plurality of directions representing flow of the pixel towards an attraction basin, or as background. In various embodiments, the plurality of directions includes 2 or more directions. In various embodiments, the plurality of directions includes 4 directions (e.g., up, down, left, and right). In various embodiments, the plurality of directions includes 8 directions (e.g., up, down, left, right, diagonal up-left, diagonal up-right, diagonal down-left, and diagonal down-right). In various embodiments, the pixel classification results in the pixel classification map 1406 do not include vectors and does not have any magnitude associated therewith. In various embodiments, the pixel classification map 1406 includes a determination of confidence of each pixel classification. In various embodiments, each classified pixel includes information (e.g., metadata) representing the level of confidence in the classification. In various embodiments, the level of confidence uses a value scale (e.g., low, medium, high), a quality scale (e.g., poor, acceptable, good, excellent), a numerical scale (a range from 0 to 100), or a color scale (e.g., red, yellow, green), etc. In various embodiments, the confidence of each pixel classification is illustrated in a particular color associated with the level of confidence. For example, a red arrow represents a high confidence classification while yellow arrows are inferred classifications from surrounding pixels (e.g., low confidence classifications). In various embodiments, the level of confidence of each pixel classification is used during post-processing to refine the pixel classification map 1406.

In various embodiments, the workflow 1400 includes a post-processing module 1408 that performs one or more post-processing operations on the pixel classification map 1406. In various embodiments, as described above, the post-processing module 1408 refines the pixel classification map 1406 by changing the classification of one or more classified pixels. For example, a direction to which one pixel was classified may be changed based on the direction(s) of surrounding classified pixels. In various embodiments, the post-processing module 1408 groups pixels that flow towards the same attraction basin into an instance representing a nucleus in the segmentation mask 1410, as described in more detail in FIG. 15. In various embodiments, after the post-processing module 1408 performs one or more post-processing operations on the pixel classification map 1406, a segmentation mask 1410 is generated representing one or more unique instances of nuclei determined from the pixel classification map 1406.

Figure 15:
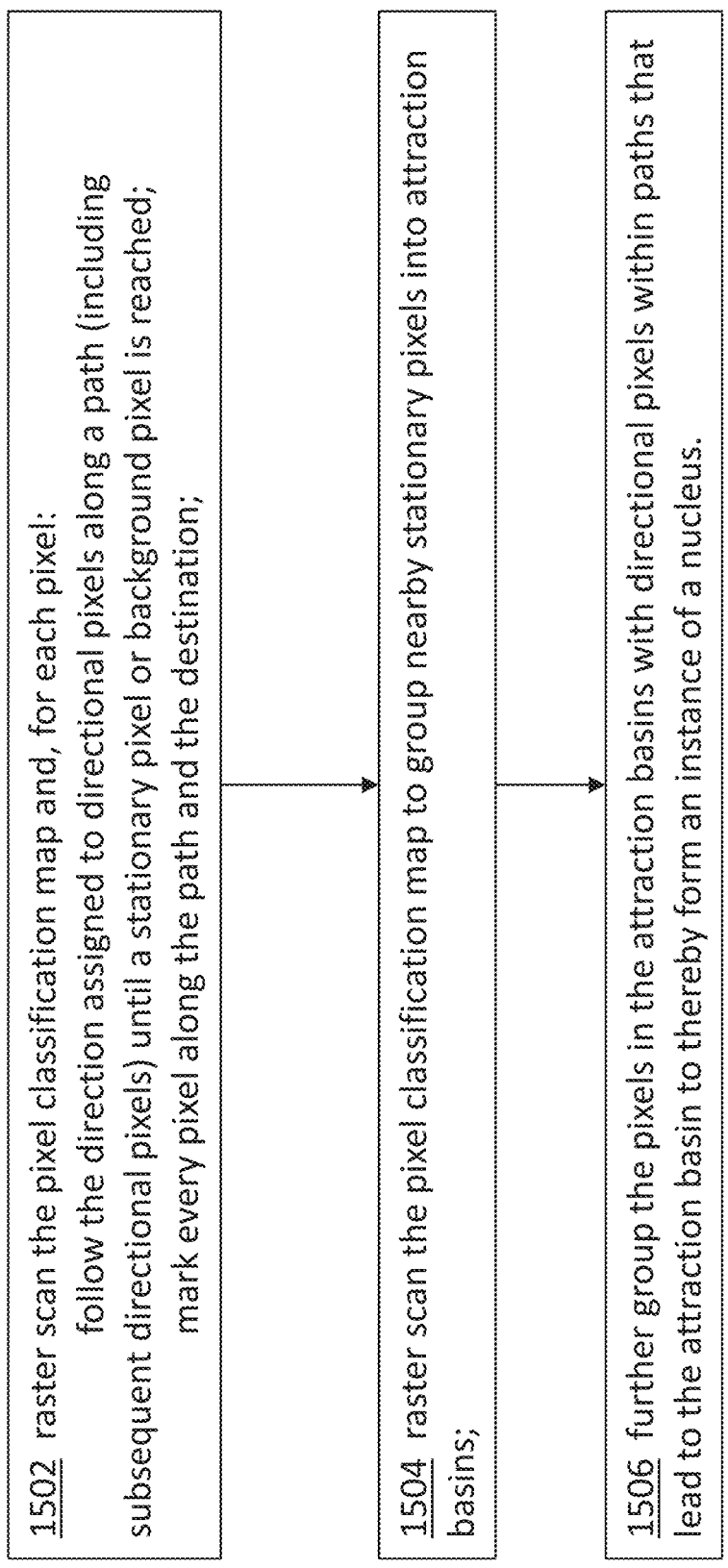
FIG. 15 shows an exemplary workflow for post processing of a pixel classification map according to embodiments of the present disclosure.

FIG. 15 shows an exemplary workflow 1500 for post processing of a pixel classification map. As shown in FIG. 15, at 1502, the pixel classification map 1406 is scanned (e.g., raster scanned). For each pixel that was classified with a direction of the plurality of directions (i.e., a directional pixel), a path defined by the direction of that pixel (and any subsequent pixels also having been classified with a direction) is followed until a stationary pixel or a pixel representing background is reached. In various embodiments, each path of one or more pixels is stored and/or the one or more pixels of each unique path are marked with an indicator that indicates that the pixels are a part of a unique path. In various embodiments, directional pixels are followed from pixel to pixel based on the assigned direction, starting at boundaries where pixels classified with a direction meet background pixels, until the path meets stationary pixels representing an attraction basin or pixels representing background. At 1504, the pixel classification map 1406 is scanned (e.g., raster scanned) to thereby group stationary pixels into one or more attraction basins. In various embodiments, unique attraction basins are determined by clustering. At 1506, the grouped stationary pixels representing the one or more attraction basins are further grouped with directional pixels (i.e., pixels having been classified with a direction) within paths that lead to a pixel within the one or more attraction basins. In various embodiments, grouping of the stationary pixels and/or grouping of the attraction basins with directional pixels (that are a part of paths leading to the attraction basins) uses union-find data structures to efficiently assign and reassign labels.

Figure 16:
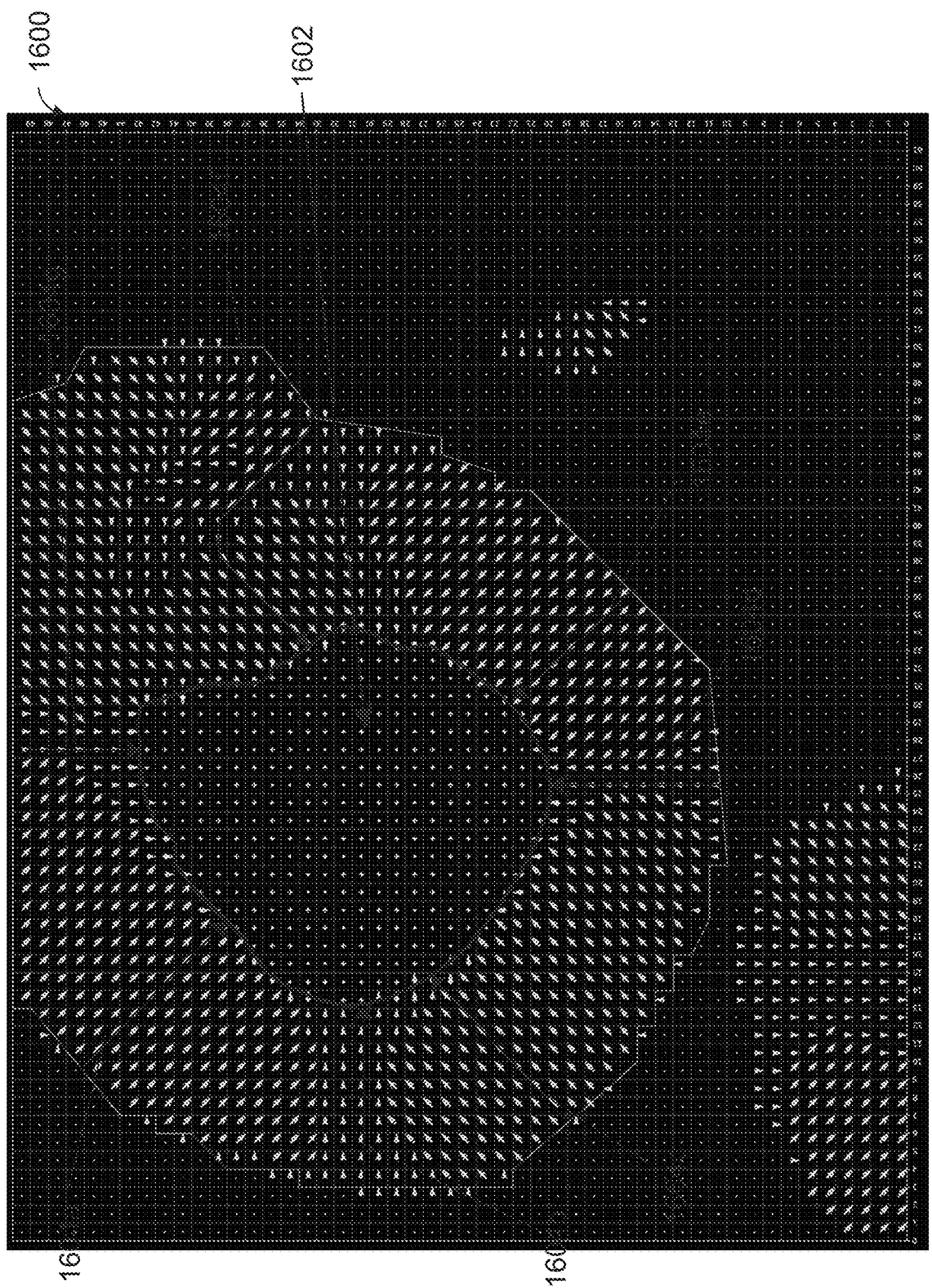
FIG. 16 shows an exemplary pixel classification map with traced paths according to embodiments of the present disclosure.

An exemplary pixel classification map 1600 is illustrated in FIG. 16 (similar to the pixel classification map shown in FIG. 9A) where a plurality of pixel paths 1604a-1604g have been traced. In various embodiments, the pixel classification map 1600 is raster scanned and, for each pixel being classified with a direction, a path (such as paths 1604a-1604g) is followed or traced from pixel to pixel until an attraction basin or background is reached. In various embodiments, the path traced is substantially straight, such as paths 1604a, 1604b, 1604c, 1604d, 1604e, 1604g. In various embodiments, the path traced is curved or serpentine, such as path 1604f. In various embodiments, the stationary pixels of the attraction basin 1602 are grouped with the directional pixels from the paths 1604a-1604g leading thereto to thereby define an instance of a nucleus in the resulting segmentation mask 1410.

Example 3: Cost Functions and Maps for Interior Stain Expansion

In some embodiments, a pixel-based geodesic expansion is used to expand one or more segmented nuclei based on a cost function calculated for each pixel. In some embodiments, the geodesic expansion allows for more reasonable cellular shapes than when nuclei are expanded, for example, using an isometric expansion based on the interior stain. In some embodiments, the cost function has one or more components that together are used to determine the total cost of a pixel if that pixel were to be assigned to a particular nucleus.

Figure 20A:
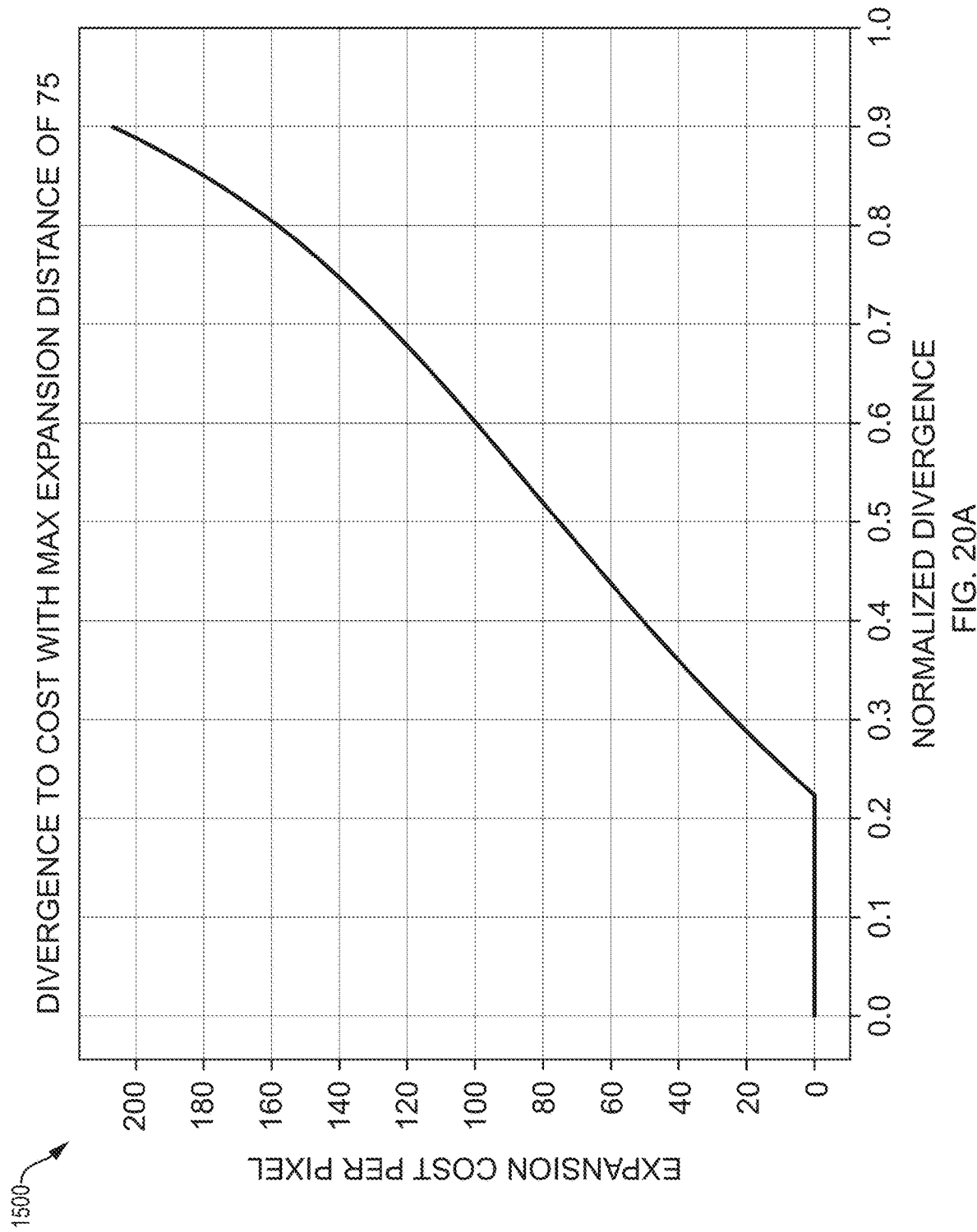
FIG. 20A is a graph illustrating an exemplary divergence component to a cost function, according to embodiments of the present disclosure.

FIG. 20A is a graph 2000 illustrating an exemplary divergence component to a cost function. As shown in FIG. 20A, as normalized divergence increases after about 0.225, the expansion cost per pixel increases. A person of ordinary skill in the art will recognize that divergence can be normalized in different ways, or illustrated in a non-normalized manner in some embodiments.

Figure 20B:
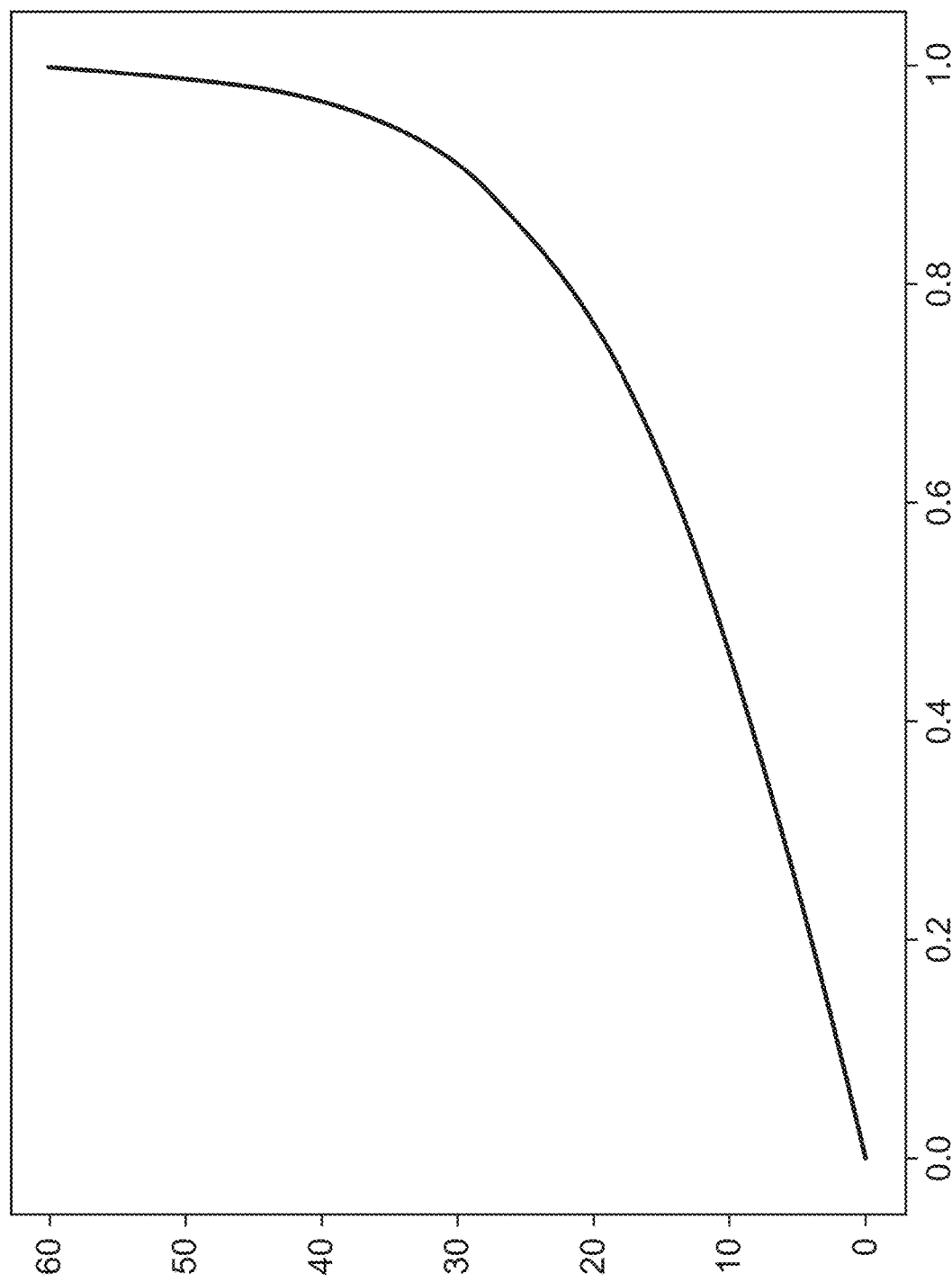
FIG. 20B is a graph illustrating an exemplary distance component to a cost function, according to embodiments of the present disclosure.

FIG. 20B is a graph 2050 illustrating an exemplary distance component to a cost function. As shown in FIG. 20B, the distance cost increases as normalized distance increases.

Figure 21A:
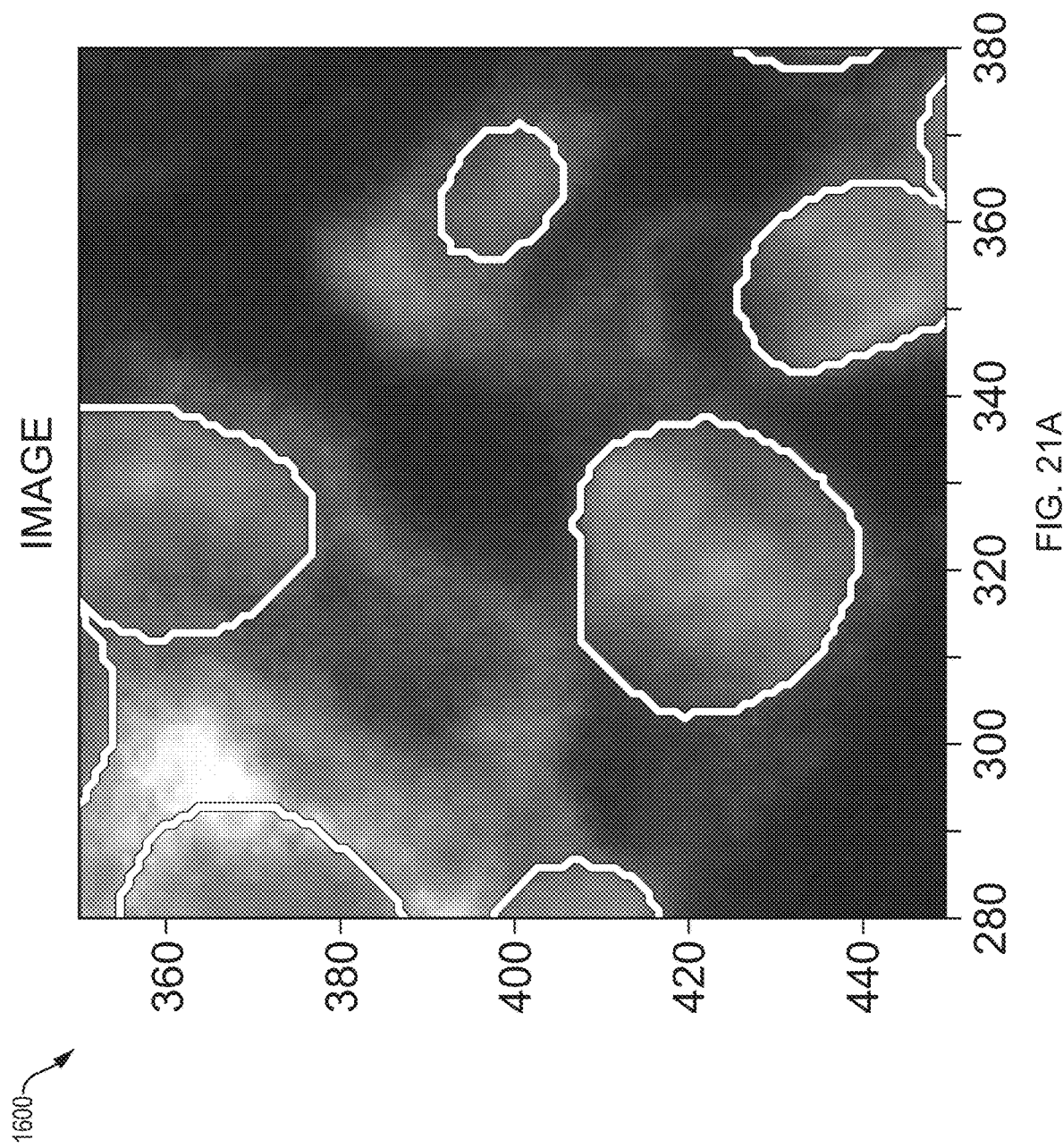
FIGS. 21A-21J show exemplary interior model inference and cost functions, according to embodiments of the present disclosure.
Figure 21B:
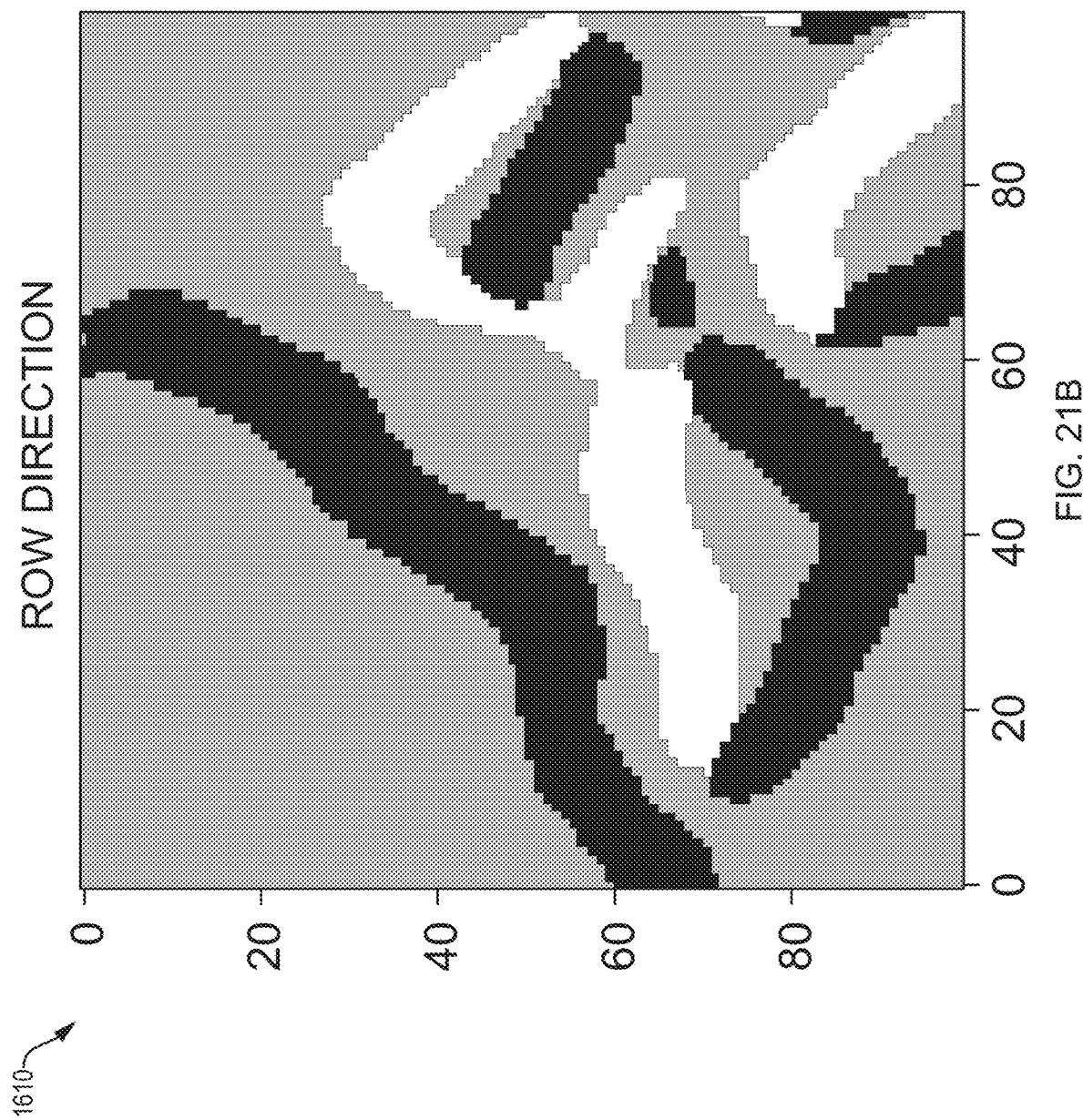
Figure 21C:
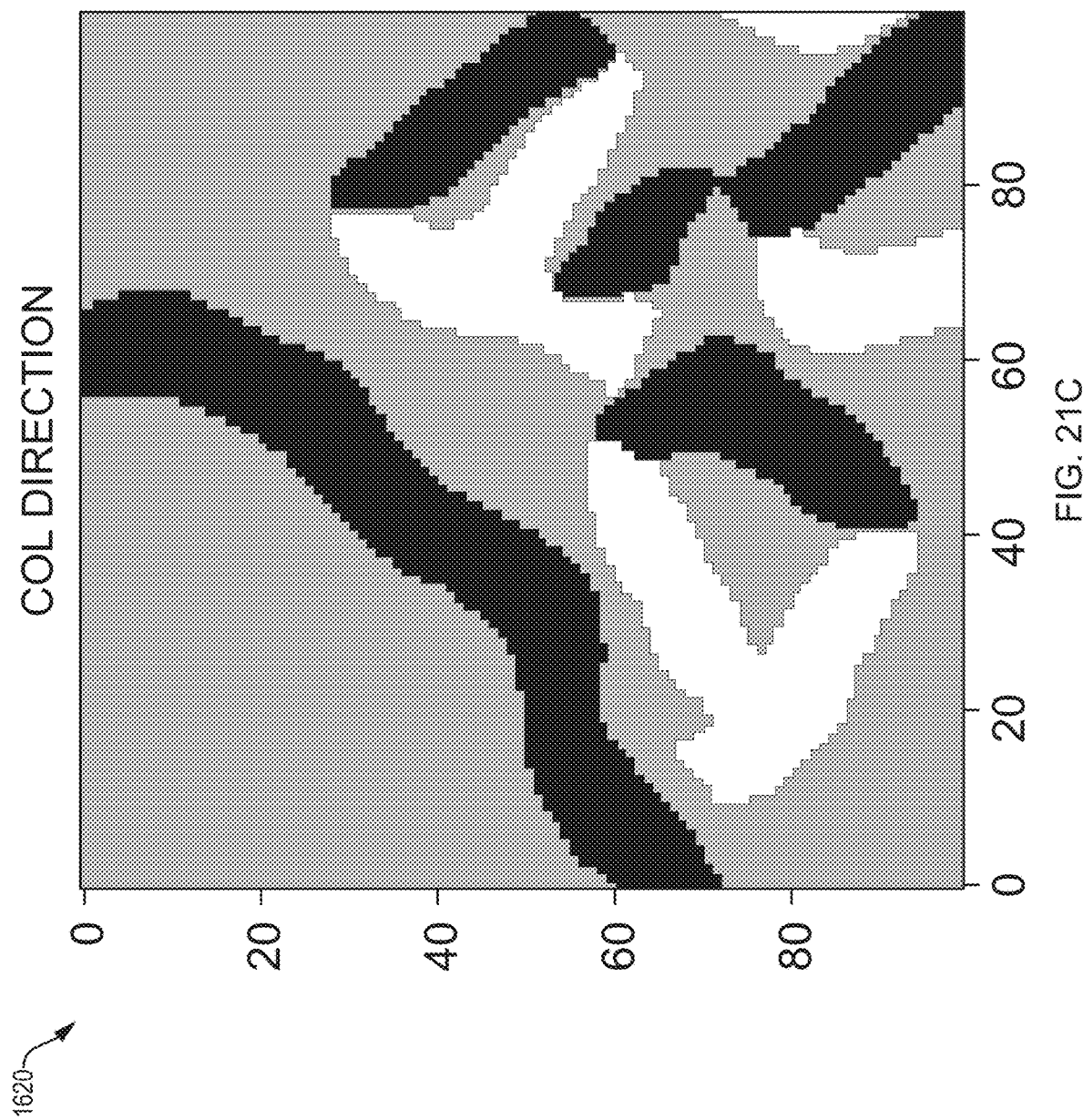
Figure 21D:
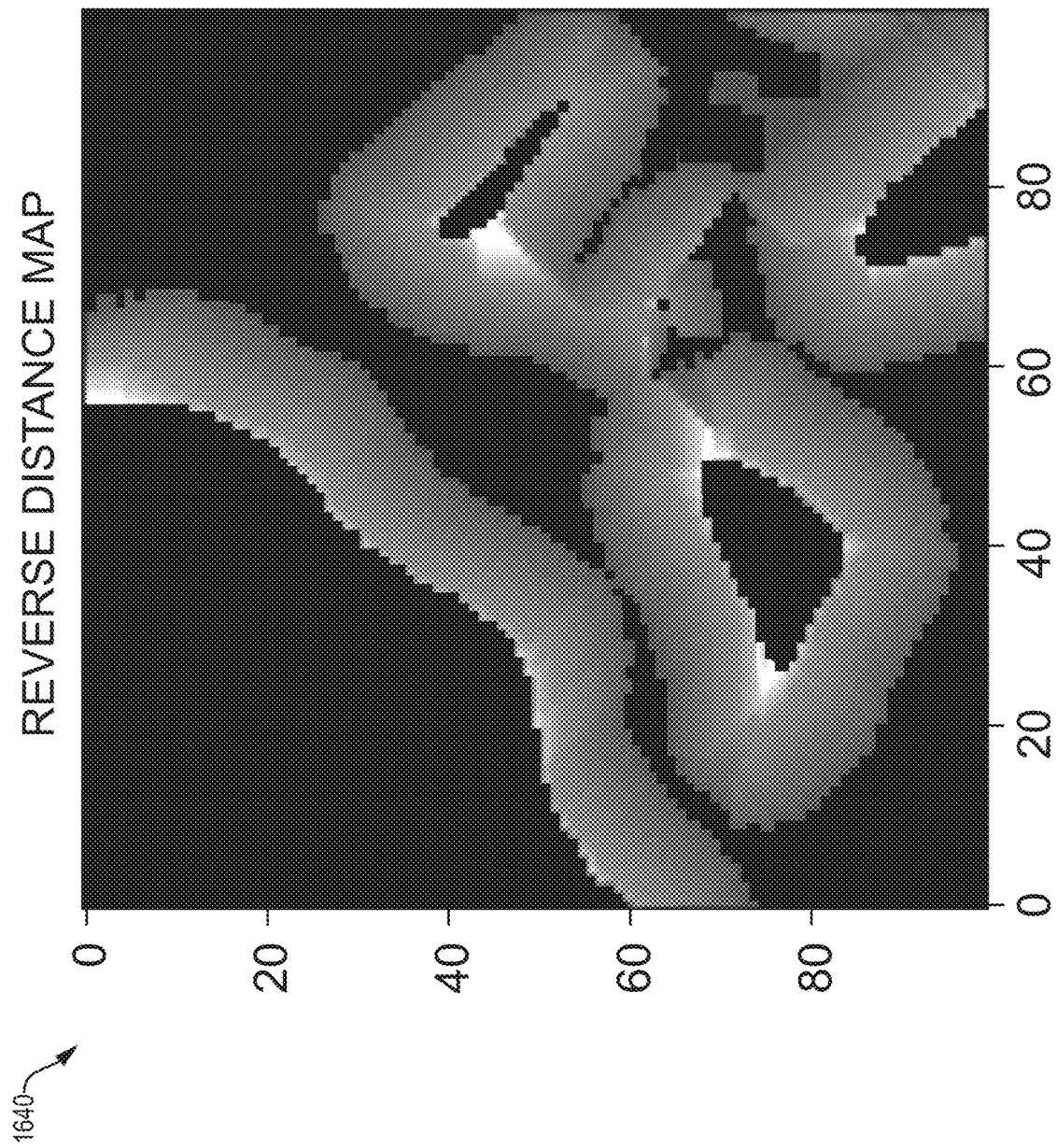
Figure 21E:
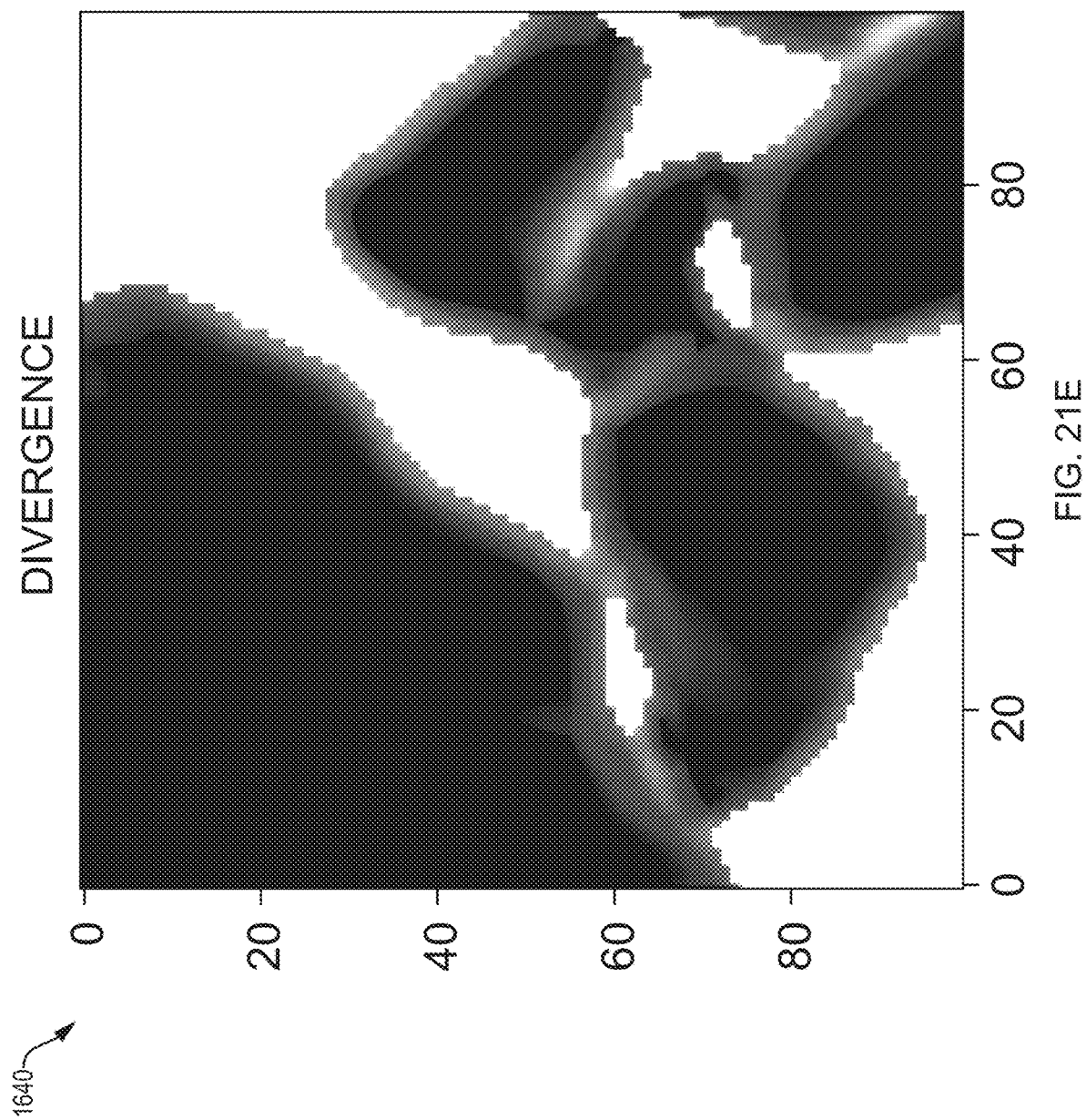
Figure 21F:
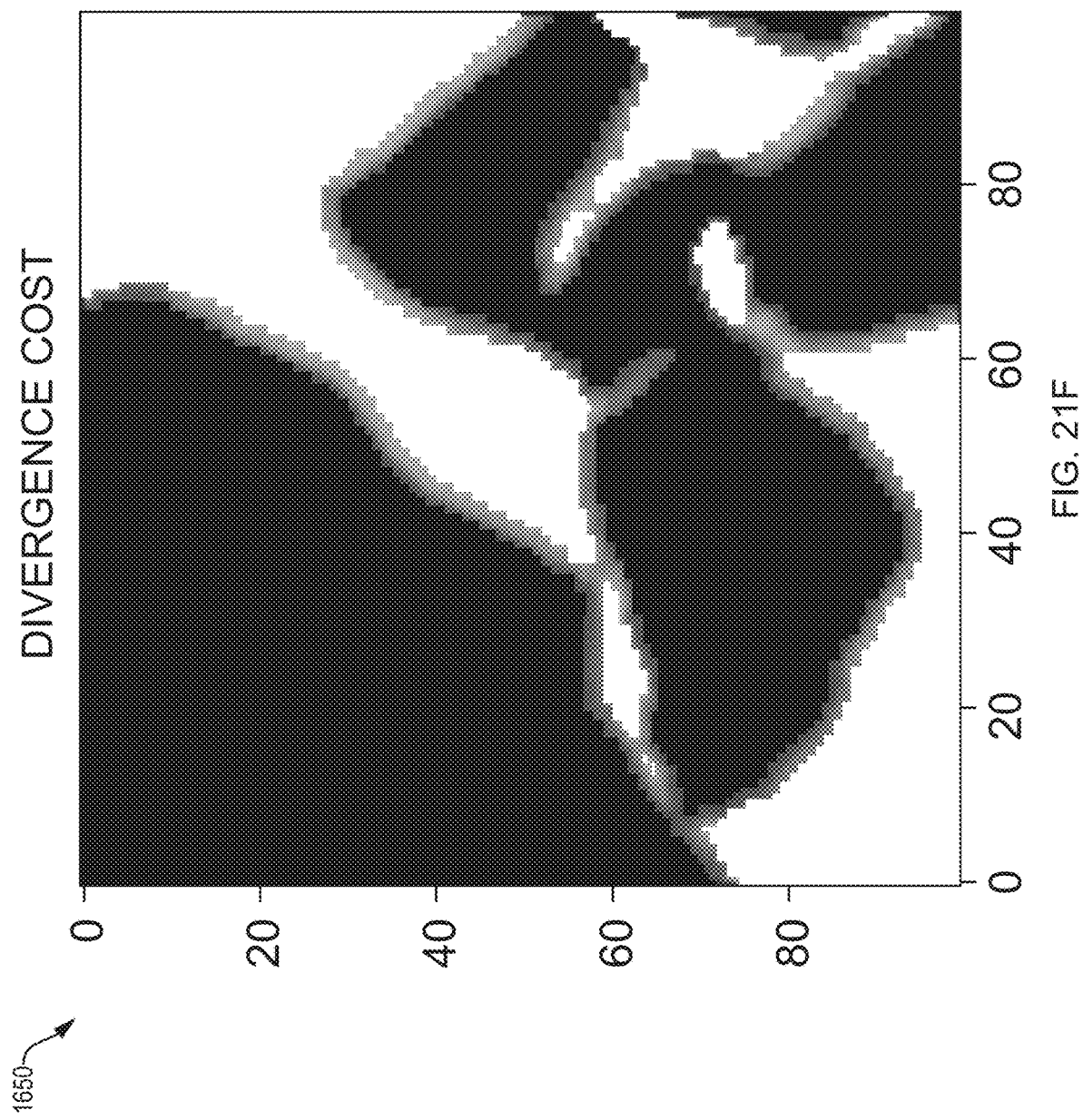
Figure 21G:
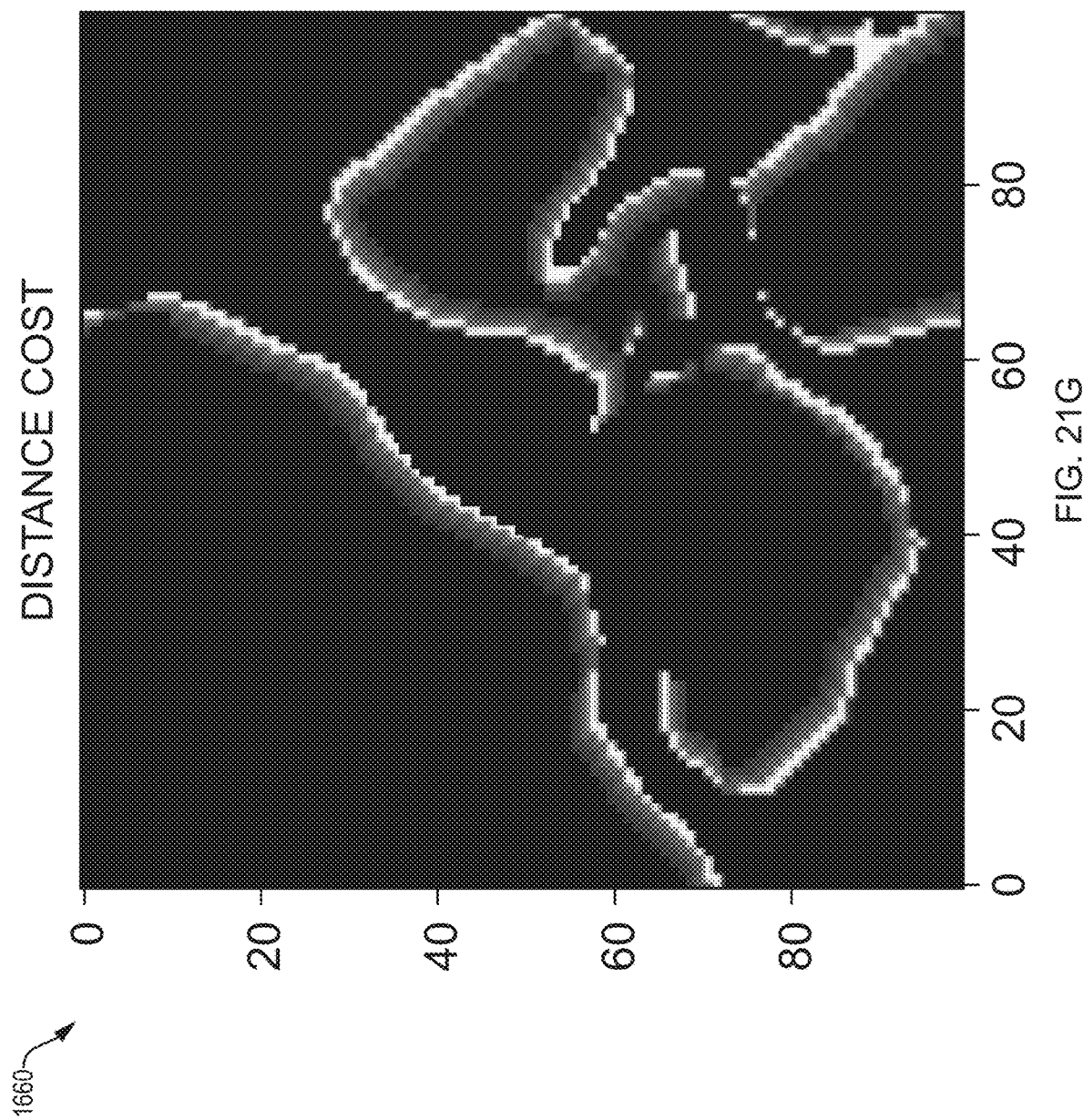
Figure 21H:
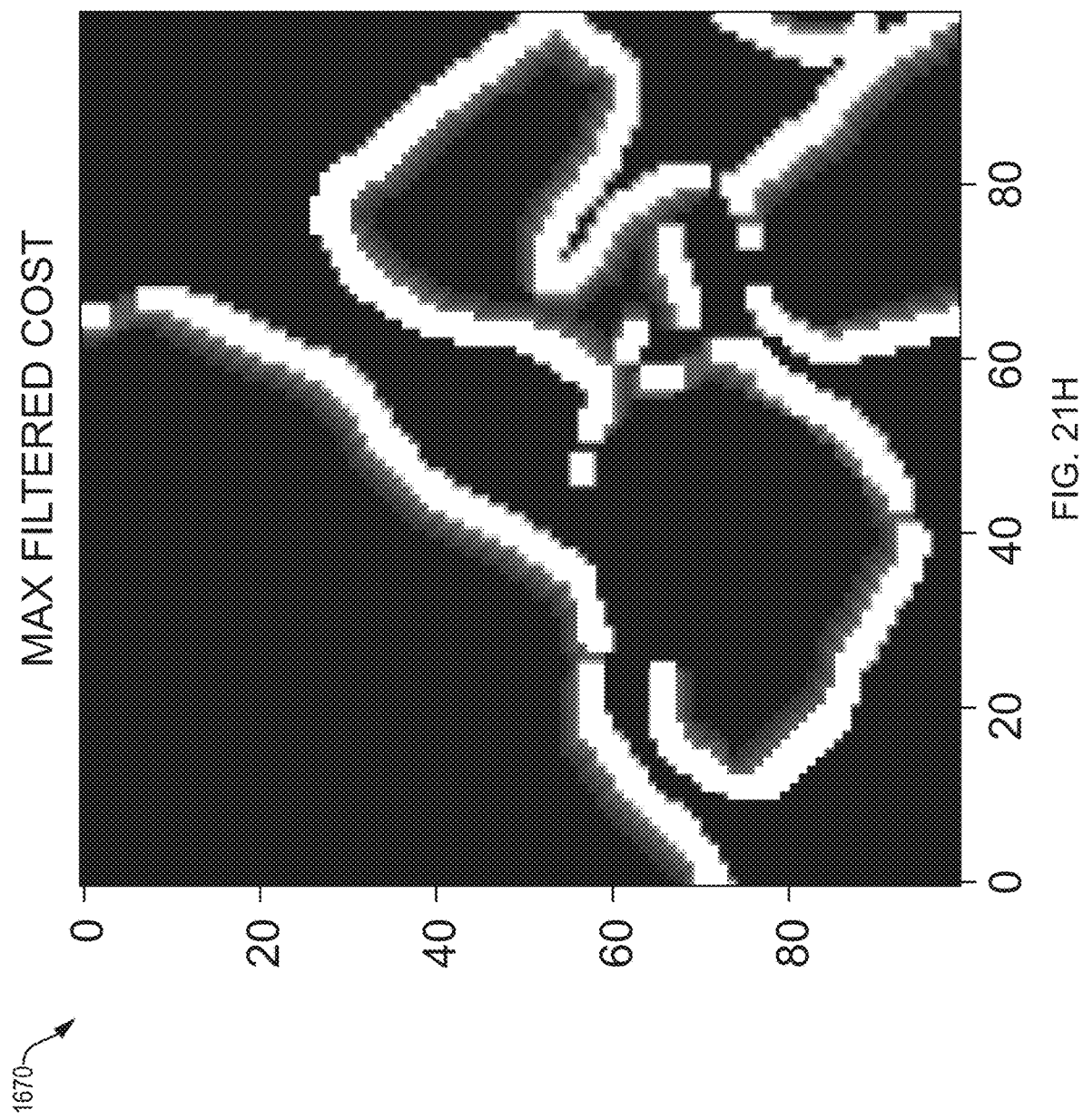
Figure 21I:
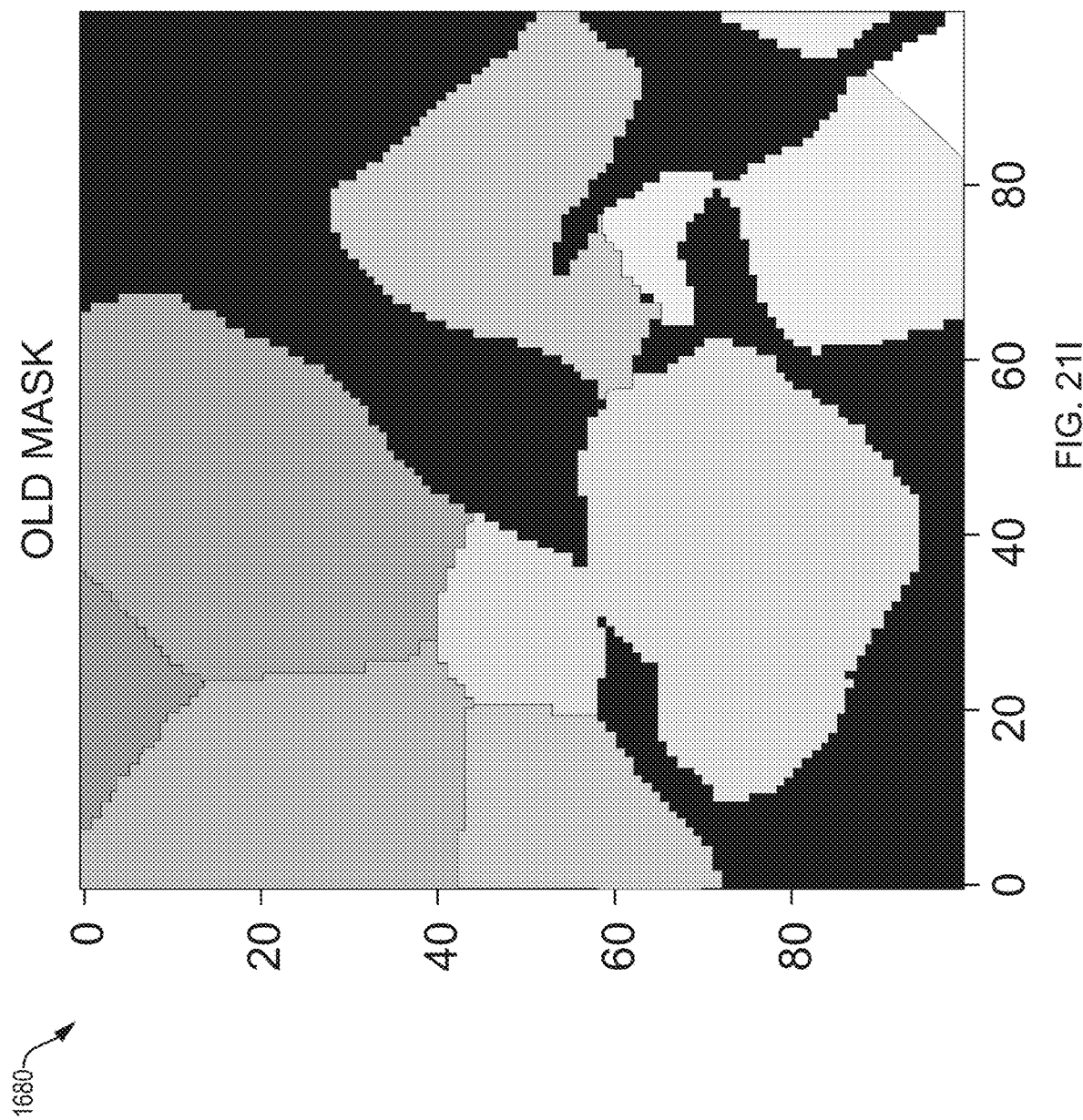
Figure 21J:
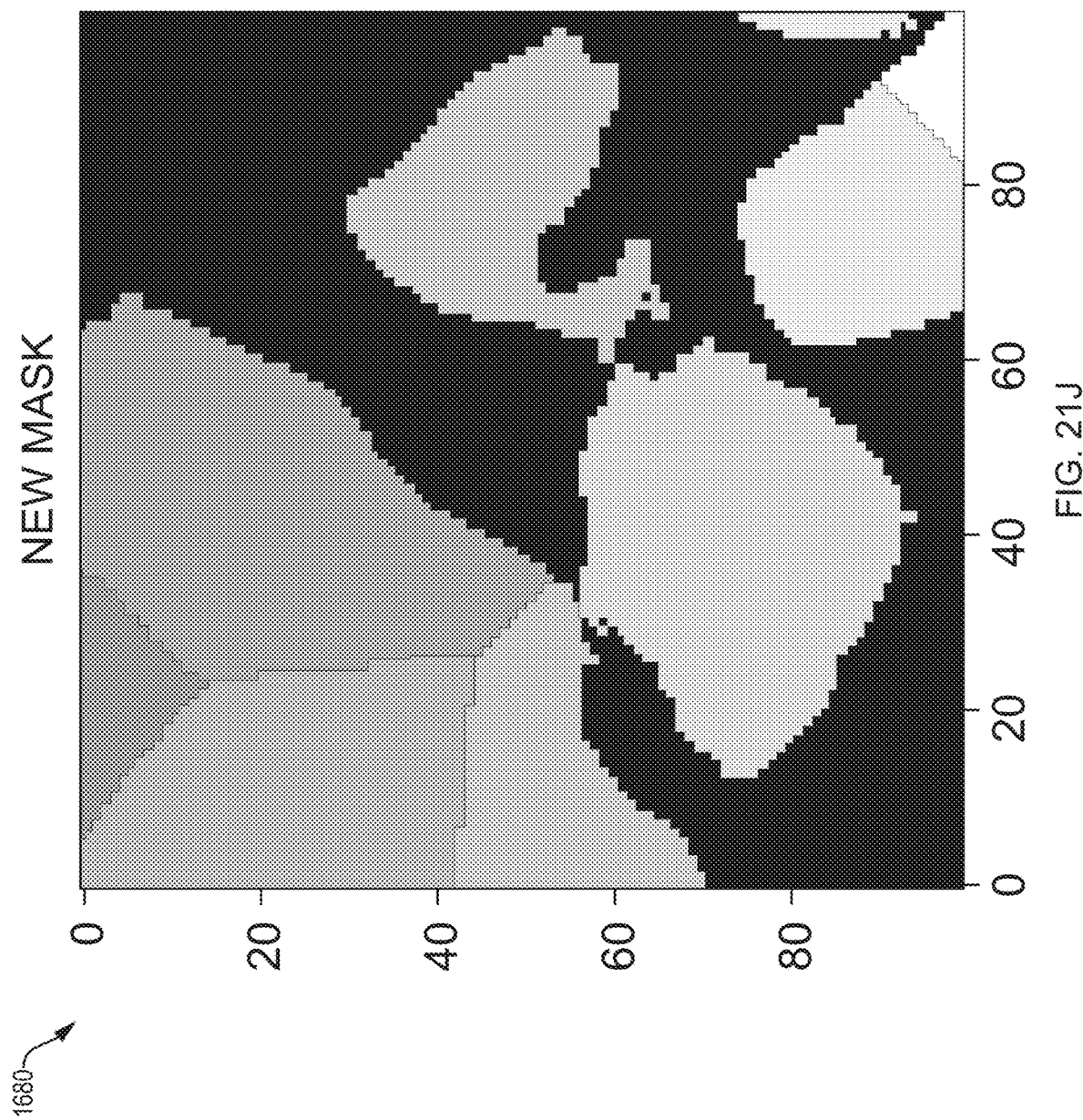

FIGS. 21A-21J are example embodiments of interior model inference and cost functions. FIG. 21A is a diagram 2100 illustrating an example input image of a sample having at least one nucleus stain, one boundary stain, and one internal stain as described above. FIG. 21B is an illustration 2110 of the distance of each pixel to a boundary of the interior region in the row direction. FIG. 21C is an illustration 2120 of the distance of each pixel to a boundary of the interior region in the column direction. FIG. 21D is an illustration 2130 of a reverse distance map. FIG. 21E is an illustration 2140 of divergence measured by the N×N kernels of N=5. FIG. 21F is an illustration 2150 of divergence cost as calculated by the function illustrated in FIG. 20A. FIG. 21G is an illustration 2160 of distance cost as calculated by the function illustrated in FIG. 20B. FIG. 21H is an illustration 2170 of max filtered cost, or the total cost function. FIG. 21I is an illustration 2180 of an old mask. FIG. 21J is an illustration 2190 of a new mask.

Figure 22A:
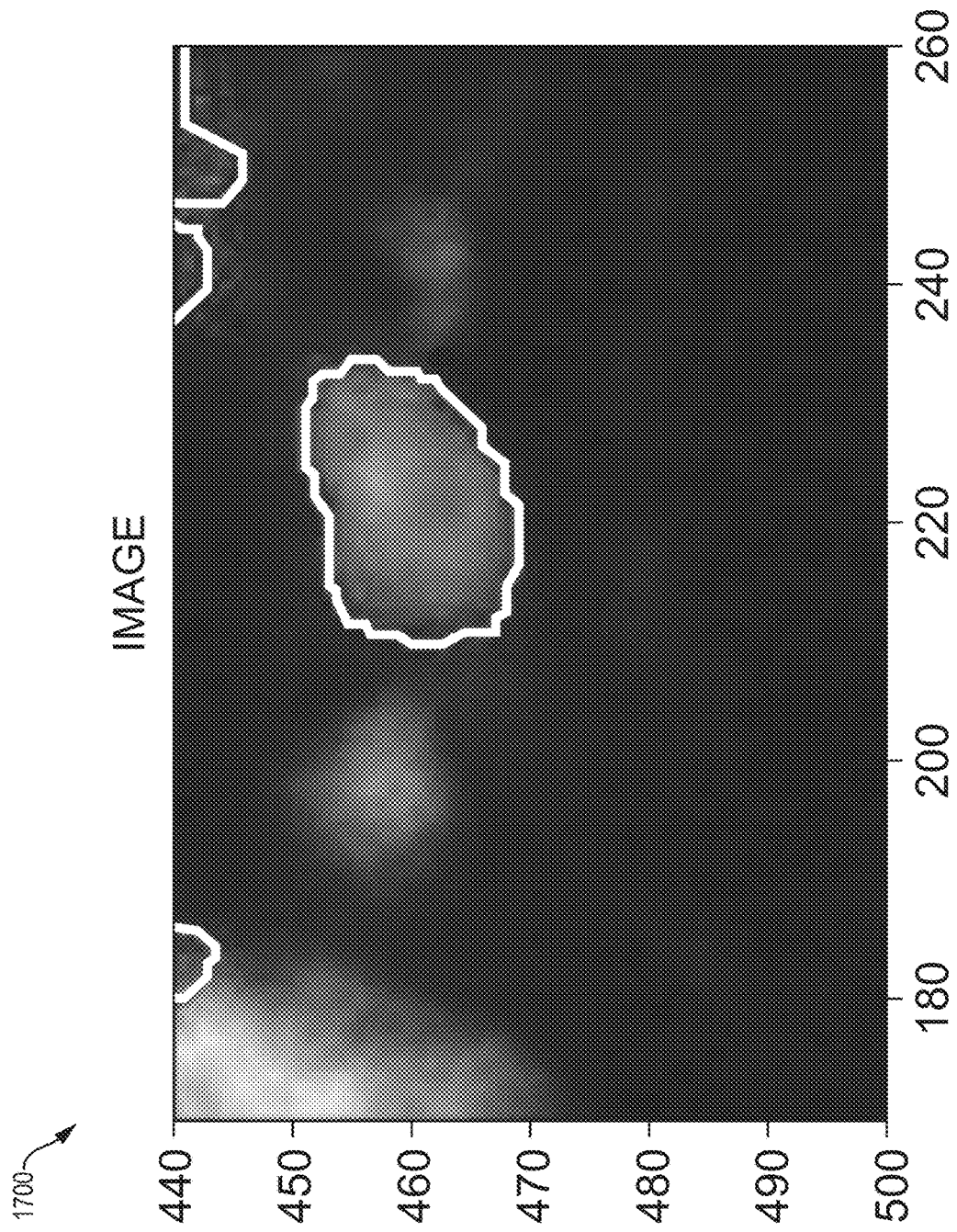
FIGS. 22A-22J show exemplary interior model inference and cost functions, according to embodiments of the present disclosure.
Figure 22B:
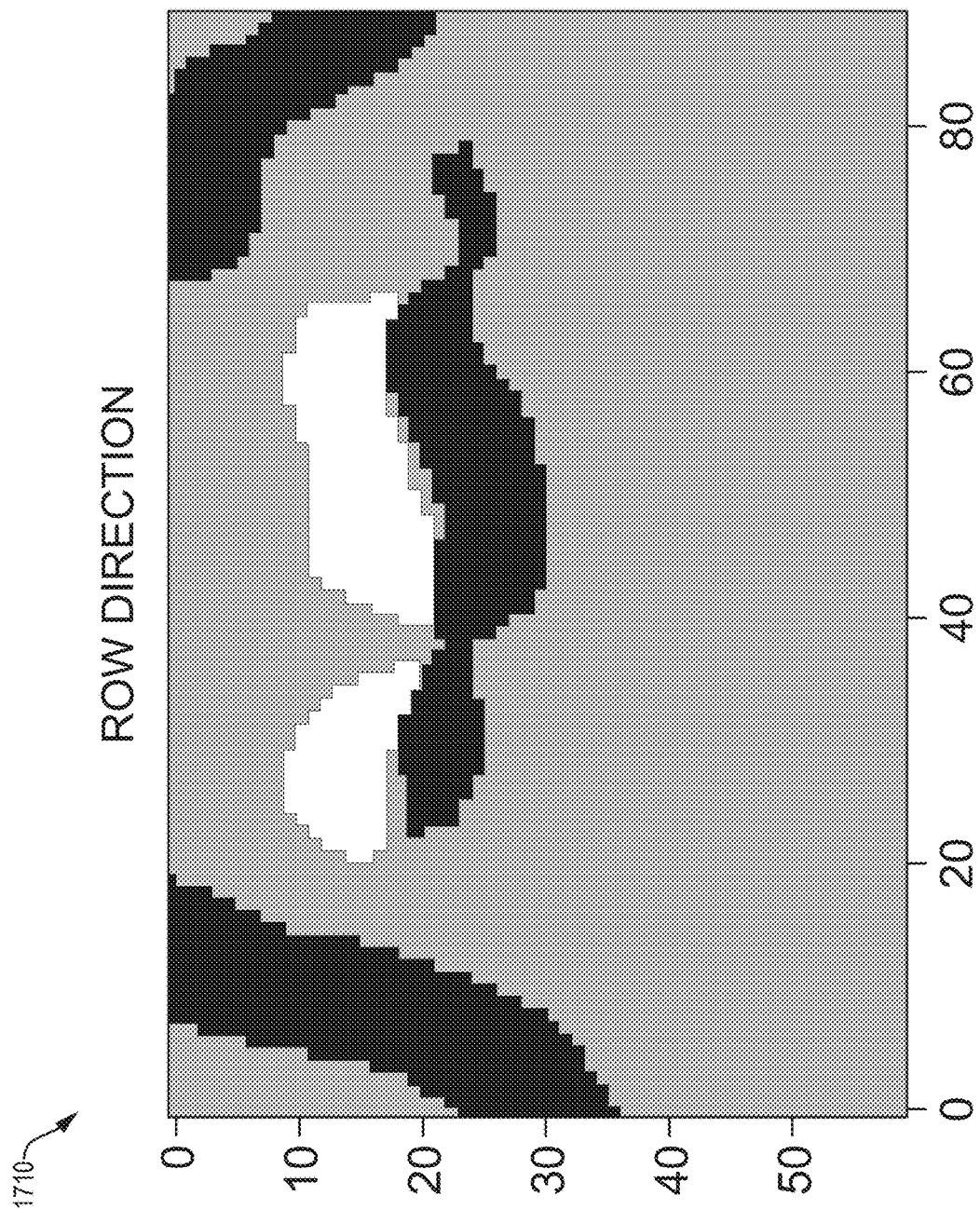
Figure 22C:
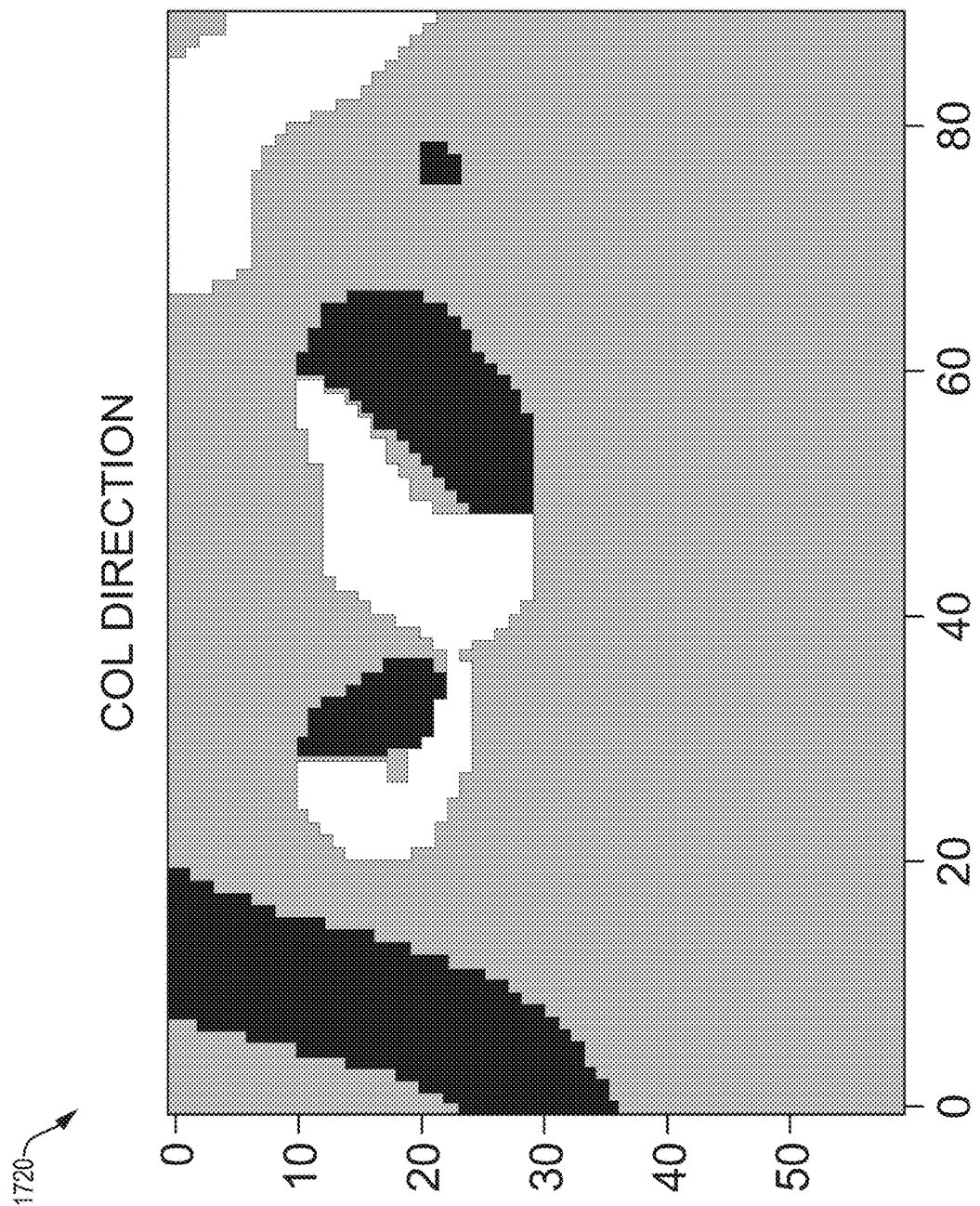
Figure 22D:
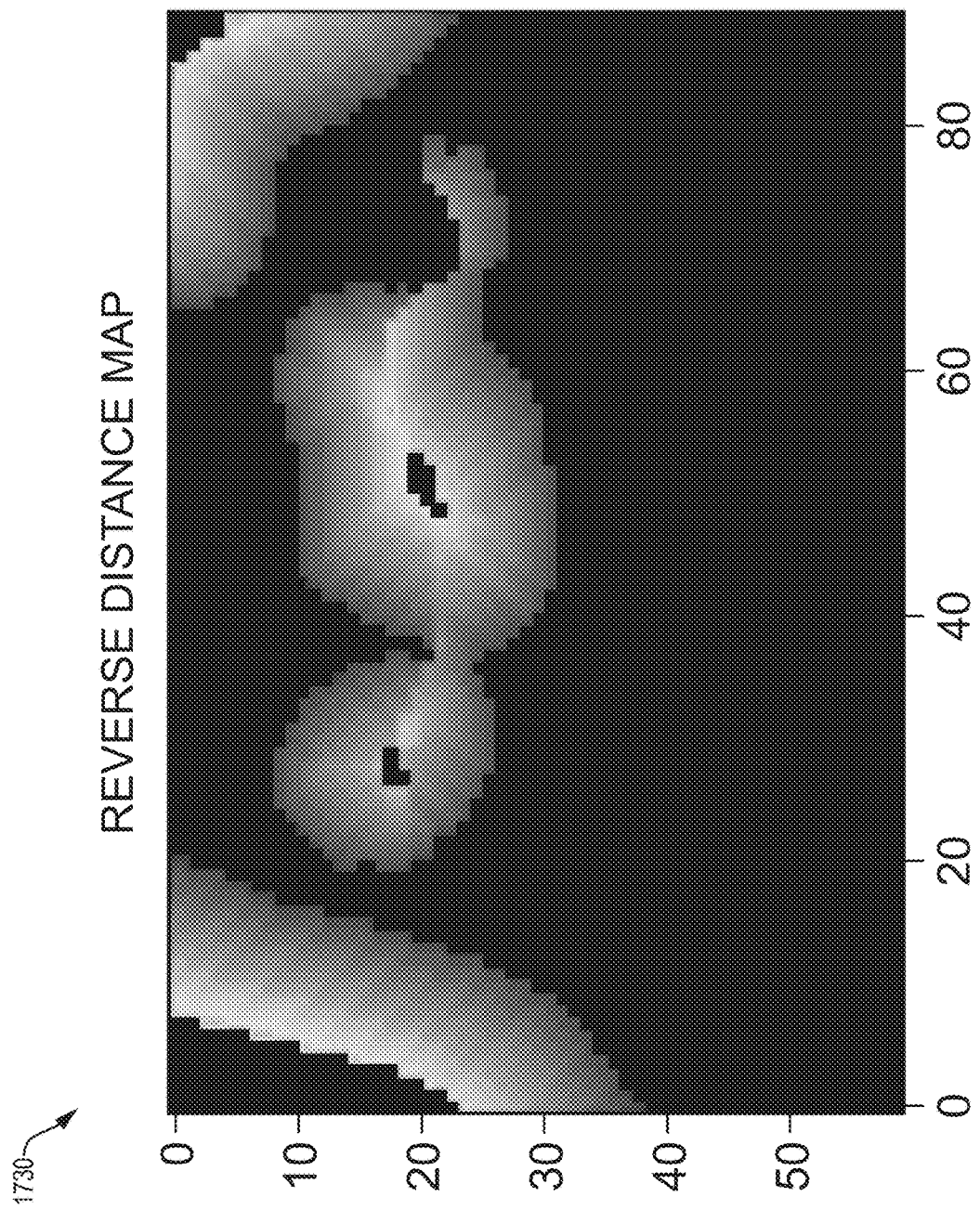
Figure 22E:
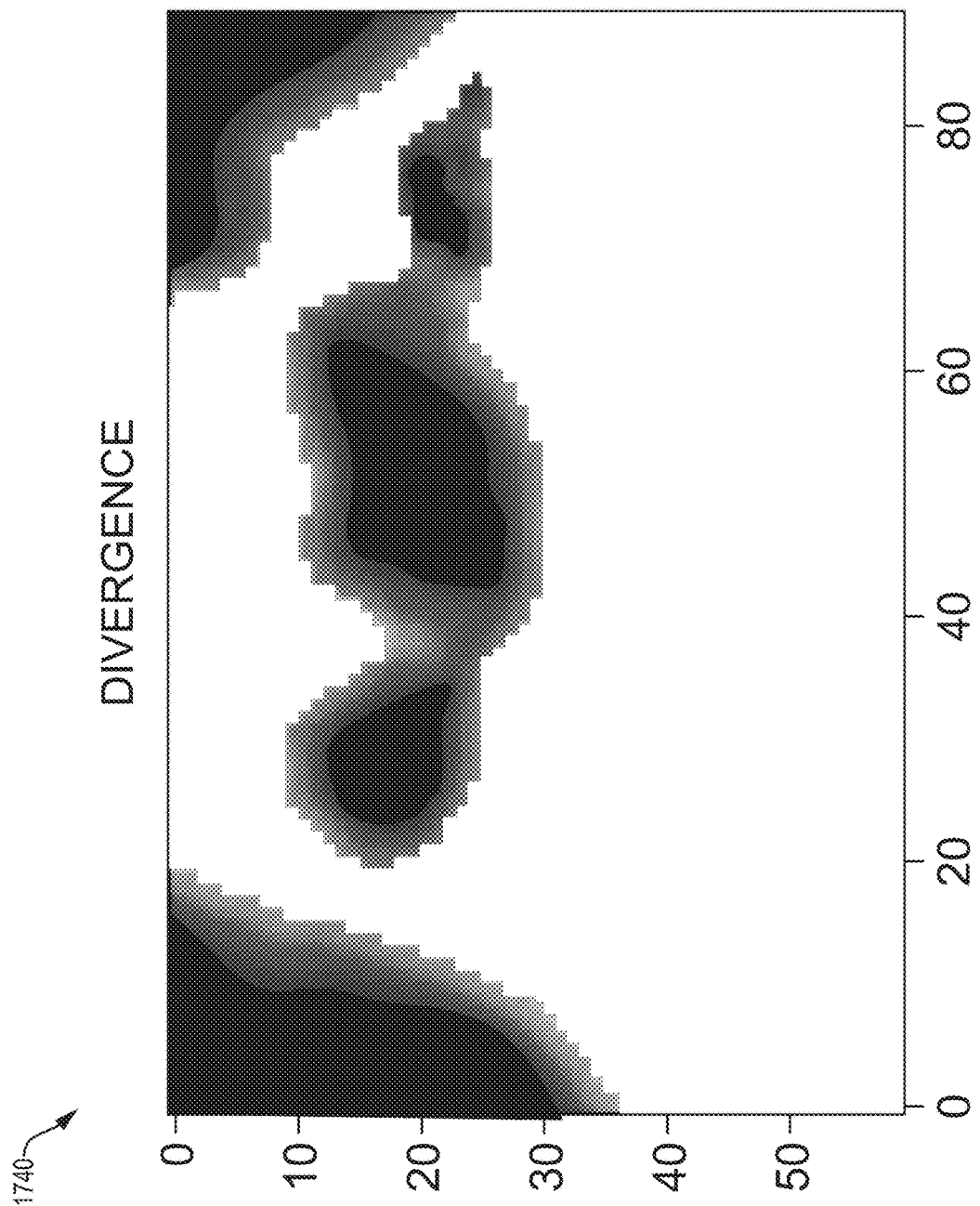
Figure 22F:
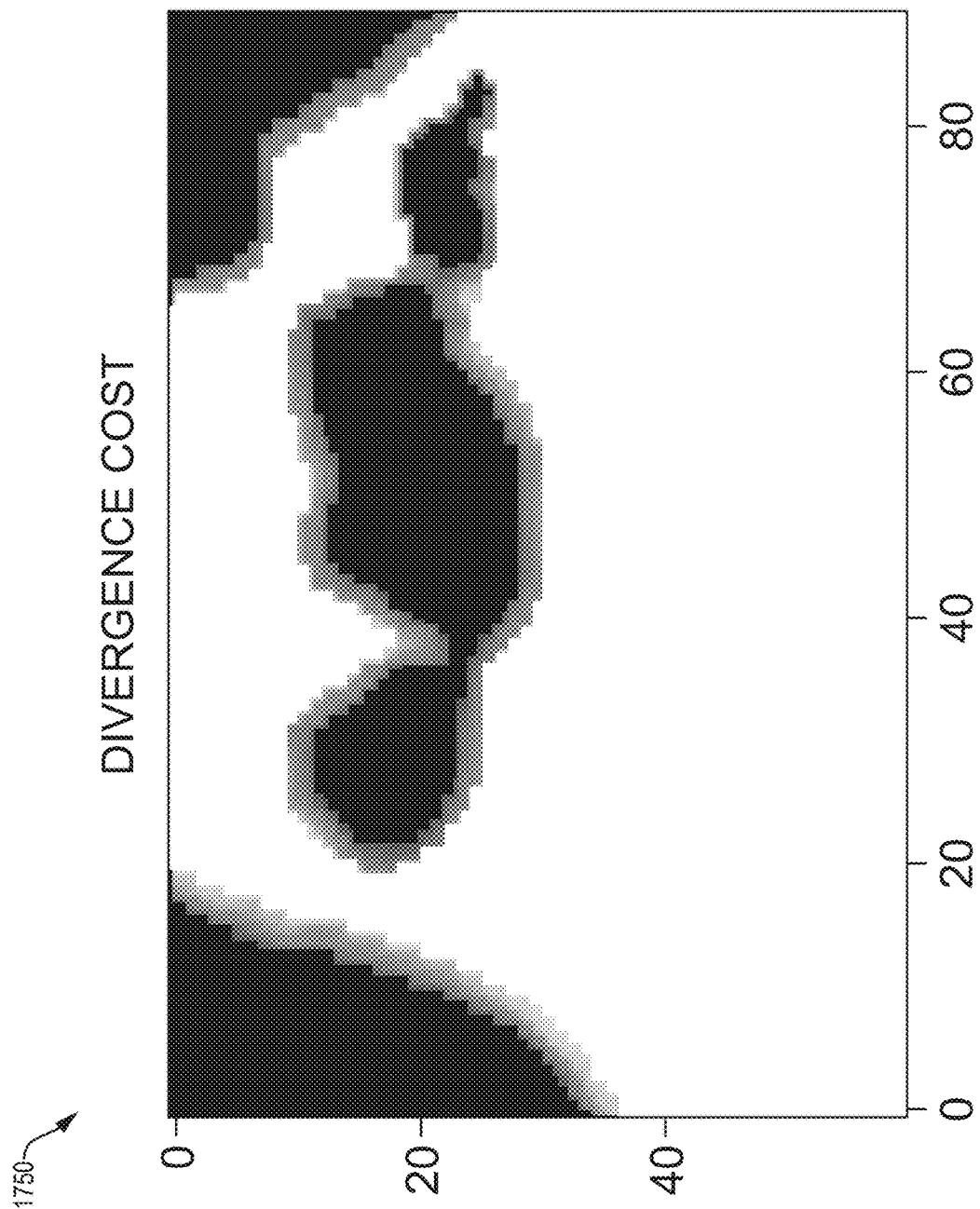
Figure 22G:
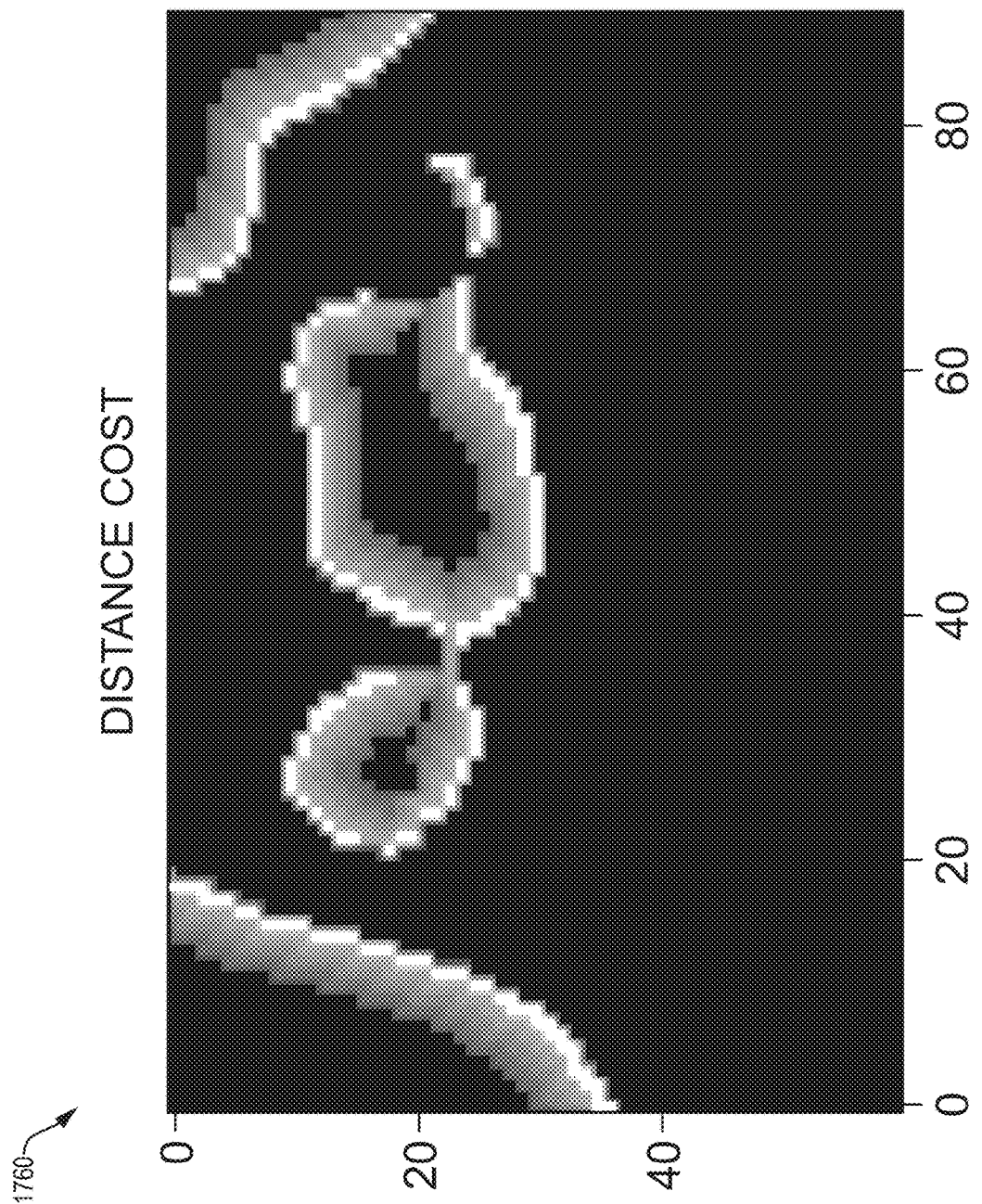
Figure 22H:
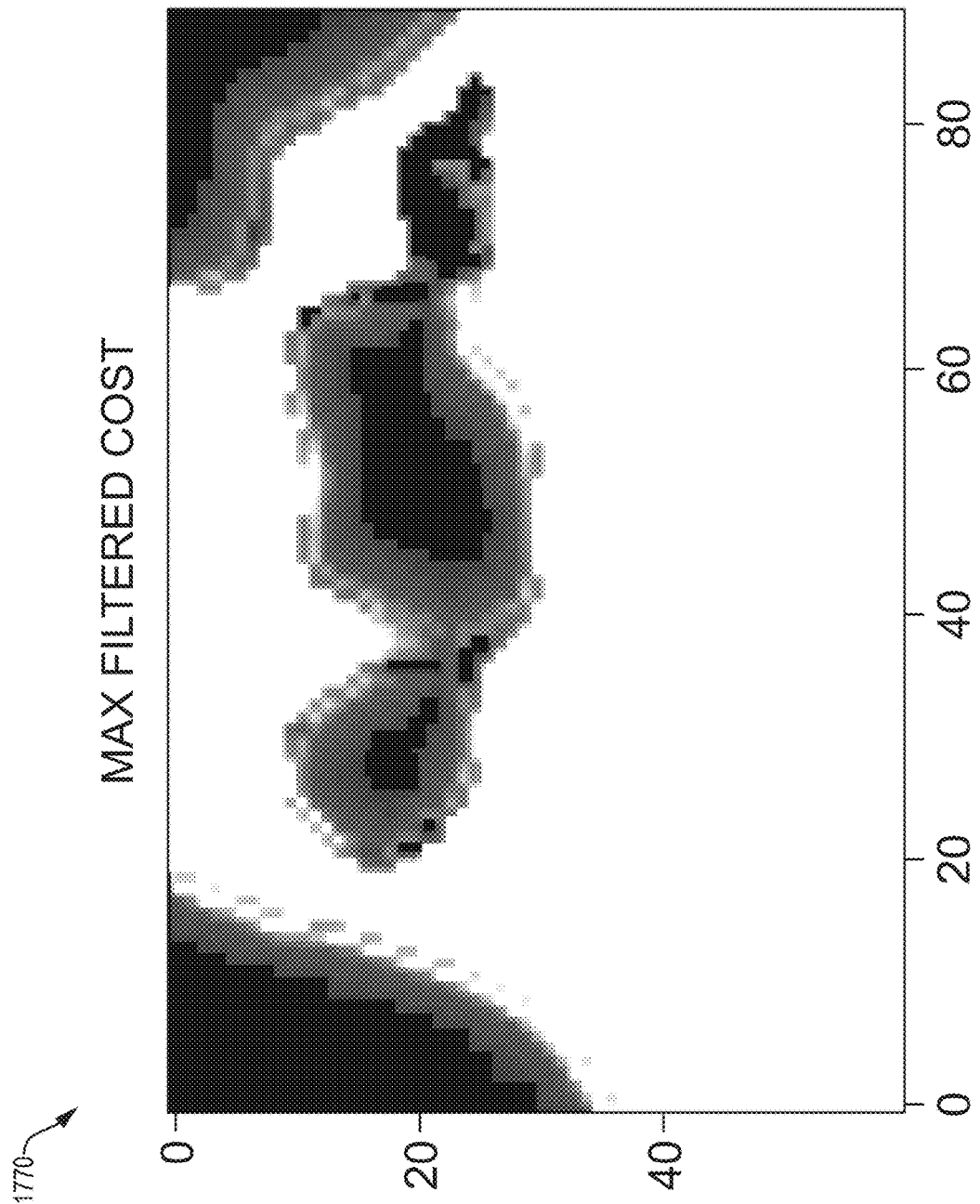
Figure 22I:
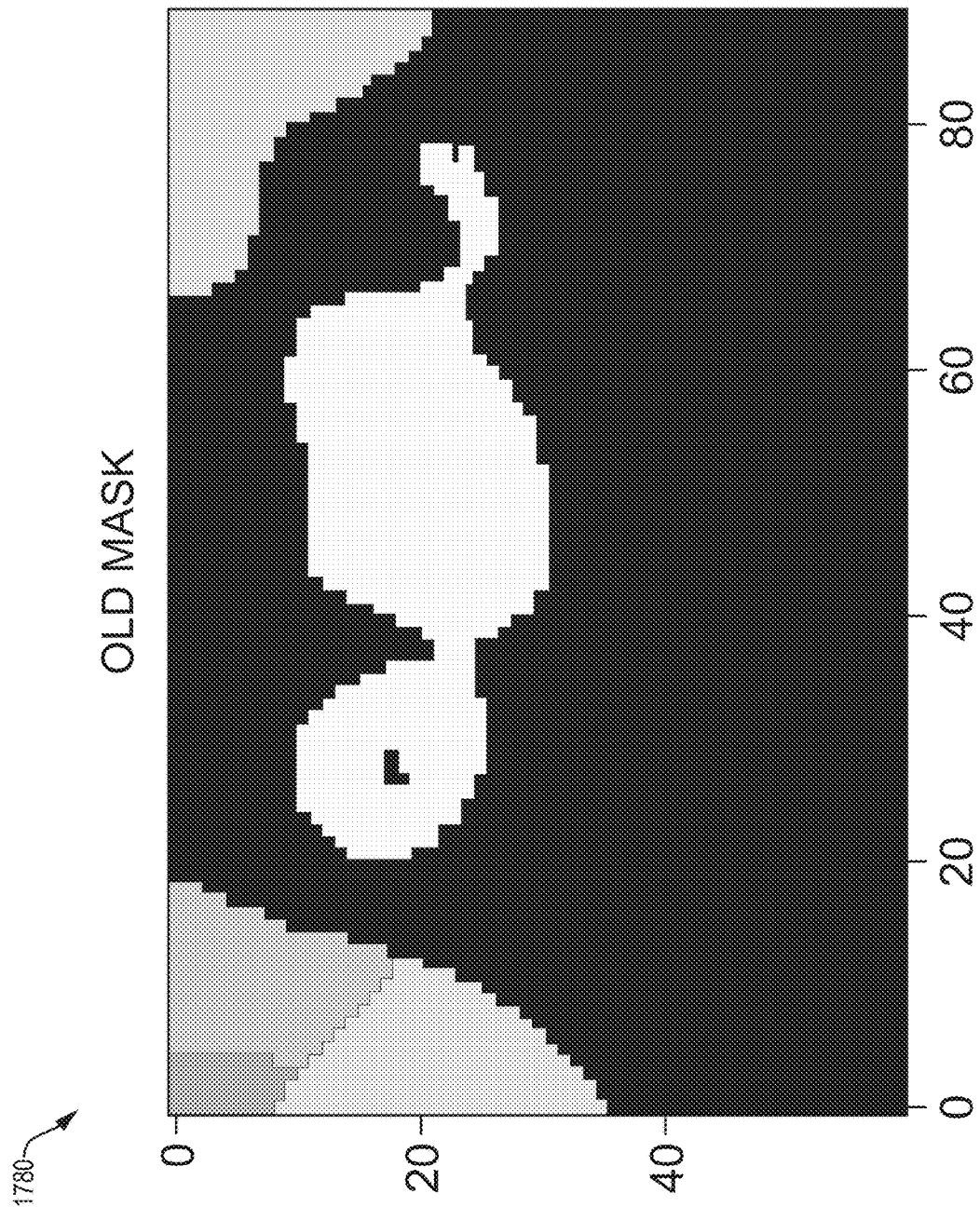
Figure 22J:
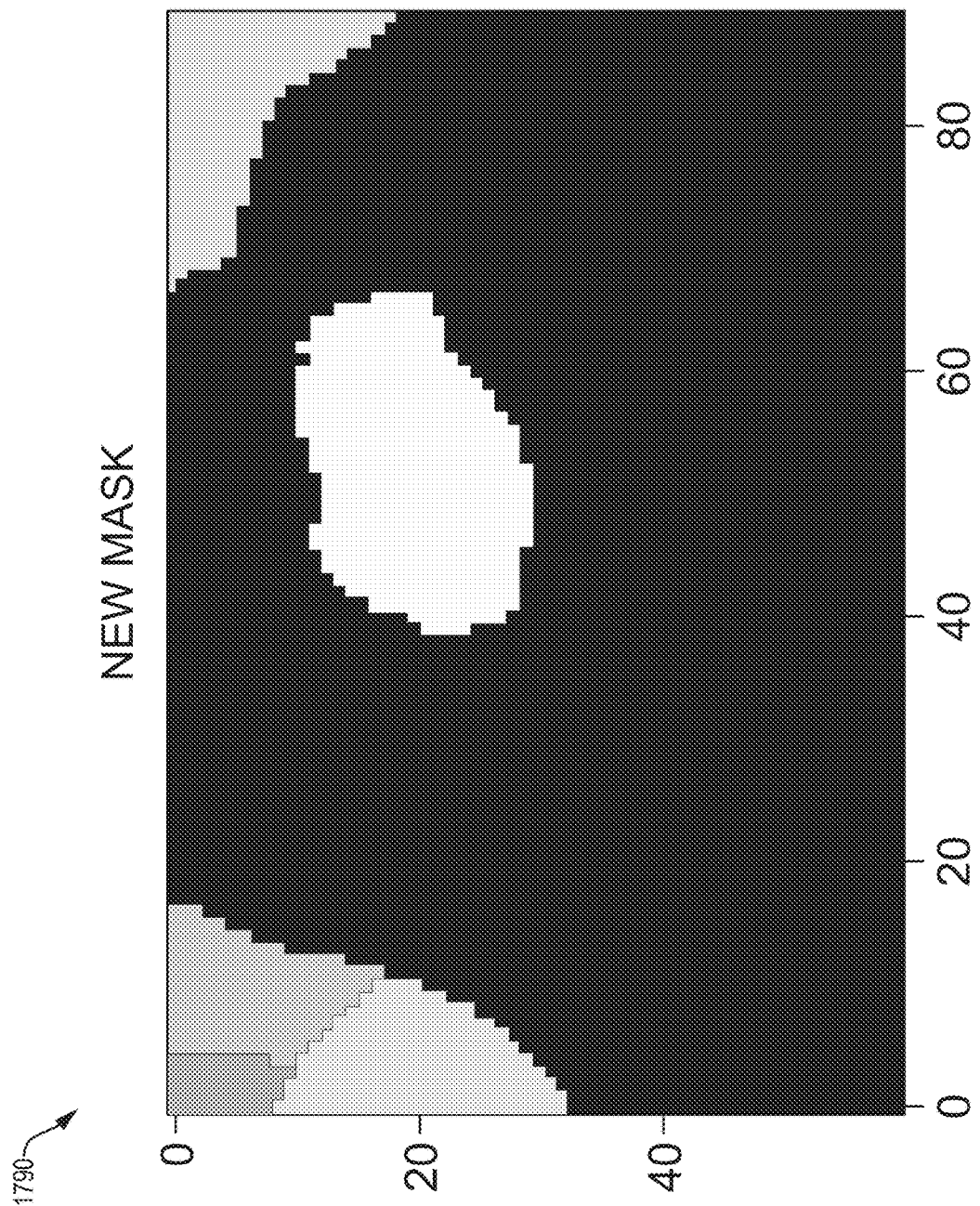

FIGS. 22A-22J are example embodiments of interior model inference and cost functions. FIG. 22A is a diagram 2200 illustrating an example input image of a sample having at least one nucleus stain, one boundary stain, and one internal stain as described above. FIG. 22B is an illustration 2210 of the distance of each pixel to a boundary of the interior region in the row direction. FIG. 22C is an illustration 2220 of the distance of each pixel to a boundary of the interior region in the column direction. FIG. 22D is an illustration 2230 of a reverse distance map. FIG. 22E is an illustration 2240 of divergence measured by the N×N kernels of N=5. FIG. 22F is an illustration 2250 of divergence cost as calculated by the function illustrated in FIG. 20A. FIG. 22G is an illustration 2260 of distance cost as calculated by the function illustrated in FIG. 20B. FIG. 22H is an illustration 2270 of max filtered cost, or the total cost function. FIG. 22I is an illustration 2280 of an old mask. FIG. 22J is an illustration 2290 of a new mask.

Cell Segmentation Using Interior Expansion by Heat Diffusion

Some alternative methods of cell segmentation include transcript-based segmentation methods that often rely on certain assumptions, prior knowledge, and/or statistical models. While transcript-based methods can leverage biological information to improve the resulting segmentation when the image does not have clearly defined (e.g., stained) cellular features, doing so can introduce bias based on the biological information chosen. Such transcript-based methods have challenges, for example, in regions where a cell type is homogeneous. In addition, in such transcript-based methods, cell segmentation accuracy is difficult to assess.

In some embodiments, exemplary embodiments of the method of the present disclosure include image-based segmentation algorithms. Imaged-based methods have advantages when the image of the stain applied to the cells is clear because the image will have an accurate cell boundary to segment. When the image includes clearly defined cellular features, a human can directly inspect the quality of the model output by comparing said output with the original image.

Some alternative methods for cell segmentation employ a deep learning cell-based segmentation with only one model to segment all cells in the image. In such methods, however, when the boundary stain is not available or unclear, these models generate an unnatural segmentation of a cell boundary (e.g., the segmented boundary does not have a clear indication of what it is based on or corresponds to, such as a cell membrane clearly demarcated with a fluorescent stain). In many cases of such methods, the boundary will appear similar to those generated by naïve nuclei expansion models (e.g., isometric nuclear expansion).

In some embodiments, the present disclosure addresses boundary stain transparency (e.g., dim or non-existent cell membrane stains). In some embodiments, when a boundary of a cell is not clear in the image, the method performs interior expansion and outputs data regarding which cells were expanded via interior expansion.

Some alternative methods use models that are limited by the number of channels of in the input image. For example, some models can only receive two channels, (i.e., one DAPI, and one cytoplasmic stain channel). Such methods, regardless of the different markers or channels provided, merge the input into a single cytoplasm channel, or an equivalent merged channel. These alternative methods reduce the efficacy of the multimodal data because merging reduces the information to one dimension or channel (e.g., 1 color).

In contrast, some embodiments of the present disclosure flexibly support two or more distinct channels, without merging channels which reduces the available information for segmentation.

In other alternative methods, outputs can exhibit large clouds of merged clusters.

In yet another alternative method, the image is treated as a graph with nodes representing the pixels and edge weights between adjacent nodes. This alternative method employs an electrical engineering analogy that solves a discrete Dirichlet problem on an arbitrary graph given by the distribution of electric potential on the nodes of an electrical circuit with resistors representing an inverse of weights (i.e., where the weights represent conductance) and boundary conditions given by voltage sources fixing the electric potential at boundary nodes (i.e., seeds). In this alternative method, edge weights are determined by changes of pixel intensity or by changes in pixel color. For example, a Gaussian weighting function can be applied to determine a change in pixel intensity between two pixels. However, when segmenting microscopy images (e.g., images of stained cells or tissue) using this method, determining the edge weights based on changes in pixel intensity is not necessarily useful because a stain signal (i.e., light emissions from one or more stains) may not have substantially uniform intensity within individual cells thus making accurate segmentation of individual cells difficult. For example, a cytoplasmic stain may be diffuse, which may cause a pixel intensity-based edge weight model to have significant inaccuracies. Additionally, some stain signal can cross (i.e., bleed) across multiple cells, making accurate segmentation of clustered cells difficult. Moreover, autofluorescence of the tissue further complicates segmentation using this method due to error caused by increased pixel intensity from the autofluorescence. Lastly, determining edge weights based on changes in color is not useful for images of stains because each stain is imaged in a single color channel, in addition to the reasons described above.

In various embodiments, a method of segmenting cellular boundaries involves expanding one or more nuclear boundaries based on an interior (e.g., cytoplasmic) stain. In particular, the method of segmenting cellular boundaries (e.g., segmenting pixels in an image and assigning pixels to a particular nucleus of a cellular nucleus segmentation mask) employs a heat diffusion analogy where the heat diffusion partial differential equation is solved by constructing an arbitrary graph where the nodes of the graph represent temperature, the edges of the graph represent conductivity and boundary conditions are defined as Dirichlet boundary conditions. In various embodiments, the Dirichlet problem for Laplace's equation consists of finding a solution φ on some domain D such that φ on the boundary of D is equal to some given function. Since the Laplace operator appears in the heat equation, one physical interpretation of this problem is as follows: fix the temperature on the boundary of the domain according to the given specification of the boundary condition and then allow heat to flow until a steady state is reached in which the temperature at each point on the domain does not change anymore. The temperature distribution in the interior will then be given by the solution to the corresponding Dirichlet problem. Solutions of Laplace's equation are called harmonic functions. In various embodiments, a heat diffusion-based interior expansion expands a nucleus based on information in an interior stain image such that the resulting cell boundary appears more natural (i.e., resembling natural cells), without sharp edges, holes, leaks, or discontinuous portions that give an unnatural shape to a cell boundary that may be included when using other interior expansion algorithms. Full cell segmentation using a heat diffusion-based interior expansion is a global optimization by solving a linear system (rather than an iterative optimization) that results in smoother, more natural, cell boundary (e.g., cell membrane) profiles.

FIGS. 23A-23E are diagrams of an exemplary graph 2300 illustrating a segmentation method that employs a heat diffusion model to segment features (e.g., cell boundaries) in images. For example, the image may include a composite image having at least one DAPI-stained nucleus, at least one stained cellular interior (e.g., 18S RNA and/or cytoplasmic protein), and/or at least one stained cellular boundary. In various embodiments, seed nodes 2322c-2322d representing seed pixels (e.g., pixels of segmented nuclei) are modelled as heat sources in the graph 2300 and are labeled C1 and C2. In various embodiments, the seed nodes 2322c-2322d are assigned a value of 1 for the boundary condition (when not treated as a heat source, these seed nodes are treated as a heat sink and assigned a boundary condition value of 0). In various embodiments, background nodes 2322b representing pixels having background (e.g., pixels of a background mask) are modelled as a heat sink. In various embodiments, the background nodes 2322b are assigned a value of 0 for the boundary condition. In various embodiments, the unlabeled pixels are represented in a graph with unknown node values. In various embodiments, values (e.g., weights) for edges 2324 are determined between each set of adjacent pixels. In various embodiments, a pixel classification and segmentation model (e.g., Ridgepath) as described above is applied to the image of the interior stain. In various embodiments, when applying the pixel classification and segmentation model, each segmented nucleus is set as an attraction basin. In various embodiments, in an interior stain image, nuclei will appear as "holes" in the interior stain, for example, where a cytoplasmic stain such as 18s is used. In various embodiments, the pixel classification and segmentation model outputs one or more values (e.g., one or more directional probabilities, a probability of no direction, a probability of background, a divergence value, etc.) for each pixel, and the one or more values are converted to an edge weight between adjacent pixels using an affinity equation as described in more detail below. In some embodiments, the one or more directional probabilities for each pixel include at least two dimensions where each dimension has an amplitude, for example, an x-directional probability and a y-directional probability. In some embodiments, the directional probability also includes a z-directional probability. In various embodiments, the amplitude for each dimension is on a range of −1 to +1 (where negative indicates the negative direction and positive indicates the positive direction). An alternative method of representing the directional probabilities is to assign an amplitude on a range of 0 to +1 for each of the four directions (+x, −x, +y, −y). In some embodiments, an absolute value is determined for each amplitude. In some embodiments, the amplitude for each dimension is on a range of 0 to +1. In various embodiments, the probabilities provided by the pixel classification model (e.g., pixel classification portion of a Ridgepath model) sum up to 1 in each direction (i.e., each direction is a separate classification task in the pixel classification model). For example, a pixel may be classified as having the following directional probabilities in the x-direction: +x probability of 0.7, −x probability of 0.1, x-stay probability of 0.1, and a background probability of 0.1. Notably, the edge weights are determined from the values at each pixel, including directional probabilities, probabilities of no motion (stay probabilities), probability of being a background pixel, and/or a divergence value. (e.g., values determined as the classification output from a Ridgepath model as described above) and are not based on any intensity value of the pixel(s) or any color of the pixel(s).

In various embodiments, edges 2324 between two background nodes are set as a small value on a 0 (representing a low conductivity) to 1 range (representing a high conductivity). For example, the value may be less than 0.1, less than 0.01, or less than 0.001. In various embodiments, edges 2324 between two background pixels/nodes are assigned values of zero. In various embodiments, based on the output of the pixel classification model, weights of edges near a source (i.e., a segmented nucleus) will be higher on the 0 to +1 range and generally should decrease, or approach zero, between pixels when approaching an edge (e.g., a cell membrane) or pixels classified as background. In various embodiments, edge weights can be engineered to provide better segmentation results. For example, edge weights near background pixels (either between a background pixel and an unlabeled pixel or between two unlabelled pixels that are in close proximity to background pixels) can be assigned low weight values (e.g., less than 0.1, less than 0.01, etc.). In various embodiments, edges 2324 connecting a background node and an unlabeled node are set as a small value on a 0 (representing a low conductivity) to 1 range (representing a high conductivity). For example, the value applied to edges 2324 connecting background nodes and unlabeled nodes may be less than 0.1, less than 0.01, or less than 0.001. In various embodiments, edges 2324 connecting background nodes and unlabeled nodes are assigned values of zero.

Figure 23A:
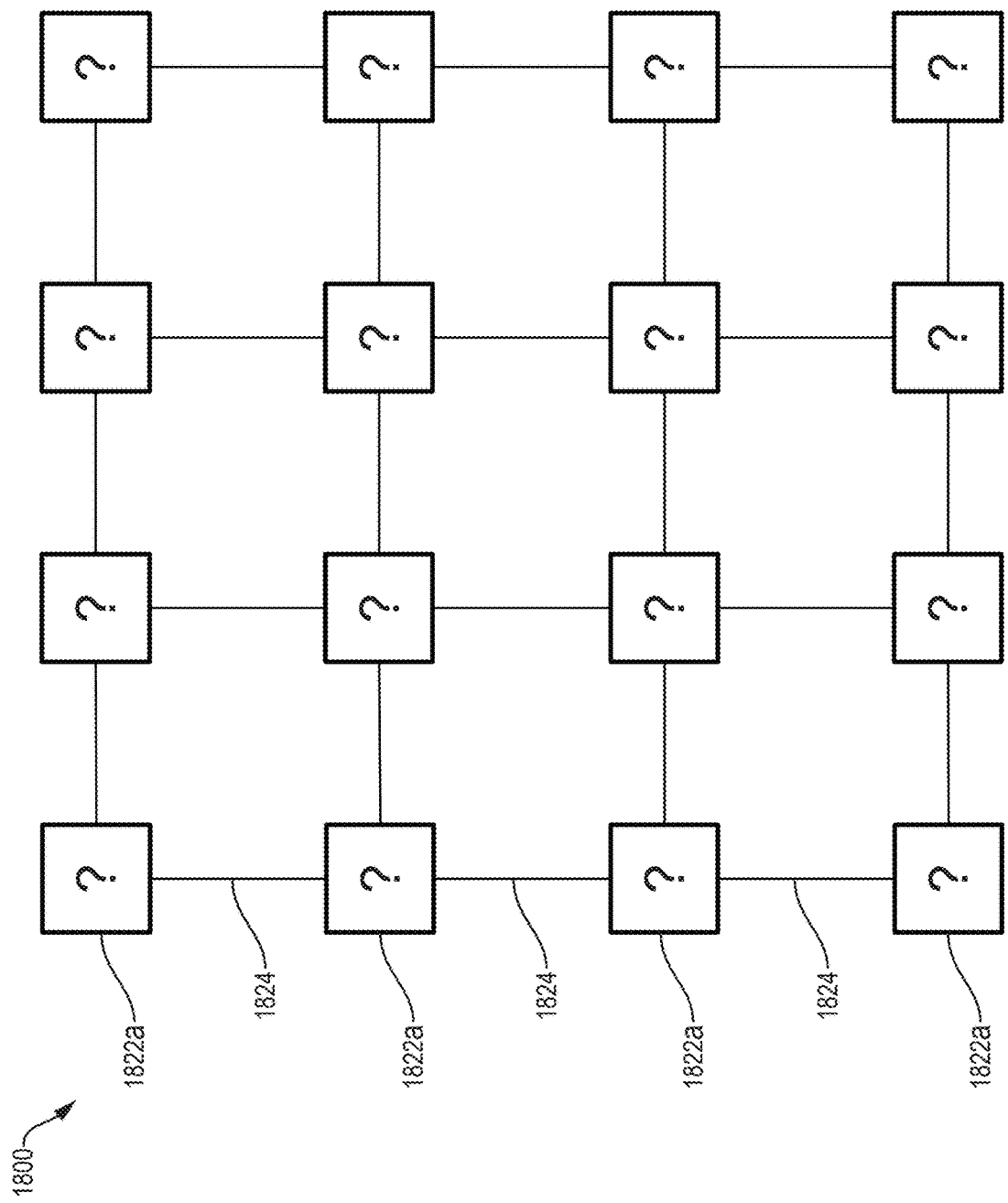
Figure 23B:
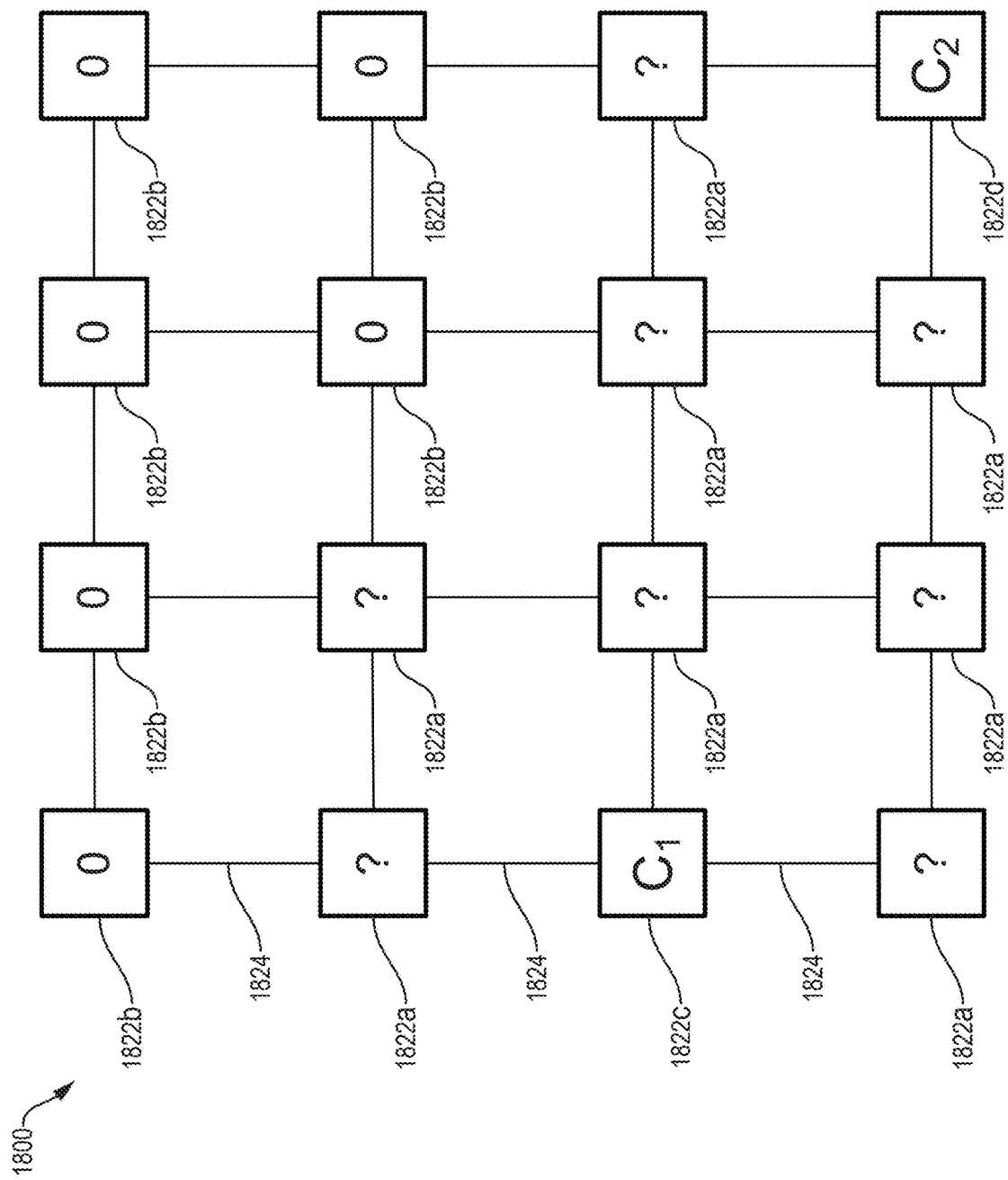

FIG. 23A is a diagram illustrating construction of a graph 2300 with nodes 2322a representing the pixels in an image and edges 2324 between pixels. As shown in FIG. 23A, in various embodiments, the graph 2300 includes a node 2322a for each pixel and edges 2324 connecting each pair of adjacent nodes 2322a. As shown in FIG. 23B, in various embodiments, when constructing the graph 2300, one or more nodes 2322a corresponding to one or more pixels are labelled based on image data provided to the model. In various embodiments, the image data includes a background segmentation mask and the background segmentation mask is used to determine nodes 2322b associated with a background of the image (e.g., pixels that do not contain any cellular features). In various embodiments, the nodes 2322b represent pixels from a boundary-segmented cell. In various embodiments, the nodes 2322b associated with the background are assigned a value of 0 as a boundary condition, representing a heat sink. In various embodiments, the image data includes a nuclear segmentation mask used to determine nodes 2322c, 2322d associated with one or more segmented nuclei. For example, node 2322c is associated with a first nucleus and node 2322d is associated with a second nucleus. In various embodiments, the image data includes a boundary segmentation mask used to determine nodes representing pixels associated with cells segmented using cellular boundary stains. In various embodiments, because the cells segmented with boundary stains are highest confidence cell boundaries, the nodes representing pixels associated with these segmented cells are associated with background, and accordingly the nodes are assigned boundary values of 0 representing heat sinks.

Figure 23C:
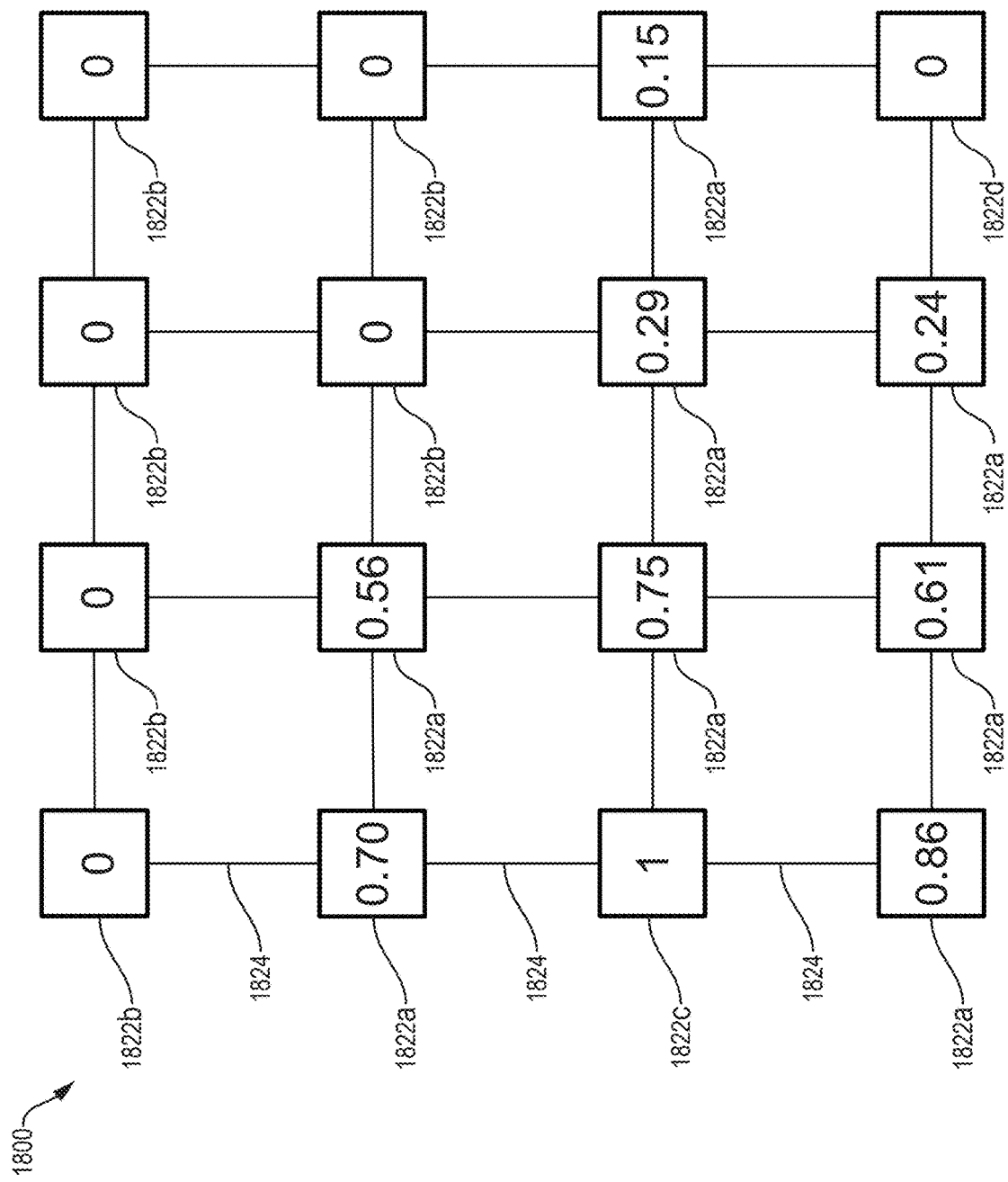

FIGS. 23C and 23D are diagrams of a graph 2300, each respective diagram illustrating node values (i.e., of unlabeled pixels) that are determined by solving the Dirichlet problem with one labeled seed node 2322c-2322d set to 1 while the other labeled seed nodes 2322c-2322d are set to 0. In FIG. 23C, nodes 2322c-2322d are illustrated where C1 is set to 1 and C2 is set to 0. In FIG. 23D, nodes 2322c-2322d are illustrated where C2 is set to 1 and C1 is set to 0.

Figure 23E:
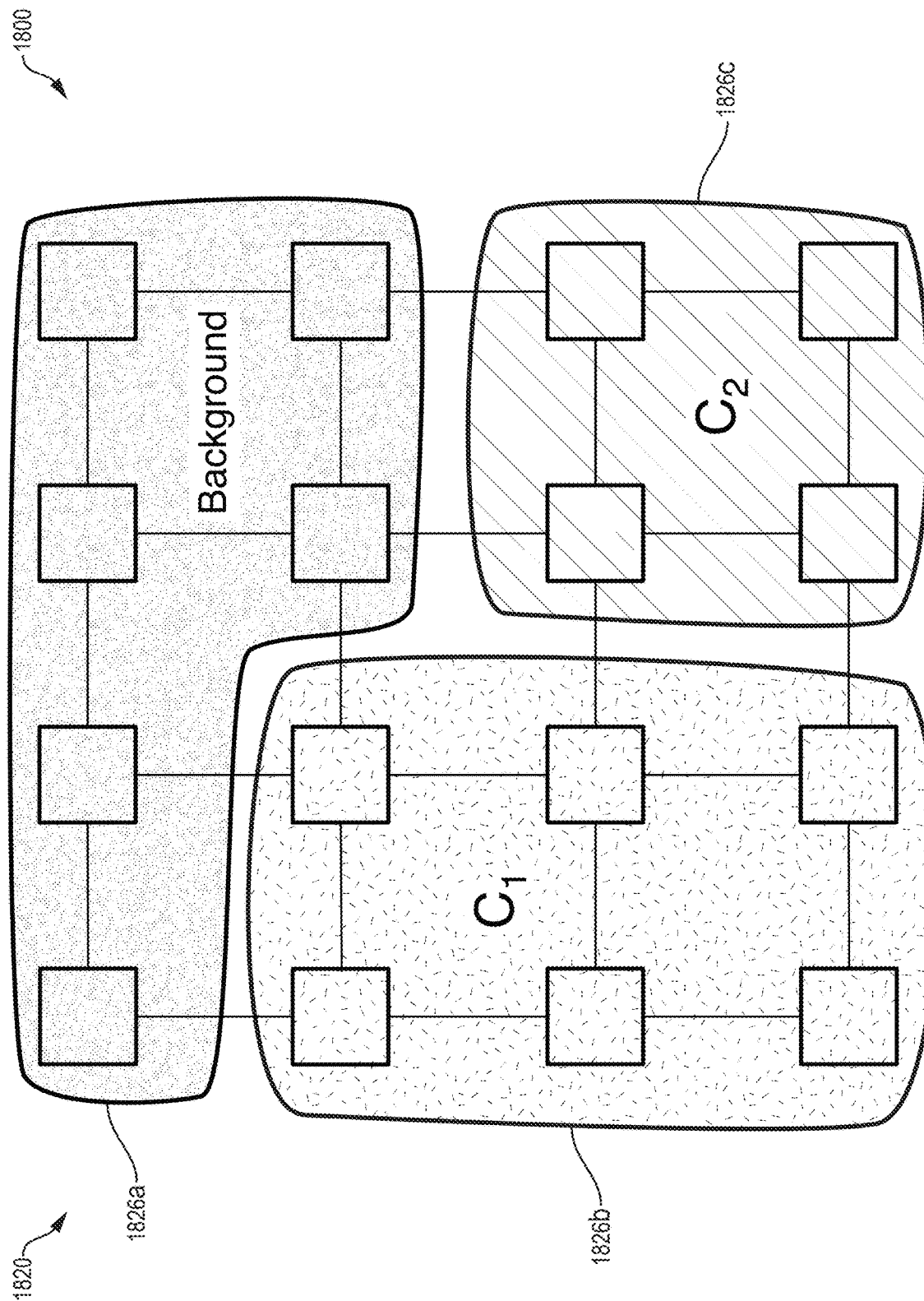

FIG. 23E illustrates an exemplary graph 2300 with the resulting heat-diffusion based segmentation 2320 of the unlabeled nodes 2322a. As shown in FIG. 23E, the background nodes 2322b are segmented as background 2326a and unlabeled nodes having the highest temperature values given the seed node as heat source are labeled to that seed node. In the example shown in FIG. 23E, a first subset of unlabeled nodes 2322a (including seed node 2322c) are segmented as a first cell 2326b and a second subset of unlabeled nodes 2322a (including seed node 2322d) are segmented as a second cell 2326c.

In various embodiments, portions of an interior stain represented by the unlabeled nodes are assigned as background for segmentation purposes. In various embodiments, during the process of determining the maximum temperature at each unlabeled node by modeling one or more seeds (e.g., nuclei) as a heat source, the unlabeled nodes are also considered for a label of background by modeling heat diffusion using the initially-set background as a heat source. In various embodiments, the initially-set background nodes 2322b are represented as a heat source and assigned a value of 1 for the boundary condition while at least some (e.g., all) nuclei are represented as heat sinks and assigned a boundary condition of 0. In various embodiments, temperatures are determined for each unlabeled node given the initially-set background nodes as the heat source. In various embodiments, an unlabeled node is subsequently assigned a label of background when the highest temperature value of that node (e.g., argmax) occurs from the background being used as the heat source (compared to the node values obtained by using nuclei C1, C2 as heat sources). That is, an unlabeled node can be assigned a label of a cell (e.g., C1, C2) or background because the heat diffusion model computes heat diffusion from each possible heat source (e.g., a cell nucleus to be expanded using an interior bounded expansion or a background to be expanded) to one or more heat sinks. FIG. 23F is a diagram of a graph 2300 illustrating node values (i.e., of unlabeled pixels) that are determined by solving the Dirichlet problem with labeled seed nodes 2322c-2322d set to 0 (i.e., heat sink) while the initially-set background nodes 2322b are set to 1 (i.e., heat source).

FIG. 23G is the graph 2300 shown in FIG. 23F with the resulting heat-diffusion based segmentation 2320 of the unlabeled nodes 2322a. As shown in FIG. 23G, the unlabeled nodes having the highest temperature values given the seed node as heat source are labeled to that seed node. Additionally, unlabeled nodes having the highest temperature values given the background as heat source are labeled background (in FIG. 23G, one node has a highest temperature value when the background is the heat source). In the example shown in FIG. 23G, a first subset of unlabeled nodes 2322a (including seed node 2322c) are segmented as a first cell 2326b (e.g., C1), a second subset of unlabeled nodes 2322a (including seed node 2322d) are segmented as a second cell 2326c (e.g., C2), and the background 2326a has been extended by one node (compared to the background segmentation in FIG. 23E) because the value at that particular node (the unlabeled node 2322a having the value 0.62) was highest when the initially-set background 2322b was used as a heat source.

As explained above, the node values (i.e., unlabeled pixels) are determined by finding a harmonic function that solves the Dirichlet problem, which obtains a segmentation based on the maximum value for each node. For example, the node above C1 is given the C1 label because the node value is highest (i.e., 0.70) when computing the heat diffusion to the heat sinks compared to the node values for the heat diffusion at the same node for the other seed C2, (i.e., 0.05) or for the boundary (if the initially-set boundary is used as a heat source).

Figure 24A:
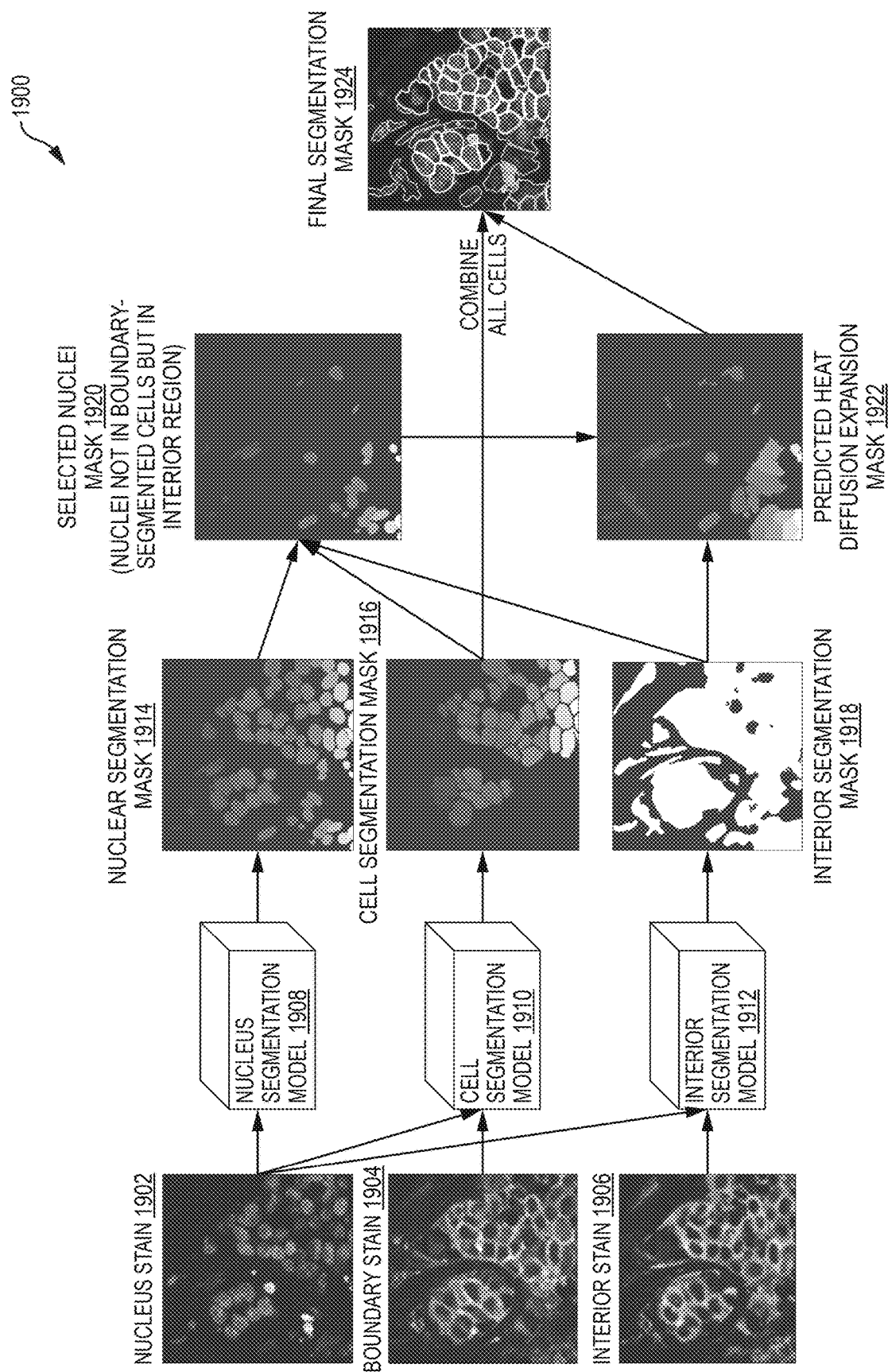
FIG. 24A is a diagram illustrating a method of cell segmentation using multiple stain indicators, according to embodiments of the present disclosure.

FIG. 24A is a diagram 2400 illustrating a method of cell segmentation using multiple stain indicators, according to embodiments of the present disclosure. A nucleus stain image 2402 (e.g., a stained with DAPI (4'6-diamidino-2-phenulindole) or other nucleus identifying stain), at least one boundary stain image 2404 and at least one interior stain image 2406 are obtained by imaging a sample contacted with multiple stains (e.g., nuclear stain, cell boundary stain, interior protein stain, cytoplasmic RNA stain). In various embodiments, a composite image is obtained and is filtered for the respective stain. In various embodiments, each stain includes a different color fluorophore and is imaged separately in its respective color channel. For example, the cellular boundary stain may have a green fluorophore and thus would be imaged in the green color channel of the optofluidic instrument, the cellular interior stain may have a red fluorophore and thus would be imaged in the red color channel of the optofluidic instrument, and the cytoplasmic RNA stain may have a yellow fluorophore and thus would be imaged in the yellow color channel. In various embodiments, the sample being imaged has been treated with a nuclear stain (e.g., DAPI), at least one boundary stain (e.g., CD45, E-cad, ATP1A1), at least one interior protein stain (e.g., alpha SMA, VIM), and at least one cytoplasmic RNA stain (e.g., 18s). In various embodiments, the at least one boundary stain, the at least one cellular interior stain, and the cytoplasmic RNA stain are mixed in a cocktail that is provided as a staining kit. In various embodiments, the images 2402, 2404, and 2406 are obtained through a single imaging cycle where the emissions of each of the one or more stains are imaged in the color channel that excites the respective fluorophores. For example, the DAPI image may be obtained in a first color channel (e.g., using a near ultraviolet illumination channel), the boundary stain image may be obtained in a second color channel, the one or more interior stain images may be obtained using a third (or more)

color channel, and the cytoplasmic RNA stain images may be obtained using a fourth color channel. In various embodiments, the nuclear segmentation mask 2414, cell segmentation mask 2416, and interior segmentation mask 2418 as separate images are combined into a single composite image. In various embodiments, the images 2402, 2404, and 2406 are separated or multiplexed from an original, combined image to isolate the effects (e.g., contrast, intensity, etc.) of the emissions from each respective stain.

In various embodiments, a nucleus segmentation model 2408 receives the nucleus stain image 2408 as input and outputs a cellular nuclear segmentation mask 2414. The cellular nuclear segmentation mask 2414 represents or identifies the cellular nuclei in the image as provided by the nucleus stain (e.g., DAPI).

In various embodiments, a cell segmentation model 2410 receives the boundary stain image 2404 as input. In various embodiments, the cell segmentation model 2410 receives the cellular nucleus stain image 2402 as input. The cell segmentation model identifies cells in the image based on the boundary stain image 2404 and, optionally, the cellular nucleus stain image 2402. In various embodiments, the cell segmentation model 2410 outputs a cell segmentation mask 2416 that represents cells in the image as identified by the model. It will be appreciated that, in other embodiments, the cell segmentation model 2410 is configured to generate the cell segmentation mask 2416 based on a boundary-stained image, an unstained image, or any combination of stained images. It will also be appreciated that any given instance of the cell segmentation model 2410 may not detect every cell in an image (e.g., due to the stain not staining every cell membrane which would cause the membrane not to fluoresce in the image and also not be segmented by the model), accordingly, aligning the nuclear segmentation mask 2414 and the cell segmentation mask 2416 may reveal a plurality of nuclei without identified cells. In various embodiments, the cell segmentation mask 2416 has at least some identified cells that correspond to one or more nuclei (e.g., a set of corresponding nuclei) in the nuclear segmentation mask. In various embodiments, each identified cell in the cell segmentation mask does not need an associated nucleus from the nuclear segmentation mask, as the boundary stain effectively identifies cells (and cell boundaries) with high accuracy. In various embodiments, because this set of corresponding nuclei are associated with an identified cell, the corresponding nuclei can be ignored or removed from the nuclear segmentation mask for future operations, such as interior stain-bounded expansion or isometric expansion. In various embodiments, nuclei identified in the nuclear segmentation mask 2414 that overlap the cell segmentation mask 2416 by a predetermined threshold are ignored or removed from the nuclear segmentation mask (see selected nuclei mask 2420 described below).

In various embodiments, the predetermined threshold is about 25%. In various embodiments, the predetermined threshold is about 30%. In various embodiments, the predetermined threshold is about 35%. In various embodiments, the predetermined threshold is about 40%. In various embodiments, the predetermined threshold is about 45%. In various embodiments, the predetermined threshold is about 50%. In various embodiments, the predetermined threshold is about 55%. In various embodiments, the predetermined threshold is about 60%. In various embodiments, the predetermined threshold is about 65%. In various embodiments, the predetermined threshold is about 70%. In various embodiments, the predetermined threshold is about 75%. In various embodiments, the predetermined threshold is about 80%. In various embodiments, the predetermined threshold is about 85%. In various embodiments, the predetermined threshold is about 90%. In various embodiments, the predetermined threshold is about 95%. In various embodiments, the predetermined threshold is about 25% to about 100%. In various embodiments, the predetermined threshold is about 30% to about 100%. In various embodiments, the predetermined threshold is about 35% to about 100%. In various embodiments, the predetermined threshold is about 40% to about 100%. In various embodiments, the predetermined threshold is about 45% to about 100%. In various embodiments, the predetermined threshold is about 50% to about 100%. In various embodiments, the predetermined threshold is about 55% to about 100%. In various embodiments, the predetermined threshold is about 60% to about 100%. In various embodiments, the predetermined threshold is about 65% to about 100%. In various embodiments, the predetermined threshold is about 70% to about 100%. In various embodiments, the predetermined threshold is about 75% to about 100%. In various embodiments, the predetermined threshold is about 80% to about 100%. In various embodiments, the predetermined threshold is about 85% to about 100%. In various embodiments, the predetermined threshold is about 90% to about 100%. In various embodiments, the predetermined threshold is about 95% to about 100%.

In various embodiments, an interior segmentation model 2412 receives the interior stain image 2406 as input. In various embodiments, the interior segmentation model 2412 receives the nucleus stain image 2402 as input. The interior segmentation model 2412 identifies portions of the image stained with a cellular interior stain. The interior segmentation model 2412 outputs an interior segmentation mask 2418 that represents or identifies portions of the image stained with the cellular interior stain. In various embodiments, any suitable number of interior stain images (e.g., two, three, four, five, six, seven, eight, nine, ten, etc.) can be segmented individually by the interior segmentation model 2412 to thereby generate an interior segmentation mask for each interior stain image. It will be appreciated that in other embodiments, interior segmentation model 2412 is configured to generate interior segmentation mask 2418 based on an interior stained image, an unstained image, or any combination of stained images. In various embodiments, the nucleus segmentation model 2408, the cell segmentation model 2410, and the interior segmentation model 2412 are the same type of model. In various embodiments, the nucleus segmentation model 2408, the cell segmentation model 2410, and the interior segmentation model 2412 are trained on the same training data set.

In some embodiments, a selected nuclei mask 2420 is generated from one or more of the nuclear segmentation mask 2414, cell segmentation mask 2416, and interior segmentation mask 2418. For example, the selected nuclei mask 2420 represents nuclei identified in the nuclear segmentation mask 2414 that do not overlap with called cells in the cell segmentation mask 2416. In various embodiments, the nuclei that overlap with called cells in the cell segmentation mask 2416 by at least a predetermined threshold can be ignored or removed from the nuclear segmentation mask 2414 for future operations, such as interior stain-bounded expansion or isometric expansion.

In various embodiments, the nuclear segmentation mask 2414, the cell segmentation mask 2416, and the interior segmentation mask 2418 are used to select nuclei of the nuclear segmentation mask 2414 that are within the regions identified by the interior segmentation mask 2418 but are not in the cell segmentation mask 2416. This operation can be represented as:

$$S=(N-C)\cap I$$

where S is the selected nuclei mask 2420, N is the nuclear segmentation mask 2414, C is the cell segmentation mask 2416, and/is the interior segmentation mask 2418. The selected nuclei mask 2420 thus identifies nuclei that appear in regions identified by the interior stain but are not already associated with an identified cell.

In some embodiments, a predicted heat diffusion expansion mask 2422 (e.g., interior cell stain-bounded nuclear expansion) is generated based on the selected nuclei mask 2420 or, in some embodiments, the nuclear segmentation mask 2414. In some embodiments, the selected nuclei mask 2420 identifies nuclei within an interior region identified by the interior segmentation mask 2418 but not within a boundary-segmented cell region identified by the cell segmentation mask 2416. A predicted heat diffusion expansion mask 2422 is generated by a heat diffusion nuclear expansion method based on at least the selected nuclei mask 2420. In some embodiments, the heat diffusion nuclear expansion method is based on the interior segmentation mask 2418. For example, the heat diffusion model may be defined such that heat conducts from a heat sink and only through pixels labelled by the interior segmentation mask 2418, thereby expanding nuclei only within pixel regions defined by the interior segmentation mask 2418.

In some embodiments, the heat diffusion nuclear expansion method determines amplitudes for each pixel in an image of the nucleus stain 2402, boundary stain 2404, or interior stain 2406. The heat diffusion nuclear expansion method constructs a graph having nodes and edges, as described with respect to FIGS. 23A-23E. Each of the nodes corresponds with one of the pixels of the image. Nodes corresponding to neighboring pixels in the image are connected by one of the edges. Weights are assigned to each edge based on amplitudes of the pixels corresponding to the nodes connected thereby. The heat diffusion nuclear expansion method then determines, based on the graph, and for each of the cellular nuclei identified by the selected nuclei mask 2420, a heat map corresponding to a predicted cell region associated with that cellular nucleus. Based on the heat maps, the heat diffusion nuclear expansion method provides a predicted heat diffusion expansion mask 2422 (e.g., a cellular segmentation mask) comprising the predicted cellular region.

A person of ordinary skill in the art can recognize that a similar method can be used with the nuclear segmentation mask 2414 instead of the selected nuclei mask 2420.

In various embodiments, the predetermined threshold is about 25%. In various embodiments, the predetermined threshold is about 30%. In various embodiments, the predetermined threshold is about 35%. In various embodiments, the predetermined threshold is about 40%. In various embodiments, the predetermined threshold is about 45%. In various embodiments, the predetermined threshold is about 50%. In various embodiments, the predetermined threshold is about 55%. In various embodiments, the predetermined threshold is about 60%. In various embodiments, the predetermined threshold is about 65%. In various embodiments, the predetermined threshold is about 70%. In various embodiments, the predetermined threshold is about 75%. In various embodiments, the predetermined threshold is about 80%. In various embodiments, the predetermined threshold is about 85%. In various embodiments, the predetermined threshold is about 90%. In various embodiments, the predetermined threshold is about 95%. In various embodiments, the predetermined threshold is about 25% to about 100%. In various embodiments, the predetermined threshold is about 30% to about 100%. In various embodiments, the predetermined threshold is about 35% to about 100%. In various embodiments, the predetermined threshold is about 40% to about 100%. In various embodiments, the predetermined threshold is about 45% to about 100%. In various embodiments, the predetermined threshold is about 50% to about 100%. In various embodiments, the predetermined threshold is about 55% to about 100%. In various embodiments, the predetermined threshold is about 60% to about 100%. In various embodiments, the predetermined threshold is about 65% to about 100%. In various embodiments, the predetermined threshold is about 70% to about 100%. In various embodiments, the predetermined threshold is about 75% to about 100%. In various embodiments, the predetermined threshold is about 80% to about 100%. In various embodiments, the predetermined threshold is about 85% to about 100%. In various embodiments, the predetermined threshold is about 90% to about 100%. In various embodiments, the predetermined threshold is about 95% to about 100%.

In some embodiments, remaining nuclei that are not within any region of the interior segmentation mask 2418 can be expanded to identify cells using a predetermined expansion model. In some embodiments, the predetermined expansion model is an isometric expansion model applied to these remaining, unexpanded nuclei. In some embodiments, the isometric expansion model expands each nucleus by a predetermined distance. In various embodiments, the predetermined distance is about 5 μm to about 30 μm. In various embodiments, the predetermined distance is about 10 μm to about 20 μm. In various embodiments, the predetermined distance is about 15 μm. In various embodiments, the predetermined distance is about 15 μm, about 14 μm, about 13 μm, about 12 μm, about 11 μm, about 10 μm, about 9 μm, about 8 μm, about 7 μm, about 6 μm, or about 5 μm. In various embodiments, the isometric expansion model expands each remaining nucleus simultaneously. In various embodiments, the isometric expansion model expands each nucleus until either the predetermined distance (e.g., 15 μm) or until the expanded cell boundary resulting from expanding the nucleus encounters an expanded cell boundary representing another cell.

In some embodiments, the predicted heat diffusion expansion mask 2422 is combined with the cell segmentation mask 2416 (e.g., the union of the predicted cell expansion mask and cell segmentation mask) to produce a final segmentation mask 2424 of all cells identified (e.g., called) by the cell segmentation process 2400. In various embodiments, the predicted heat diffusion expansion mask 2422 is combined with additional predicted cell expansion masks (e.g., from other interior segmentation masks generated by additional interior stain images) to produce a final segmentation mask 2424 of all cells identified by the cell segmentation process 2400.

In some embodiments, the method includes generating the nuclear segmentation mask from portions of the image stained by a cellular nucleus stain (e.g., DAPI). In some embodiments, generating the nuclear segmentation mask comprises providing the image to a trained machine learning model and receiving therefrom a label for each pixel of the image as nucleus or non-nucleus. In some embodiments, generating the nuclear segmentation mask comprises applying a stain intensity threshold to determine a label for each pixel of the image as nucleus or non-nucleus. In some embodiments, the cellular nucleus stain comprises DAPI.

In some embodiments, the method includes generating the cellular segmentation mask from portions of the image stained by a cellular boundary stain. In some embodiments, generating the cellular segmentation mask comprises providing the image to a trained machine learning model. In some embodiments, generating the cellular segmentation mask comprises identifying one or more closed polygons formed by the stained regions.

In some embodiments, the method includes generating the interior segmentation mask from portions of the image stained by a cellular nuclear stain. In some embodiments, generating the interior segmentation mask comprises providing the image to a trained machine learning model and receiving therefrom a label for each pixel of the image as cellular or non-cellular. In some embodiments, generating the interior segmentation mask comprises applying a stain intensity threshold to determine a label for each pixel of the image as cellular or non-cellular. In some embodiments, the cellular nuclear stain comprises DAPI.

In some embodiments, generating the predicted cell regions comprises performing a method according to the methods of FIG. 17.

Figure 24B:
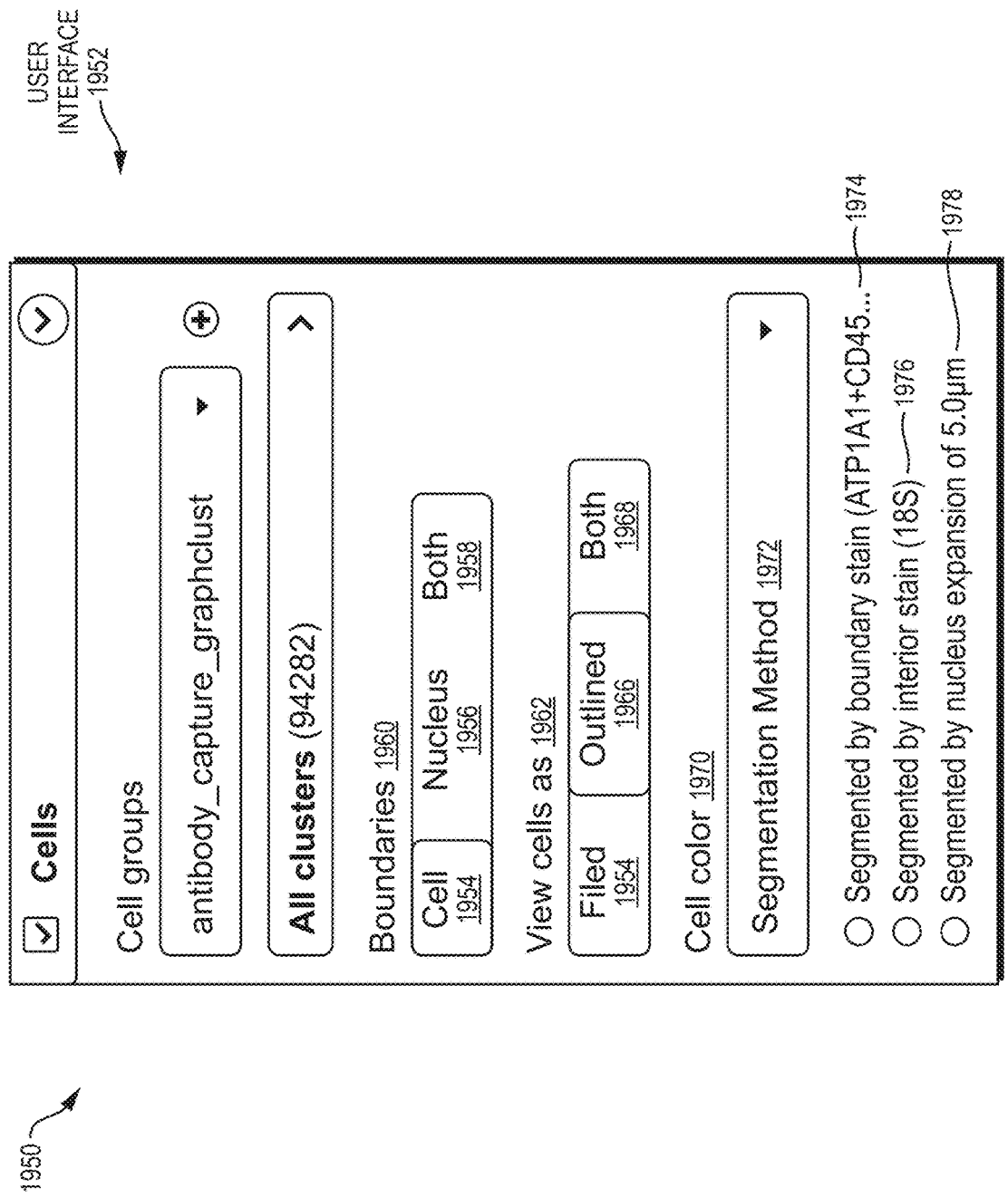
FIG. 24B is a diagram illustrating an example user interface employed by embodiments of the present disclosure.

FIG. 24B is a diagram 2450 illustrating an example user interface 2452 employed by embodiments of the present disclosure. The user interface 2452 illustrates various settings of viewing the cell segmentation method described herein. In some embodiments, the user interface displays a control for a boundary setting 2460 of illustrating cell boundaries 2454, nucleus boundaries 2456, or both 2458. In some embodiments, the user interface 2452 includes a view setting 2462 of illustrating cells as filled 2464, outlined 2466 or both 2468. In some embodiments, user interface 2452 further includes a cell color control 2470 that provides a menu 2472 for cell coloring scheme or cell patterning scheme. For example, a color selector for segmentation method colors cells segmented by cell boundary 2460 with a first color (e.g., pink), colors cells segmented by interior stain-bounded expansion a second color (e.g., green), and colors cells segmented by isometric nucleus expansion. of up to 5 μm a third color (e.g., blue).

Figure 25A:
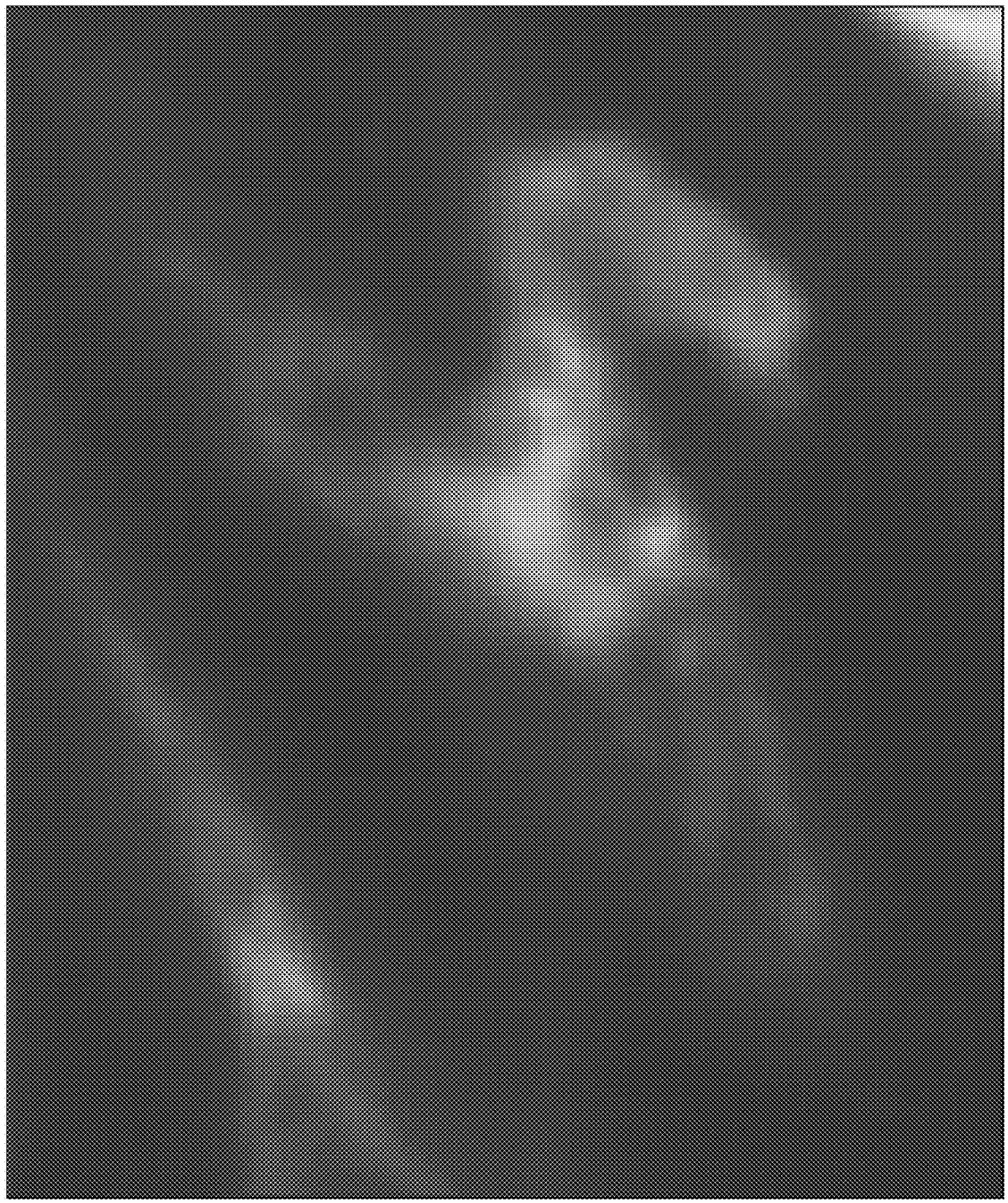
FIGS. 25A-25C are diagrams illustrating an example image and cell segmentation results thereof.
Figure 25B:
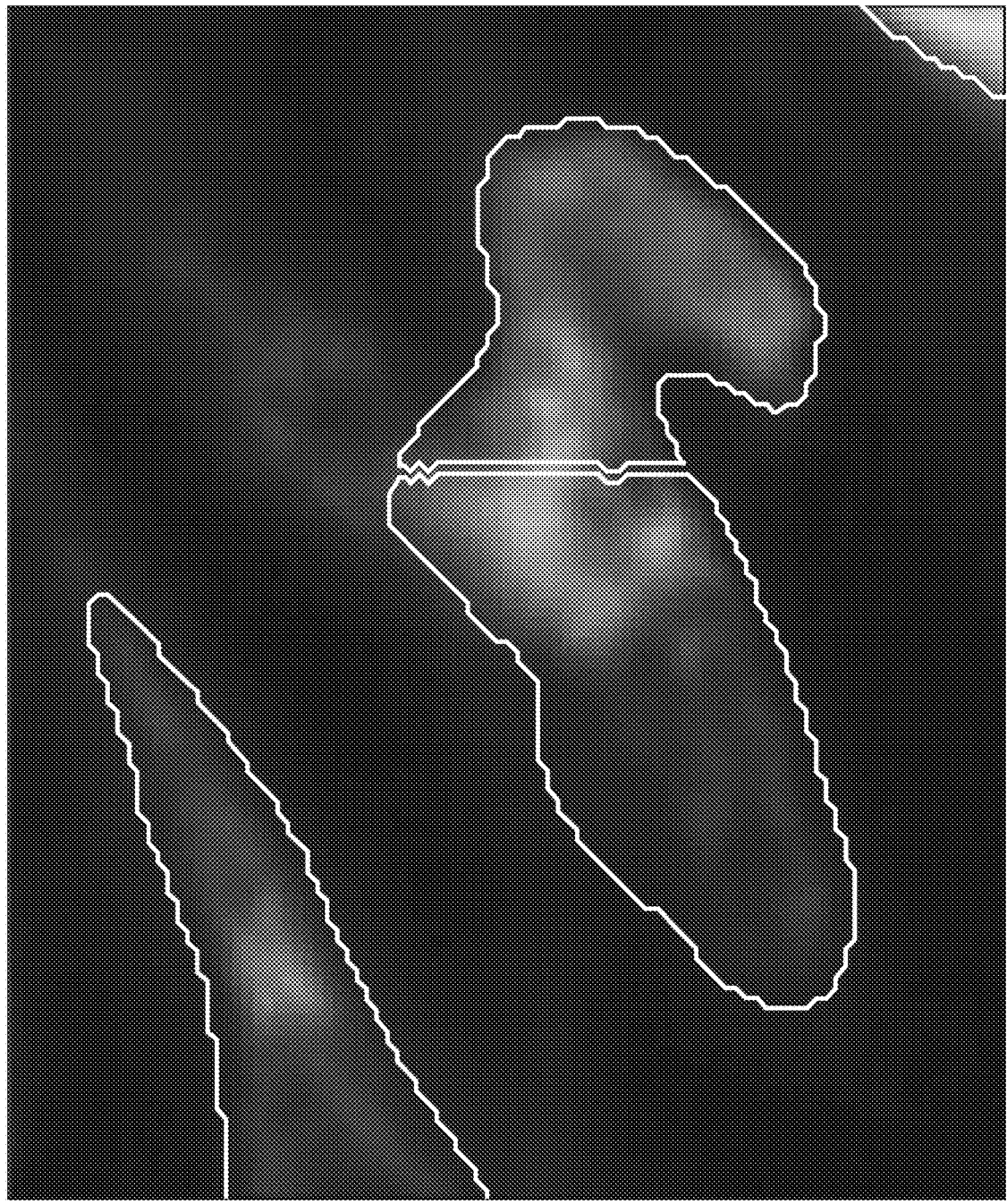
Figure 25C:
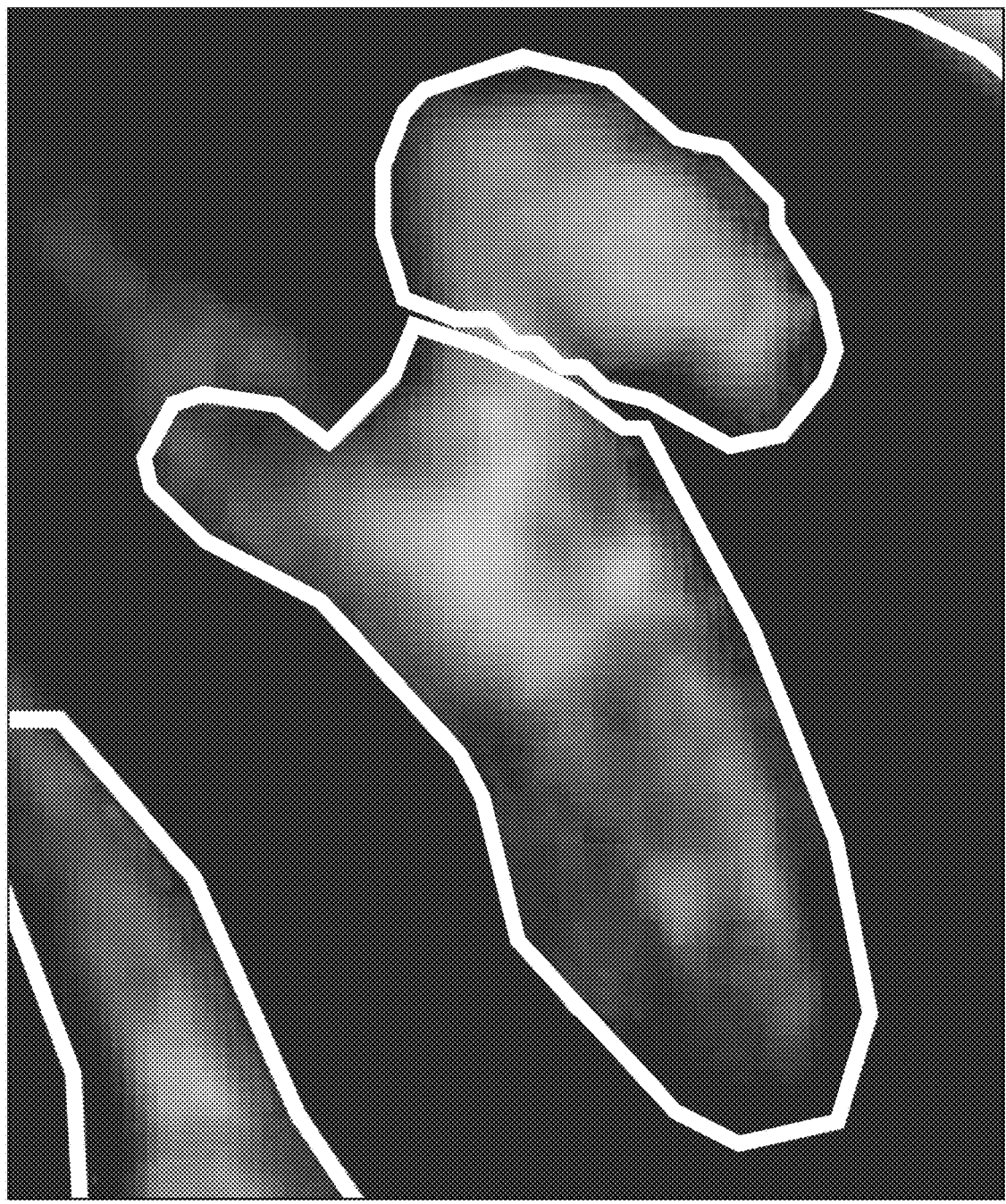

FIGS. 25A-25C are diagrams illustrating an example image and cell segmentation results thereof. FIG. 25A is an image 2500 of one or more cells with at least one stain applied. (e.g., DAPI stained nuclei and interior stained cytoplasm). FIG. 25B is an image 2520 of the one or more cells of FIG. 24A having a cell segmentation boundary determined from the interior-bounded nuclear expansion using a heat diffusion model overlaid thereon. In FIG. 25B, the cell segmentation boundary based on the heat diffusion model is illustrated with the red lines. The cell segmentation illustrated by FIG. 25B is a shape inferred by the interior stain.

However, interior behavior of a cell can vary. depending on the interior-bounded nuclear expansion model applied. FIG. 25C is an image 2540 illustrating an expansion of nuclei in the image illustrated by FIG. 25A using a geodesic model, where the resulting cell segmentation boundary determined by the geodesic model is overlaid thereon. The cell segmentation boundary based on the geodesic expansion model is illustrated with the yellow lines.

In various embodiments, some methods of interior expansion (e.g., geodesic expansion) can be leaky and generate segmentations having strange (e.g., unnatural) cell shapes. Said leakiness is a result of the geodesic expansion being pixel-based, despite using the model to generate the distance function described above. Geodesic expansion can be leaky when models (e.g., the nucleus segmentation model, cell segmentation model, and interior segmentation model described above) do not perform ideally. Geodesic expansion can also create holes and rough boundaries of cells.

FIGS. 26A-26E are diagrams illustrating embodiments of a method of generating a heat map using a heat diffusion-based method that improves on alternative cell segmentation methods. In some embodiments, a steady state heat diffusion method mimics expansion and avoid issues (e.g., leaks) of other nuclear expansion models. The heat diffusion method minimizes the Dirichlet energy on a discrete grid, with a fixed Dirichlet boundary condition. In some embodiments, the Dirichlet boundary condition can be expressed as:

$$D[x] = \frac{1}{2} x^T L x = \frac{1}{2} \sum_{e_{ij} \in E} w_{ij}(x_i - x_j)^2,$$

where x is a potential of a neighboring pixel, and i and j are indices of pixel locations along a dimension.

Figure 26A:
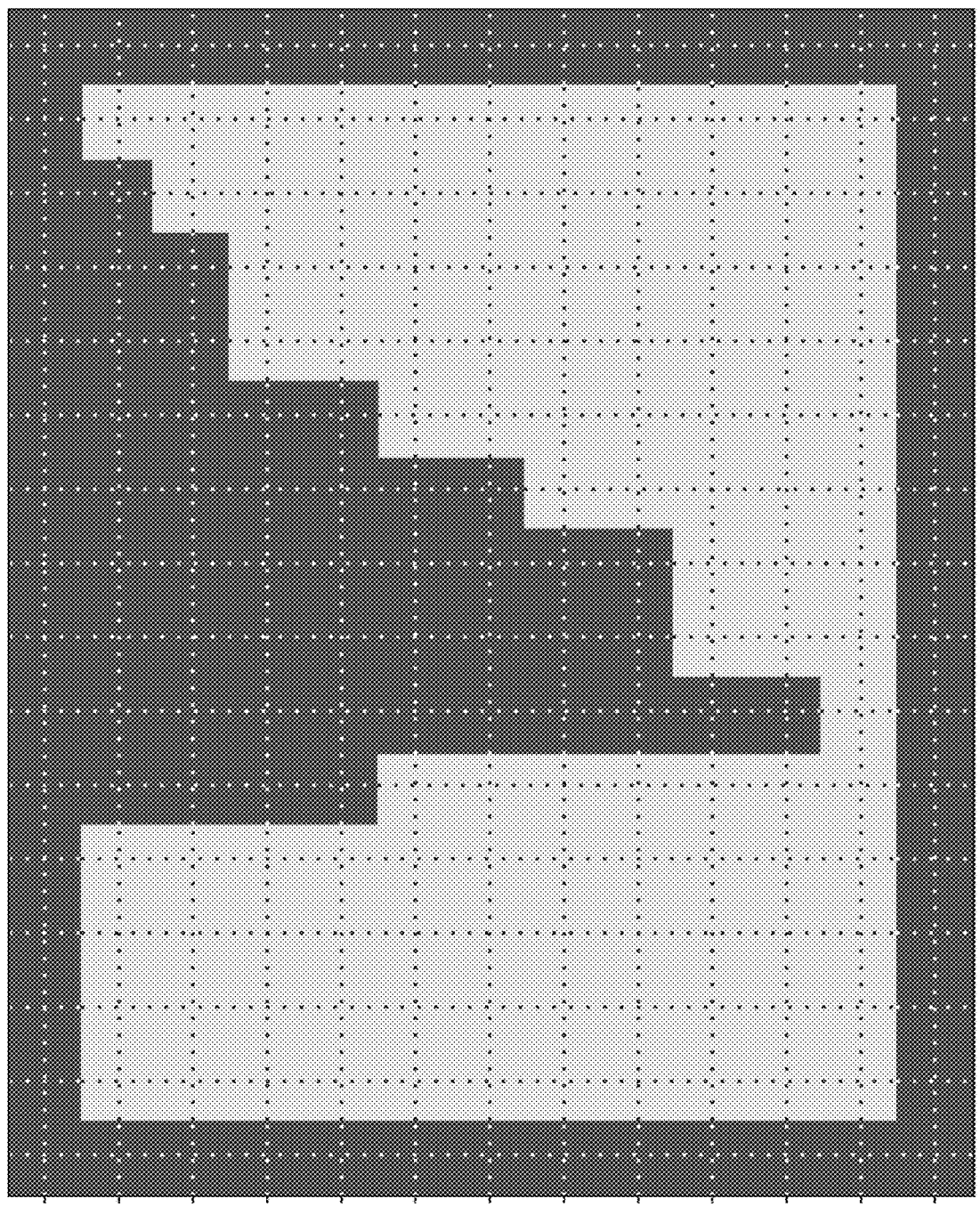

FIG. 26A is a diagram 2600 illustrating an input graph for the heat diffusion-based method. Details of the graph and its generation are discussed in further detail below. In FIG. 26A, the input graph shows a background region (purple) and an unlabeled interior region through which heat will conduct (based on the edge weights between adjacent unlabeled nodes).

Figure 26B:
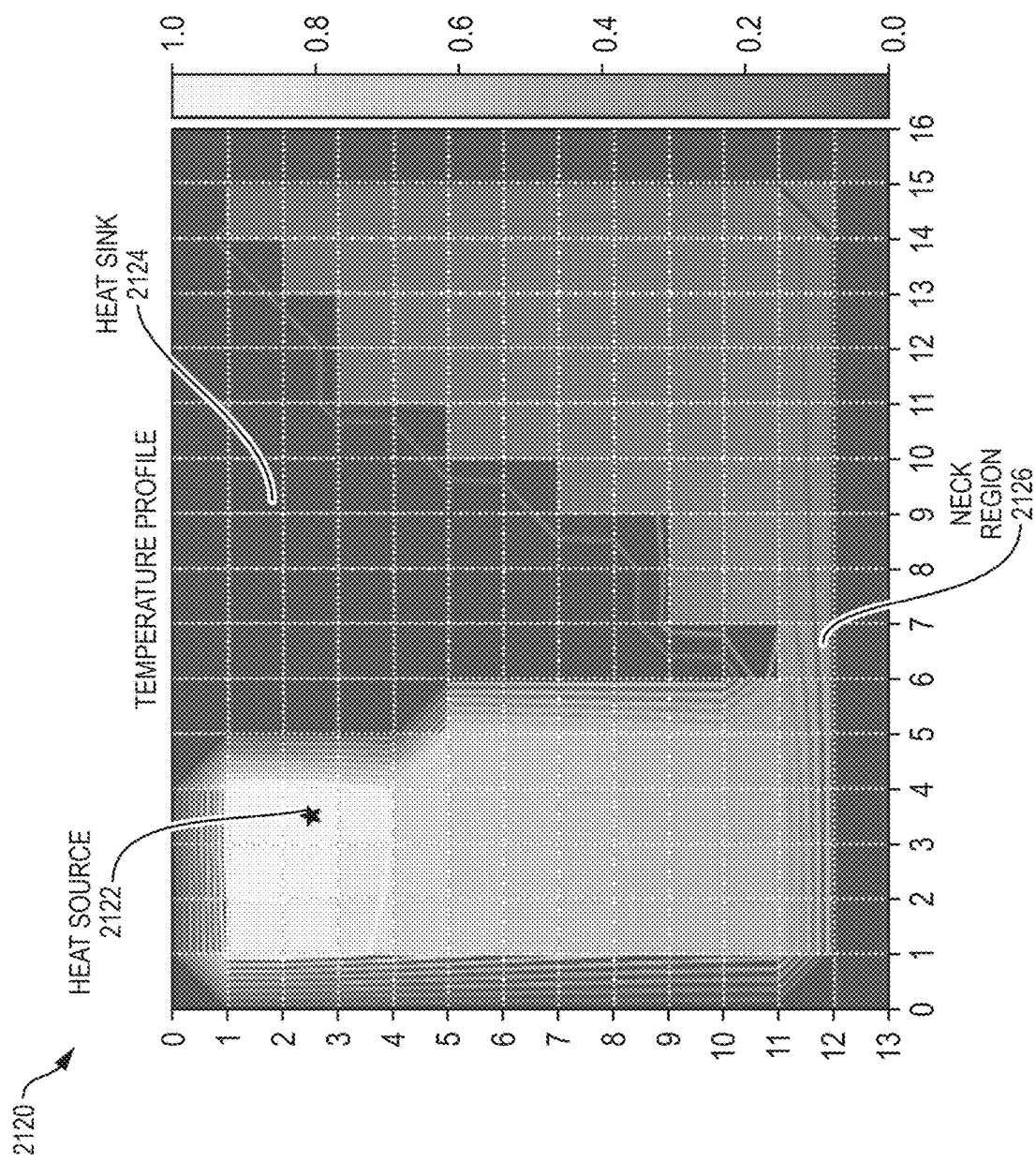
Figure 26C:
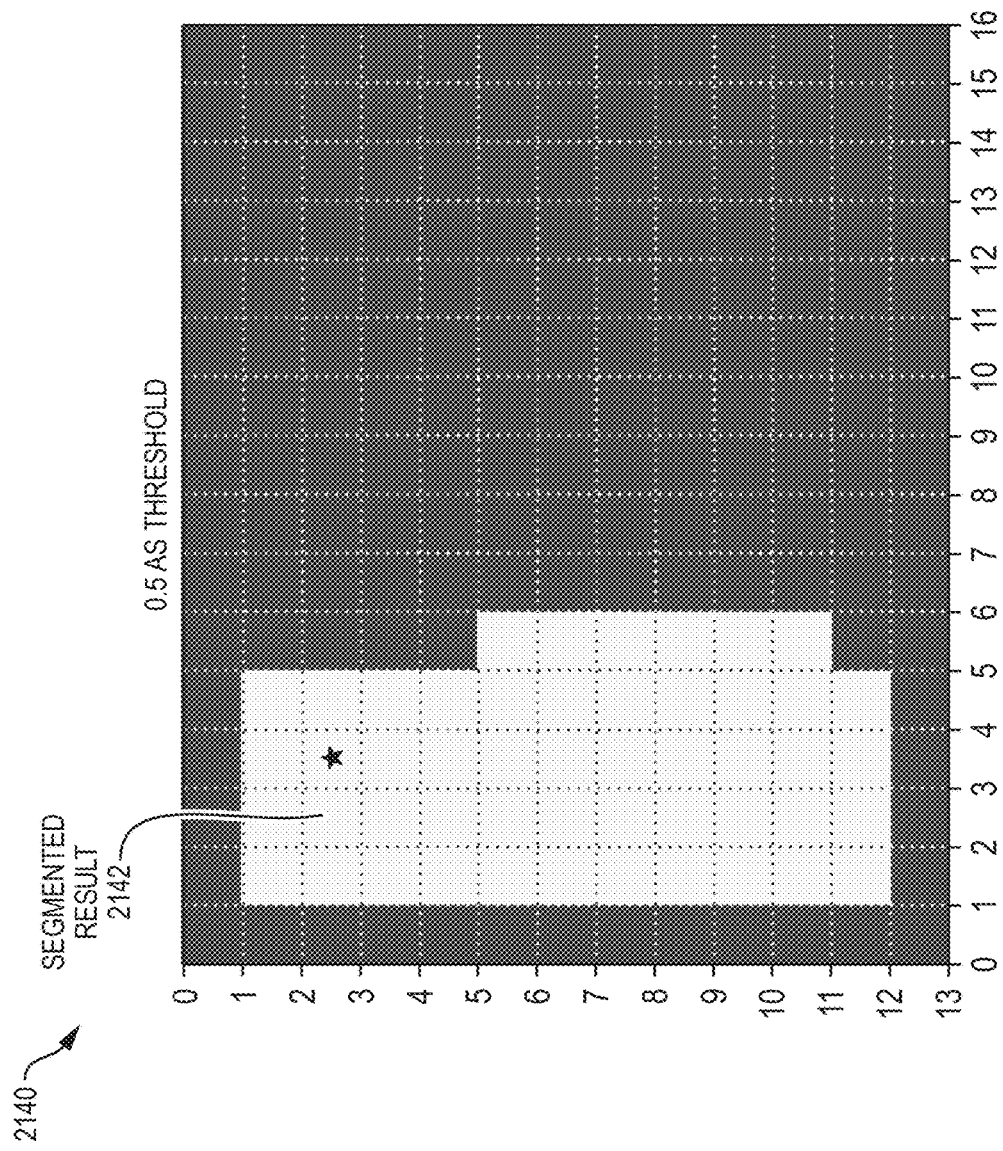

FIG. 26B is a diagram 2620 illustrating an example temperature profile using a location of the red star as a heat source 2622 (e.g., a seed pixel or group of seed pixels) and the purple region (e.g., having a temperature at or about 0) as a background 2624. FIG. 26C is a diagram 2640 illustrating a segmented result 2642 provided by the method using a node value of 0.5 as a threshold. (i.e., nodes having a value of 0.5 or above will be segmented having a label associated with the heat source). In some embodiments, the threshold is 0.20, 0.25, 0.30, 0.35, 0.40, 0.45, 0.50, 0.55, 0.60, 0.65, 0.70, 0.80, 0.85, 0.90. A person of ordinary skill in the art can recognize that the heat map is normalized on a scale of 0 to 1, but that other scales can be used. A person of ordinary skill in the art can recognize that the threshold being used can be any threshold along the normalized scale, and may be adjusted based on, for example, the application.

Figure 26D:
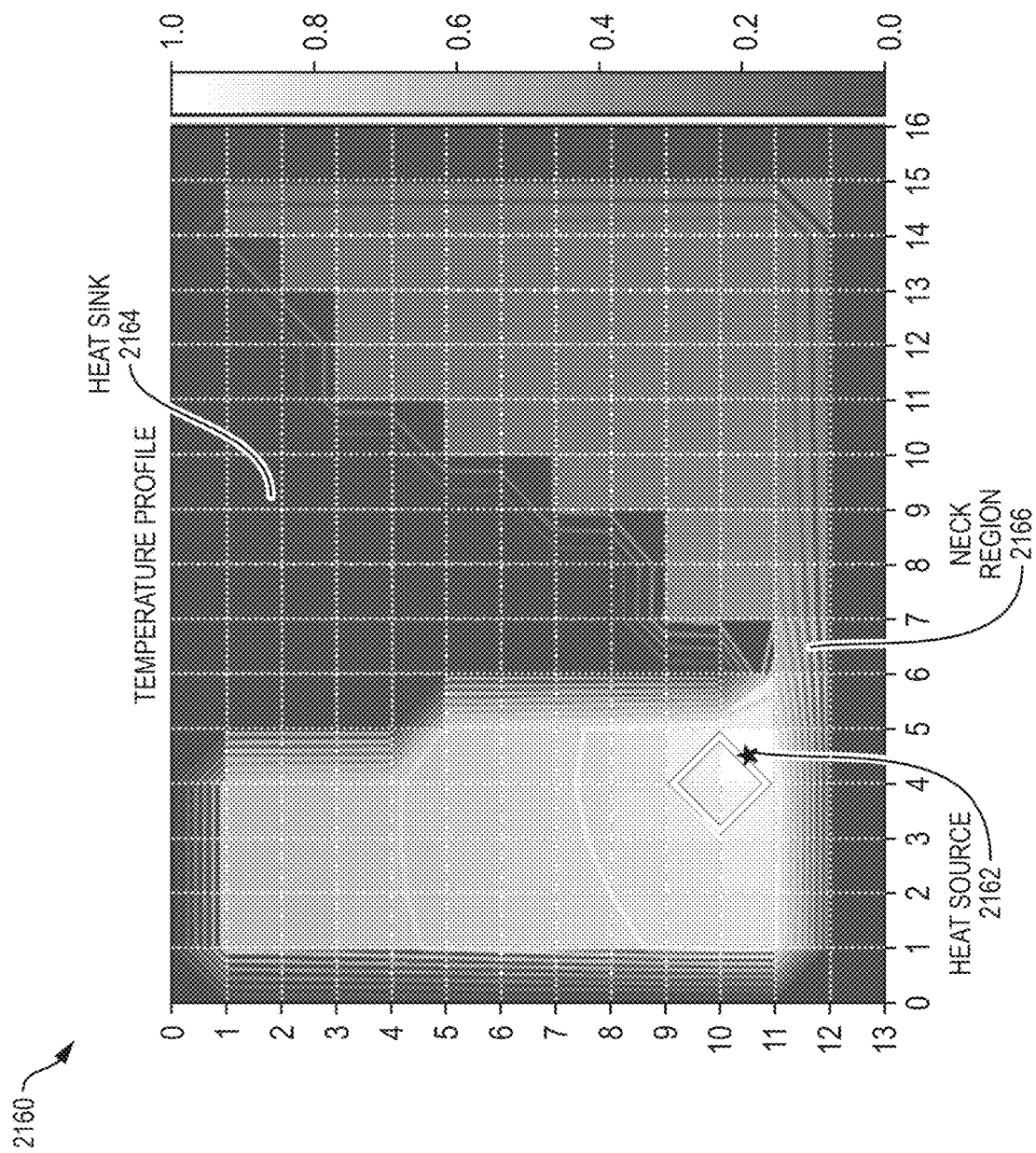

FIG. 26D is a diagram 2660 illustrating an example temperature profile using a location of the red star as a heat source 2662 (e.g., a seed pixel or group of seed pixels) and the purple region (e.g., having a temperature at or about 0) as a background 2664. FIG. 26C is a diagram 2680 illustrating a segmented result 2682 provided by the method using a node value of 0.5 as a threshold. (i.e., nodes having a value of 0.5 or above will be segmented having a label associated with the heat source). In some embodiments, the threshold is 0.20, 0.25, 0.30, 0.35, 0.40, 0.45, 0.50, 0.55, 0.60, 0.65, 0.70, 0.80, 0.85, 0.90. A person of ordinary skill in the art can recognize that the heat map is normalized on a scale of 0 to 1, but that other scales can be used. A person of ordinary skill in the art can recognize that the threshold being used can be any threshold along the normalized scale, and may be adjusted based on, for example, the application.

As shown in FIGS. 26B-26E, when the heat source 2622 is placed far from the neck region 2626, the segmented result 2642 is very similar to the segmented result 2684 provided when the heat source 2662 is placed near the neck region 2666. Thus, the heat diffusion-based segmentation method naturally discourages "leaking" into the right side of the graph, thereby reducing the chance of unnatural segmentation shapes.

In some embodiments, interior-bounded nuclear expansion by heat diffusion provides benefits because interior expansion has seed points, which are each nuclei identified by the nuclei mask. The Ridgepath model, described above, outputs a directional probability of each pixel. These directional probabilities are used to determine edge weights that are used in the heat diffusion graph. Once the graph is built, the method can perform a global optimization by solving a linear system, which does not require iterative optimization.

In some embodiments, the heat diffusion method generates a natural-looking cellular shape. In addition, the heat diffusion method generates a cellular shape that has no holes and no disconnected instances (e.g., is contiguous). In some embodiments, the heat diffusion method provides a more accurate output overall, especially for low quality input images.

Figure 27:
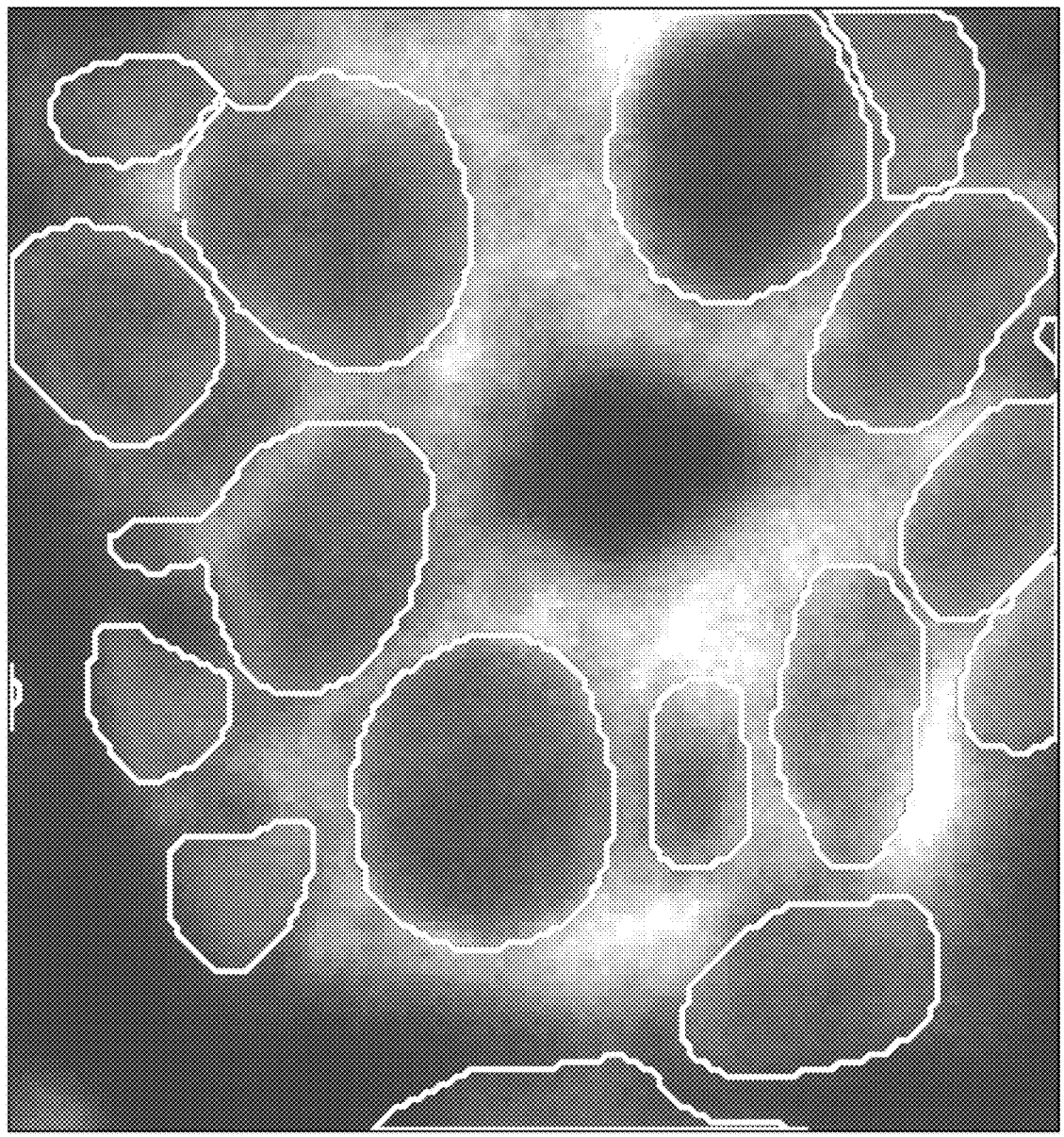
FIG. 27 is an image illustrating an example embodiment having a nuclear segmentation mask (e.g., areas within the red lines).

FIG. 27 is an image 2700 illustrating an example embodiment having a nuclear segmentation mask (e.g., areas within the red lines). defining nuclear boundaries). The method begins with reading the nuclear segmentation mask, where the nuclear segmentation mask identifies cellular nuclei stained with a cellular nucleus stain in the image. For each pixel in the image, the method determines multiple amplitudes for each pixel, each amplitude corresponding to exactly one dimension of the at least two dimensions of the image. The method further includes constructing a graph having nodes and edges. Each node corresponds to a pixel of the image 2700. Nodes corresponding to neighboring pixels are connected by one of the edges. The method further includes assigning a weight to each edge, the weight being based on the amplitudes of the pixels corresponding to the nodes connected thereby. Based on the graph, the method determines, for each cellular nuclei in the nuclear segmentation mask, an array of values (e.g., scalar values from 0 to 1) corresponding to a predicted cell region associated with the cellular nucleus. Such an array of values is referred to as a heat map herein irrespective of whether the array is being displayed. Based on the heat maps of the cellular nuclei, the method determines a cellular segmentation mask comprising the predicted cell regions.

In some embodiments, the edge weights are further based on a sigmoid function of affinity of the application. In some embodiments, the edge weights between two nodes are calculated based on the following relationship:

$$\text{weight} = \frac{1}{1 + e^{-\alpha * \text{affinity}}}$$

In the above relationship, a is a constant. In some embodiments, affinity is calculated by amplitudes of the neighboring pixels represented by the nodes connected by the edge. In other words, the affinity is calculated at least in part based on a direction of motion between a first pixel (target pixel) of the two neighboring pixels and the second pixel of the two neighboring pixels. In some embodiments, where a divergence value is incorporated into the affinity equation, the divergence value represents the flow of pixels around the target pixel and is determined based on a N×N window of pixels centered on the target pixel. Divergence is determined per dimension (e.g., a divergence is determined in x, y, and/or z). In some embodiments, divergence is determined for the first pixel as target pixel (in a particular dimension, e.g., X-direction) and then the second pixel as the target pixel (in a particular dimension, e.g., X-direction), and the two results are summed together for a total divergence in the particular dimension (e.g., X-direction). The divergence can also be determined in the other dimensions, such as the Y-direction and/or the Z-direction. Because divergence represents the flow of pixels around the target pixel, divergence is positive when the N×N window of pixels are flowing towards the target pixel (i.e., the target pixel is a "sink") and divergence is negative when the N×N window of pixels are flowing away from the target pixel (i.e., the target pixel is a "source"). In various embodiments, the N×N window is 3×3 pixels, 5×5 pixels, 7×7 pixels, 9×9 pixels, 11×11 pixels, etc. In various embodiments, divergence can be determined by centering the N×N window on an edge instead of centering on a target pixel. The amplitude in each dimension can be a positive floating point number (representing a positive direction), a negative floating point number (representing a negative direction), or zero (representing no movement along a given dimension). In some embodiments, the probability of a direction along a dimension is determined as a first value (e.g., a first floating point number on a 0 to +1 range) and the probability of no motion is determined a second, separate value (e.g., a second floating point number on a 0 to +1 range). In some embodiments, the affinity value is further based on a divergence value representing a flow of pixels in a window around a target pixel, a probability that the target pixel is a background pixel, or the combination of the two. In some embodiments, the affinity value is based on a probability of a positive direction of motion between two pixels, a probability of no direction of motion between two pixels, a probability of a negative direction of motion between two pixels, a probability that a pixel is background, and a divergence value (e.g., divergence calculated in FIG. 20A). In some embodiments, the affinity is determined from values for all dimensions (e.g., values in x-direction, values in the y direction, etc.). In some embodiments, each probability is a value from about 0 to about +1. In some embodiments, the divergence value is a value from about −1 to about +1. In some embodiments, the divergence value is clipped at zero such that any divergence value below zero is assigned a value of 0. In some embodiments, the divergence value is a value from about 0 to about +1 (e.g., after clipping). In some embodiments, such an affinity calculation is represented as:

affinity=$P$(positive direction of motion)+$P$(no direction of motion)−$P$(negative direction of motion)−$P$(background)−divergence In various embodiments, the affinity represents a relationship between a first pixel (target pixel) and an adjacent second pixel. In various embodiments, the affinity is a combination of a probability of a positive direction of motion for the first and second pixels in the relevant direction of the adjacent pixel (the sum of the directional probabilities of the two pixels pointing towards each other), added to a probability of no direction of motion for the first and second pixels in the relevant direction of the adjacent pixel subtracted by a probability of negative direction of motion for the first and second pixels in the relevant direction of the adjacent pixel (the sum of the directional probabilities of the two pixels pointing away from each other), subtracted by a probability that the first and second pixels are background, subtracted by a divergence value (e.g., representing a net direction of flow of pixels in a N×N window around the target pixel where positive divergence indicates pixels flowing towards the target pixel). In various embodiments, for each dimension As an example, a first pixel may be classified as having the following directional probabilities in the x-direction and the y-direction: +x probability of 0.7, −x probability of 0.1, x-stay probability of 0.1, +y probability of 0.7, −y probability of 0.1, y-stay probability of 0.1, background probability in x is 0.1, and background probability in y is 0.1. A second adjacent pixel (adjacent towards the right side in the x-direction) may be classified as having the following directional probabilities in the x-direction and the y-direction: +x probability of 0.6, −x probability of 0.2, x-stay probability of 0.1, +y probability of 0.7, −y probability of 0.1, y-stay probability of 0.1, background probability in x is 0.1, and background probability in y is 0.1. The probability of being background pixels for both the first and second pixels is summed 0.2 in the X-direction and the summed divergence for the two pixels (for the X-direction) is 0.1. In this example, the affinity for the two pixels is determined as (0.7+0.2)+ (0.1+0.1)−(0.1+0.6)−(0.2)−0.1=0.1. Notably, because the two adjacent pixels are along the X-direction, the probabilities for the positive and negative Y-direction for each pixel, the background probability for the Y-direction for each pixel, and the summed divergence in the Y-direction for both pixels are not factored into the affinity.

FIGS. 28A-28D are diagrams 2800, 2820, 2840, and 2860 illustrating an example embodiment of heat maps. Each respective heat map includes a respective selected nuclei 2802, 2822, 2842, and 2862. as a heat source. In some embodiments, the cellular segmentation map is formed by determining, for each pixel, which heat map has the highest temperature. for each pixel. Each respective pixel is then assigned a label of the selected nuclei 2802, 2822, 2842, and 2806 corresponding to that heat map having the highest temperature for that respective pixel. The cellular segmentation map is thereby formed of the set of these labels for each pixel.

In some embodiments, the method further includes determining which nucleus or background which each pixel belongs to by comparing which source generates the largest temperature for each pixel. In some embodiments, the background can be set as cells identified by a stain other than the identified cellular nuclei. The identified background can be used as a seed for a heat map, which is processed in the same way as the heat maps with selected nuclei, except the weight is set to be small around the background, and the background is a region of prohibition. In other words, the background cannot be expanded into because they are boundary segmented cells. Therefore, in some embodiments, each respective pixel is assigned a label of the selected nuclei 2802, 2822, 2842, and 2806 or background (not shown) corresponding to that heat map having the highest temperature for that respective pixel.

Figure 28A:
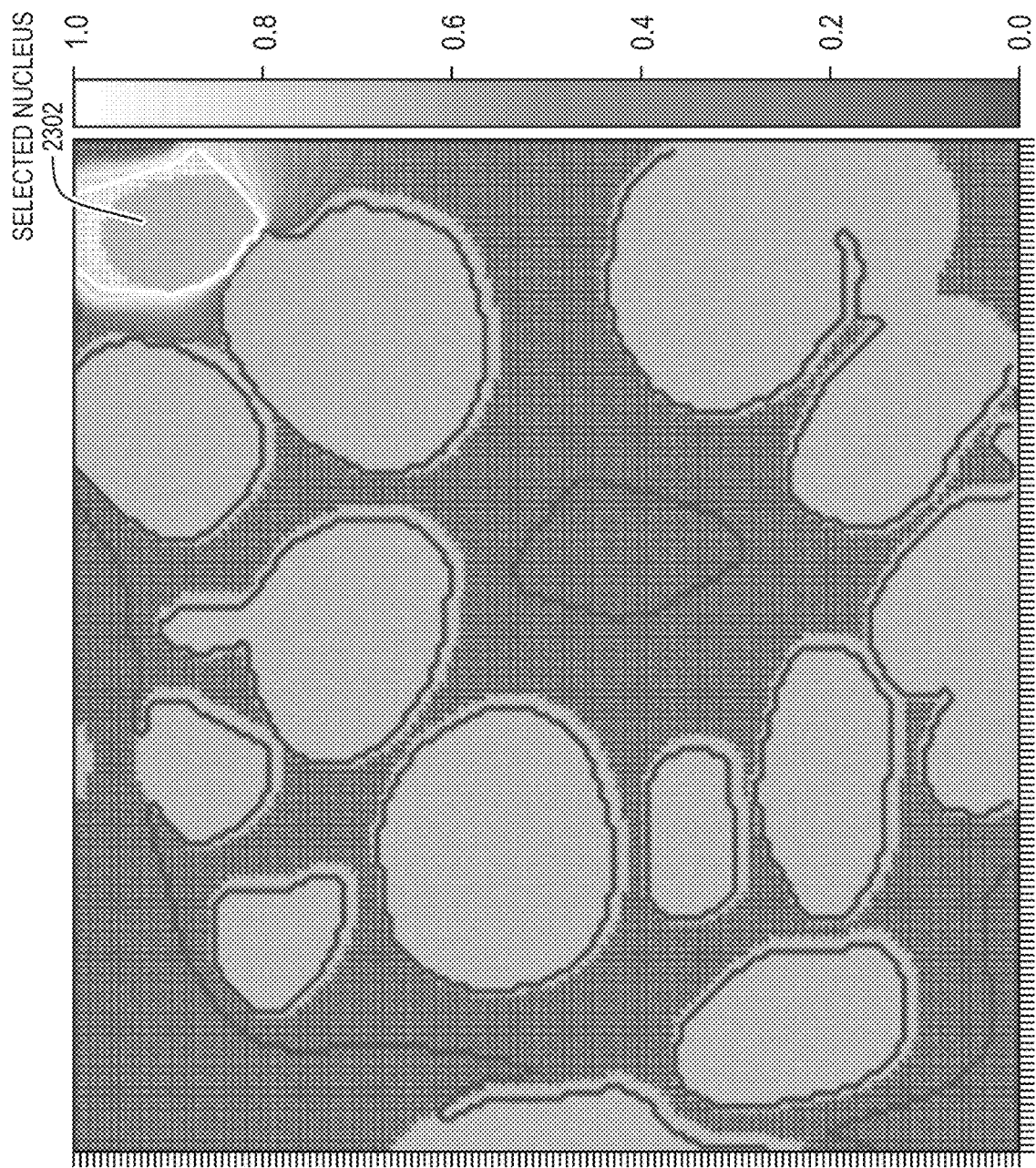
FIGS. 28A-28D are diagrams illustrating an example embodiment of heat maps.
Figure 28B:
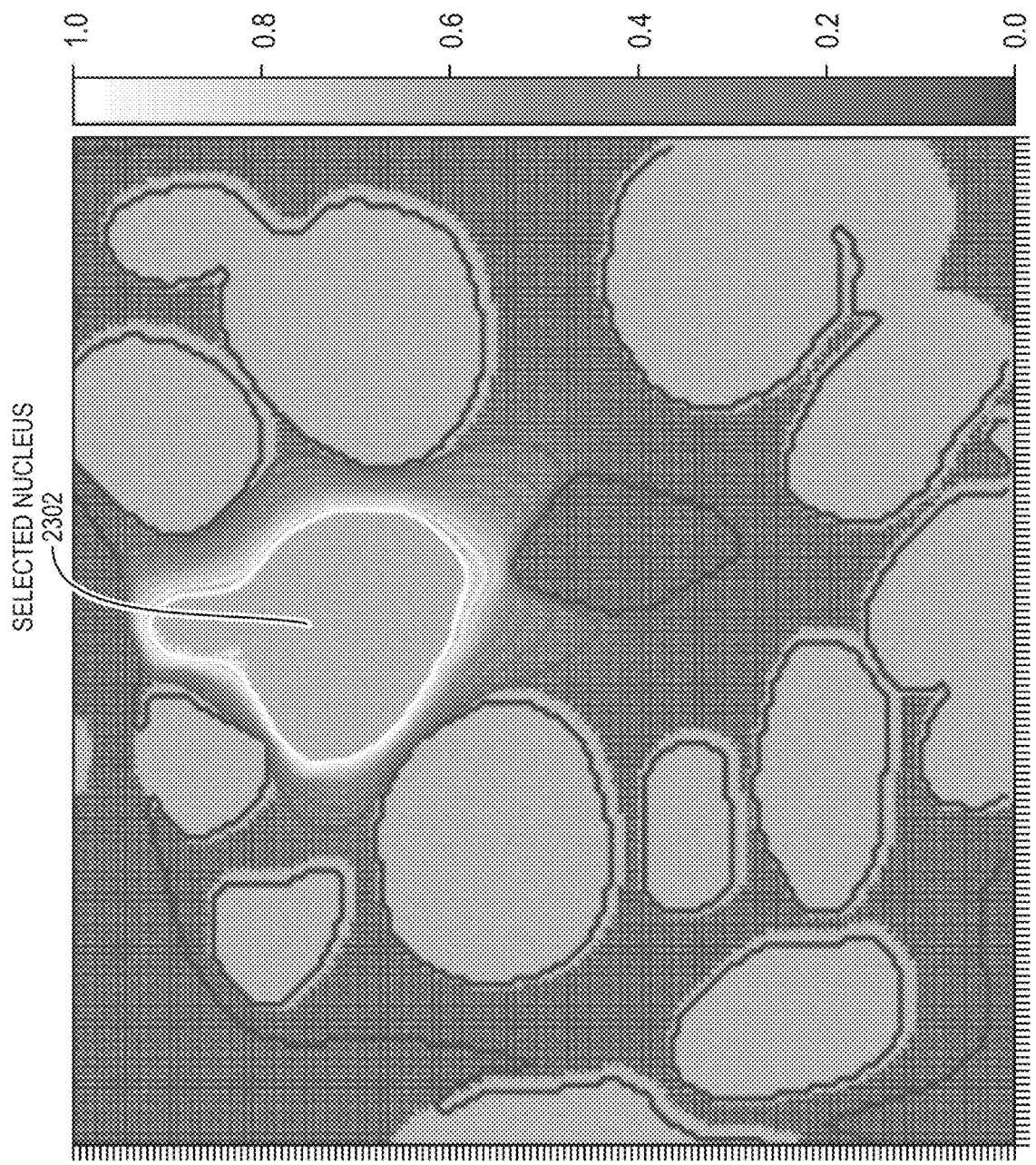
Figure 28C:
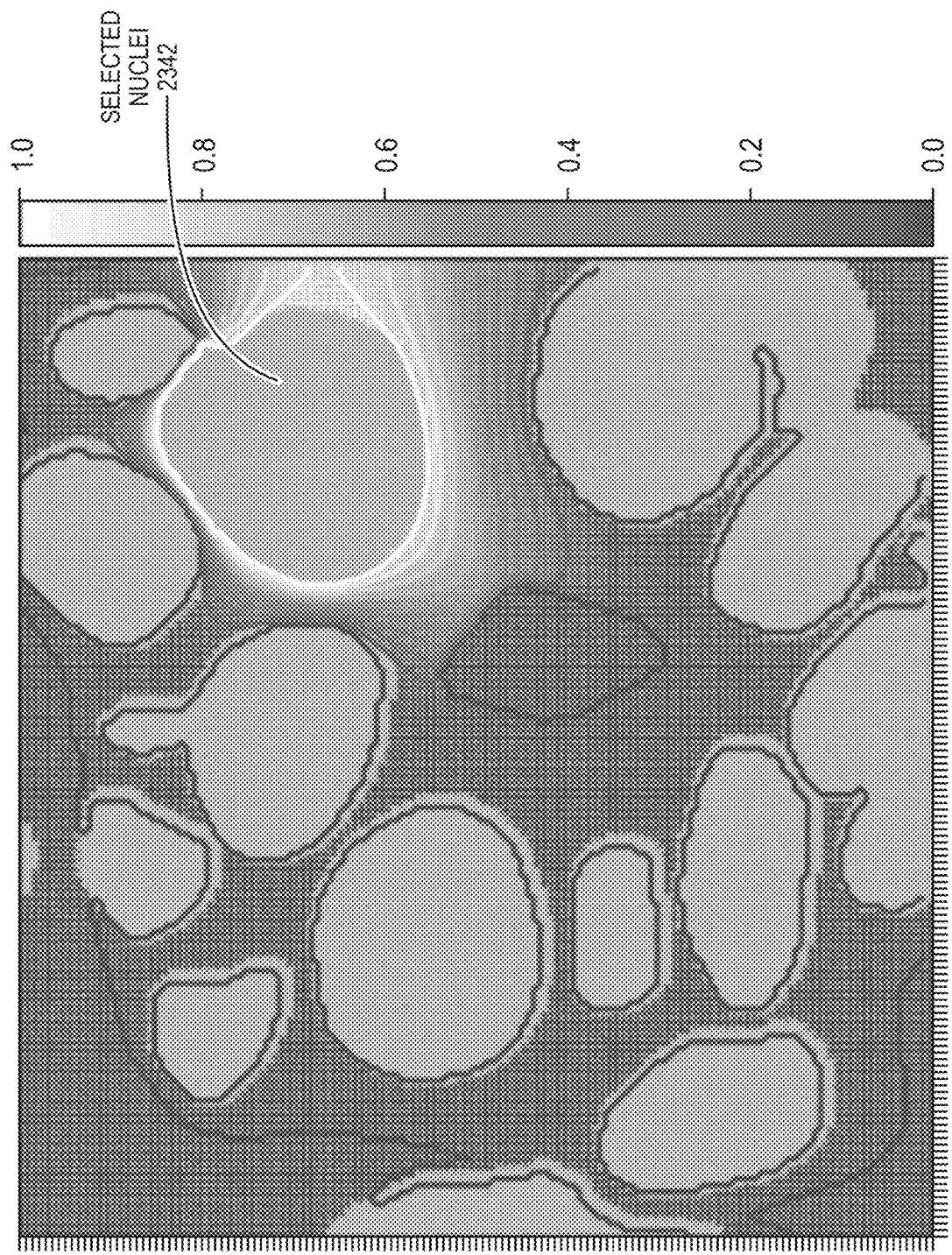
Figure 28D:
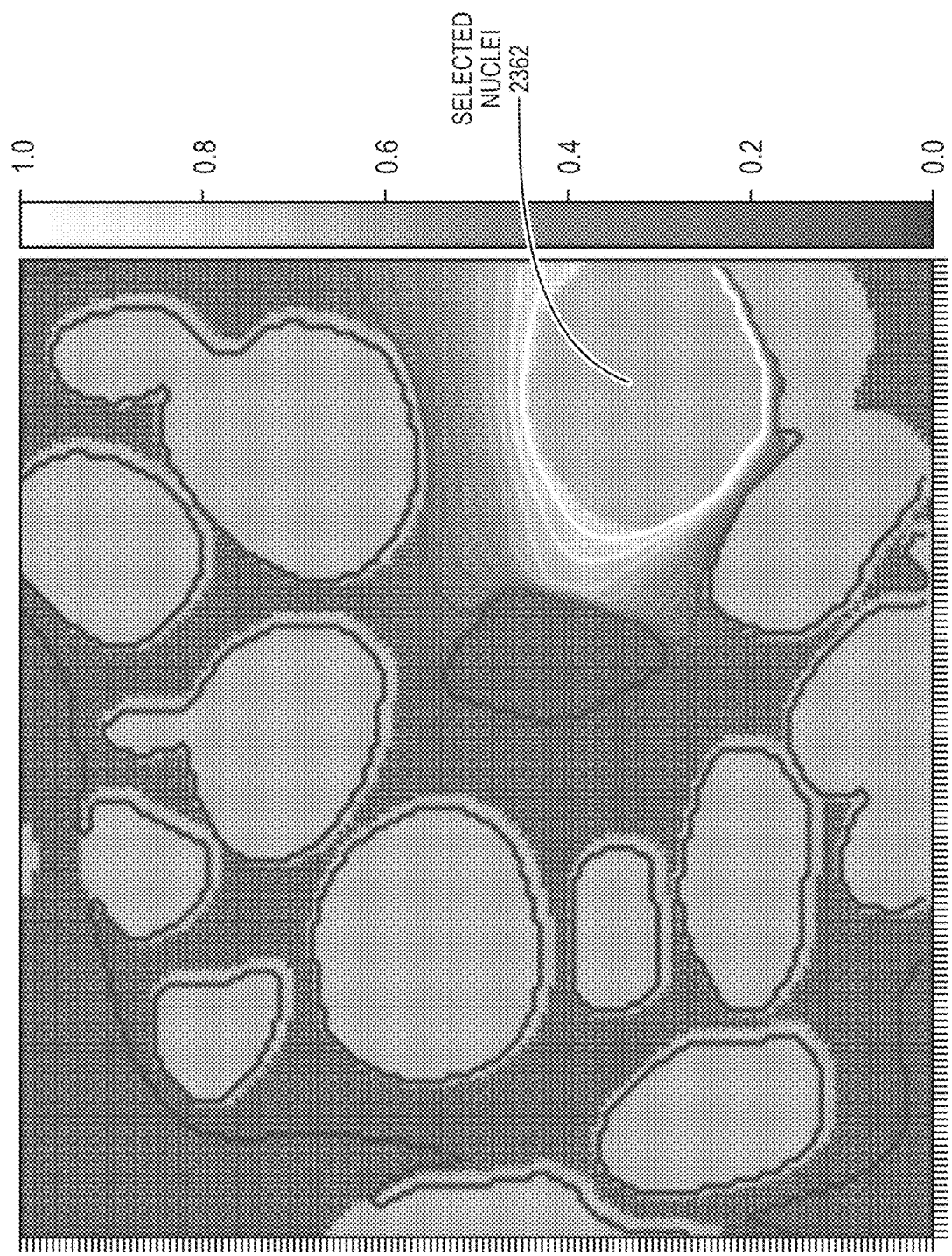
Figure 28E:
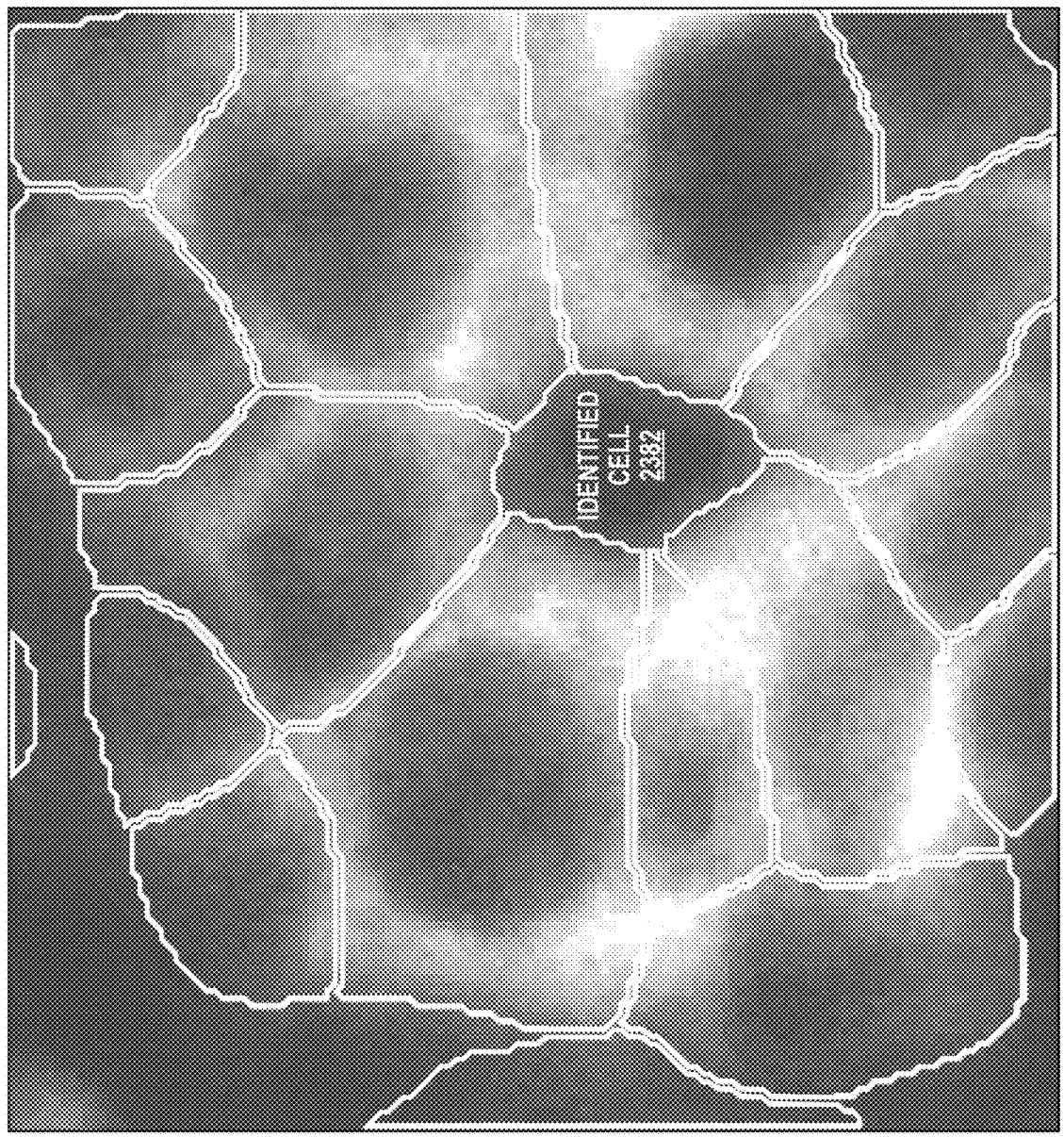
FIG. 28E is an image having a segmentation mask overlaid that is output by the method of the present disclosure.

FIG. 28E is an image 2880 having a segmentation mask overlaid that is output by the method of the present disclosure. In various embodiments, each stained nucleus, shown by the regions in blue, is expanded without leaking into an identified cell region 2882 (e.g., a cell previously segmented using a cellular boundary segmentation based on a cell boundary stain). In various embodiments, the identified cell region 2882 is marked as background, which indicates that the no nuclei can expand into that region because it is a true segmentation or ground truth that one or more cells have been identified in that region.

Figure 37:
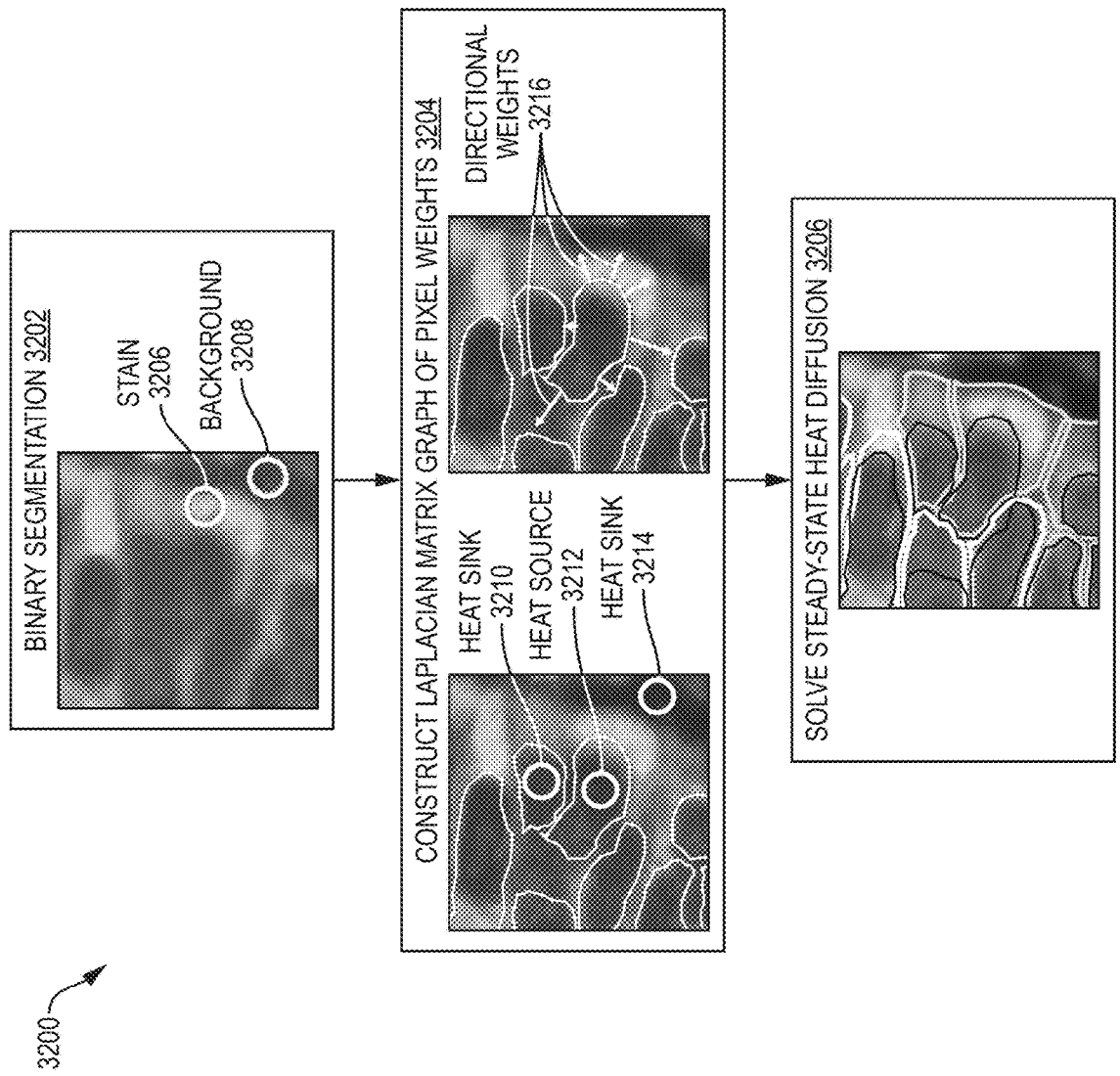
FIG. 37 is a flow diagram illustrating an example embodiment of the heat diffusion method.

FIG. 37 is a flow diagram 3700 illustrating an example embodiment of the cell segmentation using a heat diffusion method of interior expansion. The method first begins with a binary segmentation 3702 of an image of cells with at least one stain 3706 (e.g., a nuclear stain such as DAPI, a cytoplasmic stain such as 18s, etc.) applied. As shown in FIG. 37, cellular nuclei may appear as regions having low intensity of, or no, fluorescent signal (e.g., holes in the stain image). In some embodiments, the binary segmentation 3702 segments the image into one or more identified cellular nuclei and a background mask 3708. From the segmented image, the method then constructs a Laplacian graph of pixel weights 3704 in accordance with the methods described above. To construct the graph of pixel weights 3704, each identified nucleus is used as a heat source 3712, while the background 3708 and all other nuclei are used as heat sinks 3710. Each pixel is assigned a directional weight 3716. Then, the method solves for the steady-state heat diffusion 3706 by assigning, to each respective pixel of the image, a label of the selected nuclei corresponding to the heat map having the highest temperature for that respective pixel. The cellular segmentation map is thereby formed of the set of these labels for each pixel.

Figure 29A:
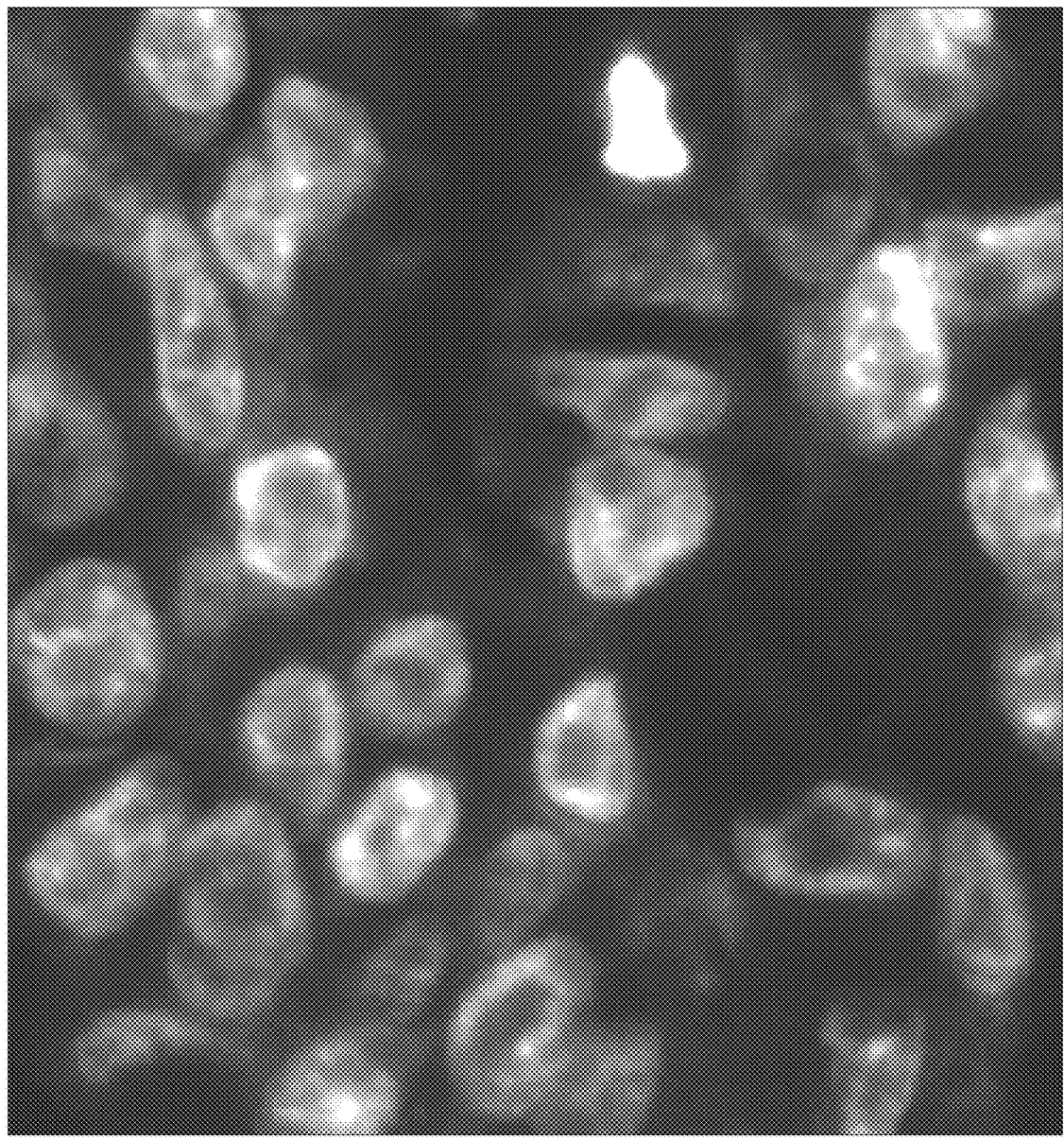
FIG. 29A is an image of cells stained by a nucleus stain (e.g., the stain illustrated in blue) that can be used as an input to embodiments of the present disclosure.
Figure 29B:
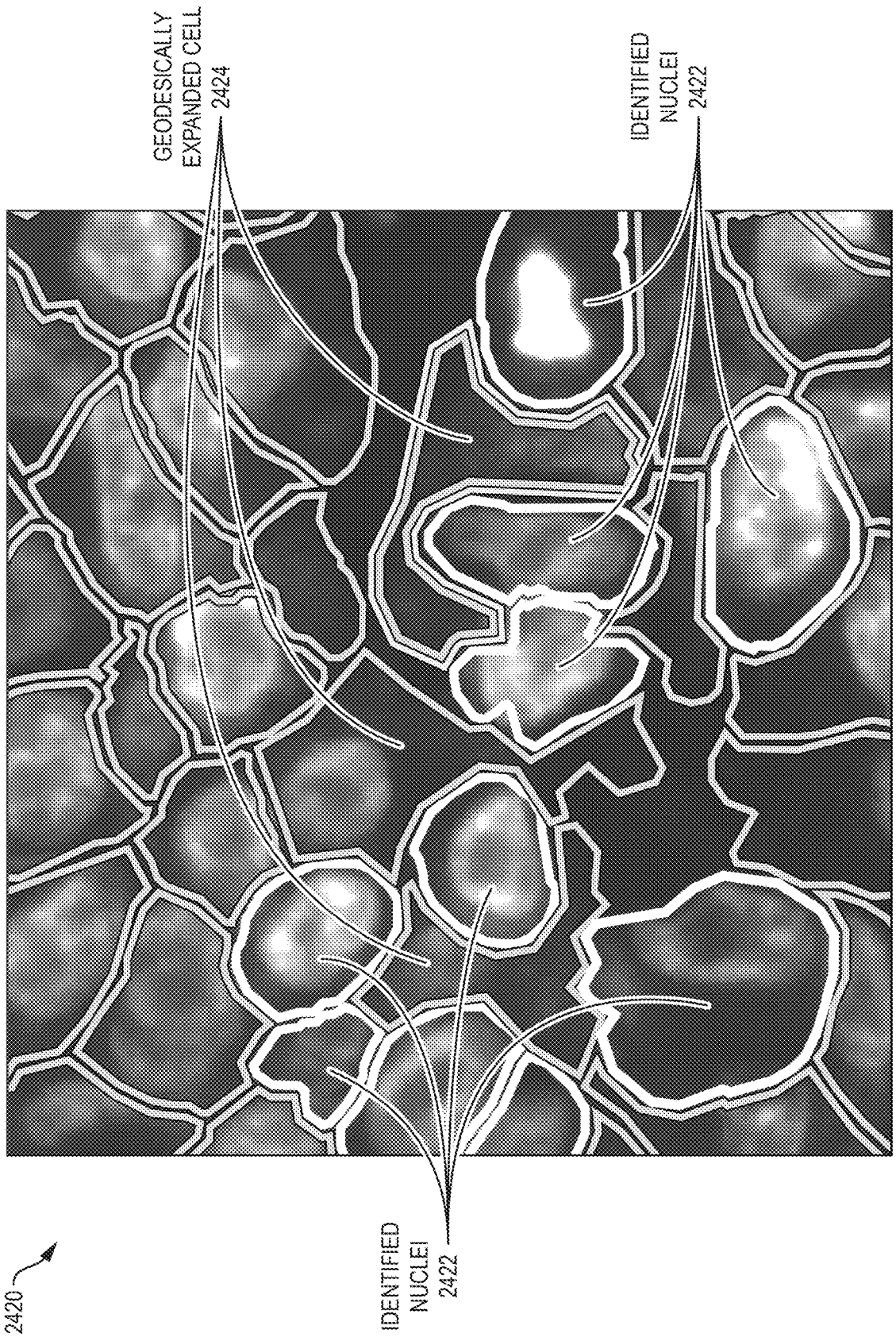
FIG. 29B is an image illustrating cell segmentation using an embodiment of a geodesic expansion method.

FIG. 29A is an image 2900 of cells stained by a nucleus stain (e.g., the stain illustrated in blue) that can be used as an input to embodiments of the present disclosure. FIG. 29B is an image 2920 illustrating cell segmentation using an embodiment of a geodesic expansion method. The identified nuclei 2922 are illustrated with blue nuclei, and are identified using a cell nuclei stain, as described above. Boundary segmented cells (i.e., cells having a highest likelihood of an accurate cell boundary) are identified with a pink border. In this example, the geodesic expansion methods described above output geodesically-expanded cells 2924 that are shown to have leaky, unnatural shapes. For example, the cells have narrow regions (e.g., "necks") that fit between other known existing cells such as the identified nuclei 2922.

Figure 29C:
FIG. 29C is an image illustrating cell segmentation using an embodiment of the heat diffusion expansion method described herein.

FIG. 29C is an image 2940 illustrating cell segmentation using an embodiment of the heat diffusion expansion method described herein. Selected seed nuclei 2942 are illustrated with blue nuclei, and are identified using a cell nuclei stain, as described above. Boundary segmented cells (i.e., cells having a highest likelihood of an accurate cell boundary) are identified with a pink border. In this example, the heat diffusion expansion methods described above output heat diffusion expanded cells 2944 that have more natural shapes compared to the geodesically-expanded cells 2924 illustrated in FIG. 29B. For example, the cells do not have the have narrow regions (e.g., "necks") of the geodesically-expanded cells 2924.

Figure 30A:
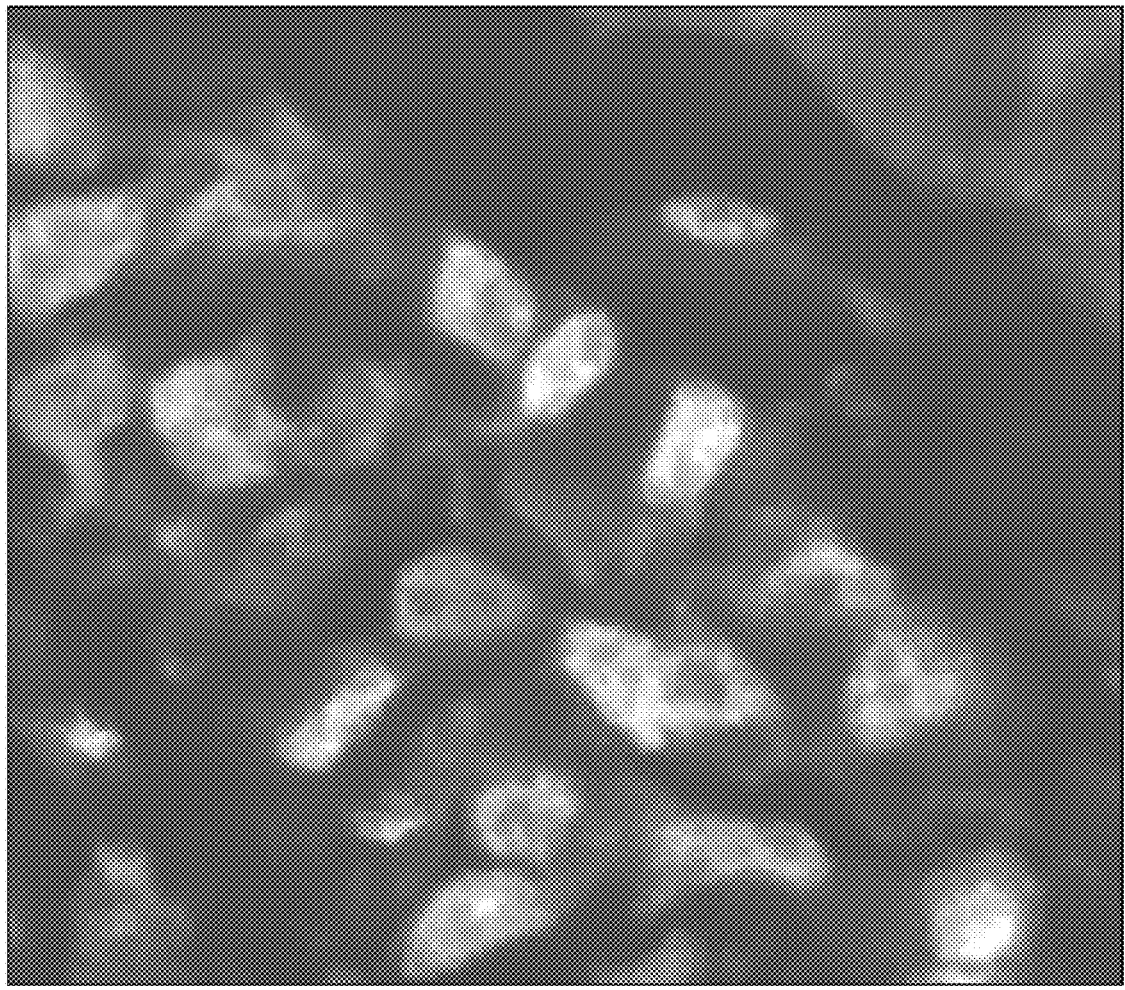
FIG. 30A is an image of cells stained by a nucleus stain (e.g., the stain illustrated in blue) that can be used as an input to embodiments of the present disclosure.
Figure 30B:
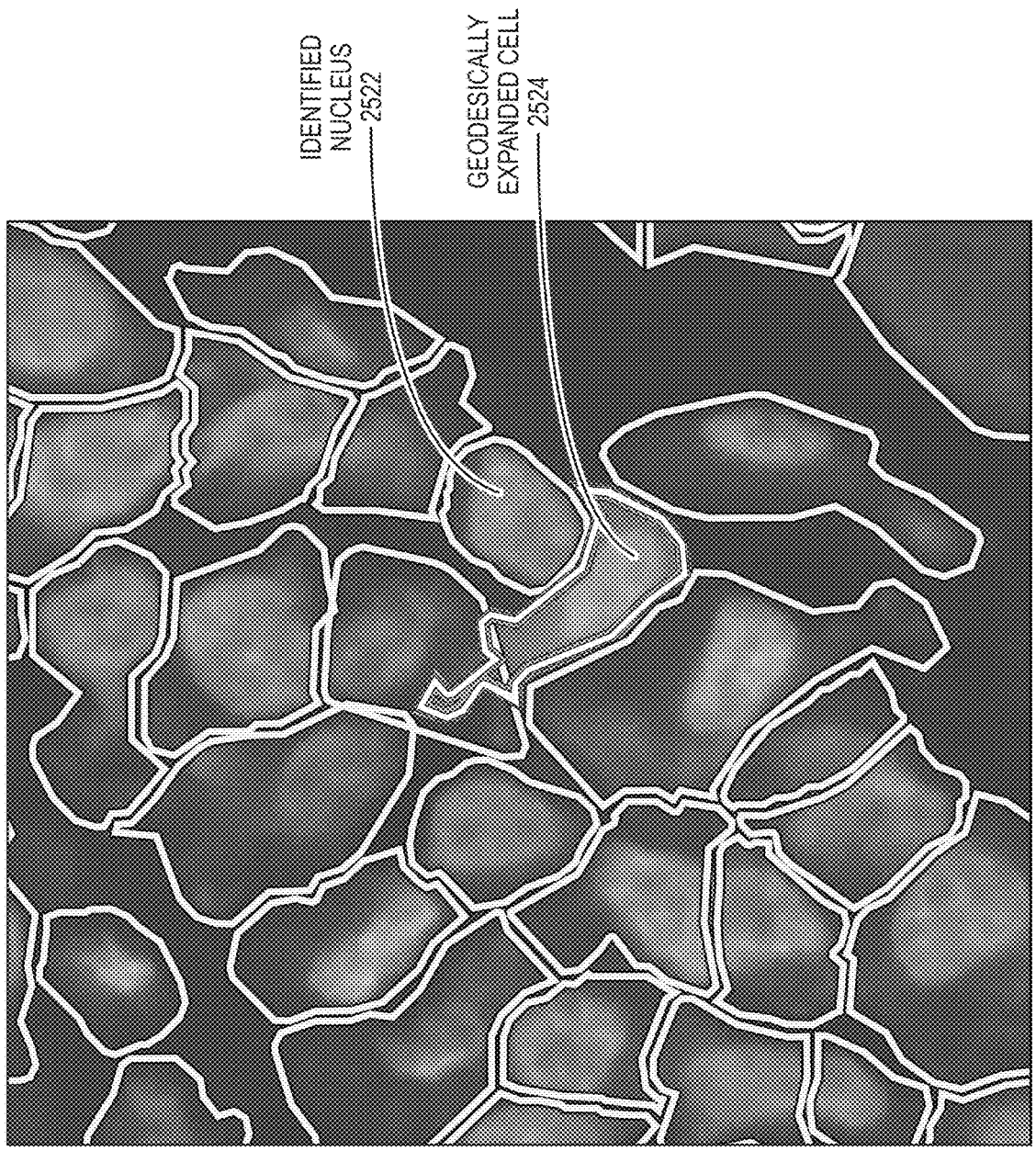
FIG. 30B is an image illustrating cell segmentation using an embodiment of a geodesic expansion method.

FIG. 30A is an image 3000 of cells stained by a nucleus stain (e.g., the stain illustrated in blue) that can be used as an input to embodiments of the present disclosure. FIG. 30B is an image 3020 illustrating cell segmentation using an embodiment of a geodesic expansion method. The identified nuclei 3022 are illustrated with blue nuclei, and are identified using a cell nuclei stain, as described above. Boundary segmented cells (i.e., cells having a highest likelihood of an accurate cell boundary) are identified with a pink border. In this example, the geodesic expansion methods described above output geodesically-expanded cells 3024 that are shown to have leaky, unnatural shapes. For example, the cells have narrow regions (e.g., "necks") that fit between other known existing cells such as the identified nuclei 3022.

Figure 30C:
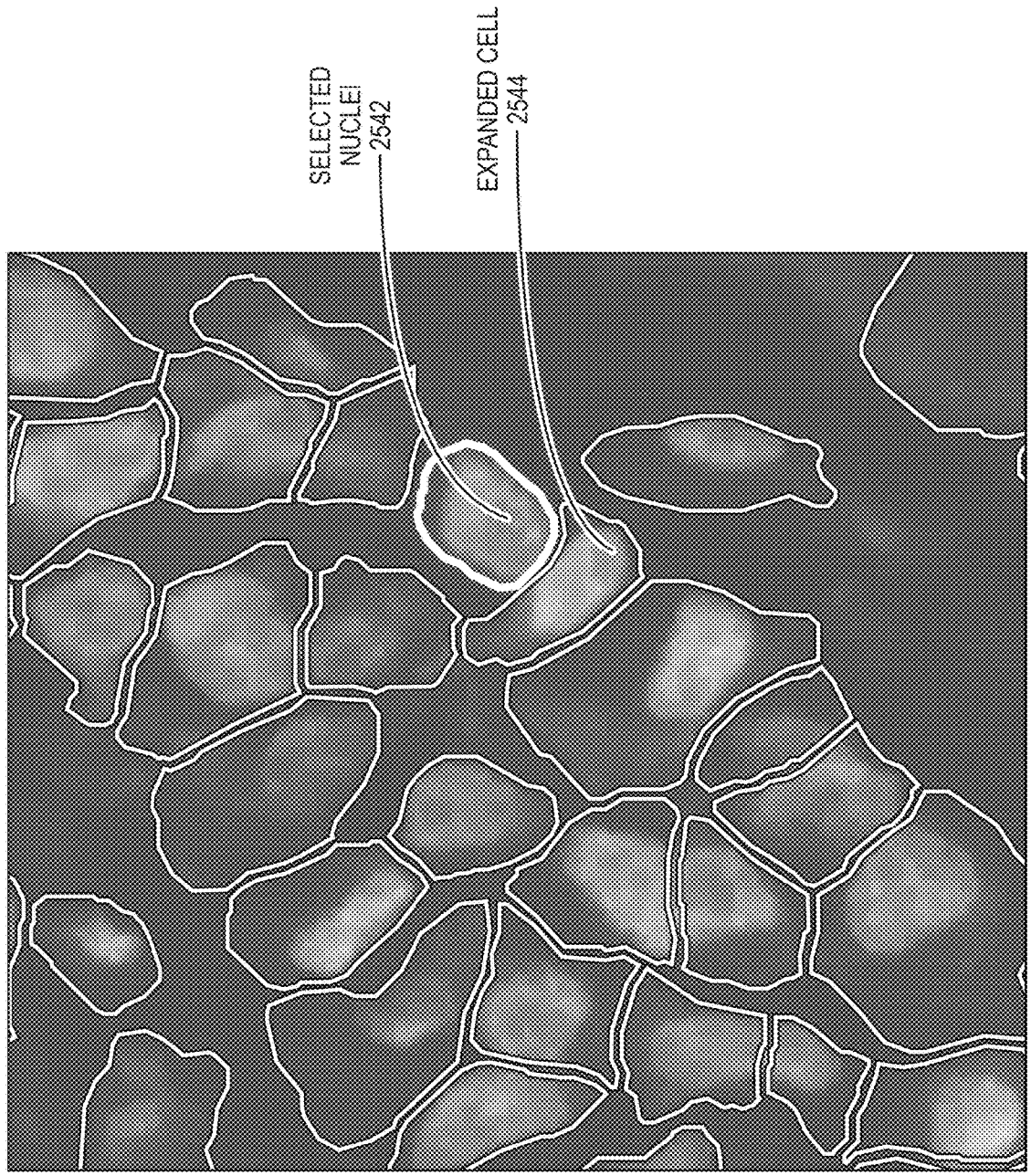
FIG. 30C is an image illustrating cell segmentation using an embodiment of the heat diffusion expansion method described herein.

FIG. 30C is an image 3040 illustrating cell segmentation using an embodiment of the heat diffusion expansion method described herein. Selected seed nuclei 3042 are illustrated with blue nuclei, and are identified using a cell nuclei stain, as described above. Boundary segmented cells (i.e., cells having a highest likelihood of an accurate cell boundary) are identified with a pink border. In this example, the heat diffusion expansion methods described above output heat diffusion expanded cells 3044 that have more natural shapes compared to the geodesically-expanded cells 3024 illustrated in FIG. 30B. For example, the cells do not have the have narrow regions (e.g., "necks") of the geodesically-expanded cells 3024.

Figure 31A:
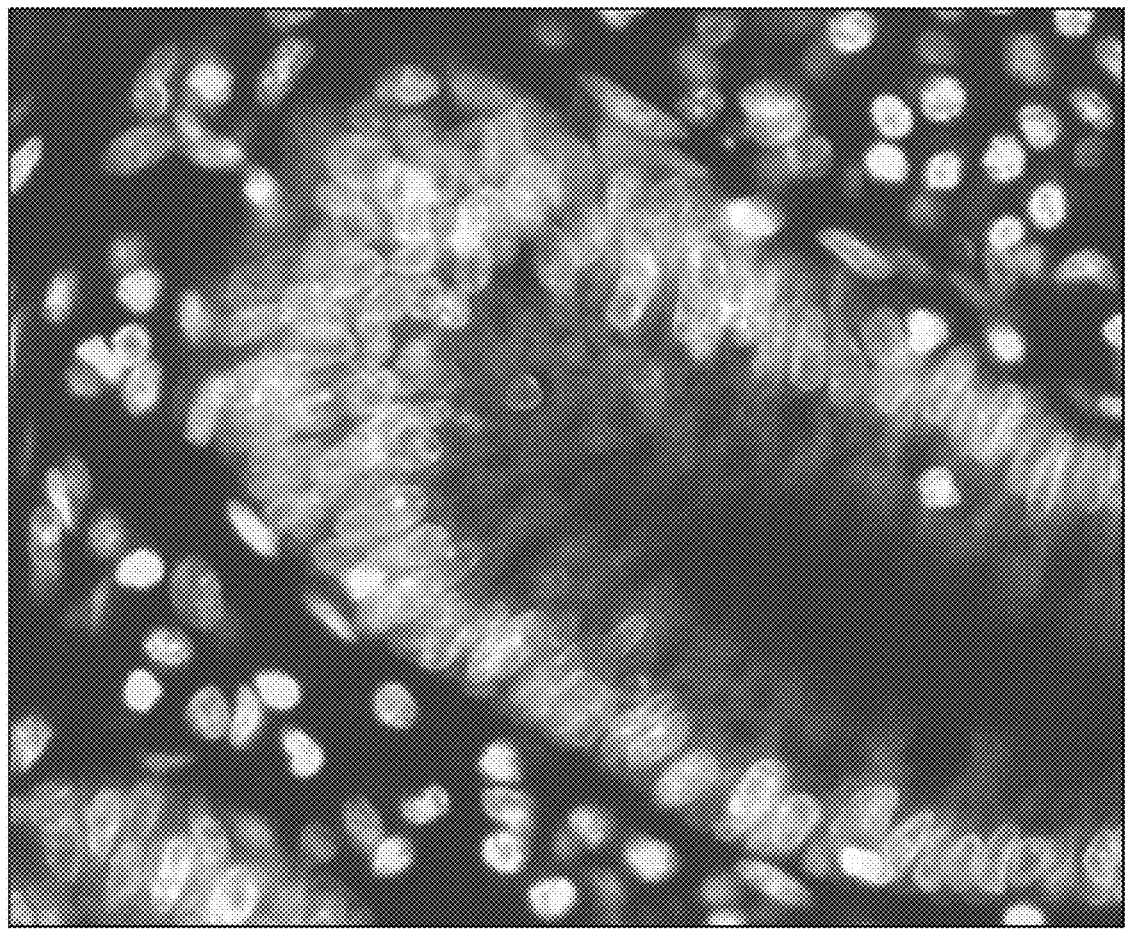
FIG. 31A is an image of cells stained by a nucleus stain (e.g., the stain illustrated in blue) that can be used as an input to embodiments of the present disclosure.
Figure 31B:
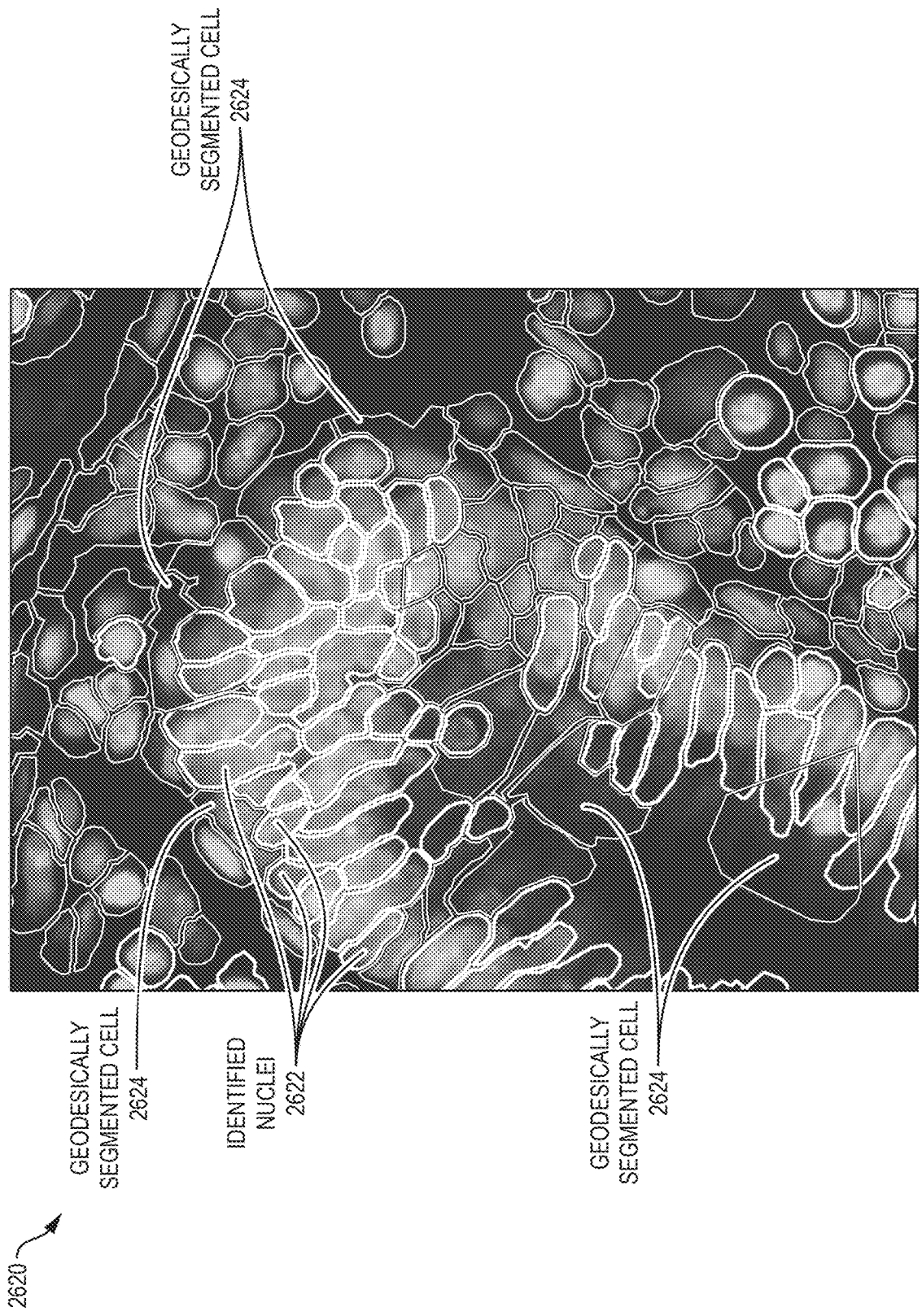
FIG. 31B is an image illustrating cell segmentation using an embodiment of a geodesic expansion method.

FIG. 31A is an image 3100 of cells stained by a nucleus stain (e.g., the stain illustrated in blue) that can be used as an input to embodiments of the present disclosure. FIG. 31B is an image 3120 illustrating cell segmentation using an embodiment of a geodesic expansion method. The identified nuclei 3122 are illustrated with blue nuclei, and are identified using a cell nuclei stain, as described above. Boundary segmented cells (i.e., cells having a highest likelihood of an accurate cell boundary) are identified with a pink border. In this example, the geodesic expansion methods described above output geodesically-expanded cells 3124 that are shown to have leaky, unnatural shapes. For example, the cells have narrow regions (e.g., "necks") that fit between other known existing cells such as the identified nuclei 3122.

Figure 31C:
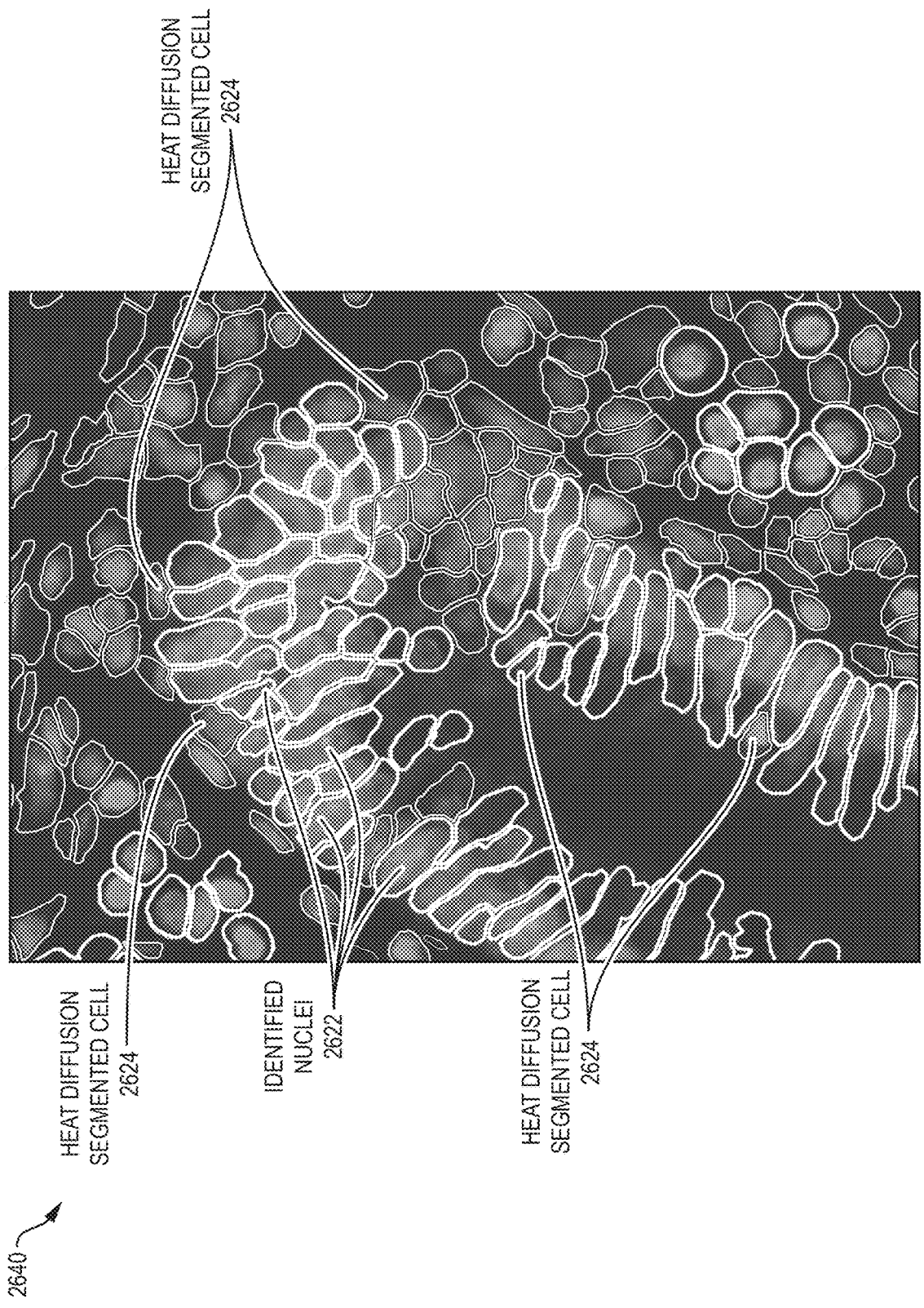
FIG. 31C is an image illustrating cell segmentation using an embodiment of the heat diffusion expansion method described herein.

FIG. 31C is an image 3140 illustrating cell segmentation using an embodiment of the heat diffusion expansion method described herein. Selected seed nuclei 3142 are illustrated with blue nuclei, and are identified using a cell nuclei stain, as described above. In this example, the heat diffusion expansion methods described above output heat diffusion expanded cells 3144 that have more natural shapes compared to the geodesically-expanded cells 3124 illustrated in FIG. 31B. For example, the cells do not have the have narrow regions (e.g., "necks") of the geodesically-expanded cells 3124.

Figure 32A:
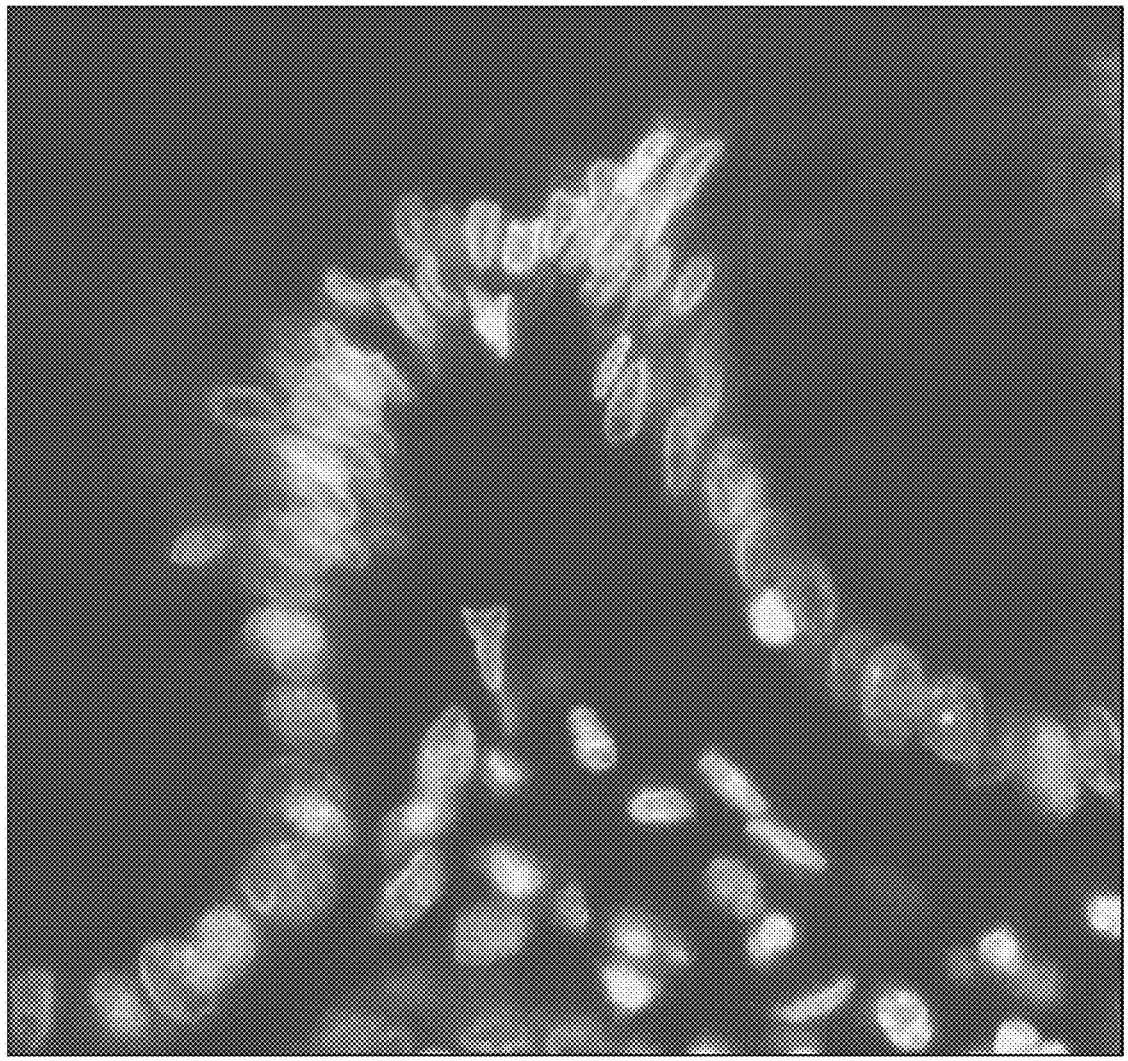
FIG. 32A is an image of cells stained by a nucleus stain (e.g., the stain illustrated in blue) that can be used as an input to embodiments of the present disclosure.
Figure 32B:
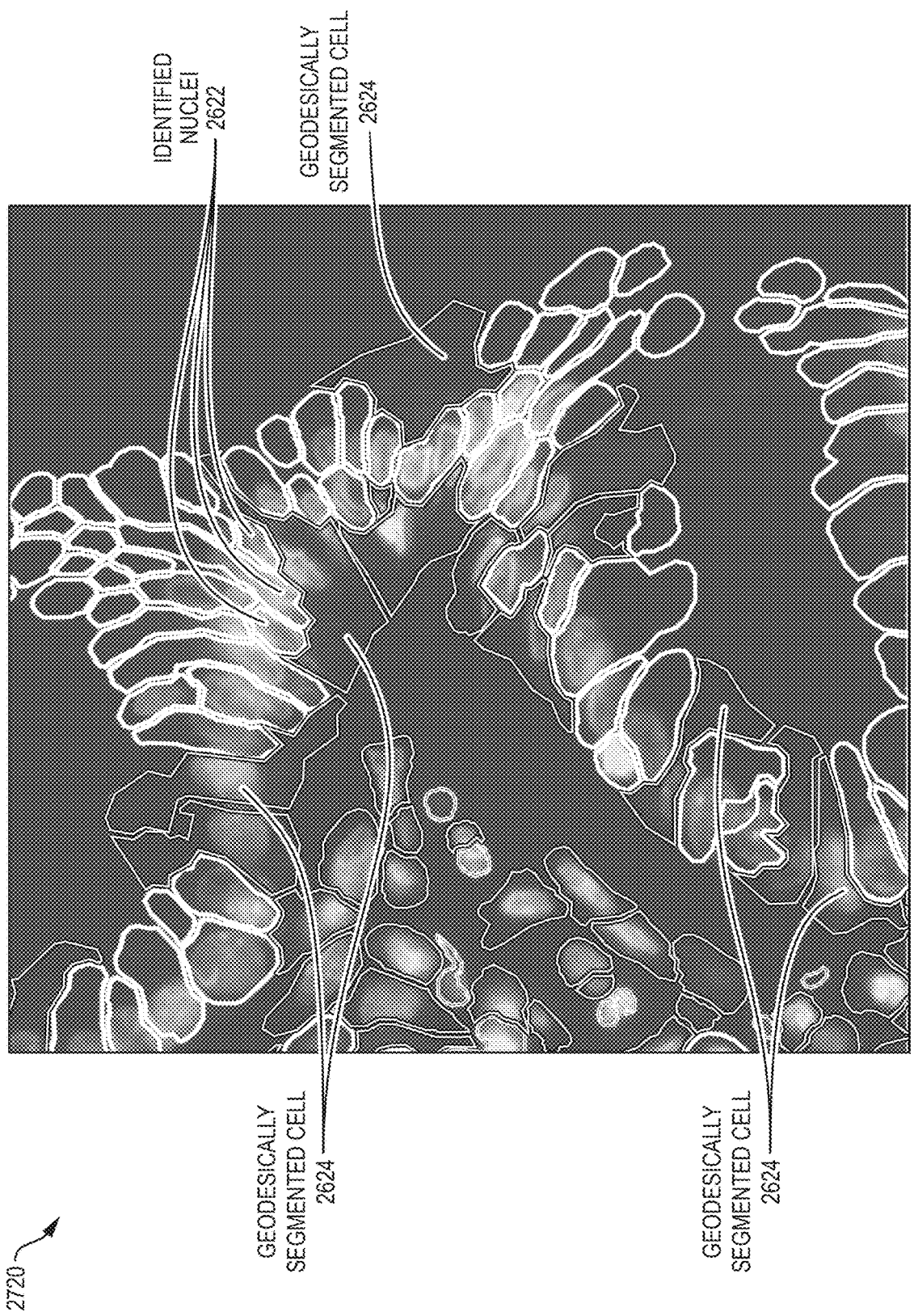
FIG. 32B is an image illustrating cell segmentation using an embodiment of a geodesic expansion method.

FIG. 32A is an image 3200 of cells stained by a nucleus stain (e.g., the stain illustrated in blue) that can be used as an input to embodiments of the present disclosure. FIG. 32B is an image 3220 illustrating cell segmentation using an embodiment of a geodesic expansion method. The identified nuclei 3222 are illustrated with blue nuclei, and are identified using a cell nuclei stain, as described above. Boundary segmented cells (i.e., cells having a highest likelihood of an accurate cell boundary) are identified with a pink border. In this example, the geodesic expansion methods described above output geodesically-expanded cells 3224 that are shown to have leaky, unnatural shapes. For example, the cells have narrow regions (e.g., "necks") that fit between other known existing cells such as the identified nuclei 3222.

Figure 32C:
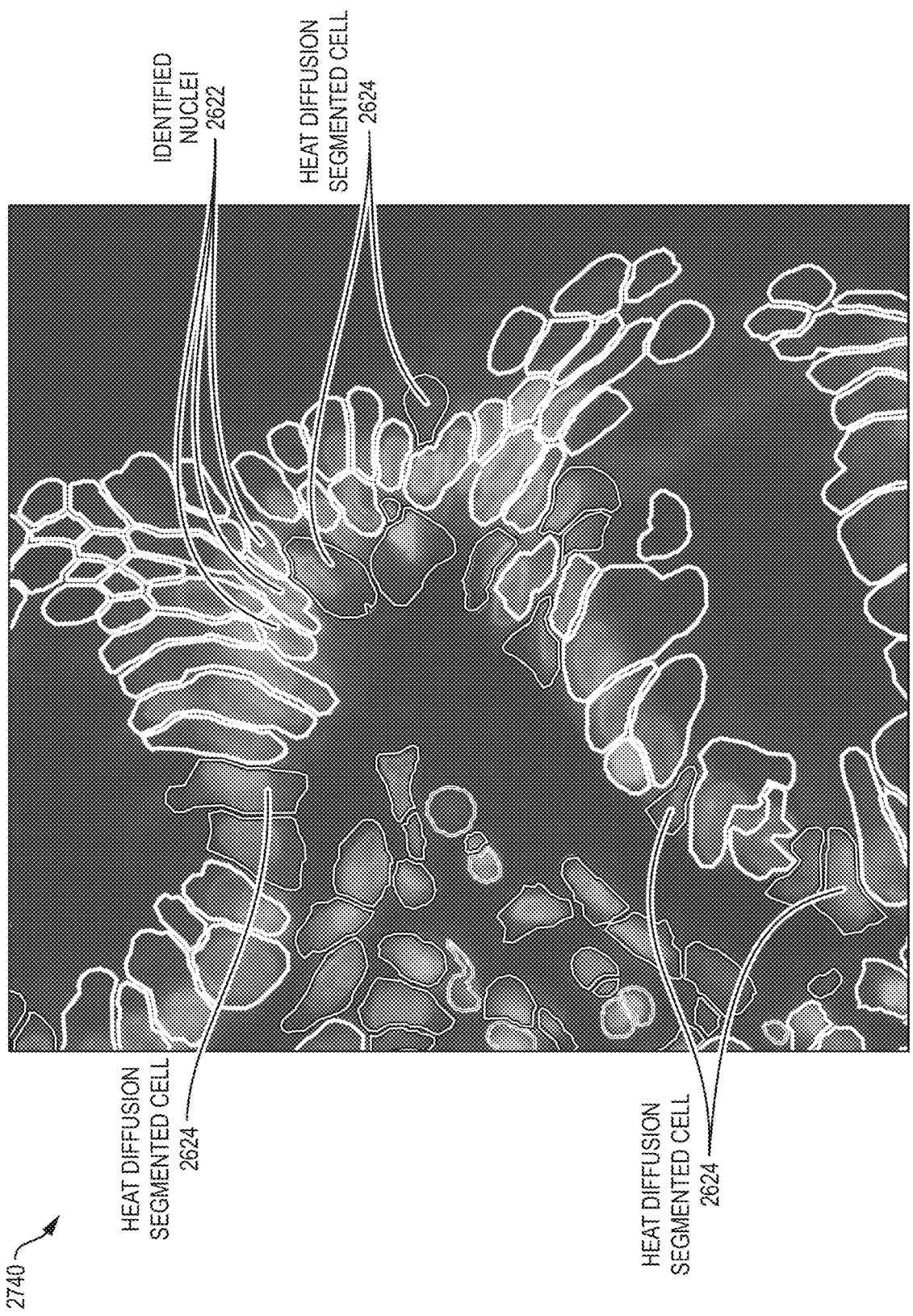
FIG. 32C is an image illustrating cell segmentation using an embodiment of the heat diffusion expansion method described herein.

FIG. 32C is an image 3240 illustrating cell segmentation using an embodiment of the heat diffusion expansion method described herein. Selected seed nuclei 3242 are illustrated with blue nuclei, and are identified using a cell nuclei stain, as described above. Boundary segmented cells (i.e., cells having a highest likelihood of an accurate cell boundary) are identified with a pink border. In this example, the heat diffusion expansion methods described above output heat diffusion expanded cells 3244 that have more natural shapes compared to the geodesically-expanded cells 3224 illustrated in FIG. 32B. For example, the cells do not have the have narrow regions (e.g., "necks") of the geodesically-expanded cells 3224.

Figure 33:
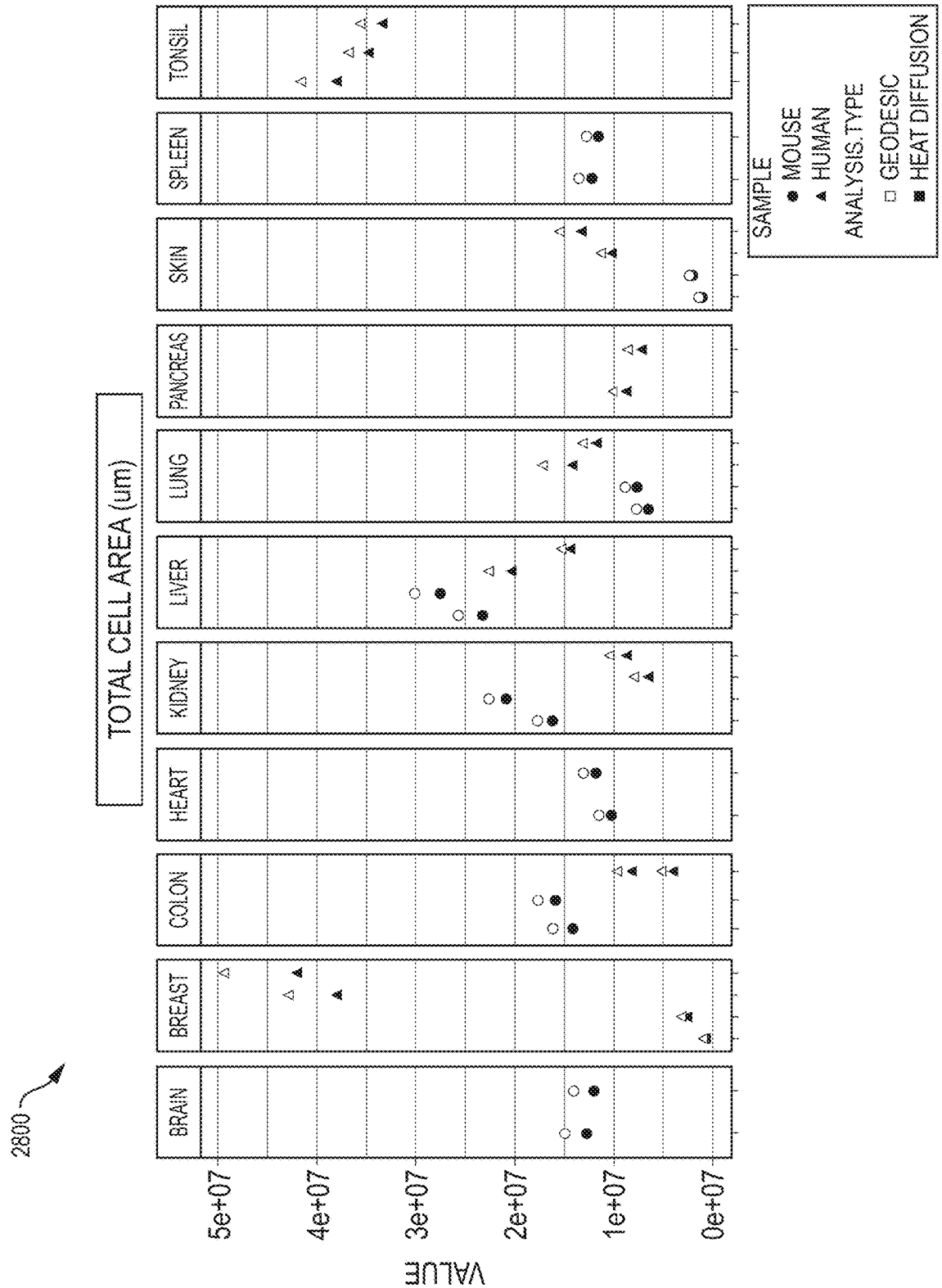
FIG. 33 is a graph illustrating an example embodiment of metrics comparing a geodesic cell expansion to a heat diffusion cell expansion based on total cell area in $\mu m^2$.

FIG. 33 is a graph 3300 illustrating an example embodiment of metrics comparing a geodesic cell expansion to a heat diffusion cell expansion based on total cell area in $\mu m^2$. The graph illustrates the total cell area of mouse samples with a circle, human samples with a triangle. Cell samples were extracted from organs such as the brain, breast, colon, heart, kidney, liver, lung, pancreas, skin, spleen, and tonsil. The graph 3300 illustrates the heat diffusion having a lower total cell area than the geodesic version in all cell types. In some embodiments, lower total cell area indicates a higher accuracy by preventing erroneous leakage of cell area.

Figure 34:
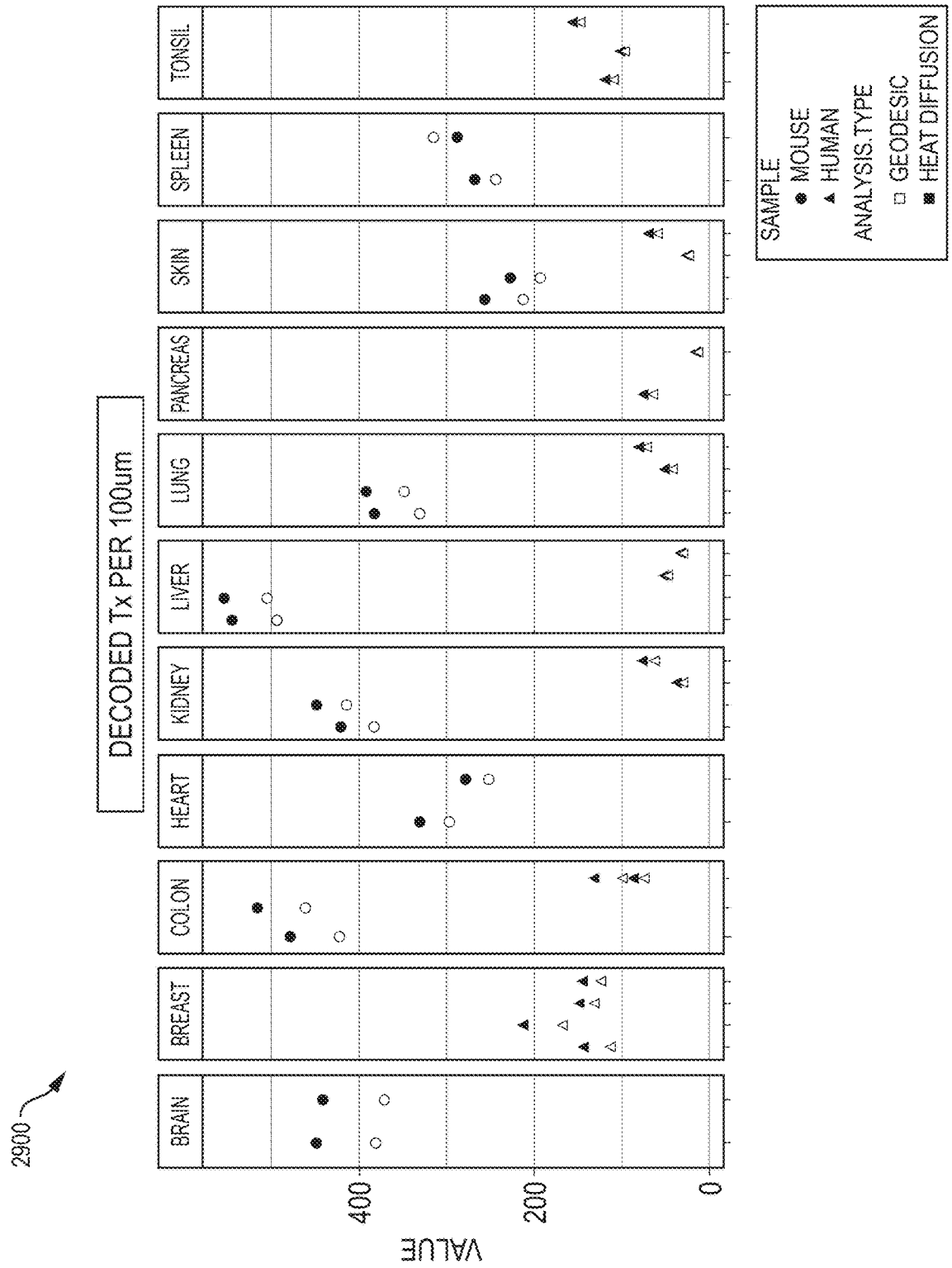
FIG. 34 is a graph illustrating an example embodiment of metrics comparing a geodesic cell expansion to a heat diffusion cell expansion based on decoded transcriptions (Tx) per 100 $\mu m^2$.

FIG. 34 is a graph 3400 illustrating an example embodiment of metrics comparing a geodesic cell expansion to a heat diffusion cell expansion based on decoded transcriptions (Tx) per 100 $\mu m^2$. The graph illustrates the decoded transcriptions of mouse samples with a circle, human samples with a triangle. Cell samples were extracted from organs such as the brain, breast, colon, heart, kidney, liver, lung, pancreas, skin, spleen, and tonsil. The graph 3400 illustrates the heat diffusion having greater decoded transcriptions than the geodesic version. The increased number of decoded transcriptions per 100 $\mu m^2$ can be due to the lowered cellular area illustrated by FIG. 33.

Figure 35:
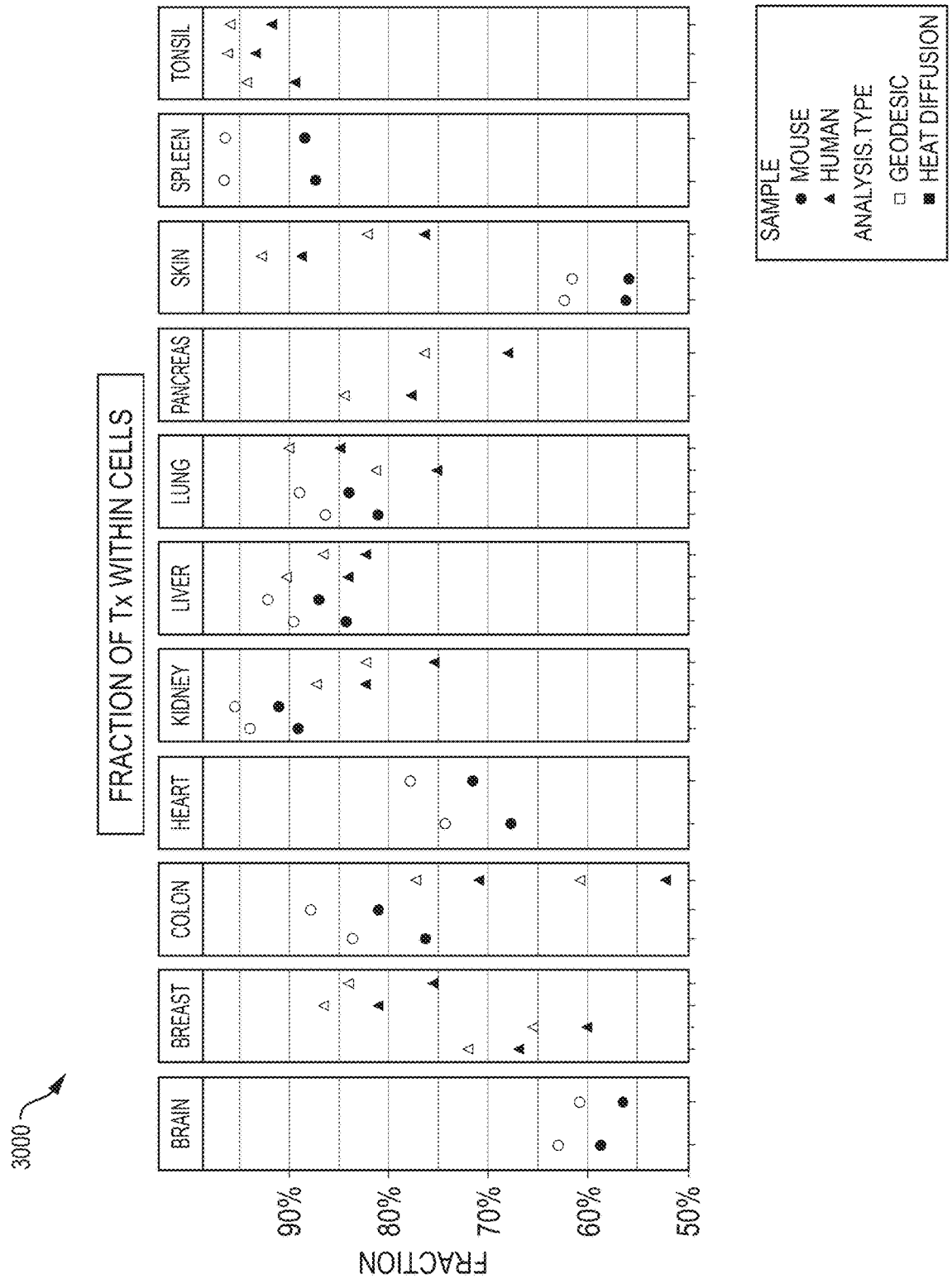
FIG. 35 is a graph illustrating an example embodiment of metrics comparing a geodesic cell expansion to a heat diffusion cell expansion based on a fraction of transcriptions within the cells.

FIG. 35 is a graph 3500 illustrating an example embodiment of metrics comparing a geodesic cell expansion to a heat diffusion cell expansion based on a fraction of transcriptions within the cells. The graph illustrates the fraction or ratio of transcriptions within cells of mouse samples with a circle, human samples with a triangle. Cell samples were extracted from organs such as the brain, breast, colon, heart, kidney, liver, lung, pancreas, skin, spleen, and tonsil. The graph 3500 illustrates the geodesic version having a greater fraction of transcriptions within the cells than the heat diffusion version. The lower fraction or ratio of transcriptions within cells observed with the heat diffusion interior expansion algorithm, can be explained because of the reduced cell size demonstrated by FIG. 33 and better controlled expansion (e.g., geodesic interior expansion using a fine-tuned cost function).

Figure 36:
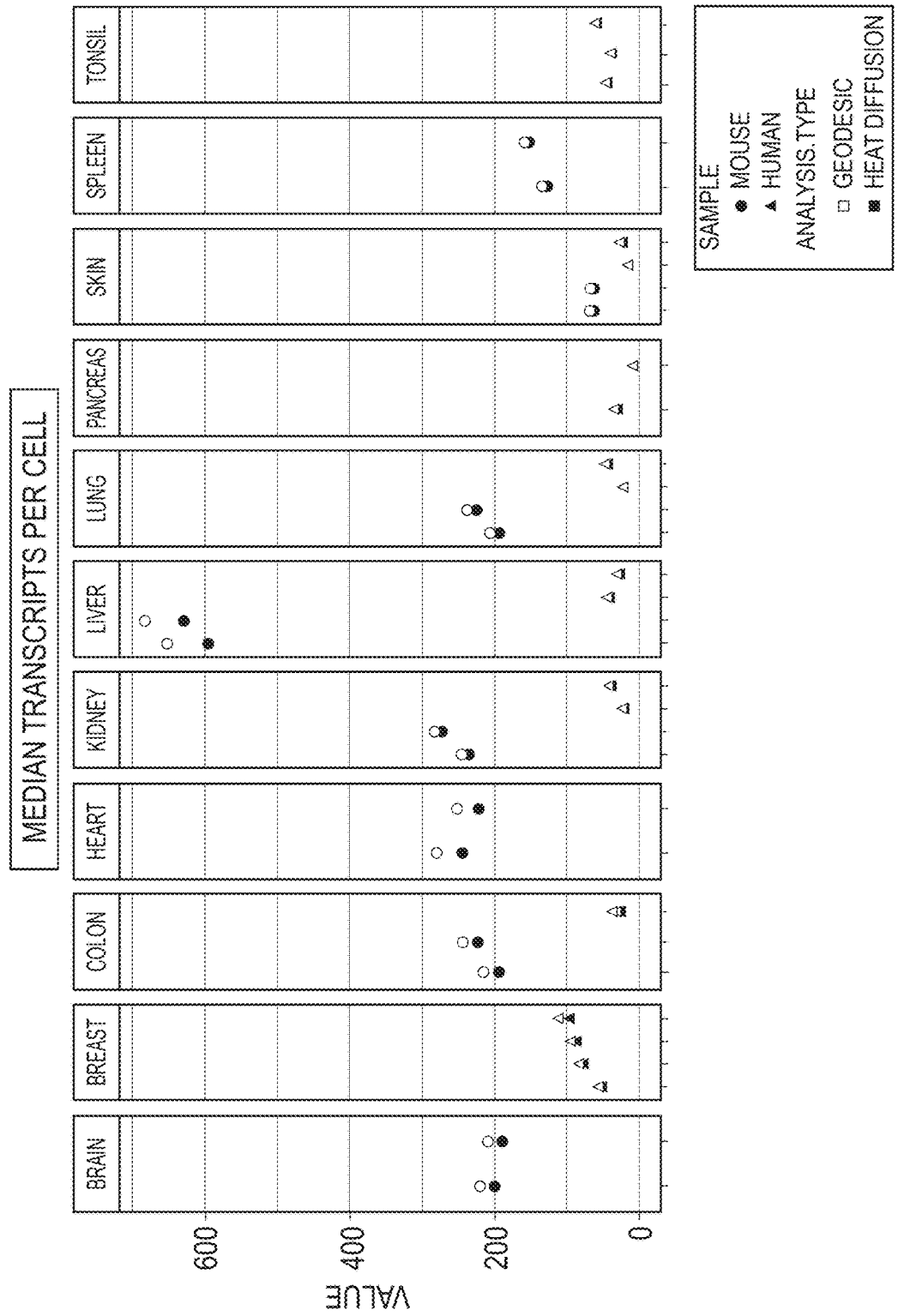
FIG. 36 is a graph illustrating an example embodiment of metrics comparing a geodesic cell expansion to a heat diffusion cell expansion based on a median number of transcripts with the cells.

FIG. 36 is a graph 3600 illustrating an example embodiment of metrics comparing a geodesic cell expansion to a heat diffusion cell expansion based on a median number of transcripts with the cells. The graph illustrates the median transcripts per cell within cells of mouse samples with a circle, human samples with a triangle. Cell samples were extracted from organs such as the brain, breast, colon, heart, kidney, liver, lung, pancreas, skin, spleen, and tonsil. The graph 3600 illustrates the geodesic version having a similar median number of transcriptions per cell as the heat diffusion version in many cases.

In various embodiments, the resulting segmentation masks (e.g., nuclear segmentation mask, cell segmentation mask, interior segmentation mask) are instance masks, meaning they contain integers where each non-zero integer represents an instance of the object. In various embodiments, a post-processing algorithm constructs each instance of cells/nuclei from the output of the model.

What is claimed is:

1. A method of cell segmentation comprising:
    reading a nuclear segmentation mask of at least one image, the at least one image comprising a plurality of pixels arranged in at least two dimensions, the nuclear segmentation mask identifying a plurality of cellular nuclei stained with a cellular nucleus stain in the at least one image;
    for each of the plurality of pixels in the at least one image, determining a plurality of amplitudes for each of the plurality of pixels, each amplitude of the plurality of amplitudes for each of the plurality of pixels corresponding to exactly one dimension of the at least two dimensions;
    constructing a graph having a plurality of nodes and a plurality of edges, wherein each of the plurality of nodes corresponds to one of the plurality of pixels and wherein nodes corresponding to neighboring pixels are connected by one of the plurality of edges;

assigning a weight to each of the plurality of edges, wherein the weight of each respective edge is based on the amplitudes of the pixels corresponding to the nodes connected thereby;

based on the graph, determining, for each of the plurality of cellular nuclei, a heat map corresponding to a predicted cell region associated with that cellular nucleus; and based on the heat maps of the plurality of cellular nuclei, determining a cellular segmentation mask comprising the predicted cell regions.

2. The method of claim 1, wherein the weight assigned to each edge of the plurality of edges is determined based on an affinity, wherein the affinity is determined by:

affinity=$P$(positive direction of motion)+$P$(no direction of motion)−$P$(negative direction of motion)−$P$(background)−divergence.

3. The method of claim 2, wherein the weight assigned to each edge of the plurality of edges is determined by:

$$\text{weight} = \frac{1}{1 + e^{-\alpha * \text{affinity}}}.$$

4. The method of claim 1, wherein only those nodes of the plurality of nodes corresponding to adjacent pixels are connected by one of the plurality of edges.

5. The method of any one of claim 1, further comprising:
reading an interior segmentation mask and/or a background mask of the at least one image; and
wherein constructing the graph is based on the interior segmentation mask and/or the background mask.

6. The method of claim 5, further comprising:
based on the heat maps of the plurality of cellular nuclei, assigning each of the plurality of pixels to one of the plurality of cellular nuclei or to a background region.

7. The method of claim 6, wherein said assigning further comprises selecting, for at least a portion of the plurality of pixels, a cellular nucleus of the plurality of cellular nuclei having an associated heat map with a highest value for that pixel.

8. The method of claim 1, wherein determining the heat maps comprises minimizes a Dirichlet energy for the graph.

9. The method of claim 1, wherein determining the heat maps comprises representing the graph as a Laplacian matrix.

10. The method of claim 9, wherein the at least one cellular interior stain comprises: a 18S ribosomal RNA stain, a polyadenylated mRNA stain, an antibody stain for alpha-smooth muscle actin (alphaSMA), an antibody stain for vimentin (VIM), an antibody stain for pan-cytokeratin (pan-CK), an antibody stain for pan-cadherin (pan-CDH), an antibody stain for drebrin, an antibody stain for gamma-catenin, an antibody stain for S100A14, an antibody stain for moesin, an antibody stain for beta-catenin, an antibody stain for GLUT2, an antibody stain for ASGR1, an antibody stain for E-cadherin, an antibody stain for cadherin-17, an antibody stain for occludin, or a combination thereof.

11. The method of claim 1, wherein determining the plurality of amplitudes comprises providing the at least one image to a pretrained machine learning model.

12. The method of claim 1, further comprising computing a divergence value for each pixel based on its plurality of amplitudes.

13. The method of claim 12, wherein the weight of each edge is further based on the divergence values of the pixels corresponding to the nodes connected thereby.

14. The method of claim 1, wherein the cellular nucleus stain comprises a DAPI stain.

15. The method of claim 1, the method further comprising:
determining a cellular boundary mask from the at least one image, wherein the cellular boundary mask identifies a plurality of cellular boundaries stained with at least one cellular boundary stain in the at least one image;
determining a first plurality of segmented cells based on the plurality of cellular boundaries in the cellular boundary mask.

16. The method of claim 15, further comprising:
determining a cellular interior mask from the at least one image, wherein the cellular interior mask identifies portions of the at least one image stained with a cellular interior stain; and
determining a selected cellular nuclei mask, the selected cellular nuclei mask identifying a plurality of selected cellular nuclei of the plurality of cellular nuclei being within the portion of the at least one image identified by the cellular interior mask;
wherein determining the heat map is performed for of the plurality of selected cellular nuclei.

17. The method of claim 1, wherein the cellular nucleus stain comprises DAPI.

18. The method of claim 1, wherein the at least one cellular boundary stain comprises: an antibody stain for ATP1A1, an antibody stain for ATP2B1, an antibody stain for pan-cytokeratin (pan-CK), an antibody stain for pan-cadherin (pan-CDH), an antibody stain for beta 2 microglobulin (B2M), an antibody stain for FXYD3, an antibody stain for gamma-catenin, an antibody stain for S100A14, an antibody stain for beta-catenin, an antibody stain for annexin A2, an antibody stain for GLUT2, an antibody stain for E-cadherin, an antibody stain for p120 catenin, an antibody stain for cadherin-17, an antibody stain for CD44, an antibody stain for CD45, a WGA lectin stain, a Con-A lectin stain, a SNA lectin stain, or a combination thereof.

19. A computer program product for cell segmentation, the computer program product comprising a computer readable storage medium having program instructions embodied therewith, the program instructions executable by a processor to cause the processor to perform a method according to claim 1.

20. A system comprising:
a processor; and
a memory with program instructions executable by the processor stored thereon, such that upon being executed by the processor, the instructions perform a method according to claim 1.

21. The system of claim 20, further comprising an imaging subsystem configured to image a sample.

22. The system of claim 21, wherein the imaging subsystem comprises an objective lens and an image sensor.

23. The system of claim 21, further comprising a fluidic subsystem configured to deliver one or more reagents to the sample.

* * * * *